(12) United States Patent
Heemskerk et al.

(10) Patent No.: US 12,448,427 B2
(45) Date of Patent: Oct. 21, 2025

(54) BINDING PROTEINS SPECIFIC FOR HA-1$^H$ AND USES THEREOF

(71) Applicant: ACADEMISCH ZIEKENHUIS LEIDEN (H.O.D.N. LUMC), Leiden (NL)

(72) Inventors: Mirjam H.M. Heemskerk, Leiden (NL); J.H. Frederik Falkenburg, Leiden (NL)

(73) Assignee: ACADEMISCH ZIEKENHUIS LEIDEN (H.O.D.N. LUMC), Leiden (NL)

( * ) Notice: Subject to any disclaimer, the term of this patent is extended or adjusted under 35 U.S.C. 154(b) by 1128 days.

(21) Appl. No.: 17/283,786

(22) PCT Filed: Oct. 9, 2019

(86) PCT No.: PCT/NL2019/050671
§ 371 (c)(1),
(2) Date: Apr. 8, 2021

(87) PCT Pub. No.: WO2020/076156
PCT Pub. Date: Apr. 16, 2020

(65) Prior Publication Data
US 2021/0380656 A1    Dec. 9, 2021

(30) Foreign Application Priority Data
Oct. 10, 2018 (NL) .................................. 2021789

(51) Int. Cl.
| | | |
|---|---|---|
| *C07K 14/725* | (2006.01) | |
| *A61K 35/17* | (2025.01) | |
| *A61K 40/11* | (2025.01) | |
| *A61K 40/32* | (2025.01) | |
| *A61K 40/42* | (2025.01) | |
| *A61K 40/46* | (2025.01) | |
| *A61P 35/00* | (2006.01) | |
| *C12N 5/0783* | (2010.01) | |

(52) U.S. Cl.
CPC .......... *C07K 14/7051* (2013.01); *A61K 40/11* (2025.01); *A61K 40/32* (2025.01); *A61K 40/42* (2025.01); *A61K 40/46* (2025.01); *A61P 35/00* (2018.01); *C12N 5/0636* (2013.01); *A61K 2239/48* (2023.05); *C12N 2510/00* (2013.01)

(58) Field of Classification Search
CPC .......... C07K 14/7051; C07K 14/70539; A61K 39/4611; A61K 39/4632; A61K 2239/48; C12N 5/0636; C12N 2510/00; A61P 35/00
See application file for complete search history.

(56) References Cited

U.S. PATENT DOCUMENTS

| | | |
|---|---|---|
| 6,410,319 B1 | 6/2002 | Raubitschek et al. |
| 6,750,325 B1 | 6/2004 | Jolliffe et al. |
| 7,446,191 B2 | 11/2008 | Jensen |
| 7,514,537 B2 | 4/2009 | Jensen |
| 8,822,647 B2 | 9/2014 | Jensen |
| 2004/0202657 A1 | 10/2004 | Bolt et al. |
| 2010/0065818 A1 | 3/2010 | Kim et al. |
| 2017/0333524 A1* | 11/2017 | Baker ................ A61K 31/7088 |

FOREIGN PATENT DOCUMENTS

| | | |
|---|---|---|
| CN | 112585162 A | 3/2021 |
| WO | 2004106380 A2 | 12/2004 |
| WO | 2007/001183 A2 | 1/2007 |
| WO | 2009/061182 A1 | 5/2009 |
| WO | 2014031687 A1 | 2/2014 |
| WO | 2016071758 A1 | 5/2016 |
| WO | 2018058002 A1 | 3/2018 |
| WO | 2022/235577 A2 | 11/2022 |

OTHER PUBLICATIONS

Smith et al., Nat Commun, May 2015, 5:5223, pp. 1-28.*
Zhang et al., Frontiers in Immunology, 2019, 10: 1854, pp. 1-18.*
Short et al., Trends in Pharmacological Science, 2024, 45(5): 406-418.*
Examination Report for Australian Application No. 2019356414 (dated Jul. 15, 2024).
Borg et al., "The CDR3 Regions of an Immunodominant T Cell Receptor Dictate the 'Energetic Landscape' of Peptide-MHC Recognition," Nature Immunology 6(2):171-180 (2005).
Garcia et al., "Structural Basis of T Cell Recognition," Annu. Rev. Immunol. 17:369-397 (1999).
English Translation and Notice of Reasons for Refusal for Japanese Application No. 2021-520195 (issued Jul. 18, 2023).
Examination Report for European Application No. 19832466.7 (dated Apr. 17, 2023).
English translation and Decision of Refusal for Japanese Patent Application No. 2021-52019 (dated Feb. 16, 2024).
Altschul, Stephen F. et al., "Gapped BLAST and PSI-BLAST: a new generation of protein database search programs", Nucleic Acids Research, 25(17): 3389-3402 (1997).
Altschul. Stephen F. et al., "Basic Local Alignment Search Tool", J. Mol. Biol., 215: 403-410 (1990).
Bowerman, Natalie A. et al., "Engineering the binding properties of the T cell receptor:peptide:MHC ternary complex that governs T cell activity", Molecular Immunology, 46: 3000-3008 (2009).
Brentjens, Renier et al., "Genetically Targeted T Cells Eradicate Systemic Acute Lymphoblastic Leukemia Xenografts", Clin. Cancer Res., 13(18): 5426-5435 (2007).

(Continued)

*Primary Examiner* — Hong Sang
(74) *Attorney, Agent, or Firm* — Troutman Pepper Locke LLP

(57) ABSTRACT

Novel nucleic acid compositions, vectors, modified cells and pharmaceutical compositions are provided that are useful for treating or preventing a relapse of a haematological malignancy after allogeneic stem cell transplantation (allo-SCT) in a HLA-A*0201 positive human subject. Corresponding methods and uses are also provided.

20 Claims, 11 Drawing Sheets
Specification includes a Sequence Listing.

(56) References Cited

OTHER PUBLICATIONS

Cohen, Stanley N., "Nonchromosomal Antibiotic Resistance in Bacteria: Genetic Transformation of *Escherichia coli* by R-Factor DNA", Proc. Nat. Acad. Sci. USA, 69(8): 2110-2114 (1972).
Coren, Lori V. et al., "Production of retroviral constructs for effective transfer and expression of T-cell receptor genes using Golden Gate cloning", Biotechniques, 58(3): 135-139 (2016).
Den Haan, Joke M.M. et al., "Identification of a Graft Versus Host Disease-Associated Human Minor Histocompatibility Antigen", Science, 268: 1476-1480 (1995).
Dossa, Robson G. et al., "Development of T-cell immunotherapy for hematopoietic stem cell transplantation receipients at risk of leukemia relapse", Blood, 131(1): 108-120 (2018).
Govers, Coen et al., "T cell receptor gene therapy: strategies for optimizing transgenic TCR pairing", Trends in Moloecular Medicine, 16(2): 77-87 (2010).
Harris, Daniel T. et al., "Adoptive T Cell Therapies: A Comparison of T Cell Receptors and Chimeric Antigen Receptors", Trends Pharmacol. Sci., 37(3): 220-230 (2016).
Heemskerk, Mirjam H.M. et al., "Efficiency of T-cell receptor in dual-specific T cells is controlled by the intrinsic qualities of the TCR chains within the TCR-CD3 complex", Blood, 109(1): 235-240 (2007).
Naguma, Y. et al., "Construction and molecular characterization of a T-cell receptor-like antibody and CAR-T cells specific for minor histocompatibility antigen HA-1H", Gene Therapy, 21: 575-584 (2014).
International Preliminary Report on Patentability, dated Apr. 8, 2021, issued in corresponding International Application No. PCT/NL2019/050671.
International Search Report, dated Feb. 12, 2020, issued in corresponding International Application No. PCT/NL2019/050671.
Jones, Benjamin S. et al., "Improving the safety of cell therapy prodeucts by suicide gene transfer", Frontiers in Pharmacology, 5: 1-8 (2014).
Jones, Stephanie et al., "Lentiviral Vector Design for Optimal T Cell Receptor Gene Expression in the Transduction of Peripheral Blood Lymphocytes and Tumor-Infiltrating Lymphocytes", Human Gene Therapy, 20: 630-640 (2009).
LeFranc, M.-P., "Unique database numbering system for immunogenetic analysis", Immunology Today, 18: 509 (1997).
Lefranc, Marie-Paule et al., "IMGT unique numbering for immunoglobulin and T cell receptor constant domains and Ig superfamily C-like domains", Developmental and Comparative Immunology, 29: 185-203 (2005).
Lefranc, Marie-Paule et al., "IMGT unique numbering for immunoglobulin and T cell receptor variable domains and Ig superfamily V-like domains", Developmental and Comparative Immunology, 27: 55-77 (2003).
Linette, Gerald P. et al., "Cardiovascular toxicity and titin cross-reactivity of affinity-enhanced T cells in myeloma and melanoma", Blood, 122(6): 863-871 (2013).
Locke, Frederick L. et al., "Off-the-shelf TCR for graft-versus-leukemia without GVHD", Blood, 131(1): 5-7 (2018).
Luchansky, J.B. et al., "Application of electroporation for transfer of plasmid DNA to Lactobacillus, Lactococcus, Leuconostoc, Listeria, Pediococcus, Bacillus, *Staphylococcus*, Enterococcus and Propionibacterium", Molecular Microbiology, 2(5)p. 637-646 (1988).
Marjit W.A. Erik et al., "Hematopoiesis-restricted minor histocompatability antigens HA-1- or HA-2-specific T cells can induce complete remissions of relapsed leukemia", PNAS, 100(5): 2742-2747 (2003).
Meij, Pauline et al., "Generation and administration of HA-1-specific T-cell lines for the treatment of patients with relapsed leukemia after allogenic stem cell transplantation: a pilot study", Haematologica, 97(8): 1205-1208 (2012).
Mommaas, Bregje et al., "Adujlt and core blood T cells can acquire HA-1 specificity through HA-1 T-cell receptor gene transfer", Haematologica, 90: 415-1421 (2005).
Monjezi, R. et al., "Enhanced CAR T-cell engineeering using non-viral Sleeping Beauty transposition from minicircle vectors", Leukemia, 31: 186-94 (2017).
Morgan, Richard A. et al., "Cancer regression and neurologic toxicity following anti-MAGE-A3 TCR gene therapy", J. Immunol., 36(2): 133-151 (2013).
Myers, Eugene W. et al., "Optimal alignments in linear space", CABIOS, 4(1): 11-17 (1988).
Needleman, Saul, B. et al., "A General Method Applicable to the Search for Similarities in the Amino Acid Sequence of Two Proteins", J. Mol. Biol., 48: 443-453 (1970).
Roth, Theodore L. et al., "Reprogramming human T cells and specificity with non-viral genome targeting", Nature, 5r59(7714): 405-409 (2018).
Sadelain, Michel et al., "The Basic Principles of Chimeric Antigen Receptor Design", Cancer Discov., 3(4): 388-98 (2013).
Scholten, Kirsten B.J. et al., "Codon modification of T cell receptors allows enhanced functional expression in transgenijc human T cells", Clinical Immunology, 119: 135-145 (2006).
Search Report, dated Mar. 13, 2019, issued in NL 2021789.
Stone, Jennifer D. et al., "A novel T cell receptor single-chain signaling complex mediates antigen-specific T cell activity and tumor congtrol", Cancer Immunol. Immunother., 63: 1163-1776 (2014).
Szymczak, Andrea et al., "Correction of multi-gene deficiency in vivo using a single 'self-cleaving' 2A peptide-based retroviral vector", Nature Biotechnology, 22(5): 589-594 (2004).
Van Leonen, Marleen et al., "Mixed T cell receptor dimers harbor potentiallyh harmful neoreactivity", PNAS, 107(24): 10972-10977 (2010).
Van Loenen, Marleen et al., "A Good Manufacturing Practice procedure to engineer donor virus-specific T cells into potent anti-leukemic effector cells", Haematologica, 99(4): 759-768 (2014).
Van Loenen, Marleen et al., "Optimization of the HA-1-specific T-cell receptor for gene therapy of hematologic malignancies", Haematologica, 96(30): 477-481 (2011).
Verdijk, Robert et al., "Exclusive TCRV?? chain usage of ex vivo generated minor Histocompatibility antigen HA-1 specific cytotoxic T cells: Implications for monitoring of immunotherapy of leukemia by TCRB spectratyping", The Hematology Journal, 3: 271-275 (2002).
Willemsen, R.A. et al., "Grafting primary human T lymphocytes with cancer-specific chimeric single chain and two chain TCR", Gene Therapy, 7: 1369-1377 (2000).
Fan et al., "T Cell Antigen Receptor Complex Synthetic Signal Transduction and its Relationship with Disease Research Progress on Disease Relationship," Chinese Medical Biotechnology 2(3):215-217 (2007) (with English Translation).
English Translation and First Office Action for China Application No. 201980081905.7 (dated May 31, 2024).
English Translation and Search Report for China Application No. 201980081905.7 (dated May 30, 2024).
Dossa et al., "Development of T-cell Immunotherapy for Hematopoietic Stem Cell Transplantation Recipients at Risk of Leukemia Relapse," Blood 131(1):108-120 (2018) and corresponding Supplemental Data (17 pages).

* cited by examiner

A

B

SEQUENCE LISTING

<160> NUMBER OF SEQ ID NOS: 92

<210> SEQ ID NO 1
<211> LENGTH: 12

-continued

```
<212> TYPE: PRT
<213> ORGANISM: Homo sapiens

<400> SEQUENCE: 1

Cys Ala Gly Asn Thr Gly Gly Phe Lys Thr Ile Phe
1               5                   10

<210> SEQ ID NO 2
<211> LENGTH: 15
<212> TYPE: PRT
<213> ORGANISM: Homo sapiens

<400> SEQUENCE: 2

Cys Ala Ala Arg Asn Ser Gly Ala Gly Ser Tyr Gln Leu Thr Phe
1               5                   10                  15

<210> SEQ ID NO 3
<211> LENGTH: 8
<212> TYPE: PRT
<213> ORGANISM: Homo sapiens

<400> SEQUENCE: 3

Cys Ala Ala Ser Asn Leu Val Phe
1               5

<210> SEQ ID NO 4
<211> LENGTH: 13
<212> TYPE: PRT
<213> ORGANISM: Homo sapiens

<400> SEQUENCE: 4

Cys Ala Ser Ser Leu Leu Gly Asn Gln Pro Gln His Phe
1               5                   10

<210> SEQ ID NO 5
<211> LENGTH: 13
<212> TYPE: PRT
<213> ORGANISM: Homo sapiens

<400> SEQUENCE: 5

Cys Ala Ser Leu Thr Val Gln Asn Thr Glu Ala Phe Phe
1               5                   10

<210> SEQ ID NO 6
<211> LENGTH: 13
<212> TYPE: PRT
<213> ORGANISM: Homo sapiens

<400> SEQUENCE: 6

Cys Ala Ser Ser Leu Val Val Val Asp Glu Gln Phe Phe
1               5                   10

<210> SEQ ID NO 7
<211> LENGTH: 6
<212> TYPE: PRT
<213> ORGANISM: Homo sapiens

<400> SEQUENCE: 7

Ser Glu His Asn Arg Leu
1               5

<210> SEQ ID NO 8
<211> LENGTH: 6
<212> TYPE: PRT
<213> ORGANISM: Homo sapiens
```

```
<400> SEQUENCE: 8

Asp Ser Ala Ser Asn Tyr
1               5

<210> SEQ ID NO 9
<211> LENGTH: 18
<212> TYPE: DNA
<213> ORGANISM: Homo sapiens

<400> SEQUENCE: 9
gacagtgcct caaactac                                                     18

<210> SEQ ID NO 10
<211> LENGTH: 9
<212> TYPE: PRT
<213> ORGANISM: Homo sapiens

<400> SEQUENCE: 10

Val Leu His Asp Asp Leu Leu Glu Ala
1               5

<210> SEQ ID NO 11
<211> LENGTH: 36
<212> TYPE: DNA
<213> ORGANISM: Homo sapiens

<400> SEQUENCE: 11
tgtgcaggca atactggagg cttcaaaact atcttt                                 36

<210> SEQ ID NO 12
<211> LENGTH: 36
<212> TYPE: DNA
<213> ORGANISM: Artificial Sequence
<220> FEATURE:
<223> OTHER INFORMATION: codon optimised nucleic acid sequence for CDR3
      of Va domain of HA-1H TCR M7

<400> SEQUENCE: 12
tgtgccggca ataccggcgg cttcaagacc atcttc                                 36

<210> SEQ ID NO 13
<211> LENGTH: 39
<212> TYPE: DNA
<213> ORGANISM: Homo sapiens

<400> SEQUENCE: 13
tgtgccagca gcttattggg taatcagccc cagcatttt                              39

<210> SEQ ID NO 14
<211> LENGTH: 39
<212> TYPE: DNA
<213> ORGANISM: Artificial Sequence
<220> FEATURE:
<223> OTHER INFORMATION: codon optimised nucleic acid sequence for CDR3
      of Vb domain of HA-1H TCR M7

<400> SEQUENCE: 14
tgcgccagct ccctgctggg caaccagccc cagcacttc                              39

<210> SEQ ID NO 15
<211> LENGTH: 18
<212> TYPE: DNA
<213> ORGANISM: Homo sapiens
```

-continued

```
<400> SEQUENCE: 15
tctgaacaca accgcctt                                                    18

<210> SEQ ID NO 16
<211> LENGTH: 18
<212> TYPE: DNA
<213> ORGANISM: Artificial Sequence
<220> FEATURE:
<223> OTHER INFORMATION: codon optimised nucleic acid sequence for CDR1
      of Vb domain of HA-1H TCR M7; HA-1H TCR M2, or HA-1H TCR FK47.83

<400> SEQUENCE: 16
agcgagcaca accggctg                                                    18

<210> SEQ ID NO 17
<211> LENGTH: 128
<212> TYPE: PRT
<213> ORGANISM: Homo sapiens

<400> SEQUENCE: 17

Met Leu Leu Ile Thr Ser Met Leu Val Leu Trp Met Gln Leu Ser Gln
1               5                   10                  15

Val Asn Gly Gln Gln Val Met Gln Ile Pro Gln Tyr Gln His Val Gln
            20                  25                  30

Glu Gly Glu Asp Phe Thr Thr Tyr Cys Asn Ser Ser Thr Thr Leu Ser
        35                  40                  45

Asn Ile Gln Trp Tyr Lys Gln Arg Pro Gly Gly His Pro Val Phe Leu
    50                  55                  60

Ile Gln Leu Val Lys Ser Gly Glu Val Lys Lys Gln Lys Arg Leu Thr
65                  70                  75                  80

Phe Gln Phe Gly Glu Ala Lys Lys Asn Ser Ser Leu His Ile Thr Ala
                85                  90                  95

Thr Gln Thr Thr Asp Val Gly Thr Tyr Phe Cys Ala Gly Asn Thr Gly
            100                 105                 110

Gly Phe Lys Thr Ile Phe Gly Ala Gly Thr Arg Leu Phe Val Lys Ala
        115                 120                 125

<210> SEQ ID NO 18
<211> LENGTH: 132
<212> TYPE: PRT
<213> ORGANISM: Homo sapiens

<400> SEQUENCE: 18

Met Gly Thr Ser Leu Leu Cys Trp Met Ala Leu Cys Leu Leu Gly Ala
1               5                   10                  15

Asp His Ala Asp Thr Gly Val Ser Gln Asp Pro Arg His Lys Ile Thr
            20                  25                  30

Lys Arg Gly Gln Asn Val Thr Phe Arg Cys Asp Pro Ile Ser Glu His
        35                  40                  45

Asn Arg Leu Tyr Trp Tyr Arg Gln Thr Leu Gly Gln Gly Pro Glu Phe
    50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110
```

Ser Ser Leu Leu Gly Asn Gln Pro Gln His Phe Gly Asp Gly Thr Arg
        115                 120                 125

Leu Ser Ile Leu
    130

<210> SEQ ID NO 19
<211> LENGTH: 384
<212> TYPE: DNA
<213> ORGANISM: Homo sapiens

<400> SEQUENCE: 19
atgctactca tcacatcaat gttggtctta tggatgcaat tgtcacaggt gaatggacaa      60
caggtaatgc aaattcctca gtaccagcat gtacaagaag agaagactt caccacgtac      120 tgcaattcct caactacttt aagcaatata cagtggtata agcaaaggcc tggtggacat     180
cccgtttttt tgatacagtt agtgaagagt ggagaagtga agaagcagaa aagactgaca    240
tttcagtttg gagaagcaaa aagaacagc tccctgcaca tcacagccac ccagactaca     300
gatgtaggaa cctacttctg tgcaggcaat actggaggct caaaactat ctttggagca     360 ggaacaagac tatttgttaa agca                                            384

<210> SEQ ID NO 20
<211> LENGTH: 384
<212> TYPE: DNA
<213> ORGANISM: Artificial Sequence
<220> FEATURE:
<223> OTHER INFORMATION: codon optimised nucleic acid sequence for Va
      (VJ) domain of HA-1H TCR M7

<400> SEQUENCE: 20
atgctgctga tcacctccat gctggtgctg tggatgcagc tgtcccaggt gaacggccag      60
caggtgatgc agatccccca gtaccagcac gtgcaggagg gcgaggattt caccacctac     120
tgtaacagca gcaccaccct gagcaacatc cagtggtaca gcagagacc tggcggccac     180 cccgtgttcc tgatccagct ggtgaagagc ggcgaggtga agaagcagaa gcggctgacc    240
ttccagttcg gcgaggccaa gaagaatagc agcctgcaca tcaccgccac cagaccacc     300 gatgtgggca cctacttctg tgccggcaat accggcggct caagaccat cttcggagcc    360 ggcaccagac tgttcgtgaa ggcc                                            384

<210> SEQ ID NO 21
<211> LENGTH: 396
<212> TYPE: DNA
<213> ORGANISM: Homo sapiens

<400> SEQUENCE: 21
atgggcacca gcctcctctg ctggatggcc ctgtgtctcc tgggggcaga tcacgcagat      60
actggagtct cccaggaccc cagacacaag atcacaaaga ggggacagaa tgtaactttc    120
aggtgtgatc aatttctga acacaaccgc ctttattggt accgcagac cctggggcag     180 ggcccagagt ttctgactta cttccagaat gaagctcaac tagaaaaatc aaggctgctc    240
agtgatcggt ctctgcaga gaggcctaag ggatctttct ccaccttgga gatccagcgc    300
acagagcagg gggactcggc catgtatctc tgtgccagca gcttattggg taatcagccc    360
cagcattttg gtgatgggac tcgactctcc atccta                               396

<210> SEQ ID NO 22
<211> LENGTH: 396

```
<212> TYPE: DNA
<213> ORGANISM: Artificial Sequence
<220> FEATURE:
<223> OTHER INFORMATION: codon optimised nucleic acid sequence for Vb
      (VDJ) domain of HA-1H TCR M7

<400> SEQUENCE: 22
atgggcacca gcctgctgtg ctggatggcc ctgtgcctgc tgggcgctga ccatgctgat    60
accggcgtga gccaggaccc ccggcacaag atcaccaagc ggggccagaa cgtgaccttc   120
agatgcgacc ccatcagcga gcacaaccgg ctgtactggt acagacagac cctgggccag   180
ggccccgagt tcctgaccta cttccagaac gaggcccagc tggaaaagag ccggctgctg   240
tccgaccggt tcagcgccga gcggcccaag ggcagcttca gcaccctgga aatccagcgg   300
accgagcagg gcgacagcgc catgtacctg tgcgccagct ccctgctggg caaccagccc   360
cagcacttcg gcgacggcac cagactgagc atcctg                             396

<210> SEQ ID NO 23
<211> LENGTH: 45
<212> TYPE: DNA
<213> ORGANISM: Homo sapiens

<400> SEQUENCE: 23
tgtgcagcaa ggaactctgg ggctgggagt taccaactca ctttc                    45

<210> SEQ ID NO 24
<211> LENGTH: 45
<212> TYPE: DNA
<213> ORGANISM: Artificial Sequence
<220> FEATURE:
<223> OTHER INFORMATION: codon optimised nucleic acid sequence for CDR3
      of Va domain of HA-1H TCR M2

<400> SEQUENCE: 24
tgcgccgccc ggaacagcgg cgccggcagc taccagctga ccttc                    45

<210> SEQ ID NO 25
<211> LENGTH: 39
<212> TYPE: DNA
<213> ORGANISM: Homo sapiens

<400> SEQUENCE: 25
tgtgccagct tgacggtaca gaacactgaa gctttcttt                           39

<210> SEQ ID NO 26
<211> LENGTH: 39
<212> TYPE: DNA
<213> ORGANISM: Artificial Sequence
<220> FEATURE:
<223> OTHER INFORMATION: codon optimised nucleic acid sequence for CDR3
      of Vb domain of HA-1H TCR M2

<400> SEQUENCE: 26
tgcgccagcc tgaccgtgca gaacaccgag gccttcttc                           39

<210> SEQ ID NO 27
<211> LENGTH: 18
<212> TYPE: DNA
<213> ORGANISM: Artificial Sequence
<220> FEATURE:
<223> OTHER INFORMATION: codon optimised nucleic acid sequence for CDR1
      of Va domain of HA-1H TCR M2 or HA-1H TCR FK47.83
```

<400> SEQUENCE: 27
gacagcgcca gcaactac                                                    18

<210> SEQ ID NO 28
<211> LENGTH: 7
<212> TYPE: PRT
<213> ORGANISM: Homo sapiens

<400> SEQUENCE: 28

Ile Arg Ser Asn Val Gly Glu
1               5

<210> SEQ ID NO 29
<211> LENGTH: 133
<212> TYPE: PRT
<213> ORGANISM: Homo sapiens

<400> SEQUENCE: 29

Met Thr Ser Ile Arg Ala Val Phe Ile Phe Leu Trp Leu Gln Leu Asp
1               5                   10                  15

Leu Val Asn Gly Glu Asn Val Glu Gln His Pro Ser Thr Leu Ser Val
            20                  25                  30

Gln Glu Gly Asp Ser Ala Val Ile Lys Cys Thr Tyr Ser Asp Ser Ala
        35                  40                  45

Ser Asn Tyr Phe Pro Trp Tyr Lys Gln Glu Leu Gly Lys Arg Pro Gln
    50                  55                  60

Leu Ile Ile Asp Ile Arg Ser Asn Val Gly Glu Lys Lys Asp Gln Arg
65                  70                  75                  80

Ile Ala Val Thr Leu Asn Lys Thr Ala Lys His Phe Ser Leu His Ile
                85                  90                  95

Thr Glu Thr Gln Pro Glu Asp Ser Ala Val Tyr Phe Cys Ala Ala Arg
            100                 105                 110

Asn Ser Gly Ala Gly Ser Tyr Gln Leu Thr Phe Gly Lys Gly Thr Lys
        115                 120                 125

Leu Ser Val Ile Pro
    130

<210> SEQ ID NO 30
<211> LENGTH: 132
<212> TYPE: PRT
<213> ORGANISM: Homo sapiens

<400> SEQUENCE: 30

Met Gly Thr Ser Leu Leu Cys Trp Met Ala Leu Cys Leu Leu Gly Ala
1               5                   10                  15

Asp His Ala Asp Thr Gly Val Ser Gln Asn Pro Arg His Lys Ile Thr
            20                  25                  30

Lys Arg Gly Gln Asn Val Thr Phe Arg Cys Asp Pro Ile Ser Glu His
        35                  40                  45

Asn Arg Leu Tyr Trp Tyr Arg Gln Thr Leu Gly Gln Gly Pro Glu Phe
    50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110

Ser Leu Thr Val Gln Asn Thr Glu Ala Phe Phe Gly Gln Gly Thr Arg
        115                 120                 125

Leu Thr Val Val
    130

<210> SEQ ID NO 31
<211> LENGTH: 399
<212> TYPE: DNA
<213> ORGANISM: Homo sapiens

<400> SEQUENCE: 31

```
atgacatcca ttcgagctgt atttatattc ctgtggctgc agctggactt ggtgaatgga      60
gagaatgtgg agcagcatcc ttcaaccctg agtgtccagg agggagacag cgctgttatc     120
aagtgtactt attcagacag tgcctcaaac tacttccctt ggtataagca agaacttgga     180
aaaagacctc agcttattat agacattcgt tcaaatgtgg gcgaaaagaa agaccaacga     240
attgctgtta cattgaacaa dacagccaaa catttctccc tgcacatcac agagacccaa     300
cctgaagact cggctgtcta cttctgtgca gcaaggaact ctggggctgg agttaccaa      360 ctcactttcg ggaaggggac caaactctcg gtcatacca                            399
```

<210> SEQ ID NO 32
<211> LENGTH: 399
<212> TYPE: DNA
<213> ORGANISM: Artificial Sequence
<220> FEATURE:
<223> OTHER INFORMATION: codon optimised nucleic acid sequence for Va
      (VJ) domain of HA-1H TCR M2

<400> SEQUENCE: 32

```
atgaccagca tccgggccgt gttcatcttc ctgtggctgc agctggacct ggtgaacggc      60
gagaacgtgg agcagcaccc cagcaccctg agcgtgcagg agggcgacag cgccgtgatc     120
aagtgcacct acagcgacag cgccagcaac tacttcccct ggtacaagca ggagctgggc     180
aagcggcccc agctgatcat cgacatccgg agcaacgtgg gcgagaagaa ggaccagcgg     240
atcgccgtga ccctgaacaa gaccgccaag cacttcagcc tgcacatcac cgagacccag     300
cccgaggaca gcgccgtgta cttctgcgcc gcccggaaca gcggcgccgg cagctaccag     360
ctgaccttcg gcaagggcac caagctgagc gtgatcccc                            399
```

<210> SEQ ID NO 33
<211> LENGTH: 396
<212> TYPE: DNA
<213> ORGANISM: Homo sapiens

<400> SEQUENCE: 33

```
atgggcacca gcctcctctg ctggatggcc ctgtgtctcc tgggggcaga tcacgcagat      60
actggagtct cccagaaccc cagacacaag atcacaaaga ggggacagaa tgtaactttc     120
aggtgtgatc aatttctga acacaaccgc ctttattggt accgcagac cctggggcag      180 ggcccagagt ttctgactta cttccagaat gaagctcaac tagaaaaatc aaggctgctc     240
agtgatcggt ctctgcaga gaggcctaag ggatctttct ccaccttgga gatccagcgc     300
acagagcagg gggactcggc catgtatctc tgtgccagct gacggtaca gaacactgaa      360 gctttctttg gacaaggcac cagactcaca gttgta                              396
```

<210> SEQ ID NO 34
<211> LENGTH: 396

```
<212> TYPE: DNA
<213> ORGANISM: Artificial Sequence
<220> FEATURE:
<223> OTHER INFORMATION: codon optimised nucleic acid sequence for Vb
      (VDJ) domain of HA-1H TCR M2

<400> SEQUENCE: 34
atgggcacca gcctgctgtg ctggatggcc ctgtgcctgc tgggcgccga ccacgccgac      60
accggcgtga gccagaaccc ccggcacaag atcaccaagc ggggccagaa cgtgaccttc     120
cggtgcgacc ccatcagcga gcacaaccgg ctgtactggt accggcagac cctgggccag     180
ggccccgagt tcctgaccta cttccagaac gaggcccagc tggagaagag ccggctgctg     240
agcgaccggt tcagcgccga gcggcccaag ggcagcttca gcaccctgga gatccagcgg     300
accgagcagg gcgacagcgc catgtacctg tgcgccagcc tgaccgtgca gaacaccgag     360
gccttcttcg gcagggcac ccggctgacc gtggtg                                396

<210> SEQ ID NO 35
<211> LENGTH: 24
<212> TYPE: DNA
<213> ORGANISM: Homo sapiens

<400> SEQUENCE: 35
tgtgcagcaa gtaatctggt cttt                                            24

<210> SEQ ID NO 36
<211> LENGTH: 24
<212> TYPE: DNA
<213> ORGANISM: Artificial Sequence
<220> FEATURE:
<223> OTHER INFORMATION: codon optimised nucleic acid sequence for CDR3
      of Va domain of HA-1H TCR FK47.83

<400> SEQUENCE: 36
tgcgccgcca gcaacctggt gttc                                            24

<210> SEQ ID NO 37
<211> LENGTH: 39
<212> TYPE: DNA
<213> ORGANISM: Homo sapiens

<400> SEQUENCE: 37
tgtgccagca gcttagtcgt tgtggatgag cagttcttc                            39

<210> SEQ ID NO 38
<211> LENGTH: 39
<212> TYPE: DNA
<213> ORGANISM: Artificial Sequence
<220> FEATURE:
<223> OTHER INFORMATION: codon optimised nucleic acid sequence for CDR3
      of Vb domain of HA-1H TCR FK47.83

<400> SEQUENCE: 38
tgcgccagca gcctggtggt ggtggacgag cagttcttc                            39

<210> SEQ ID NO 39
<211> LENGTH: 21
<212> TYPE: DNA
<213> ORGANISM: Homo sapiens

<400> SEQUENCE: 39
attcgttcaa atgtgggcga a                                               21
```

<210> SEQ ID NO 40
<211> LENGTH: 21
<212> TYPE: DNA
<213> ORGANISM: Artificial Sequence
<220> FEATURE:
<223> OTHER INFORMATION: codon optimised nucleic acid sequence for CDR2 of Va domain of HA-1H TCR M2 or HA-1H TCR FK47.83

<400> SEQUENCE: 40
atccggagca acgtgggcga g                                       21

<210> SEQ ID NO 41
<211> LENGTH: 126
<212> TYPE: PRT
<213> ORGANISM: Homo sapiens

<400> SEQUENCE: 41

Met Thr Ser Ile Arg Ala Val Phe Ile Phe Leu Trp Leu Gln Leu Asp
1               5                   10                  15

Leu Val Asn Gly Glu Asn Val Glu Gln His Pro Ser Thr Leu Ser Val
            20                  25                  30

Gln Glu Gly Asp Ser Ala Val Ile Lys Cys Thr Tyr Ser Asp Ser Ala
        35                  40                  45

Ser Asn Tyr Phe Pro Trp Tyr Lys Gln Glu Leu Gly Lys Arg Pro Gln
    50                  55                  60

Leu Ile Ile Asp Ile Arg Ser Asn Val Gly Glu Lys Lys Asp Gln Arg
65                  70                  75                  80

Ile Ala Val Thr Leu Asn Lys Thr Ala Lys His Phe Ser Leu His Ile
                85                  90                  95

Thr Glu Thr Gln Pro Glu Asp Ser Ala Val Tyr Phe Cys Ala Ala Ser
            100                 105                 110

Asn Leu Val Phe Gly Ala Gly Thr Ile Leu Arg Val Lys Ser
        115                 120                 125

<210> SEQ ID NO 42
<211> LENGTH: 132
<212> TYPE: PRT
<213> ORGANISM: Homo sapiens

<400> SEQUENCE: 42

Met Gly Thr Ser Leu Leu Cys Trp Met Ala Leu Cys Leu Leu Gly Ala
1               5                   10                  15

Asp His Ala Asp Thr Gly Val Ser Gln Asn Pro Arg His Lys Ile Thr
            20                  25                  30

Lys Arg Gly Gln Asn Val Thr Phe Arg Cys Asp Pro Ile Ser Glu His
        35                  40                  45

Asn Arg Leu Tyr Trp Tyr Arg Gln Thr Leu Gly Gln Gly Pro Glu Phe
    50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110

Ser Ser Leu Val Val Val Asp Glu Gln Phe Phe Gly Pro Gly Thr Arg
        115                 120                 125

Leu Thr Val Leu
    130

<210> SEQ ID NO 43
<211> LENGTH: 378
<212> TYPE: DNA
<213> ORGANISM: Homo sapiens

<400> SEQUENCE: 43

```
atgacatcca ttcgagctgt atttatattc ctgtggctgc agctggactt ggtgaatgga      60
gagaatgtgg agcagcatcc ttcaaccctg agtgtccagg aggggagacag cgctgttatc     120 aagtgtactt attcagacag tgcctcaaac tacttcccct tggtataagca agaacttgga    180 aaaagacctc agcttattat agacattcgt tcaaatgtgg gcgaaaagaa agaccaacga     240
attgctgtta cattgaacaa gacagccaaa catttctccc tgcacatcac agagacccaa     300
cctgaagact cggctgtcta cttctgtgca gcaagtaatc tggtctttgg cgcaggaacc     360
attctgagag tcaagtcc                                                   378
```

<210> SEQ ID NO 44
<211> LENGTH: 378
<212> TYPE: DNA
<213> ORGANISM: Artificial Sequence
<220> FEATURE:
<223> OTHER INFORMATION: codon optimised nucleic acid sequence for Va
    (VJ) domain of HA-1H TCR FK47.83

<400> SEQUENCE: 44

```
atgaccagca tccgggccgt gttcatcttc ctgtggctgc agctggacct ggtgaacggc      60
gagaacgtgg agcagcaccc cagcaccctg agcgtgcagg agggcgacag cgccgtgatc    120
aagtgcacct acagcgacag cgccagcaac tacttcccct ggtacaagca ggagctgggc    180
aagcggcccc agctgatcat cgacatccgg agcaacgtgg gcgagaagaa ggaccagcgg    240
atcgccgtga ccctgaacaa gaccgccaag cacttcagcc tgcacatcac cgagacccag    300
cccgaggaca gcgccgtgta cttctgcgcc gccagcaacc tggtgttcgg cgccggcacc    360
atcctgcggg tgaagagc                                                   378
```

<210> SEQ ID NO 45
<211> LENGTH: 396
<212> TYPE: DNA
<213> ORGANISM: Homo sapiens

<400> SEQUENCE: 45

```
atgggcacca gcctcctctg ctggatggcc ctgtgtctcc tgggggcaga tcacgcagat      60
actggagtct cccagaaccc cagacacaag atcacaaaga ggggacagaa tgtaactttc    120
aggtgtgatc caatttctga acacaaccgc ctttattggt accgacagac cctggggcag    180
ggcccagagt ttctgactta cttccagaat gaagctcaac tagaaaaatc aaggctgctc    240
agtgatcggt ctctgcaga gaggcctaag ggatctttct ccaccttgga gatccagcgc    300
acagagcagg gggactcggc catgtatctc tgtgccagca gcttagtcgt tgtggatgag    360
cagttcttcg ggccagggac acggctcacc gtgcta                              396
```

<210> SEQ ID NO 46
<211> LENGTH: 396
<212> TYPE: DNA
<213> ORGANISM: Artificial Sequence
<220> FEATURE:
<223> OTHER INFORMATION: codon optimised nucleic acid sequence for Vb
    (VDJ) domain of HA-1H TCR FK47.83

<400> SEQUENCE: 46

```
atgggcacca gcctgctgtg ctggatggcc ctgtgcctgc tgggcgccga ccacgccgac      60
accggcgtga gccagaaccc ccggcacaag atcaccaagc ggggccagaa cgtgaccttc     120
cggtgcgacc ccatcagcga gcacaaccgg ctgtactggt accggcagac cctgggccag     180
ggccccgagt tcctgaccta cttccagaac gaggcccagc tggagaagag ccggctgctg     240
agcgaccggt tcagcgccga gcggcccaag ggcagcttca gcaccctgga gatccagcgg     300
accgagcagg gcgacagcgc catgtacctg tgcgccagca gcctggtggt ggtggacgag     360
cagttcttcg gccccggcac ccggctgacc gtgctg                               396
```

<210> SEQ ID NO 47
<211> LENGTH: 269
<212> TYPE: PRT
<213> ORGANISM: Homo sapiens

<400> SEQUENCE: 47

```
Met Leu Leu Ile Thr Ser Met Leu Val Leu Trp Met Gln Leu Ser Gln
1               5                   10                  15

Val Asn Gly Gln Gln Val Met Gln Ile Pro Gln Tyr Gln His Val Gln
            20                  25                  30

Glu Gly Glu Asp Phe Thr Thr Tyr Cys Asn Ser Ser Thr Thr Leu Ser
        35                  40                  45

Asn Ile Gln Trp Tyr Lys Gln Arg Pro Gly Gly His Pro Val Phe Leu
    50                  55                  60

Ile Gln Leu Val Lys Ser Gly Glu Val Lys Gln Lys Arg Leu Thr
65                  70                  75                  80

Phe Gln Phe Gly Glu Ala Lys Lys Asn Ser Ser Leu His Ile Thr Ala
                85                  90                  95

Thr Gln Thr Thr Asp Val Gly Thr Tyr Phe Cys Ala Gly Asn Thr Gly
            100                 105                 110

Gly Phe Lys Thr Ile Phe Gly Ala Gly Thr Arg Leu Phe Val Lys Ala
        115                 120                 125

Asn Ile Gln Asn Pro Asp Pro Ala Val Tyr Gln Leu Arg Asp Ser Lys
    130                 135                 140

Ser Ser Asp Lys Ser Val Cys Leu Phe Thr Asp Phe Asp Ser Gln Thr
145                 150                 155                 160

Asn Val Ser Gln Ser Lys Asp Ser Asp Val Tyr Ile Thr Asp Lys Thr
                165                 170                 175

Val Leu Asp Met Arg Ser Met Asp Phe Lys Ser Asn Ser Ala Val Ala
            180                 185                 190

Trp Ser Asn Lys Ser Asp Phe Ala Cys Ala Asn Ala Phe Asn Asn Ser
        195                 200                 205

Ile Ile Pro Glu Asp Thr Phe Phe Pro Ser Pro Glu Ser Ser Cys Asp
    210                 215                 220

Val Lys Leu Val Glu Lys Ser Phe Glu Thr Asp Thr Asn Leu Asn Phe
225                 230                 235                 240

Gln Asn Leu Ser Val Ile Gly Phe Arg Ile Leu Leu Leu Lys Val Ala
                245                 250                 255

Gly Phe Asn Leu Leu Met Thr Leu Arg Leu Trp Ser Ser
            260                 265
```

<210> SEQ ID NO 48
<211> LENGTH: 268

<212> TYPE: PRT
<213> ORGANISM: Artificial Sequence
<220> FEATURE:
<223> OTHER INFORMATION: amino acid sequence for Va (VJ) domain of HA-1H
      TCR M7 and constant domain (murine)

<400> SEQUENCE: 48

Met Lys Ser Leu Arg Val Leu Leu Val Ile Leu Trp Leu Gln Leu Ser
1               5                   10                  15

Trp Val Trp Ser Gln Gly Gln Gln Val Met Gln Ile Pro Gln Tyr Gln
            20                  25                  30

His Val Gln Glu Gly Glu Asp Phe Thr Thr Tyr Cys Asn Ser Ser Thr
        35                  40                  45

Thr Leu Ser Asn Ile Gln Trp Tyr Lys Gln Arg Pro Gly Gly His Pro
    50                  55                  60

Val Phe Leu Ile Gln Leu Val Lys Ser Gly Glu Val Lys Lys Gln Lys
65                  70                  75                  80

Arg Leu Thr Phe Gln Phe Gly Glu Ala Lys Lys Asn Ser Ser Leu His
                85                  90                  95

Ile Thr Ala Thr Gln Thr Thr Asp Val Gly Thr Tyr Phe Cys Ala Gly
            100                 105                 110

Asn Thr Gly Gly Phe Lys Thr Ile Phe Gly Ala Gly Thr Arg Leu Phe
        115                 120                 125

Val Lys Ala Asp Ile Gln Asn Pro Glu Pro Ala Val Tyr Gln Leu Lys
    130                 135                 140

Asp Pro Arg Ser Gln Asp Ser Thr Leu Cys Leu Phe Thr Asp Phe Asp
145                 150                 155                 160

Ser Gln Ile Asn Val Pro Lys Thr Met Glu Ser Gly Thr Phe Ile Thr
                165                 170                 175

Asp Lys Cys Val Leu Asp Met Lys Ala Met Asp Ser Lys Ser Asn Gly
            180                 185                 190

Ala Ile Ala Trp Ser Asn Gln Thr Ser Phe Thr Cys Gln Asp Ile Phe
        195                 200                 205

Lys Glu Thr Asn Ala Thr Tyr Pro Ser Ser Asp Val Pro Cys Asp Ala
    210                 215                 220

Thr Leu Thr Glu Lys Ser Phe Glu Thr Asp Met Asn Leu Asn Phe Gln
225                 230                 235                 240

Asn Leu Ser Val Met Gly Leu Arg Ile Leu Leu Leu Lys Val Ala Gly
                245                 250                 255

Phe Asn Leu Leu Met Thr Leu Arg Leu Trp Ser Ser
            260                 265

<210> SEQ ID NO 49
<211> LENGTH: 810
<212> TYPE: DNA
<213> ORGANISM: Homo sapiens

<400> SEQUENCE: 49
atgctactca tcacatcaat gttggtctta tggatgcaat tgtcacaggt gaatggacaa      60
caggtaatgc aaattcctca gtaccagcat gtacaagaag gagaagactt caccacgtac     120
tgcaattcct caactacttt aagcaatata cagtggtata gcaaaggcc tggtggacat     180 cccgtttttt tgatacagtt agtgaagagt ggagaagtga agaagcagaa aagactgaca     240
tttcagtttg gagaagcaaa aaagaacagc tccctgcaca tcacagccac ccagactaca     300
gatgtaggaa cctacttctg tgcaggcaat actggaggct caaaactat ctttggagca     360

```
ggaacaagac tatttgttaa agcaaatatc cagaaccctg accctgccgt gtaccagctg    420
agagactcta atccagtga caagtctgtc tgcctattca ccgatttga ttctcaaaca    480 aatgtgtcac aaagtaagga ttctgatgtg tatatcacag acaaaactgt gctagacatg    540
aggtctatgg acttcaagag caacagtgct gtggcctgga gcaacaaatc tgactttgca    600
tgtgcaaacg ccttcaacaa cagcattatt ccagaagaca ccttcttccc cagcccagaa    660
agttcctgtg atgtcaagct ggtcgagaaa agctttgaaa cagatacgaa cctaaacttt    720
caaaacctgt cagtgattgg gttccgaatc ctcctcctga agtggccgg gtttaatctg    780 ctcatgacgc tgcggctgtg gtccagctga                                    810

<210> SEQ ID NO 50
<211> LENGTH: 810
<212> TYPE: DNA
<213> ORGANISM: Artificial Sequence
<220> FEATURE:
<223> OTHER INFORMATION: codon optimised nucleic acid sequence for Va
      (VJ) domain and constant domain of HA-1H TCR M7

<400> SEQUENCE: 50
atgctgctga tcacctccat gctggtgctg tggatgcagc tgtcccaggt gaacggccag     60
caggtgatgc agatccccca gtaccagcac gtgcaggagg gcgaggattt caccacctac    120
tgtaacagca gcaccaccct gagcaacatc agtggtaca agcagagacc tggcggccac    180
cccgtgttcc tgatccagct ggtgaagagc ggcgaggtga agaagcagaa gcggctgacc    240
ttccagttcg gcgaggccaa gaagaatagc agcctgcaca tcaccgccac ccagaccacc    300
gatgtgggca cctacttctg tgccggcaat accggcggct tcaagaccat cttcggagcc    360
ggcaccagac tgttcgtgaa ggccaacatc agaaccctg accctgccgt gtaccagctg    420
agggacagca agagcagcga caagagcgtg tgtctgttca ccgacttcga cagccagacc    480
aacgtgtccc agagcaagga cagcgacgtg tacatcaccg acaagtgcgt gctggacatg    540
cggagcatgg acttcaagag caacagcgcc gtggcctgga gcaacaagag cgacttcgcc    600
tgtgccaacg ccttcaacaa cagcatcatc cccgaggaca ccttttcc cagccctgag    660 agcagctgtg acgtgaaact ggtggagaag agcttcgaga ccgacaccaa cctgaacttc    720
cagaacctga gcgtgatcgg cttcaggatc ctgctgctga aggtggccgg cttcaacctg    780
ctgatgaccc tgagactgtg gtccagctga                                    810

<210> SEQ ID NO 51
<211> LENGTH: 861
<212> TYPE: DNA
<213> ORGANISM: Artificial Sequence
<220> FEATURE:
<223> OTHER INFORMATION: codon optimised nucleic acid sequence for Va
      (VJ) domain and constant domain (murine) of HA-1H TCR M7

<400> SEQUENCE: 51
atgaagagcc tgcgcgtgct gctggtcatc ctgtggctgc aattgtcgtg ggtctggagc     60
caaatgctgc tgatcaccctc catgctggtg ctgtggatgc agctgtccca ggtgaacggc    120
cagcaggtga tgcagatccc ccagtaccag cacgtgcagg agggcgagga tttcaccacc    180
tactgtaaca gcagcaccac cctgagcaac atccagtggt acaagcagag acctggcggc    240
caccccgtgt tcctgatcca gctggtgaag agcggcgagg tgaagaagca gaagcggctg    300
accttccagt tcggcgaggc caagaagaat agcagcctgc acatcaccgc cacccagacc    360
accgatgtgg gcacctactt ctgtgccggc aataccggcg gcttcaagac catcttcgga    420
```

```
gccggcacca gactgttcgt gaaggccgac attcagaacc cggaaccggc tgtataccag    480
ctgaaggacc cccgatctca ggatagtact ctgtgcctgt tcaccgactt tgatagtcag    540
atcaatgtgc ctaaaaccat ggaatccgga acttttatta ccgacaagtg cgtgctggat    600
atgaaagcca tggacagtaa gtcaaacggc gccatcgctt ggagcaatca gacatccttc    660
acttgccagg atatcttcaa ggagaccaac gcaacatacc catcctctga cgtgccctgt    720
gatgccaccc tgacagagaa gtctttcgaa acagacatga acctgaattt tcagaatctg    780
agcgtgatgg gcctgagaat cctgctgctg aaggtcgctg gtttaatct gctgatgaca     840 ctgcggctgt ggtcctcatg a                                               861
```

<210> SEQ ID NO 52
<211> LENGTH: 309
<212> TYPE: PRT
<213> ORGANISM: Homo sapiens

<400> SEQUENCE: 52

```
Met Gly Thr Ser Leu Leu Cys Trp Met Ala Leu Cys Leu Leu Gly Ala
1               5                   10                  15

Asp His Ala Asp Thr Gly Val Ser Gln Asp Pro Arg His Lys Ile Thr
            20                  25                  30

Lys Arg Gly Gln Asn Val Thr Phe Arg Cys Asp Pro Ile Ser Glu His
        35                  40                  45

Asn Arg Leu Tyr Trp Tyr Arg Gln Thr Leu Gly Gln Gly Pro Glu Phe
    50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110

Ser Ser Leu Leu Gly Asn Gln Pro Gln His Phe Gly Asp Gly Thr Arg
        115                 120                 125

Leu Ser Ile Leu Glu Asp Leu Asn Lys Val Phe Pro Pro Glu Val Ala
    130                 135                 140

Val Phe Glu Pro Ser Glu Ala Glu Ile Ser His Thr Gln Lys Ala Thr
145                 150                 155                 160

Leu Val Cys Leu Ala Thr Gly Phe Phe Pro Asp His Val Glu Leu Ser
                165                 170                 175

Trp Trp Val Asn Gly Lys Glu Val His Ser Gly Val Ser Thr Asp Pro
            180                 185                 190

Gln Pro Leu Lys Glu Gln Pro Ala Leu Asn Asp Ser Arg Tyr Cys Leu
        195                 200                 205

Ser Ser Arg Leu Arg Val Ser Ala Thr Phe Trp Gln Asn Pro Arg Asn
    210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Cys Gly Phe Thr Ser Val Ser Tyr Gln Gln
            260                 265                 270

Gly Val Leu Ser Ala Thr Ile Leu Tyr Glu Ile Leu Leu Gly Lys Ala
        275                 280                 285
```

Thr Leu Tyr Ala Val Leu Val Ser Ala Leu Val Leu Met Ala Met Val
        290                 295                 300

Lys Arg Lys Asp Phe
305

<210> SEQ ID NO 53
<211> LENGTH: 305
<212> TYPE: PRT
<213> ORGANISM: Artificial Sequence
<220> FEATURE:
<223> OTHER INFORMATION: amino acid sequence for Vb (VDJ) domain of
      HA-1H TCR M7 and constant domain (murine)

<400> SEQUENCE: 53

Met Gly Thr Ser Leu Leu Cys Trp Met Ala Leu Cys Leu Leu Gly Ala
1               5                   10                  15

Asp His Ala Asp Thr Gly Val Ser Gln Asp Pro Arg His Lys Ile Thr
            20                  25                  30

Lys Arg Gly Gln Asn Val Thr Phe Arg Cys Asp Pro Ile Ser Glu His
        35                  40                  45

Asn Arg Leu Tyr Trp Tyr Arg Gln Thr Leu Gly Gln Gly Pro Glu Phe
    50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110

Ser Ser Leu Leu Gly Asn Gln Pro Gln His Phe Gly Asp Gly Thr Arg
        115                 120                 125

Leu Ser Ile Leu Glu Asp Leu Arg Asn Val Thr Pro Pro Lys Val Ser
    130                 135                 140

Leu Phe Glu Pro Ser Lys Ala Glu Ile Ala Asn Lys Gln Lys Ala Thr
145                 150                 155                 160

Leu Val Cys Leu Ala Arg Gly Phe Phe Pro Asp His Val Glu Leu Ser
                165                 170                 175

Trp Trp Val Asn Gly Lys Glu Val His Ser Gly Val Cys Thr Asp Pro
            180                 185                 190

Gln Ala Tyr Lys Glu Ser Asn Tyr Ser Tyr Cys Leu Ser Ser Arg Leu
        195                 200                 205

Arg Val Ser Ala Thr Phe Trp His Asn Pro Arg Asn His Phe Arg Cys
    210                 215                 220

Gln Val Gln Phe His Gly Leu Ser Glu Glu Asp Lys Trp Pro Glu Gly
225                 230                 235                 240

Ser Pro Lys Pro Val Thr Gln Asn Ile Ser Ala Glu Ala Trp Gly Arg
                245                 250                 255

Ala Asp Cys Gly Ile Thr Ser Ala Ser Tyr His Gln Gly Val Leu Ser
            260                 265                 270

Ala Thr Ile Leu Tyr Glu Ile Leu Leu Gly Lys Ala Thr Leu Tyr Ala
        275                 280                 285

Val Leu Val Ser Gly Leu Val Leu Met Ala Met Val Lys Lys Lys Asn
    290                 295                 300

Ser
305

<210> SEQ ID NO 54

<211> LENGTH: 930
<212> TYPE: DNA
<213> ORGANISM: Homo sapiens

<400> SEQUENCE: 54

```
atgggcacca gcctcctctg ctggatggcc ctgtgtctcc tgggggcaga tcacgcagat      60
actggagtct cccaggaccc cagacacaag atcacaaaga gggggacagaa tgtaactttc    120
aggtgtgatc aatttctga acacaaccgc ctttattggt accgacagac cctggggcag     180
ggcccagagt ttctgactta cttccagaat gaagctcaac tagaaaaatc aaggctgctc    240
agtgatcggt tctctgcaga gaggcctaag ggatctttct ccaccttgga gatccagcgc    300
acagagcagg gggactcggc catgtatctc tgtgccagca gcttattggg taatcagccc    360
cagcattttg gtgatgggac tcgactctcc atcctagagg acctgaacaa ggtgttccca    420
cccgaggtcg ctgtgtttga gccatcagaa gcagagatct cccacaccca aaaggccaca    480
ctggtgtgcc tggccacagg cttcttcccc gaccacgtgg agctgagctg gtgggtgaat    540
gggaaggagt gcacagtgg ggtcagcaca gacccgcagc cctcaaggga gcagcccgcc    600
ctcaatgact ccagatactg cctgagcagc cgcctgaggg tctcggccac cttctggcag    660
aaccccgca accacttccg ctgtcaagtc cagttctacg gctctcggga gaatgacgag    720
tggacccagg atagggccaa acccgtcacc cagatcgtca gcgccgaggc ctggggtaga    780
gcagactgtg ctttacctc ggtgtcctac cagcaagggg tcctgtctgc caccatcctc    840
tatgagatcc tgctagggaa ggccaccctg tatgctgtgc tggtcagcgc ccttgtgttg    900
atggccatgg tcaagagaaa ggatttctga                                     930
```

<210> SEQ ID NO 55
<211> LENGTH: 930
<212> TYPE: DNA
<213> ORGANISM: Artificial Sequence
<220> FEATURE:
<223> OTHER INFORMATION: codon optimised nucleic acid sequence for Vb (VDJ) domain and constant domain of HA-1H TCR M7

<400> SEQUENCE: 55

```
atgggcacca gcctgctgtg ctggatggcc ctgtgcctgc tgggcgctga ccatgctgat      60
accggcgtga gccaggaccc ccggcacaag atcaccaagc ggggccagaa cgtgaccttc    120
agatgcgacc ccatcagcga gcacaaccgg ctgtactggt acagacagac cctgggccag    180
ggccccgagt cctgaccta cttccagaac gaggcccagc tggaaaagag ccggctgctg    240
tccgaccggt tcagcgccga gcggcccaag ggcagcttca gcaccctgga aatccagcgg    300
accgagcagg gcgacagcgc catgtacctg tgcgccagct ccctgctggg caaccagccc    360
cagcacttcg gcgacggcac cagactgagc atcctggaag atctgaacaa ggtgttcccc    420
cccgaggtgg ccgtgttcga gccagcgag gccgagatca gccacaccca gaaagccacc    480
ctggtgtgcc tggccaccgg ctttttcccc gaccacgtgg agctgtcttg gtgggtgaac    540
ggcaaagagg tgcacagcgg cgtcagcacc gaccccagc ccctgaaaga gcagcccgcc    600
ctgaacgaca gccggtactg cctgtctagc cggctgcggg tgtccgccac cttctggcag    660
aaccccggca accacttccg gtgccaggtg cagttctacg gcctgagcga gaacgacgag    720
tggacccagg acagagccaa gcccgtgacc cagatcgtgt ccgccgaggc ctggggcaga    780
```

-continued

```
gccgactgcg gcttcaccag cgtgtcctac cagcagggcg tgctgtctgc caccatcctg    840
tacgagatcc tgctggggaa ggccaccctg tacgccgtgc tggtgtccgc cctggtgctg    900
atggccatgg tgaagcggaa ggacttctga                                     930
```

```
<210> SEQ ID NO 56
<211> LENGTH: 918
<212> TYPE: DNA
<213> ORGANISM: Artificial Sequence
<220> FEATURE:
<223> OTHER INFORMATION: codon optimised nucleic acid sequence for Vb
      (VDJ) domain and constant domain (murine) of HA-1H TCR M7

<400> SEQUENCE: 56
atgggcacca gcctgctgtg ctggatggcc ctgtgcctgc tgggcgctga ccatgctgat    60
accggcgtga gccaggaccc ccggcacaag atcaccaagc ggggccagaa cgtgaccttc    120
agatgcgacc ccatcagcga gcacaaccgg ctgtactggt acagacagac cctgggccag    180 ggcccccgagt tcctgaccta cttccagaac gaggcccagc tggaaaagag ccggctgctg    240
tccgaccggt tcagcgccga gcggcccaag ggcagcttca gcaccctgga aatccagcgg    300
accgagcagg gcgacagcgc catgtacctg tgcgccagct ccctgctggg caaccagccc    360
cagcacttcg gcgacggcac cagactgagc atcctggaag atctacgtaa cgtgacacca    420
cccaaagtct cactgtttga gcctagcaag gcagaaattg ccaacaagca gaaggccacc    480
ctggtgtgcc tggcaagagg gttctttcca gatcacgtgg agctgtcctg gtgggtcaac    540
ggcaaagaag tgcattctgg ggtctgcacc gacccccagg cttacaagga gagtaattac    600
tcatattgtc tgtcaagccg gctgagagtg tccgccacat tctggcacaa ccctaggaat    660
catttccgct gccaggtcca gtttcacggc ctgagtgagg aagataaatg gccagagggg    720
tcacctaagc cagtgacaca gaacatcagc gcagaagcct ggggacgagc agactgtggc    780
attactagcg cctcctatca tcagggcgtg ctgagcgcca ctatcctgta cgagattctg    840
ctgggaaagg ccaccctgta tgctgtgctg gtctccggcc tggtgctgat ggccatggtc    900
aagaaaaaga actcttga                                                  918
```

```
<210> SEQ ID NO 57
<211> LENGTH: 274
<212> TYPE: PRT
<213> ORGANISM: Homo sapiens

<400> SEQUENCE: 57

Met Thr Ser Ile Arg Ala Val Phe Ile Phe Leu Trp Leu Gln Leu Asp
1               5                   10                  15

Leu Val Asn Gly Glu Asn Val Glu Gln His Pro Ser Thr Leu Ser Val
            20                  25                  30

Gln Glu Gly Asp Ser Ala Val Ile Lys Cys Thr Tyr Ser Asp Ser Ala
        35                  40                  45

Ser Asn Tyr Phe Pro Trp Tyr Lys Gln Glu Leu Gly Lys Arg Pro Gln
    50                  55                  60

Leu Ile Ile Asp Ile Arg Ser Asn Val Gly Glu Lys Lys Asp Gln Arg
65                  70                  75                  80

Ile Ala Val Thr Leu Asn Lys Thr Ala Lys His Phe Ser Leu His Ile
                85                  90                  95

Thr Glu Thr Gln Pro Glu Asp Ser Ala Val Tyr Phe Cys Ala Ala Arg
            100                 105                 110
```

Asn Ser Gly Ala Gly Ser Tyr Gln Leu Thr Phe Gly Lys Gly Thr Lys
            115                 120                 125

Leu Ser Val Ile Pro Asn Ile Gln Asn Pro Asp Pro Ala Val Tyr Gln
    130                 135                 140

Leu Arg Asp Ser Lys Ser Ser Asp Lys Ser Val Cys Leu Phe Thr Asp
145                 150                 155                 160

Phe Asp Ser Gln Thr Asn Val Ser Gln Ser Lys Asp Ser Asp Val Tyr
                165                 170                 175

Ile Thr Asp Lys Thr Val Leu Asp Met Arg Ser Met Asp Phe Lys Ser
            180                 185                 190

Asn Ser Ala Val Ala Trp Ser Asn Lys Ser Asp Phe Ala Cys Ala Asn
        195                 200                 205

Ala Phe Asn Asn Ser Ile Ile Pro Glu Asp Thr Phe Phe Pro Ser Pro
    210                 215                 220

Glu Ser Ser Cys Asp Val Lys Leu Val Glu Lys Ser Phe Glu Thr Asp
225                 230                 235                 240

Thr Asn Leu Asn Phe Gln Asn Leu Ser Val Ile Gly Phe Arg Ile Leu
                245                 250                 255

Leu Leu Lys Val Ala Gly Phe Asn Leu Leu Met Thr Leu Arg Leu Trp
            260                 265                 270

Ser Ser

<210> SEQ ID NO 58
<211> LENGTH: 272
<212> TYPE: PRT
<213> ORGANISM: Artificial Sequence
<220> FEATURE:
<223> OTHER INFORMATION: amino acid sequence for Va (VJ) domain of HA-1H
      TCR M2 and constant domain (murine)

<400> SEQUENCE: 58

Met Lys Ser Leu Arg Val Leu Leu Val Ile Leu Trp Leu Gln Leu Ser
1               5                   10                  15

Trp Val Trp Ser Gln Gly Glu Asn Val Glu Gln His Pro Ser Thr Leu
            20                  25                  30

Ser Val Gln Glu Gly Asp Ser Ala Val Ile Lys Cys Thr Tyr Ser Asp
        35                  40                  45

Ser Ala Ser Asn Tyr Phe Pro Trp Tyr Lys Gln Glu Leu Gly Lys Arg
    50                  55                  60

Pro Gln Leu Ile Ile Asp Ile Arg Ser Asn Val Gly Glu Lys Lys Asp
65                  70                  75                  80

Gln Arg Ile Ala Val Thr Leu Asn Lys Thr Ala Lys His Phe Ser Leu
                85                  90                  95

His Ile Thr Glu Thr Gln Pro Glu Asp Ser Ala Val Tyr Phe Cys Ala
            100                 105                 110

Ala Arg Asn Ser Gly Ala Gly Ser Tyr Gln Leu Thr Phe Gly Lys Gly
        115                 120                 125

Thr Lys Leu Ser Val Ile Pro Asp Ile Gln Asn Pro Glu Pro Ala Val
    130                 135                 140

Tyr Gln Leu Lys Asp Pro Arg Ser Gln Asp Ser Thr Leu Cys Leu Phe
145                 150                 155                 160

Thr Asp Phe Asp Ser Gln Ile Asn Val Pro Lys Thr Met Glu Ser Gly
                165                 170                 175

Thr Phe Ile Thr Asp Lys Cys Val Leu Asp Met Lys Ala Met Asp Ser
            180                 185                 190

```
Lys Ser Asn Gly Ala Ile Ala Trp Ser Asn Gln Thr Ser Phe Thr Cys
        195                 200                 205

Gln Asp Ile Phe Lys Glu Thr Asn Ala Thr Tyr Pro Ser Ser Asp Val
    210                 215                 220

Pro Cys Asp Ala Thr Leu Thr Glu Lys Ser Phe Glu Thr Asp Met Asn
225                 230                 235                 240
Leu Asn Phe Gln Asn Leu Ser Val Met Gly Leu Arg Ile Leu Leu Leu
                245                 250                 255

Lys Val Ala Gly Phe Asn Leu Leu Met Thr Leu Arg Leu Trp Ser Ser
            260                 265                 270
```

<210> SEQ ID NO 59
<211> LENGTH: 825
<212> TYPE: DNA
<213> ORGANISM: Homo sapiens

<400> SEQUENCE: 59

```
atgacatcca ttcgagctgt atttatattc ctgtggctgc agctggactt ggtgaatgga      60
gagaatgtgg agcagcatcc ttcaaccctg agtgtccagg agggagacag cgctgttatc     120
aagtgtactt attcagacag tgcctcaaac tacttccctt ggtataagca agaacttgga     180
aaaagacctc agcttattat agacattcgt tcaaatgtgg gcgaaaagaa agaccaacga     240
attgctgtta cattgaacaa gacagccaaa catttctccc tgcacatcac agagacccaa     300
cctgaagact cggctgtcta cttctgtgca gcaaggaact ctggggctgg gagttaccaa     360
ctcactttcg ggaaggggac caaactctcg gtcataccaa atatccagaa ccctgaccct     420
gccgtgtacc agctgagaga ctctaaatcc agtgacaagt ctgtctgcct attcaccgat     480
tttgattctc aaacaaatgt gtcacaaagt aaggattctg atgtgtatat cacagacaaa     540
actgtgctag acatgaggtc tatggacttc aagagcaaca gtgctgtggc ctggagcaac     600
aaatctgact ttgcatgtgc aaacgccttc aacaacagca ttattccaga agacaccttc     660
ttccccagcc cagaaagttc ctgtgatgtc aagctggtcg agaaaagctt tgaaacagat     720
acgaacctaa actttcaaaa cctgtcagtg attgggttcc gaatcctcct cctgaaagtg     780
gccgggttta atctgctcat gacgctgcgg ttgtggtcca gctga                     825
```

<210> SEQ ID NO 60
<211> LENGTH: 825
<212> TYPE: DNA
<213> ORGANISM: Artificial Sequence
<220> FEATURE:
<223> OTHER INFORMATION: codon optimised nucleic acid sequence for Va
      (VJ) domain and constant domain of HA-1H TCR M2

<400> SEQUENCE: 60

```
atgaccagca tccgggccgt gttcatcttc ctgtggctgc agctggacct ggtgaacggc      60
gagaacgtgg agcagcaccc cagcaccctg agcgtgcagg agggcgacag cgccgtgatc     120
aagtgcacct acagcgacag cgccagcaac tacttcccct ggtacaagca ggagctgggc     180
aagcggcccc agctgatcat cgacatccgg agcaacgtgg gcgagaagaa ggaccagcgg     240
atcgccgtga ccctgaacaa gaccgccaag cacttcagcc tgcacatcac cgagacccag     300
cccgaggaca gcgccgtgta cttctgcgcc gcccggaaca gcggcgccgg cagctaccag     360
ctgaccttcg gcaagggcac caagctgagc gtgatcccca acatccagaa ccccgacccc     420
gccgtgtacc agctgcggga cagcaagagc agcgacaaga gcgtgtgcct gttcaccgac     480
ttcgacagcc agaccaacgt gagccagagc aaggacagcg acgtgtacat caccgacaag     540
```

```
tgcgtgctgg acatgcgag catggacttc aagagcaaca gcgccgtggc ctggagcaac      600
aagagcgact tcgcctgcgc caacgccttc aacaacagca tcatccccga ggacaccttc      660
ttccccagcc ccgagagcag ctgcgacgtg aagctggtgg agaagagctt cgagaccgac      720
accaacctga acttccagaa cctgagcgtg atcggcttcc ggatcctgct gctgaaggtg      780
gccggcttca acctgctgat gaccctgcgg ctgtggagca gctga                     825
```

```
<210> SEQ ID NO 61
<211> LENGTH: 819
<212> TYPE: DNA
<213> ORGANISM: Artificial Sequence
<220> FEATURE:
<223> OTHER INFORMATION: codon optimised nucleic acid sequence for Va
      (VJ) domain and constant domain (murine) of HA-1H TCR M2

<400> SEQUENCE: 61
atgaagagcc tgcgcgtgct gctggtcatc ctgtggctgc aattgtcgtg ggtctggagc      60
caaggcgaga cgtggagca gcaccccagc accctgagcg tgcaggaggg cgacagcgcc      120
gtgatcaagt gcacctacag cgacagcgcc agcaactact cccctggta caagcaggag      180 ctgggcaagc ggccccagct gatcatcgac atccggagca cgtgggcga agaaggac        240 cagcggatcg ccgtgaccct gaacaagacc gccaagcact tcagcctgca catcaccgag      300
acccagcccg aggacagcgc cgtgtacttc tgcgccgccc ggaacagcgg cgccggcagc      360
taccagctga ccttcggcaa gggcaccaag ctgagcgtga tccccgacat tcagaacccg      420
gaaccggctg ataccagct gaaggacccc cgatctcagg atagtactct gtgcctgttc      480
accgactttg atagtcagat caatgtgcct aaaaccatgg aatccggaac tttattacc      540 gacaagtgcg tgctggatat gaaagccatg gacagtaagt caaacggcgc catcgcttgg      600
agcaatcaga catccttcac ttgccaggat atcttcaagg agaccaacgc aacatacca      660 tcctctgacg tgcccgtgga tgccaccctg acagagaagt cttcgaaac agacatgaac      720 ctgaattttc agaatctgag cgtgatgggc ctgagaatcc tgctgctgaa ggtcgctggg      780
tttaatctgc tgatgacact gcggctgtgg tcctcatga                            819
```

```
<210> SEQ ID NO 62
<211> LENGTH: 309
<212> TYPE: PRT
<213> ORGANISM: Homo sapiens

<400> SEQUENCE: 62

Met Gly Thr Ser Leu Leu Cys Trp Met Ala Leu Cys Leu Leu Gly Ala
1               5                   10                  15

Asp His Ala Asp Thr Gly Val Ser Gln Asn Pro Arg His Lys Ile Thr
            20                  25                  30

Lys Arg Gly Gln Asn Val Thr Phe Arg Cys Asp Pro Ile Ser Glu His
        35                  40                  45

Asn Arg Leu Tyr Trp Tyr Arg Gln Thr Leu Gly Gln Gly Pro Glu Phe
    50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110
```

```
Ser Leu Thr Val Gln Asn Thr Glu Ala Phe Phe Gly Gln Gly Thr Arg
            115                 120                 125

Leu Thr Val Val Glu Asp Leu Asn Lys Val Phe Pro Pro Glu Val Ala
        130                 135                 140

Val Phe Glu Pro Ser Glu Ala Glu Ile Ser His Thr Gln Lys Ala Thr
145                 150                 155                 160

Leu Val Cys Leu Ala Thr Gly Phe Phe Pro Asp His Val Glu Leu Ser
                165                 170                 175

Trp Trp Val Asn Gly Lys Glu Val His Ser Gly Val Ser Thr Asp Pro
                180                 185                 190

Gln Pro Leu Lys Glu Gln Pro Ala Leu Asn Asp Ser Arg Tyr Cys Leu
            195                 200                 205

Ser Ser Arg Leu Arg Val Ser Ala Thr Phe Trp Gln Asn Pro Arg Asn
        210                 215                 220

His Phe Arg Cys Gln Val Gln Phe Tyr Gly Leu Ser Glu Asn Asp Glu
225                 230                 235                 240

Trp Thr Gln Asp Arg Ala Lys Pro Val Thr Gln Ile Val Ser Ala Glu
                245                 250                 255

Ala Trp Gly Arg Ala Asp Cys Gly Phe Thr Ser Val Ser Tyr Gln Gln
                260                 265                 270

Gly Val Leu Ser Ala Thr Ile Leu Tyr Glu Ile Leu Leu Gly Lys Ala
            275                 280                 285

Thr Leu Tyr Ala Val Leu Val Ser Ala Leu Val Leu Met Ala Met Val
        290                 295                 300

Lys Arg Lys Asp Phe
305

<210> SEQ ID NO 63
<211> LENGTH: 305
<212> TYPE: PRT
<213> ORGANISM: Artificial Sequence
<220> FEATURE:
<223> OTHER INFORMATION: amino acid sequence for Vb (VDJ) domain of
      HA-1H TCR M2 and constant domain (murine)

<400> SEQUENCE: 63

Met Gly Thr Ser Leu Leu Cys Trp Met Ala Leu Cys Leu Leu Gly Ala
1               5                   10                  15

Asp His Ala Asp Thr Gly Val Ser Gln Asn Pro Arg His Lys Ile Thr
                20                  25                  30

Lys Arg Gly Gln Asn Val Thr Phe Arg Cys Asp Pro Ile Ser Glu His
            35                  40                  45

Asn Arg Leu Tyr Trp Tyr Arg Gln Thr Leu Gly Gln Gly Pro Glu Phe
        50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110

Ser Leu Thr Val Gln Asn Thr Glu Ala Phe Phe Gly Gln Gly Thr Arg
        115                 120                 125

Leu Thr Val Val Glu Asp Leu Arg Asn Val Thr Pro Pro Lys Val Ser
        130                 135                 140

Leu Phe Glu Pro Ser Lys Ala Glu Ile Ala Asn Lys Gln Lys Ala Thr
145                 150                 155                 160
```

```
Leu Val Cys Leu Ala Arg Gly Phe Phe Pro Asp His Val Glu Leu Ser
            165                 170                 175
Trp Trp Val Asn Gly Lys Glu Val His Ser Gly Val Cys Thr Asp Pro
        180                 185                 190
Gln Ala Tyr Lys Glu Ser Asn Tyr Ser Tyr Cys Leu Ser Ser Arg Leu
        195                 200                 205
Arg Val Ser Ala Thr Phe Trp His Asn Pro Arg Asn His Phe Arg Cys
    210                 215                 220
Gln Val Gln Phe His Gly Leu Ser Glu Glu Asp Lys Trp Pro Glu Gly
225                 230                 235                 240
Ser Pro Lys Pro Val Thr Gln Asn Ile Ser Ala Glu Ala Trp Gly Arg
                245                 250                 255
Ala Asp Cys Gly Ile Thr Ser Ala Ser Tyr His Gln Gly Val Leu Ser
            260                 265                 270
Ala Thr Ile Leu Tyr Glu Ile Leu Leu Gly Lys Ala Thr Leu Tyr Ala
        275                 280                 285
Val Leu Val Ser Gly Leu Val Leu Met Ala Met Val Lys Lys Lys Asn
    290                 295                 300
Ser
305

<210> SEQ ID NO 64
<211> LENGTH: 930
<212> TYPE: DNA
<213> ORGANISM: Homo sapiens

<400> SEQUENCE: 64
atgggcacca gcctcctctg ctggatggcc ctgtgtctcc tgggggcaga tcacgcagat      60
actggagtct cccagaaccc cagacacaag atcacaaaga ggggacagaa tgtaactttc     120
aggtgtgatc caatttctga acacaaccgc ctttattggt accgacagac cctggggcag     180
ggcccagagt ttctgactta cttccagaat gaagctcaac tagaaaaatc aaggctgctc     240
agtgatcggt tctctgcaga gaggcctaag ggatctttct ccaccttgga gatccagcgc     300
acagagcagg gggactcggc catgtatctc tgtgccagct gacggtaca gaacactgaa     360 gctttctttg acaaggcac cagactcaca gttgtagagg acctgaacaa ggtgttccca     420
cccgaggtcg ctgtgtttga gccatcagaa gcagagatct cccacaccca aaaggccaca     480
ctggtgtgcc tggccacagg cttcttccct gaccacgtgg agctgagctg gtgggtgaat     540
gggaaggagt gcacagtgg gtcagcacg acccgcagc ccctcaagga gcagcccgcc     600
ctcaatgact ccagatactg cctgagcagc cgcctgaggg tctcggccac cttctggcag     660 aaccccgca accacttccg ctgtcaagtc cagttctacg gctctcgga gaatgacgag     720 tggacccagg ataggccaa acccgtcacc cagatcgtca gcgccgaggc tggggtaga     780 gcagactgtg gctttacctc ggtgtcctac agcaaggggt cctgtctgc caccatcctc     840 tatgagatcc tgctagggaa ggccaccctg tatgctgtgc tggtcagcgc ccttgtgttg     900
atggccatgg tcaagagaaa ggatttctga                                     930

<210> SEQ ID NO 65
<211> LENGTH: 930
<212> TYPE: DNA
<213> ORGANISM: Artificial Sequence
<220> FEATURE:
<223> OTHER INFORMATION: codon optimised nucleic acid sequence for Vb
      (VDJ) domain and constant domain of HA-1H TCR M2
```

<400> SEQUENCE: 65

```
atgggcacca gcctgctgtg ctggatggcc ctgtgcctgc tgggcgccga ccacgccgac    60
accggcgtga gccagaaccc ccggcacaag atcaccaagc ggggccagaa cgtgaccttc   120
cggtgcgacc ccatcagcga gcacaaccgg ctgtactggt accggcagac cctgggccag   180
ggccccgagt tcctgaccta cttccagaac gaggcccagc tggagaagag ccggctgctg   240
agcgaccggt tcagcgccga gcggcccaag ggcagcttca gcaccctgga gatccagcgg   300
accgagcagg gcgacagcgc catgtacctg tgcgccagcc tgaccgtgca gaacaccgag   360
gccttcttcg gcagggcac ccggctgacc gtggtggagg acctgaacaa ggtgttcccc   420
cccgaggtgg ccgtgttcga gccagcgag gccgagatca gccacaccca gaaggccacc   480
ctggtgtgcc tggccaccgg cttcttcccc gaccacgtgg agctgagctg gtgggtgaac   540
ggcaaggagg tgcacagcgg cgtgagctgc gaccccagc ccctgaagga gcagcccgcc   600
ctgaacgaca gccggtactg cctgagcagc cggctgcggg tgagcgccac cttctggcag   660
aaccccgga accacttccg gtgccaggtg cagttctacg gcctgagcga gaacgacgag   720
tggacccagg accgggccaa gcccgtgacc cagatcgtga cgccgaggc ctggggccgg   780
gccgactgcg gcttcaccag cgtgagctac agcagggcg tgctgagcgc caccatcctg   840
tacgagatcc tgctgggcaa ggccacccctg tacgccgtgc tggtgagcgc cctggtgctg   900
atggccatgg tgaagcggaa ggacttctga                                     930
```

<210> SEQ ID NO 66
<211> LENGTH: 918
<212> TYPE: DNA
<213> ORGANISM: Artificial Sequence
<220> FEATURE:
<223> OTHER INFORMATION: codon optimised nucleic acid sequence for Vb
      (VDJ) domain and constant domain (murine) of HA-1H TCR M2

<400> SEQUENCE: 66

```
atgggcacca gcctgctgtg ctggatggcc ctgtgcctgc tgggcgccga ccacgccgac    60
accggcgtga gccagaaccc ccggcacaag atcaccaagc ggggccagaa cgtgaccttc   120
cggtgcgacc ccatcagcga gcacaaccgg ctgtactggt accggcagac cctgggccag   180
ggccccgagt tcctgaccta cttccagaac gaggcccagc tggagaagag ccggctgctg   240
agcgaccggt tcagcgccga gcggcccaag ggcagcttca gcaccctgga gatccagcgg   300
accgagcagg gcgacagcgc catgtacctg tgcgccagcc tgaccgtgca gaacaccgag   360
gccttcttcg gcagggcac ccggctgacc gtggtggaag atctacgtaa cgtgacacca   420
cccaaagtct cactgtttga gcctagcaag gcagaaattg ccaacaagca gaaggccacc   480
ctggtgtgcc tggcaagagg gttctttcca gatcacgtgg agctgtcctg gtgggtcaac   540
ggcaaagaag tgcattctgg ggtctgcacc gaccccagg cttacaagga gagtaattac   600
tcatattgtc tgtcaagccg gctgagagtg tccgccacat ctggcacaa ccctaggaat   660
catttccgct gccaggtcca gtttcacggc ctgagtgagg aagataaatg ccagagggg   720
tcacctaagc cagtgacaca gaacatcagc gcagaagcct ggggacgagc agactgtggc   780
attactagcg cctcctatca tcagggcgtg ctgagcgcca ctatcctgta cgagattctg   840
ctgggaaagg ccaccctgta tgctgtgctg gtctccggcc tggtgctgat ggccatggtc   900
aagaaaaaga actcttga                                                 918
```

<210> SEQ ID NO 67
<211> LENGTH: 267
<212> TYPE: PRT
<213> ORGANISM: Homo sapiens

<400> SEQUENCE: 67

Met Thr Ser Ile Arg Ala Val Phe Ile Phe Leu Trp Leu Gln Leu Asp
1               5                   10                  15

Leu Val Asn Gly Glu Asn Val Glu Gln His Pro Ser Thr Leu Ser Val
            20                  25                  30

Gln Glu Gly Asp Ser Ala Val Ile Lys Cys Thr Tyr Ser Asp Ser Ala
        35                  40                  45

Ser Asn Tyr Phe Pro Trp Tyr Lys Gln Glu Leu Gly Lys Arg Pro Gln
50                  55                  60

Leu Ile Ile Asp Ile Arg Ser Asn Val Gly Glu Lys Lys Asp Gln Arg
65                  70                  75                  80

Ile Ala Val Thr Leu Asn Lys Thr Ala Lys His Phe Ser Leu His Ile
                85                  90                  95

Thr Glu Thr Gln Pro Glu Asp Ser Ala Val Tyr Phe Cys Ala Ala Ser
            100                 105                 110

Asn Leu Val Phe Gly Ala Gly Thr Ile Leu Arg Val Lys Ser Tyr Ile
        115                 120                 125

Gln Asn Pro Asp Pro Ala Val Tyr Gln Leu Arg Asp Ser Lys Ser Ser
    130                 135                 140

Asp Lys Ser Val Cys Leu Phe Thr Asp Phe Asp Ser Gln Thr Asn Val
145                 150                 155                 160

Ser Gln Ser Lys Asp Ser Asp Val Tyr Ile Thr Asp Lys Thr Val Leu
                165                 170                 175

Asp Met Arg Ser Met Asp Phe Lys Ser Asn Ser Ala Val Ala Trp Ser
            180                 185                 190

Asn Lys Ser Asp Phe Ala Cys Ala Asn Ala Phe Asn Asn Ser Ile Ile
        195                 200                 205

Pro Glu Asp Thr Phe Phe Pro Ser Pro Glu Ser Ser Cys Asp Val Lys
    210                 215                 220

Leu Val Glu Lys Ser Phe Glu Thr Asp Thr Asn Leu Asn Phe Gln Asn
225                 230                 235                 240

Leu Ser Val Ile Gly Phe Arg Ile Leu Leu Leu Lys Val Ala Gly Phe
                245                 250                 255

Asn Leu Leu Met Thr Leu Arg Leu Trp Ser Ser
            260                 265

<210> SEQ ID NO 68
<211> LENGTH: 265
<212> TYPE: PRT
<213> ORGANISM: Artificial Sequence
<220> FEATURE:
<223> OTHER INFORMATION: amino acid sequence for Va (VJ) domain of HA-1H
      TCR FK47.83 and constant domain (murine)

<400> SEQUENCE: 68

Met Lys Ser Leu Arg Val Leu Leu Val Ile Leu Trp Leu Gln Leu Ser
1               5                   10                  15

Trp Val Trp Ser Gln Gly Glu Asn Val Glu Gln His Pro Ser Thr Leu
            20                  25                  30

Ser Val Gln Glu Gly Asp Ser Ala Val Ile Lys Cys Thr Tyr Ser Asp
        35                  40                  45

```
Ser Ala Ser Asn Tyr Phe Pro Trp Tyr Lys Gln Glu Leu Gly Lys Arg
    50                  55                  60

Pro Gln Leu Ile Ile Asp Ile Arg Ser Asn Val Gly Glu Lys Lys Asp
65                  70                  75                  80

Gln Arg Ile Ala Val Thr Leu Asn Lys Thr Ala Lys His Phe Ser Leu
                85                  90                  95

His Ile Thr Glu Thr Gln Pro Glu Asp Ser Ala Val Tyr Phe Cys Ala
                100                 105                 110

Ala Ser Asn Leu Val Phe Gly Ala Gly Thr Ile Leu Arg Val Lys Ser
            115                 120                 125

Asp Ile Gln Asn Pro Glu Pro Ala Val Tyr Gln Leu Lys Asp Pro Arg
130                 135                 140

Ser Gln Asp Ser Thr Leu Cys Leu Phe Thr Asp Phe Asp Ser Gln Ile
145                 150                 155                 160

Asn Val Pro Lys Thr Met Glu Ser Gly Thr Phe Ile Thr Asp Lys Cys
                165                 170                 175

Val Leu Asp Met Lys Ala Met Asp Ser Lys Ser Asn Gly Ala Ile Ala
                180                 185                 190

Trp Ser Asn Gln Thr Ser Phe Thr Cys Gln Asp Ile Phe Lys Glu Thr
            195                 200                 205

Asn Ala Thr Tyr Pro Ser Ser Asp Val Pro Cys Asp Ala Thr Leu Thr
210                 215                 220

Glu Lys Ser Phe Glu Thr Asp Met Asn Leu Asn Phe Gln Asn Leu Ser
225                 230                 235                 240

Val Met Gly Leu Arg Ile Leu Leu Leu Lys Val Ala Gly Phe Asn Leu
                245                 250                 255

Leu Met Thr Leu Arg Leu Trp Ser Ser
            260                 265

<210> SEQ ID NO 69
<211> LENGTH: 804
<212> TYPE: DNA
<213> ORGANISM: Homo sapiens

<400> SEQUENCE: 69
atgacatcca ttcgagctgt atttatattc ctgtggctgc agctggactt ggtgaatgga      60
gagaatgtgg agcagcatcc ttcaaccctg agtgtccagg agggagacag cgctgttatc     120
aagtgtactt attcagacag tgcctcaaac tacttccctt ggtataagca agaacttgga     180
aaaagacctc agcttattat agacattcgt tcaaatgtgg gcgaaaagaa agaccaacga     240
attgctgtta cattgaacaa gacagccaaa catttctccc tgcacatcac agagacccaa     300
cctgaagact cggctgtcta cttctgtgca gcaagtaatc tggtctttgg cgcaggaacc     360
attctgagag tcaagtccta tatccagaac cctgaccctg ccgtgtacca gctgagagac     420
tctaaatcca gtgacaagtc tgtctgccta ttcaccgatt ttgattctca aacaaatgtg     480
tcacaaagta aggattctga tgtgtatatc acagacaaaa ctgtgctaga catgaggtct     540
atggacttca gagcaacagt gctgtggcc tggagcaaca atctgacttt gcatgtgca      600 aacgccttca caacagcat tattccagaa gacaccttct ccccagccc agaaagttcc      660 tgtgatgtca agctggtcga gaaagctttt gaaacagata cgaacctaaa ctttcaaaac     720
ctgtcagtga ttgggttccg aatcctcctc ctgaaagtgg ccgggtttaa tctgctcatg     780
acgctgcggt tgtggtccag ctga                                            804
```

<210> SEQ ID NO 70
<211> LENGTH: 804
<212> TYPE: DNA
<213> ORGANISM: Artificial Sequence
<220> FEATURE:
<223> OTHER INFORMATION: codon optimised nucleic acid sequence for Va
      (VJ) domain and constant domain of HA-1H TCR FK47.83

<400> SEQUENCE: 70

| atgaccagca tccgggccgt gttcatcttc ctgtggctgc agctggacct ggtgaacggc | 60 |
| gagaacgtgg agcagcaccc cagcaccctg agcgtgcagg agggcgacag cgccgtgatc | 120 |
| aagtgcacct acagcgacag cgccagcaac tacttcccct ggtacaagca ggagctgggc | 180 |
| aagcggcccc agctgatcat cgacatccgg agcaacgtgg gcgagaagaa ggaccagcgg | 240 |
| atcgccgtga ccctgaacaa gaccgccaag cacttcagcc tgcacatcac cgagacccag | 300 |
| cccgaggaca cgccgtgta cttctgcgcc gccagcaacc tggtgttcgg cgccggcacc | 360 |
| atcctgcggg tgaagagcta catccagaac cccgacccccg ccgtgtacca gctgcgggac | 420 |
| agcaagagca gcgacaagag cgtgtgcctg ttcaccgact cgacagcca gaccaacgtg | 480 |
| agccagagca aggacagcga cgtgtacatc accgacaagt gcgtgctgga catgcggagc | 540 |
| atggacttca gagcaacag cgccgtggcc tggagcaaca agagcgactt cgcctgcgcc | 600 |
| aacgccttca caacagcat catccccgag gacaccttct ccccagccc cgagagcagc | 660 |
| tgcgacgtga agctggtgga aagagcttc gagaccgaca ccaacctgaa cttccagaac | 720 |
| ctgagcgtga tcggcttccg gatcctgctg ctgaaggtgg ccggcttcaa cctgctgatg | 780 |
| accctgcggc tgtggagcag ctga | 804 |

<210> SEQ ID NO 71
<211> LENGTH: 798
<212> TYPE: DNA
<213> ORGANISM: Artificial Sequence
<220> FEATURE:
<223> OTHER INFORMATION: codon optimised nucleic acid sequence for Va
      (VJ) domain and constant domain (murine) of HA-1H TCR FK47.83

<400> SEQUENCE: 71

| atgaagagcc tgcgcgtgct gctggtcatc ctgtggctgc aattgtcgtg ggtctggagc | 60 |
| caaggcgaga acgtggagca gcaccccagc accctgagcg tgcaggaggg cgacagcgcc | 120 |
| gtgatcaagt gcacctacag cgacagcgcc agcaactact cccctggta caagcaggag | 180 |
| ctgggcaagc ggccccagct gatcatcgac atcggagca acgtgggcga agaaggac | 240 |
| cagcggatcg ccgtgaccct gaacaagacc gccaagcact tcagcctgca catcaccgag | 300 |
| acccagcccg aggacagcgc cgtgtacttc tgcgccgcca gcaacctggt gttcggcgcc | 360 |
| ggcaccatcc tgcgggtgaa gagcgacatt cagaacccgg aaccggctgt ataccagctg | 420 |
| aaggaccccc gatctcagga tagtactctg tgcctgttca ccgactttga tagtcagatc | 480 |
| aatgtgccta aaaccatgga atccggaact tttattaccg acaagtgcgt gctggatatg | 540 |
| aaagccatgg acagtaagtc aaacggcgcc atcgcttgga gcaatcagac atccttcact | 600 |
| tgccaggata tcttcaagga gaccaacgca acatacccat cctctgacgt gcctgtgat | 660 |
| gccaccctga cagagaagtc tttcgaaaca gacatgaacc tgaattttca gaatctgagc | 720 |
| gtgatgggcc tgagaatcct gctgctgaag gtcgctgggt ttaatctgct gatgacactg | 780 |
| cggctgtggt cctcatga | 798 |

<210> SEQ ID NO 72
<211> LENGTH: 311
<212> TYPE: PRT
<213> ORGANISM: Homo sapiens

<400> SEQUENCE: 72

```
Met Gly Thr Ser Leu Leu Cys Trp Met Ala Leu Cys Leu Leu Gly Ala
1               5                   10                  15
Asp His Ala Asp Thr Gly Val Ser Gln Asn Pro Arg His Lys Ile Thr
            20                  25                  30
Lys Arg Gly Gln Asn Val Thr Phe Arg Cys Asp Pro Ile Ser Glu His
        35                  40                  45
Asn Arg Leu Tyr Trp Tyr Arg Gln Thr Leu Gly Gln Gly Pro Glu Phe
    50                  55                  60
Leu Thr Tyr Phe Gln Asn Glu Ala Gln Leu Glu Lys Ser Arg Leu Leu
65                  70                  75                  80
Ser Asp Arg Phe Ser Ala Glu Arg Pro Lys Gly Ser Phe Ser Thr Leu
                85                  90                  95
Glu Ile Gln Arg Thr Glu Gln Gly Asp Ser Ala Met Tyr Leu Cys Ala
            100                 105                 110
Ser Ser Leu Val Val Val Asp Glu Gln Phe Phe Gly Pro Gly Thr Arg
        115                 120                 125
Leu Thr Val Leu Glu Asp Leu Lys Asn Val Phe Pro Pro Glu Val Ala
    130                 135                 140
Val Phe Glu Pro Ser Glu Ala Glu Ile Ser His Thr Gln Lys Ala Thr
145                 150                 155                 160
Leu Val Cys Leu Ala Thr Gly Phe Tyr Pro Asp His Val Glu Leu Ser
                165                 170                 175
Trp Trp Val Asn Gly Lys Glu Val His Ser Gly Val Ser Thr Asp Pro
            180                 185                 190
Gln Pro Leu Lys Glu Gln Pro Ala Leu Asn Asp Ser Arg Tyr Cys Leu
        195                 200                 205
Ser Ser Arg Leu Arg Val Ser Ala Thr Phe Trp Gln Asn Pro Arg Asn
    210                 215                 220
His Phe Arg Cys Gln Val Gln Phe Tyr Gly Leu Ser Glu Asn Asp Glu
225                 230                 235                 240
Trp Thr Gln Asp Arg Ala Lys Pro Val Thr Gln Ile Val Ser Ala Glu
                245                 250                 255
Ala Trp Gly Arg Ala Asp Cys Gly Phe Thr Ser Glu Ser Tyr Gln Gln
            260                 265                 270
Gly Val Leu Ser Ala Thr Ile Leu Tyr Glu Ile Leu Leu Gly Lys Ala
        275                 280                 285
Thr Leu Tyr Ala Val Leu Val Ser Ala Leu Val Leu Met Ala Met Val
    290                 295                 300
Lys Arg Lys Asp Ser Arg Gly
305                 310
```

<210> SEQ ID NO 73
<211> LENGTH: 305
<212> TYPE: PRT
<213> ORGANISM: Artificial Sequence
<220> FEATURE:
<223> OTHER INFORMATION: amino acid sequence for Vb (VDJ) domain and
      constant domain (murine) of HA-1H TCR FK47.83

<400> SEQUENCE: 73

```
Met Gly Thr Ser Leu Leu Cys Trp Met Ala Leu Cys Leu Leu Gly Ala
1               5                   10                  15

Asp His Ala Asp Thr Gly Val Ser Gln Asn Pro Arg His Lys Ile Thr
            20                  25                  30

Lys Arg Gly Gln Asn Val Thr Phe Arg Cys Asp Pro Ile Ser Glu His
        35                  40                  45

Asn Arg Leu Tyr Trp Tyr Arg Gln Thr Leu Gly Gln Gly Pro Glu Phe
    50                  55                  60

Leu Thr Tyr Phe Gln Asn Glu Ala Gln Leu Glu Lys Ser Arg Leu Leu
65                  70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110

Ser Ser Leu Val Val Asp Glu Gln Phe Phe Gly Pro Gly Thr Arg
        115                 120                 125

Leu Thr Val Leu Glu Asp Leu Arg Asn Val Thr Pro Pro Lys Val Ser
130                 135                 140

Leu Phe Glu Pro Ser Lys Ala Glu Ile Ala Asn Lys Gln Lys Ala Thr
145                 150                 155                 160

Leu Val Cys Leu Ala Arg Gly Phe Phe Pro Asp His Val Glu Leu Ser
                165                 170                 175

Trp Trp Val Asn Gly Lys Glu Val His Ser Gly Val Cys Thr Asp Pro
            180                 185                 190

Gln Ala Tyr Lys Glu Ser Asn Tyr Ser Tyr Cys Leu Ser Ser Arg Leu
        195                 200                 205

Arg Val Ser Ala Thr Phe Trp His Asn Pro Arg Asn His Phe Arg Cys
    210                 215                 220

Gln Val Gln Phe His Gly Leu Ser Glu Glu Asp Lys Trp Pro Glu Gly
225                 230                 235                 240

Ser Pro Lys Pro Val Thr Gln Asn Ile Ser Ala Glu Ala Trp Gly Arg
                245                 250                 255

Ala Asp Cys Gly Ile Thr Ser Ala Ser Tyr His Gln Gly Val Leu Ser
            260                 265                 270

Ala Thr Ile Leu Tyr Glu Ile Leu Leu Gly Lys Ala Thr Leu Tyr Ala
        275                 280                 285

Val Leu Val Ser Gly Leu Val Leu Met Ala Met Val Lys Lys Lys Asn
    290                 295                 300

Ser
305
```

<210> SEQ ID NO 74
<211> LENGTH: 936
<212> TYPE: DNA
<213> ORGANISM: Homo sapiens

<400> SEQUENCE: 74

```
atgggcacca gcctcctctg ctggatggcc ctgtgtctcc tgggggcaga tcacgcagat    60
actggagtct cccagaaccc cagacacaag atcacaaaga gggacagaa tgtaactttc    120 aggtgtgatc caatttctga acacaaccgc ctttattggt accgacagac cctggggcag    180
ggcccagagt ttctgactta cttccagaat gaagctcaac tagaaaaatc aaggctgctc    240
```

```
agtgatcggt tctctgcaga gaggcctaag ggatctttct ccaccttgga gatccagcgc      300
acagagcagg gggactcggc catgtatctc tgtgccagca gcttagtcgt tgtggatgag      360
cagttcttcg ggccagggac acggctcacc gtgctagagg acctgaaaaa cgtgttccca      420
cccgaggtcg ctgtgtttga gccatcagaa gcagagatct cccacaccca aaaggccaca      480
ctggtatgcc tggccacagg cttctacccc gaccacgtgg agctgagctg gtgggtgaat      540
gggaaggagg tgcacagtgg ggtcagcaca gacccgcagc ccctcaagga gcagcccgcc      600
ctcaatgact ccagatactg cctgagcagc cgcctgaggg tctcggccac cttctggcag      660 aaccccgca accacttccg ctgtcaagtc cagttctacg gctctcgga gaatgacgag        720 tggacccagg atagggccaa acctgtcacc cagatcgtca gcgccgaggc ctggggtaga      780
gcagactgtg gcttcacctc cgagtcttac agcaagggg tcctgtctgc caccatcctc       840
tatgagatct tgctagggaa ggccaccttg tatgccgtgc tggtcagtgc cctcgtgctg      900
atggccatgg tcaagagaaa ggattccaga ggctag                                936

<210> SEQ ID NO 75
<211> LENGTH: 936
<212> TYPE: DNA
<213> ORGANISM: Artificial Sequence
<220> FEATURE:
<223> OTHER INFORMATION: codon optimised nucleic acid sequence for Vb
      (VDJ) domain and constant domain of HA-1H TCR FK47.83

<400> SEQUENCE: 75
atgggcacca gcctgctgtg ctggatggcc ctgtgcctgc tgggcgccga ccacgccgac       60
accggcgtga gccagaaccc ccggcacaag atcaccaagc ggggccagaa cgtgaccttc      120
cggtgcgacc ccatcagcga gcacaaccgg ctgtactggt accggcagac cctgggccag      180
ggccccgagt tcctgaccta cttccagaac gaggcccagc tggagaagag ccggctgctg      240
agcgaccggt tcagcgccga gcggcccaag ggcagcttca gcaccctgga gatccagcgg      300
accgagcagg gcgacagcgc catgtacctg tgcgccagca gctggtggt ggtggacgag       360 cagttcttcg gccccggcac ccggctgacc gtgctggagg acctgaagaa cgtgttcccc      420
cccgaggtgg ccgtgttcga gccagcgag gccgagatca gccacaccca gaaggccacc      480
ctggtgtgcc tggccaccgg cttctacccc gaccacgtgg agctgagctg gtgggtgaac      540
ggcaaggagg tgcacagcgg cgtgtgcacc gaccccagc ccctgaagga gcagcccgcc       600
ctgaacgaca gccggtactg cctgagcagc cggctgcggg tgagcgccac cttctggcag      660 aaccccgga accacttccg gtgccaggtg cagttctacg gctgagcga gaacgacgag        720 tggacccagg accgggccaa gcccgtgacc cagatcgtga gcgccgaggc ctggggccgg      780
gccgactgcg gcttccaccag cgagagctac cagcagggcg tgctgagcgc caccatcctg     840
tacgagatcc tgctgggcaa ggccacccotg tacgccgtgc tggtgagcgc cctggtgctg    900
atggccatgg tgaagcggaa ggacagccgg ggctga                                936

<210> SEQ ID NO 76
<211> LENGTH: 918
<212> TYPE: DNA
<213> ORGANISM: Artificial Sequence
<220> FEATURE:
<223> OTHER INFORMATION: codon optimised nucleic acid sequence for Vb
      (VDJ) domain and constant domain (murine) of HA-1H TCR FK47.83
```

<400> SEQUENCE: 76

```
atgggcacca gcctgctgtg ctggatggcc ctgtgcctgc tgggcgccga ccacgccgac      60
accggcgtga gccagaaccc ccggcacaag atcaccaagc ggggccagaa cgtgaccttc     120
cggtgcgacc ccatcagcga gcacaaccgg ctgtactggt accggcagac cctgggccag     180
ggccccgagt tcctgaccta cttccagaac gaggcccagc tggagaagag ccggctgctg     240
agcgaccggt tcagcgccga gcggcccaag ggcagcttca gcaccctgga gatccagcgg     300
accgagcagg gcgacagcgc catgtacctg tgcgccagca gctggtggt ggtggacgag      360
cagttcttcg gccccggcac ccggctgacc gtgctggaag atctacgtaa cgtgacacca     420
cccaaagtct cactgtttga gcctagcaag gcagaaattg ccaacaagca gaaggccacc     480
ctggtgtgcc tggcaagagg gttctttcca gatcacgtgg agctgtcctg gtgggtcaac     540
ggcaaagaag tgcattctgg ggtctgcacc gaccccccagg cttacaagga gagtaattac     600
tcatattgtc tgtcaagccg gctgagagtg tccgccacat tctggcacaa ccctaggaat     660
catttccgct gccaggtcca gtttcacggc ctgagtgagg aagataaatg ccagagggg      720
tcacctaagc cagtgacaca gaacatcagc gcagaagcct ggggacgagc agactgtggc     780
attactagcg cctcctatca tcagggcgtg ctgagcgcca ctatcctgta cgagattctg     840
ctgggaaagg ccaccctgta tgctgtgctg gtctccggcc tggtgctgat ggccatggtc     900
aagaaaaaga actcttga                                                   918
```

<210> SEQ ID NO 77
<211> LENGTH: 120
<212> TYPE: DNA
<213> ORGANISM: Homo sapiens

<400> SEQUENCE: 77

```
aggtgtgatc caatttctga acacaaccgc ctttattggt accgacagac cctggggcag      60
ggcccagagt ttctgactta cttccagaat gaagctcaac tagaaaaatc aaggctgctc    120
```

<210> SEQ ID NO 78
<211> LENGTH: 120
<212> TYPE: DNA
<213> ORGANISM: Homo sapiens

<400> SEQUENCE: 78

```
aggtgtgatc caatttcggg tcatgtatcc ctttttggt accaacaggc cctggggcag       60
gggccagagt ttctgactta tttccagaat gaagctcaac tagacaaatc ggggctgccc    120
```

<210> SEQ ID NO 79
<211> LENGTH: 9
<212> TYPE: PRT
<213> ORGANISM: Homo sapiens

<400> SEQUENCE: 79

Val Leu Arg Asp Asp Leu Leu Glu Ala
1               5

<210> SEQ ID NO 80
<211> LENGTH: 5
<212> TYPE: PRT
<213> ORGANISM: Homo sapiens

<400> SEQUENCE: 80

Thr Thr Leu Ser Asn
1               5

<210> SEQ ID NO 81
<211> LENGTH: 15
<212> TYPE: DNA
<213> ORGANISM: Homo sapiens

<400> SEQUENCE: 81
actactttaa gcaat                                                     15

<210> SEQ ID NO 82
<211> LENGTH: 15
<212> TYPE: DNA
<213> ORGANISM: Artificial Sequence
<220> FEATURE:
<223> OTHER INFORMATION: codon optimised nucleic acid sequence for CDR1
      of Va domain of HA-1H TCR M7

<400> SEQUENCE: 82
accaccctga gcaac                                                     15

<210> SEQ ID NO 83
<211> LENGTH: 7
<212> TYPE: PRT
<213> ORGANISM: Homo sapiens

<400> SEQUENCE: 83

Leu Val Lys Ser Gly Glu Val
1               5

<210> SEQ ID NO 84
<211> LENGTH: 21
<212> TYPE: DNA
<213> ORGANISM: Homo sapiens

<400> SEQUENCE: 84
ttagtgaaga gtggagaagt g                                              21

<210> SEQ ID NO 85
<211> LENGTH: 21
<212> TYPE: DNA
<213> ORGANISM: Artificial Sequence
<220> FEATURE:
<223> OTHER INFORMATION: codon optimised nucleic acid sequence for CDR2
      of Va domain of HA-1H TCR M7

<400> SEQUENCE: 85
ctggtgaaga gcggcgaggt g                                              21

<210> SEQ ID NO 86
<211> LENGTH: 6
<212> TYPE: PRT
<213> ORGANISM: Homo sapiens

<400> SEQUENCE: 86

Phe Gln Asn Glu Ala Gln
1               5

<210> SEQ ID NO 87
<211> LENGTH: 18
<212> TYPE: DNA
<213> ORGANISM: Homo sapiens

<400> SEQUENCE: 87
ttccagaatg aagctcaa					18

<210> SEQ ID NO 88
<211> LENGTH: 18
<212> TYPE: DNA
<213> ORGANISM: Artificial Sequence
<220> FEATURE:
<223> OTHER INFORMATION: codon optimised nucleic acid sequence for CDR2
      of Vb domain of HA-1H TCR M7, HA-1H TCR M2, or HA-1H TCR FK47.83

<400> SEQUENCE: 88
ttccagaacg aggcccag					18

<210> SEQ ID NO 89
<211> LENGTH: 441
<212> TYPE: DNA
<213> ORGANISM: Mus musculus

<400> SEQUENCE: 89
gagcaaggcc gagatcgcca acaagcagaa agccaccctc gtgtgcctgg ccagaggctt		60 cttccccgac catgtggaac tgtcttggtg ggtcaacggc aaagaggtgc acagcggagt		120 gtccaccgac cctcaggcct acaaagagag caactacagc tactgcctga gcagcagact		180 gcgggtgtcc gccaccttct ggcacaaccc ccggaaccac ttcagatgcc aggtgcagtt		240 tcacggcctg agcgaagagg acaagtggcc cgaaggctcc ccaagcccg tgacccagaa		300 tatctctgcc gaggcctggg gcagagccga ctgtggaatt accagcgcca gctaccacca		360 gggcgtgctg tctgccacca tcctgtacga gatcctgctg ggcaaggcca ccctgtacgc		420 cgtgctggtg tctggcctgg t		441

<210> SEQ ID NO 90
<211> LENGTH: 363
<212> TYPE: DNA
<213> ORGANISM: Mus musculus

<400> SEQUENCE: 90
caggacagca ccctgtgcct gttcaccgac ttcgacagcc agatcaacgt gcccaagacc		60 atggaaagcg gcaccttcat caccgacaag acagtgctgg acatgaaggc catggacagc		120 aagtccaacg gcgcaatcgc ctggtccaac cagaccagct tcacatgcca ggacatcttc		180 aaagagacaa acgccacata ccccagcagc gacgtgccct gtgatgccac cctgacagag		240 aagtccttcg agacagacat gaacctgaac ttccagaatc tgtccgtgat gggcctgaga		300 atcctgctgc tgaaggtggc cggcttcaat ctgctgatga ccctgcggct gtggtccagc		360 tga		363

<210> SEQ ID NO 91
<211> LENGTH: 132
<212> TYPE: PRT
<213> ORGANISM: Artificial Sequence
<220> FEATURE:
<223> OTHER INFORMATION: Seattle TCR2, Vb domain

<400> SEQUENCE: 91

Met Gly Thr Ser Leu Leu Cys Trp Met Ala Leu Cys Leu Leu Gly Ala
1               5                   10                  15

Asp His Ala Asp Thr Gly Val Ser Gln Asp Pro Arg His Lys Ile Thr
            20                  25                  30

```
Lys Arg Gly Gln Asn Val Thr Phe Arg Cys Asp Pro Ile Ser Glu His
            35                  40                  45

Asn Arg Leu Tyr Trp Tyr Arg Gln Thr Leu Gly Gln Gly Pro Glu Phe
 50                  55                  60

Leu Thr Tyr Phe Gln Asn Glu Ala Gln Leu Glu Lys Ser Arg Leu Leu
 65              70                  75                  80

Ser Asp Arg Phe Ser Ala Glu Arg Pro Lys Gly Ser Phe Ser Thr Leu
                85                  90                  95

Glu Ile Gln Arg Thr Glu Gln Gly Asp Ser Ala Met Tyr Leu Cys Ala
            100                 105                 110

Ser Ser Leu Val Lys Gly Glu Lys Leu Phe Phe Gly Ser Gly Thr Gln
            115                 120                 125

Leu Ser Val Leu
        130

<210> SEQ ID NO 92
<211> LENGTH: 133
<212> TYPE: PRT
<213> ORGANISM: Artificial Sequence
<220> FEATURE:
<223> OTHER INFORMATION: Seattle TCR2, Va domain

<400> SEQUENCE: 92

Met Glu Thr Leu Leu Gly Leu Leu Ile Leu Trp Leu Gln Leu Gln Trp
 1               5                  10                  15

Val Ser Ser Lys Gln Glu Val Thr Gln Ile Pro Ala Ala Leu Ser Val
            20                  25                  30

Pro Glu Gly Glu Asn Leu Val Leu Asn Cys Ser Phe Thr Asp Ser Ala
            35                  40                  45

Ile Tyr Asn Leu Gln Trp Phe Arg Gln Asp Pro Gly Lys Gly Leu Thr
 50                  55                  60

Ser Leu Leu Leu Ile Gln Ser Ser Gln Arg Glu Gln Thr Ser Gly Arg
 65              70                  75                  80

Leu Asn Ala Ser Leu Asp Lys Ser Ser Gly Arg Ser Thr Leu Tyr Ile
                85                  90                  95

Ala Ala Ser Gln Pro Gly Asp Ser Ala Thr Tyr Leu Cys Ala Val Ile
            100                 105                 110

Gly Leu Gly Gly Thr Tyr Lys Tyr Ile Phe Gly Thr Gly Thr Arg Leu
            115                 120                 125

Lys Val Leu Ala Asn
        130
```

BINDING PROTEINS SPECIFIC FOR HA-1$^H$ AND USES THEREOF

Novel nucleic acid compositions, vector systems, modified cells and pharmaceutical compositions are provided that are useful for treating or preventing a relapse of a haematological malignancy after allogeneic stem cell transplantation (allo-SCT) in a HLA-A*0201 positive human subject. Corresponding methods and uses are also provided.

BACKGROUND

Haematological malignancies are cancers that affect the blood and lymph system. The cancer may begin in blood-forming tissue (e.g. bone marrow), or in the cells of the immune system. Patients with haematological malignancies can be successfully treated with human leukocyte antigen (HLA)-matched allogeneic stem cell transplantation (allo-SCT). To reduce the development of graft-versus-host disease (GvHD), donor T cells can be depleted from the stem cell graft and re-administered pre-emptively after the allo-SCT. Although this two-step procedure of T-cell depleted allo-SCT and donor lymphocyte infusion (DLI) reduces the incidence and severity of GvHD compared to non T cell-depleted allo-SCT, GvHD remains an important cause of morbidity and mortality, particularly in the setting of HLA-mismatched transplantation. The risk of inducing GvHD is even higher when DLI is administered early after allo-SCT. Patients with high-risk leukaemia are likely to relapse early after transplantation, at a time when administration of DLI is likely to result in GvHD. Treatment options are scarce for this patient population and new therapeutic modalities are required to allow early administration of T cells capable of exerting a graft-versus-leukaemia (GvL) effect without causing GvHD.

Adoptive transfer of T cells with defined anti-leukaemia specificity is a strategy to dissect graft versus host disease (GvHD) responses from graft versus leukaemia (GvL) responses. It has been demonstrated that donor T cells recognizing minor histocompatibility antigens (MiHA) selectively expressed on hematopoietic cells mediate anti-leukemic reactivity after allo-SCT without causing severe GvHD. The HA-1$^H$ antigen is a minor histocompatibility antigen that is a compelling target for immunotherapy since it is highly expressed in haematological malignancies and normal hematopoietic cells, but not in normal nonhematopoietic cells. It is also presented in the context of HLA-A*0201, a globally common human leukocyte antigen serotype, therefore is a suitable target antigen in a significant proportion of patients with haematological malignancies. Previously, a direct association was shown between the emergence of HA-1 specific T cells and the complete disappearance of malignant recipient cells in HA-1 incompatible donor-recipient pairs (1). HA-1 TCR modified T cells can therefore potentially be used to treat patients suffering from different haematological malignancies, including leukaemia and lymphoma, after allo-SCT. However, it has previously been shown in a phase I clinical study that in vitro cultured HA-1-specific T-cells derived from the T cell repertoire of donors lacked in vivo persistence and in vivo anti-leukemic reactivity (Meij et al., 2012).

There is a need for novel immunotherapies for treating haematological malignancies.

BRIEF SUMMARY OF THE DISCLOSURE

The minor histocompatibility antigen HA-1$^H$ is encoded by the polymeric HMHA1 gene (also called Rho GTPase-activating protein 45). HMHA1 variants (rs_1801284 A/A or A/G) present in 52% of individuals give rise to an immunogenic peptide containing a histidine residue in place of an arginine (VLHDDLLEA; SEQ ID NO:10) (R139H polymorphism) and HLA presentation of this peptide occurs in individuals with the common HLA-A*0201 (A2) allele (2). T cell therapies targeting HA-1$^H$ are therefore applicable to approximately 25% of subjects transplanted for hematological malignancies and require a T cell donor who is either HLA-A2 negative or HA-1$^H$ negative ("HA-1$^R$"; VLRDDL-LEA; SEQ ID NO:79).

The inventors have isolated and sequenced novel TCRs that are specific for an HA-1$^H$ antigen Such TCRs are useful for treating or preventing a relapse of a haematological malignancy after allogeneic stem cell transplantation (allo-SCT) in a HLA-A*0201 positive human subject.

The inventors have previously shown that in-vitro cultured HA-1 specific T cells from the T cell repertoire of donors lacked in vivo persistence and in vivo-anti-leukemic reactivity (Meij et al, 2012). The inventors have now isolated HA-1 TCRs derived from HA-1 specific T cells isolated from patients that experienced potent anti-leukemic responses that were mediated by these HA-1 specific T cells (Marijt et al 2003, van Loenen et al 2011). Advantageously, the HA-1 TCRs described herein therefore resemble the natural T-cell response and correspond with high affinity TCRs with highly effective anti-leukemic reactivity. Surprisingly, the HA-1 specific TCRs described herein exert more potent anti-tumor reactivity compared to the less bonafide candidates generated by in vitro culture. In addition, since these HA-1 TCRs were isolated from an activated anti-leukemic response without signs of graft versus host disease (GvHD) these TCRs are known to be safe as they will not induce graft versus host disease or other toxicities. Advantageously, potent anti-leukemic reactivity of the HA-1 specific TCRs was demonstrated against primary AML and ALL blasts derived from patients at the moment of diagnosis, proving the efficaciousness of these HA1-TCRs in patients with hematological malignancies. Even more convincingly, a preclinical in vivo model has been used herein to show that HA-1 TCR engineered T cells very effectively eradicated the established multiple myeloma after infusion, highlighting the potent in vivo anti-tumour reactivity of the HA-1 TCR.

The inventors have investigated which components of the novel TCRs are essential for HA-1$^H$ antigen specificity and TCR functionality. Surprisingly, they have found that the CDR1 region of the TCR β chain variable domain (Vβ) is crucial for HA-1$^H$ specificity but is not sufficient for HA-1 specificity. They have also identified that the CDR3 regions of both the TCR β chain variable domain (Vβ) and the TCR α chain variable domain (Vα) are required, and that the TCR β chain variable (Vβ) domain needs to be encoded by a TRBV7-9 gene.

HA-1$^H$ specific TCRs described herein therefore require the following minimal components: (a) a TCR Vα domain comprising a HA-1$^H$ specific CDR3 (see e.g. SEQ ID NOs: 1 to 3); and (b) a TCR Vβ domain having an amino acid sequence encoded by a TRBV7-9 gene, wherein the Vβ domain comprises a HA-1$^H$ specific CDR3 (see e.g. SEQ ID NOs: 4 to 6) and a HA-1$^H$ specific CDR1 (see e.g. SEQ ID NO: 7).

The CDR3 TCR sequences described herein differ from those known in the prior art, e.g. WO2018/058002. Furthermore, the TRAV regions (containing the CDR1 and CDR2 region) of the alpha chain sequences of the TCRs described herein are completely different from the TRAV regions of the alpha chains of the TCRs described in WO2018/058002. In addition, the TRAJ regions are combined with different TRAV regions. There are therefore several differences between the TCRs we claim and the TCRs of the cited prior art.

HA-1$^H$ specific binding proteins (e.g. TCRs) are exemplified herein using specific CDR3 and CDR1 sequence combinations. For example, a combination of:
(a) a TCR Vα domain comprising a CDR3 of SEQ ID NO: 1; and
(b) a TCR Vβ domain having an amino acid sequence encoded by a TRBV7-9 gene, wherein the Vβ domain comprises a CDR3 of SEQ ID NO: 4 and a CDR1 of SEQ ID NO: 7 is shown herein to confer HA-1$^H$ binding specificity. Although these specific CDR sequences are exemplified, the CDRs may also include some variability from the specified sequences (e.g. each specified CDR may have at least 80% sequence identity to the specified SEQ ID NO). The TRBV7-9 gene may be TRBV7-9*03 (see for example TCR M7).

In addition, a combination of:
(a) a TCR Vα domain comprising a CDR3 of SEQ ID NO: 2; and
(b) a TCR Vβ domain having an amino acid sequence encoded by a TRBV7-9 gene, wherein the Vβ domain comprises a CDR3 of SEQ ID NO: 5 and a CDR1 of SEQ ID NO: 7 is shown herein to confer HA-1$^H$ binding specificity. Although these specific CDR sequences are exemplified, the CDRs may also include some variability from the specified sequences (e.g. each specified CDR may have at least 80% sequence identity to the specified SEQ ID NO). The TRBV7-9 gene may be TRBV7-9*01 (see for example TCR M2).

Furthermore, a combination of:
(a) a TCR Vα domain comprising a CDR3 of SEQ ID NO: 3; and
(b) a TCR Vβ domain having an amino acid sequence encoded by a TRBV7-9 gene, wherein the Vβ domain comprises a CDR3 of SEQ ID NO:6 and a CDR1 of SEQ ID NO: 7 is shown to confer HA-1$^H$ binding specificity. Although these specific CDR sequences are exemplified, the CDRs may also include some variability from the specified sequences (e.g. each specified CDR may have at least 80% sequence identity to the specified SEQ ID NO). The TRBV7-9 gene may be TRBV7-9*01 (see for example TCR FK47.83).

The inventors have also shown that HA-1$^H$ specific binding proteins (e.g. TCRs) can be formed by different combinations of the TCR Vα and TCR Vβ domains described herein. For example, a functional TCR was generated using a TCR Vβ domain equivalent to the M7 clone (SEQ ID NO: 18) in combination with a TCR Vα domain equivalent to the M2 clone (SEQ ID NO: 29). Accordingly, a functional binding protein (e.g. TCR) can also be generated from a combination of:
(a) a TCR Vα domain comprising a CDR3 of SEQ ID NO: 2; and
(b) a TCR Vβ domain having an amino acid sequence encoded by a TRBV7-9 gene, wherein the Vβ domain comprises a CDR3 of SEQ ID NO: 4 and a CDR1 of SEQ ID NO: 7 is shown to confer HA-1$^H$ binding specificity. Although these specific CDR sequences are exemplified, the CDRs may also include some variability from the specified sequences (e.g. each specified CDR may have at least 80% sequence identity to the specified SEQ ID NO). The TRBV7-9 gene may be TRBV7-9*01 (see for example TCR M7).

Although the data presented herein relates to the above specific combinations, other combinations may also be used to form functional binding proteins specific for HA-1". Such combinations are also encompassed herein and are described in more detail below.

The invention has been exemplified by generating functional TCRs that are specific for HA-1$^H$. However, the invention also encompasses other binding proteins with the features specified above to confer for HA-1$^H$ antigen specificity. Accordingly, other binding proteins (e.g. an antigen binding fragment of a TCR (such as a single chain TCR), or a chimeric antigen receptor (CAR)) are also encompassed. These binding proteins (e.g. when expressed by a host cell such as an immune cell, e.g. a T cell) can be used as a standalone therapy to treat a hematologic malignancy or to prevent a relapse or recurrence thereof or can be used as part of a therapeutic regimen comprising additional therapies or agents (e.g., following, or in combination with, allogeneic SCT).

In one aspect, the invention provides an isolated nucleic acid composition that encodes an HA-1$^H$ antigen-specific binding protein having a TCR α chain variable (Vα) domain and a TCR β chain variable (Vβ) domain, the composition comprising:
(a) a nucleic acid sequence that encodes a TCR Vα domain comprising a CDR3 amino acid sequence having at least 85% sequence identity to any one of SEQ ID NOs: 1 to 3; and
(b) a nucleic acid sequence that encodes a TCR Vβ domain having an amino acid sequence encoded by a TRBV7-9 gene, wherein the Vβ domain comprises a CDR3 amino acid sequence having at least 90% sequence identity to any one of SEQ ID NOs: 4 to 6 and a CDR1 amino acid sequence having at least 80% sequence identity to SEQ ID NO: 7.

Suitably, the TRBV7-9 gene may be TRBV7-9*01 or TRBV7-9*03.

Suitably, the HA-1$^H$ antigen may comprise the amino acid sequence shown in SEQ ID NO: 10.

Suitably, the encoded binding protein may be capable of specifically binding to a HA-1$^H$ antigen: HLA-A*0201 complex.

Suitably, the nucleic acid sequence may be codon optimised for expression in a host cell, optionally wherein the host cell is a human T cell.

Suitably:
(i) the CDR3 of the Vα domain may comprise or consist of the amino acid sequence of SEQ ID NO: 1,
(ii) the CDR3 of the Vβ domain may comprise or consist of the amino acid sequence of SEQ ID NO:4, and
(iii) the CDR1 of the Vβ domain may comprise or consist of the amino acid sequence of SEQ ID NO: 7.

Suitably:
(i) the CDR3 of the Vα domain may be encoded by a nucleic acid sequence comprising the sequence of SEQ ID NO: 11 or SEQ ID NO:12; and/or
(ii) the CDR3 of the Vβ domain may be encoded by a nucleic acid sequence comprising the sequence of SEQ ID NO: 13 or SEQ ID NO:14; and/or
(iii) the CDR1 of the Vβ domain may be encoded by a nucleic acid sequence comprising the sequence of SEQ ID NO: 15 or SEQ ID NO:16.

Suitably:
(i) the Vα domain may comprise an amino acid sequence having at least 90% sequence identity to, comprising, or consisting of, SEQ ID NO: 17; and/or (ii) the Vβ domain may comprise an amino acid sequence having at least 90% sequence identity to, comprising, or consisting of, SEQ ID NO: 18.

Suitably:
(i) the Vα domain may be encoded by a nucleic acid sequence comprising the sequence of SEQ ID NO: 19 or SEQ ID NO: 20; and/or
(ii) the Vβ domain may be encoded by a nucleic acid sequence comprising the sequence of SEQ ID NO: 21 or SEQ ID NO:22.

Suitably:
(i) the CDR3 of the Vα domain may comprise or consist of the amino acid sequence of SEQ ID NO: 2,
(ii) the CDR3 of the Vβ domain may comprise or consist of the amino acid sequence of SEQ ID NO: 5, and
(iii) the CDR1 of the Vβ domain may comprise or consist of the amino acid sequence of SEQ ID NO: 7.

Suitably:
(i) the CDR3 of the Vα domain may be encoded by a nucleic acid sequence comprising the sequence of SEQ ID NO: 23 or SEQ ID NO:24; and/or
(ii) the CDR3 of the Vβ domain may be encoded by a nucleic acid sequence comprising the sequence of SEQ ID NO: 25 or SEQ ID NO:26; and/or
(iii) the CDR1 of the Vβ domain may be encoded by a nucleic acid sequence comprising the sequence of SEQ ID NO: 15 or SEQ ID NO:16.

Suitably:
(i) the Vα domain may comprise an amino acid sequence having at least 90% sequence identity to, comprising, or consisting of, SEQ ID NO: 29; and/or
(ii) the Vβ domain may comprise an amino acid sequence having at least 90% sequence identity to, comprising, or consisting of, SEQ ID NO: 30.

Suitably:
(i) the Vα domain may be encoded by a nucleic acid sequence comprising the sequence of SEQ ID NO: 31 or SEQ ID NO:32; and/or
(ii) the Vβ domain may be encoded by a nucleic acid sequence comprising the sequence of SEQ ID NO: 33 or SEQ ID NO:34.

Suitably:
(i) the CDR3 of the Vα domain may comprise or consist of the amino acid sequence of SEQ ID NO: 3,
(ii) the CDR3 of the Vβ domain may comprise or consist of the amino acid sequence of SEQ ID NO:6, and
(iii) the CDR1 of the Vβ domain may comprise or consist of the amino acid sequence of SEQ ID NO: 7.

Suitably:
(i) the CDR3 of the Vα domain may be encoded by a nucleic acid sequence comprising the sequence of SEQ ID NO: 35 or SEQ ID NO:36; and/or
(ii) the CDR3 of the Vβ domain may be encoded by a nucleic acid sequence comprising the sequence of SEQ ID NO: 37 or SEQ ID NO:38; and/or
(iii) the CDR1 of the Vβ domain may be encoded by a nucleic acid sequence comprising the sequence of SEQ ID NO: 15 or SEQ ID NO:16.

Suitably:
(i) the Vα domain may comprise an amino acid sequence having at least 90% sequence identity to, comprising, or consisting of, SEQ ID NO: 41; and/or
(ii) the Vβ domain may comprise an amino acid sequence having at least 90% sequence identity to, comprising, or consisting of, SEQ ID NO: 42.

Suitably:
(i) the Vα domain may be encoded by a nucleic acid sequence comprising the sequence of SEQ ID NO: 43 or SEQ ID NO:44; and/or
(ii) the Vβ domain may be encoded by a nucleic acid sequence comprising the sequence of SEQ ID NO: 45 or SEQ ID NO:46.

Suitably, the isolated nucleic acid composition may further comprise a TCR α chain constant domain and/or a TCR β chain constant domain.

Suitably, the encoded binding protein may comprise a TCR, an antigen binding fragment of a TCR, or a chimeric antigen receptor (CAR).

Suitably, the antigen binding fragment of a TCR may be a single chain TCR (scTCR).

In another aspect, the invention provides a vector system comprising a nucleic acid composition described herein.

Suitably, the vector may be a plasmid, a viral vector, or a cosmid, optionally wherein the vector is selected from the group consisting of a retrovirus, lentivirus, adeno-associated virus, adenovirus, vaccinia virus, canary poxvirus, herpes virus, minicircle vector and synthetic DNA or RNA.

In another aspect, the invention provides a modified cell transfected or transduced with a nucleic acid composition described herein, or a vector system described herein, wherein the modified cell is HLA-A*0201 negative and/or HA-1$^H$ negative.

Suitably, the modified cell may be selected from the group consisting of a CD8 T cell, a CD4 T cell, an NK cell, an NK-T cell, a gamma-delta T cell, a hematopoietic stem cell, a progenitor cell, a T cell line or a NK-92 cell line.

Suitably, the modified cell may be a human cell.

In another aspect, the invention provides a pharmaceutical composition comprising a nucleic acid composition described herein, a vector system described herein, or a modified cell described herein, and a pharmaceutically acceptable excipient, adjuvant, diluent and/or carrier.

In another aspect, the invention provides a method for treating or preventing a relapse of a haematological malignancy after allogeneic stem cell transplantation (allo-SCT) in a HLA-A*0201 positive human subject, the method comprising administering to the subject a therapeutically effective amount of a pharmaceutical composition described herein.

In another aspect, the invention provides a pharmaceutical composition according described herein for use in treating or preventing a relapse of a haematological malignancy after allogeneic stem cell transplantation (allo-SCT) in a HLA-A*0201 positive human subject.

In another aspect, the invention provides for the use of a pharmaceutical composition described herein in the manufacture of a medicament for treating or preventing a relapse of a haematological malignancy after allogeneic stem cell transplantation (allo-SCT) in a HLA-A*0201 positive human subject.

Suitably, the haematological malignancy may comprise a leukemia, a lymphoma, a myelodysplastic disorder, or a myeloma.

Suitably:
(i) the haematological malignancy may comprise a leukemia, optionally wherein the leukemia is selected from the group consisting of acute myeloid leukemia (AML), acute lymphocytic leukemia (ALL), mixed phenotype acute leukemia (MPAL), chronic myeloid leukemia (CML), B cell prolymphocytic leukemia, hairy cell leukemia, or chronic lymphocytic leukemia (CLL); or (ii) the haematological malignancy may comprise a lymphoma, optionally wherein the lymphoma is selected from the group consisting of Hodgkin's lymphoma (HL), non-Hodgkin's lymphoma (NHL), a central nervous system lymphoma, small lymphocytic lymphoma (SLL), CD37+ dendritic cell lymphoma, lymphoplasmacytic lymphoma, splenic marginal zone lymphoma, extra-nodal marginal zone B-cell lymphoma of mucosa-associated (MALT) lymphoid tissue, nodal marginal zone B-cell lymphoma, follicular lymphoma, mantle cell lymphoma, diffuse large B-cell lymphoma, mediastinal (thymic) large B-cell lymphoma, precursor B-lymphoblastic lymphoma, immunoblastic large cell lymphoma, intravascular large B-cell lymphoma, primary effusion lymphoma, or Burkitt's lymphoma; or (iii) the hematological malignancy may comprise a myelodysplastic disorder, optionally wherein the myelodysplastic disorder is selected from refractory cytopenia with unilineage dysplasia (refractory anemia, refractory neutropenia, and refractory thrombocytopenia), refractory anemia with ring sideroblasts (RARS), refractory anemia with ring sideroblasts-thrombocytosis (RARS-t), refractory cytopenia with multinieage dysplasia (RCMD), refractory cytopenia with multinieage dysplasia and ring sideroblasts (RCMD-RS), refractory anemia with excess blasts (RAEB), myelodysplasia unclassifiable, or refractory cytopenia of childhood.

Suitably, the subject may have previously received lymphodepleting chemotherapy.

Suitably, the lymphodepleting chemotherapy may comprise cyclophosphamide, fludarabine, anti-thymocyte globulin, or a combination thereof.

Suitably, one or more of the modified cells within the composition described herein may be allogeneic to the subject.

In another aspect, the invention provides a method of generating a binding protein that is capable of specifically binding to a peptide containing an HA-1$^H$ antigen and does not bind to a peptide that does not contain an HA-1$^H$ antigen, comprising contacting a nucleic acid composition described herein with a cell under conditions in which the nucleic acid composition is incorporated and expressed by the cell.

Suitably, the method may be ex vivo.

In another aspect, the invention provides an isolated nucleic acid sequence comprising or consisting of the nucleotide sequence of any one of SEQ ID NOs: 11 to 14, 19 to 26, 31 to 38, 43 to 46, 49 to 51, 54 to 56, 59 to 66, 69 to 71, and 74 to 76.

In another aspect, the invention provides an isolated nucleic acid sequence comprising or consisting of the nucleotide sequence of any one of SEQ ID NOs: 11 to 14, 19 to 26, 31 to 38, 43 to 46, 49 to 51, 54 to 56, 59 to 66, 69 to 71, and 74 to 76 for use in therapy.

Throughout the description and claims of this specification, the words "comprise" and "contain" and variations of them mean "including but not limited to", and they are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The patent, scientific and technical literature referred to herein establish knowledge that was available to those skilled in the art at the time of filing. The entire disclosure of the issued patents, published and pending patent applications, and other publications that are cited herein are hereby incorporated by reference to the same extent as if each was specifically and individually indicated to be incorporated by reference. In the case of any inconsistencies, the present disclosure will prevail.

Unless defined otherwise herein, all technical and scientific terms used herein have the same meaning as commonly understood by one of ordinary skill in the art to which this invention pertains. For example, Singleton and Sainsbury, Dictionary of Microbiology and Molecular Biology, 2d Ed., John Wiley and Sons, NY; and Hale and Marham, The Harper Collins Dictionary of Biology, Harper Perennial, NY (1991) provide those of skill in the art with a general dictionary of many of the terms used in the invention. Although any methods and materials similar or equivalent to those described herein find use in the practice of the present invention, the preferred methods and materials are described herein. Accordingly, the terms defined immediately below are more fully described by reference to the Specification as a whole. Also, as used herein, the singular terms "a", "an," and "the" include the plural reference unless the context clearly indicates otherwise. Unless otherwise indicated, nucleic acids are written left to right in 5' to 3' orientation; amino acid sequences are written left to right in amino to carboxy orientation, respectively. It is to be understood that this invention is not limited to the particular methodology, protocols, and reagents described, as these may vary, depending upon the context they are used by those of skill in the art.

Various aspects of the invention are described in further detail below.

BRIEF DESCRIPTION OF THE DRAWINGS

Embodiments of the invention are further described hereinafter with reference to the accompanying drawings, in which.

To improve the vector for clinical use, the modified HA-1-TCR chains linked with a T2A sequence were expressed in the MP71 vector without marker gene. pp50 VTE and EBNA3A FLR virus-specific T-cells were transduced with pLZRS vectors encoding unmodified HA-1-TCR chains linked with a T2A sequence and linked with an IRES sequence to a marker gene (WT TCR) or with MP71 vector without marker gene encoding HA-1-TCR opt SS or empty vectors (mock td) and one week after transduction tested for HA-1-specific IFNγ production against different HLA-A2$^{pos}$ AML and ALL primary cells that were either positive or negative for HA-1 as indicated in the figure. The experiment was performed in duplicate and is representative for 2 independent experiments.

Figure 6:
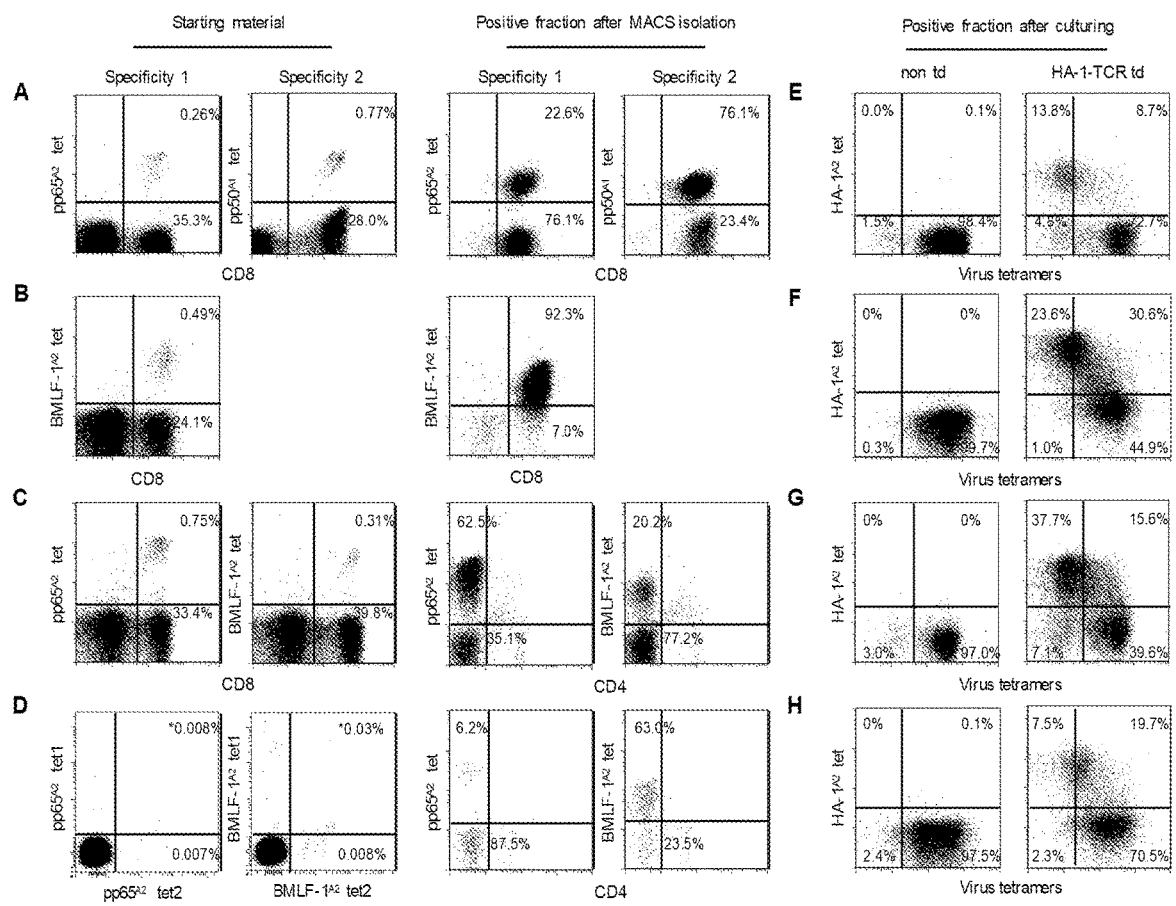

FIG. 6 shows virus-specific T-cells can be purified and transduced using Streptamer-based selection procedure on a Clini-MACS device. To test whether the procedure could be scaled up, virus-specific T-cells were purified using Streptamers and Clini-MACS device and 2-3 days after isolation either transduced with the HA-1-TCR (HA-1-TCR td) or non-transduced (non td). For this purpose, 1×10$^{9}$ PBMCs were thawed from healthy donor JBC (A+E), UPB (B+F), UHO (C+G), and UBQ (D+H). (A-D) Before and directly after CliniMACS-separation donor PBMC were stained with tetramers and the frequencies of virus-specific T-cells were measured in the starting material as well as in the positively isolated fraction using flowcytometry after a D-biotin dissociation step. (E-H) One week after transduction and 12-13 days after MACS-isolation, antigen-specificity of both the non td and HA-1-TCR td cell lines was measured using HA-1- and virus-tetramers. Percentages indicate frequencies of virus-specific or HA-1-specific T-cells in that particular quadrant. *Sensitive combinatorial coding analysis demonstrated that leukapheresis material of UBQ contained 0.008% pp65$^{42}$ specific T-cells and 0.03% BMLF-1$^{42}$ specific T-cells.

Figure 7:
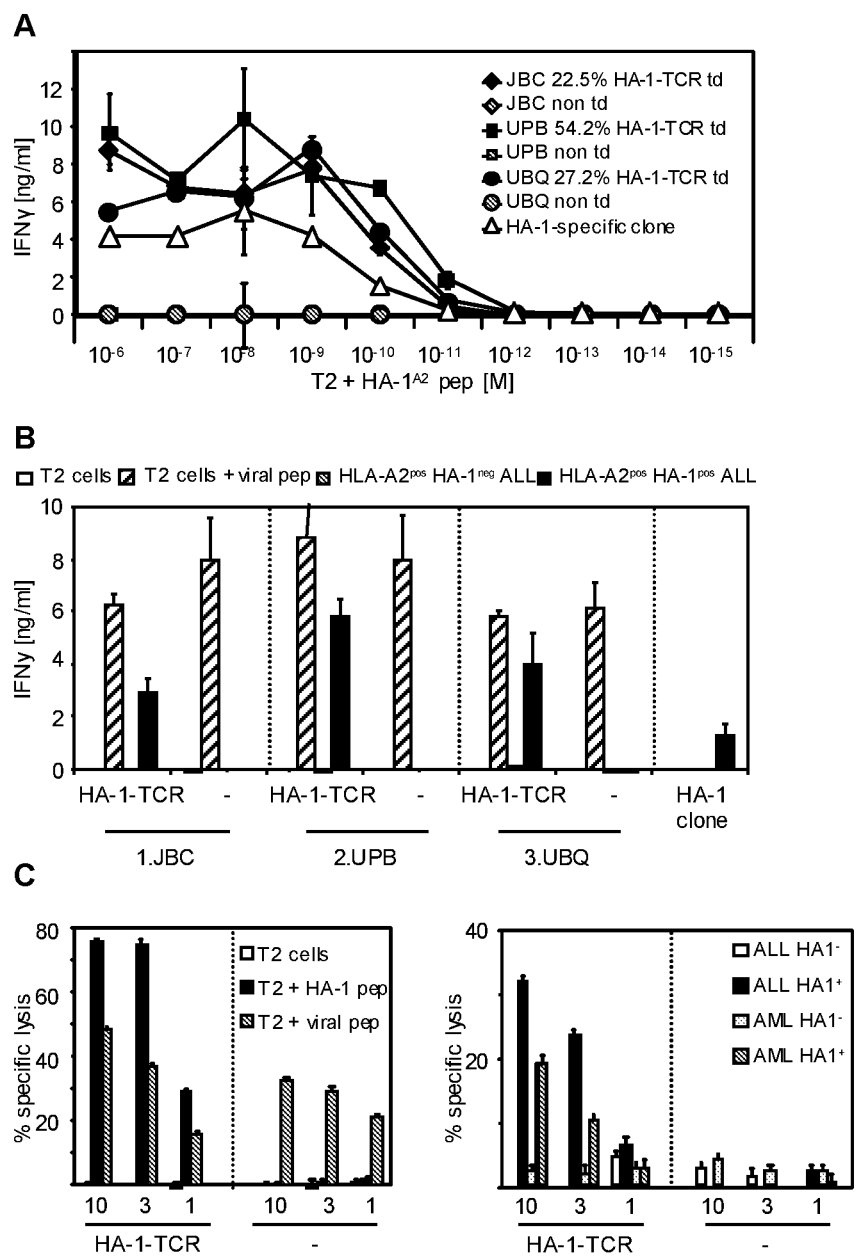

FIG. 7 shows that HA-1-TCR modified T-cells demonstrate dose-dependent HA-1 specific reactivity and recognize HA-1 positive primary leukemic cell samples. (A) Both non-transduced (grey symbols; non td) and HA-1-TCR transduced (black symbols; HA-1-TCR td) virus-specific T-cells of 3 different test procedures (JBC, UPB and UBQ) were tested for their HA-1-specific reactivity in standard IFN-γ ELISA using T2-cells pulsed with different concentrations of HA-1 peptide. 5,000 virus-tetramer$^{pos}$ or 5,000 HA-1-tetramer$^{pos}$ transduced T-cells were tested against 20,000 T2 cells. (B) In addition, the same T-cells were tested for their capacity to recognize HA-1 positive target cells presenting endogenously processed HA-1. Target cells were T2 cells unpulsed (white bars) or pulsed with relevant viral peptides (viral pep; black striped bars), or HLA-A2$^{pos}$ primary ALL cells either HA-1$^{neg}$ (grey bars) or HA-1$^{pos}$ (black bars). As a control, a HA-1-specific T-cell clone was included. (C) Both non-transduced and HA-1-TCR transduced virus-specific T-cells of all 4 different test procedures (JBC, UPB, UHO and UBQ) were tested for their HA-1-specific reactivity in a chromium release assay using different effector-to-target ratios. As a representative example, cytotoxic reactivity of HA-1-TCR transduced virus-specific T-cells of healthy individual UHO is depicted. Target cells were T2 cells unpulsed (white bars) or pulsed with either HA-1 peptide (black bars) or relevant viral peptides (viral pep; grey bars) (left panel), or HLA-A2$^{pos}$ primary ALL cells either HA-1$^{neg}$ (white bars) or HA-1$^{pos}$ (black bars), or HLA-A2$^{pos}$ primary AML cells either HA-1$^{neg}$ (light grey) or HA-1$^{pos}$ (dark grey) (right panel).

Figure 8:
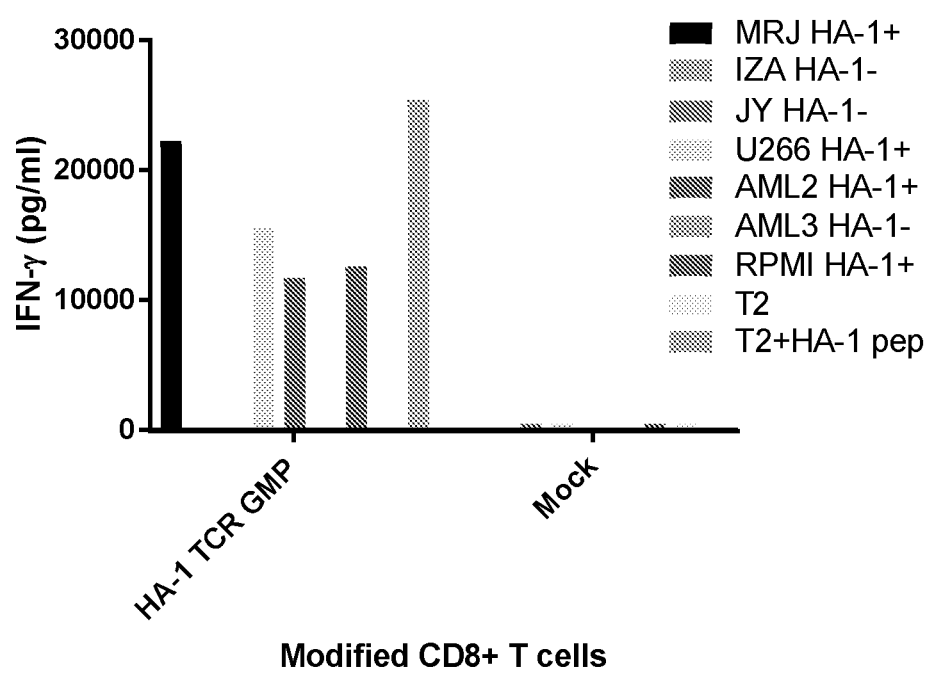

FIG. 8 demonstrates that HA-1 TCR modified polyclonal CD8+ T cells exert potent HA-1 specific reactivity against various different HA-1 positive AML and MM cell lines. Both non-transduced (mock) and HA-1-TCR modified CD8+ T cells transduced with the clinical grade retroviral vector (HA-1 TCR GMP) were tested for their HA-1-specific reactivity in standard IFN-γ ELISA against different HA-1 positive and HA-1 negative target cells (indicated in legend). LCL-MRJ, LCL-JY, and LCL-IZA are EBV transformed B cell lines. AML 2 and AML3 are acute myeloid leukemia (AML) cell lines. U266 and RPMI are multiple myeloma (MM) cell lines. T2 is a TAP deficient cell line that was loaded with the HA-1 peptide (T2+HA-1 peptide) or not loaded with peptide (T2).

Figure 9:
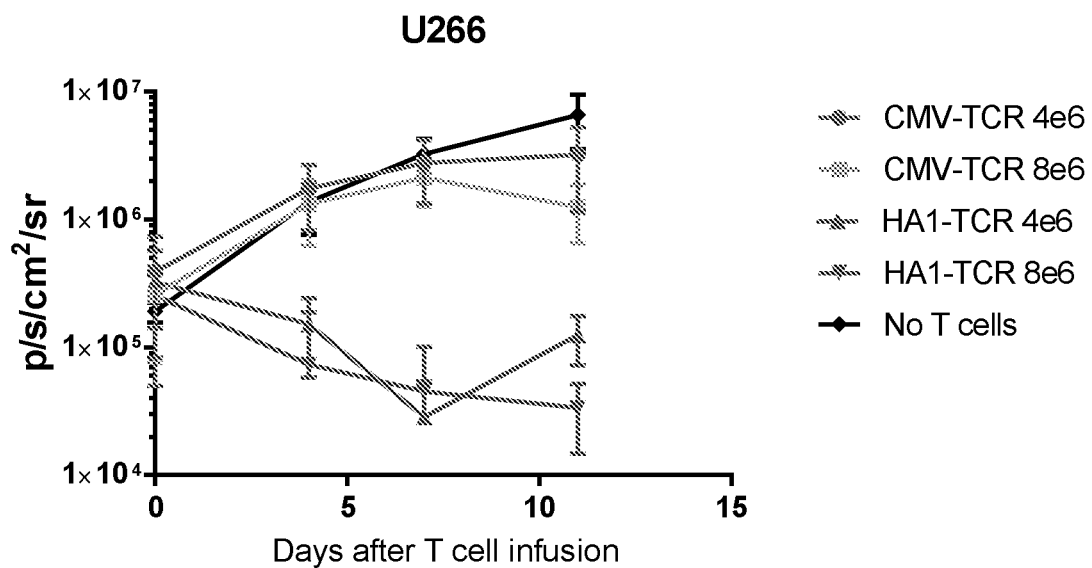

FIG. 9 demonstrates that polyclonal CD8+ T cells modified with the clinical grade HA-1 TCR clinical supernatant exert potent anti-tumour reactivity in a xenograft model of multiple myeloma. NSG mice were injected i.v. with luciferase positive multiple myeloma cell line U266 and 21 days after tumour challenge the mice were treated i.v. with either HA-1 TCR modified T cells (4×10e6 or 8×10e6 cells) or CMV TCR modified T cells (4×10e6 or 8×10e6 cells). Both TCR transduced T cell populations consisted of 30% TCR transduced T cells.

Figure 10:
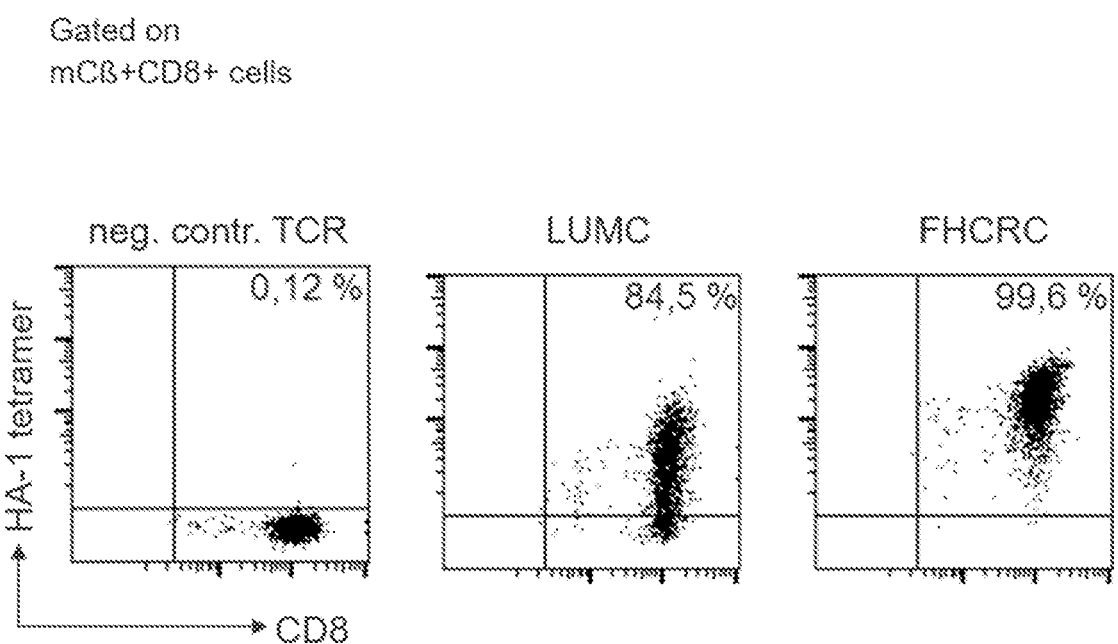

FIG. 10 shows the HA-1$^H$-MHC-multimer binding of CD8$^+$ T cells transduced with two different HA-1$^H$-reactive TCRs (a TCR comprising the M7 Vα and Vβ domains described herein (see SEQ ID NO: 17 and 18)—referred to as "LUMC" herein; and a TCR comprising the TCR2 Vα and Vβ domains described in WO2018/058002A1 (see SEQ ID NO: 91 and SEQ ID NO: 92)—referred to as "FHCRC" herein).

CD8 T cells were isolated from PBMCs of a healthy donor and transduced with the mentioned TCRs. Transduced CD8 T cells were subsequently enriched via FACS using the murine constant beta region as a marker for transduction. After expansion of these cells, they were stained with an HA-1$^H$-MHC-multimer and antibodies against CD8 and the murine constant beta region (mmCb) and analyzed by flow cytometry. Populations were gated on viable CD8$^+$/mCb$^+$ cells.

PBMCs of a healthy donor are isolated by ficoll gradient centrifugation. CD8 T-cells are enriched by negative magnetic selection (Miltenyi) and stimulated in non-tissue culture 24-well plates, precoated with anti-CD3 (5 μg/ml) and anti-CD28 (1 μg/ml) mAb (BD Pharmingen, Heidelberg, Germany). Amphotropic retroviral particles are produced by transfection of HEK293T cells with the respective TCR encoding retroviral plasmid and two expression plasmids. On day two after stimulation, CD8 T cells are transduced and on day twelve enriched for transduced CD8$^+$ cells by FACS using the murine constant beta region as a marker for transduction and then expanded by REP.

Figure 11:
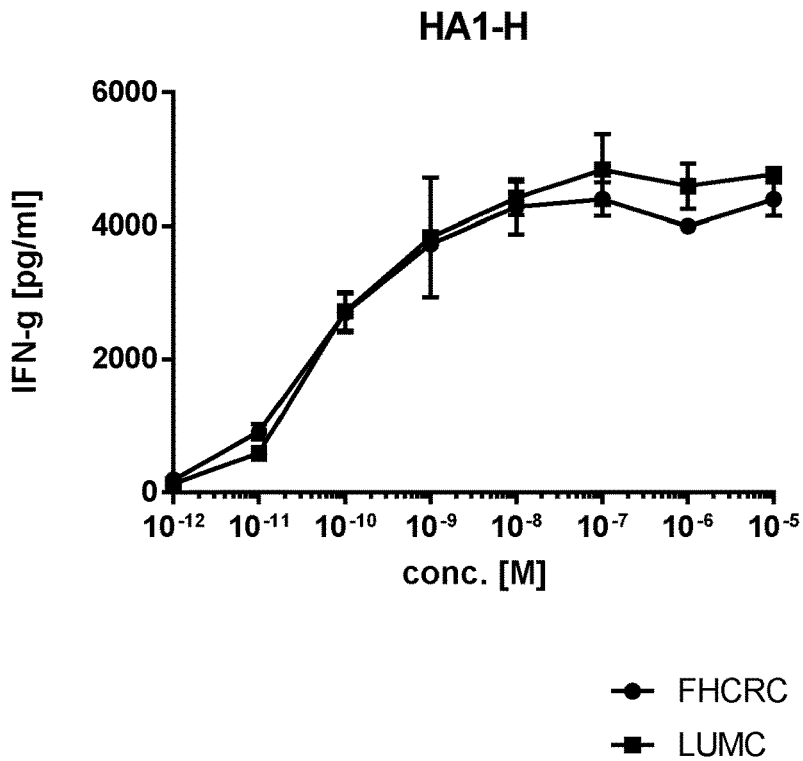
Figure 11:
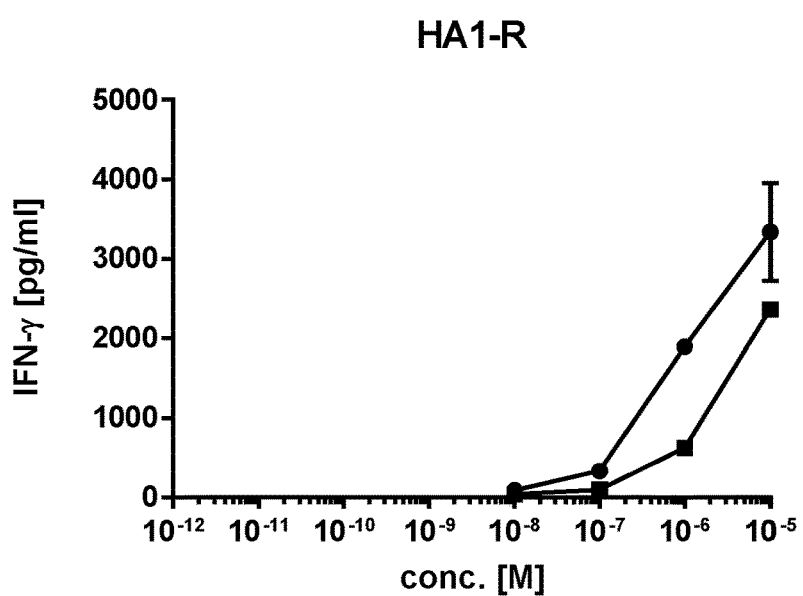

FIG. 11 (A) Functional avidity was analyzed by co-culture of HA-1H-TCR-transgenic T cells with T2 cells loaded with graded concentrations of HA-1H peptide ($10^{-12}$ M-$10^{-5}$ M). (B) Non-specific recognition of the HA-1R peptide by HA-1H TCR transduced T cells. T2 cells were loaded with graded concentrations of HA-1R peptide ($10^{-8}$ M-$10^{-5}$ M) and co-cultivated with CD8+ transduced T cells expressing FHCRC or LUMC.

Figure 12:
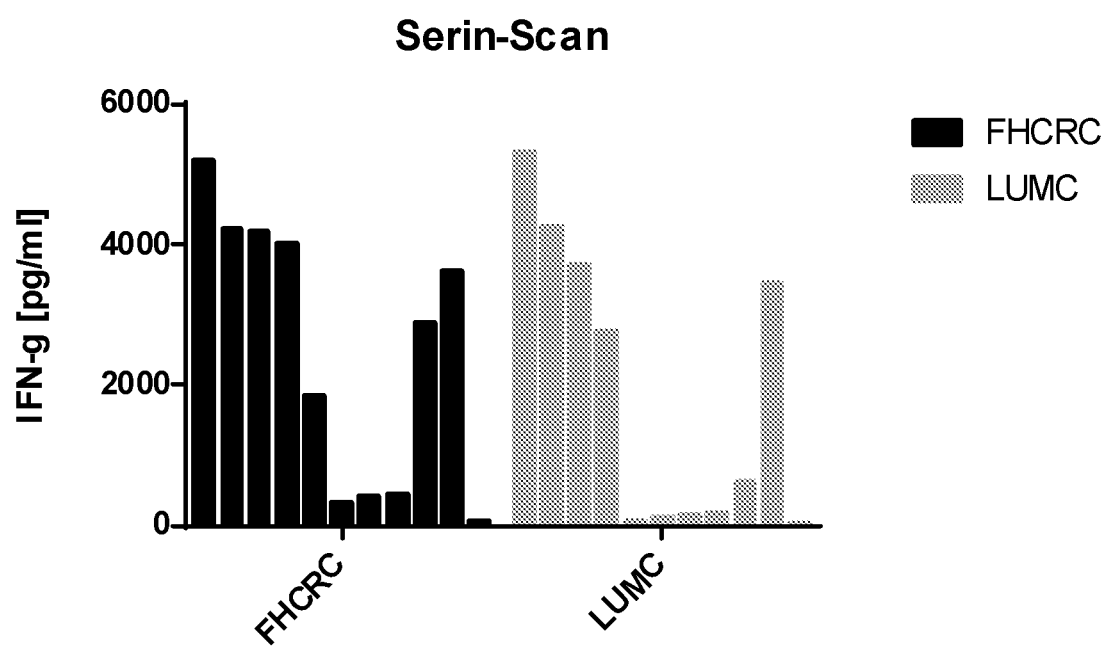

FIG. 12 shows the different recognition motifs of CD8+ T cells transduced with FHCRC or LUMC. Amino acid substitution scanning is used to define critical amino acids in the epitope sequence that abolish recognition by the TCR whenever these residues are exchanged. These "fixed" amino acids can be used to define unique TCR recognition motifs. Serine residues were used to systematically replace individual amino acids in the HA1$_{VLH}$ peptide (Serine Scan). The first bar in the graph represents the IFN-γ release in co-culture of TCR transduced T cells with T2 cells loaded with $10^{-5}$M original peptide, followed by amino acid substitutions via Serine at position 1-9.

DETAILED DESCRIPTION

The inventors have isolated and sequenced novel TCRs that are specific for an HA-1$^H$ antigen. Such TCRs are useful for treating or preventing a relapse of a haematological malignancy after allogeneic stem cell transplantation (allo-SCT) in a HLA-A*0201 positive human subject.

The inventors have investigated which components of the novel TCRs are essential for HA-1$^H$ antigen specificity and TCR functionality. Surprisingly, they have found that the CDR1 region of the TCR β chain variable domain (Vβ) is crucial for HA-1$^H$ specificity, but is not sufficient for HA-1 specificity. They have also identified that the CDR3 regions of both the TCR β chain variable domain (Vβ) and the TCR α chain variable domain (Vα) are required, and that the TCR β-chain variable (Vβ) domain needs to be encoded by a TRBV7-9 gene.

Nucleic Acid Compositions that Encode Binding Protein Components

The invention provides an isolated nucleic acid composition that encodes a binding protein comprising T cell receptor (TCR) components that specifically bind an HA-1$^H$ antigen. The encoded binding protein is therefore capable of specifically binding to a peptide containing an HA-1$^H$ antigen and does not bind to a peptide that does not contain an HA-1$^H$ antigen.

The nucleic acid composition comprises (a) a nucleic acid sequence that encodes a TCR Vα domain with the specified features described herein and (b) a nucleic acid sequence that encodes a TCR Vβ domain with the specified features described herein. The encoded TCR components form an HA-1$^H$ antigen-specific binding protein.

The nucleic acid sequences of (a) and (b) above may be distinct nucleic acid sequences within the nucleic acid composition. The TCR components of the binding protein may therefore be encoded by two (or more) nucleic acid sequences (with distinct nucleotide sequences) which, together, encode all of the TCR components of the binding protein. In other words, some of the TCR components may be encoded by one nucleic acid sequence in the nucleic acid composition, and others may be encoded by another (distinct) nucleic acid sequence within the nucleic acid composition.

Alternatively, the nucleic acid sequences of (a) and (b) may be part of a single nucleic acid sequence. The TCR components of the binding protein may therefore all be encoded by a single nucleic acid sequence (for example with a single open reading frame, or with multiple (e.g. 2 or more, three or more etc) open reading frames).

Nucleic acid sequences described herein may form part of a larger nucleic acid sequence that encodes a larger component part of a functioning binding protein. For example, a nucleic acid sequence that encodes a TCR Vα domain with the specified features described herein may be part of a larger nucleic acid sequence that encodes a functional TCR α chain (including the constant domain). As another example, a nucleic acid sequence that encodes a TCR Vβ domain with the specified features described herein may be part of a larger nucleic acid sequence that encodes a functional TCR β chain (including the constant domain). As a further example, both nucleic acid sequences (a) and (b) above may be part of a larger nucleic acid sequence that encodes a combination of a functional TCR α chain (including the constant domain) and a functional TCR β chain (including the constant domain), optionally wherein the sequence encoding the functional TCR α chain is separated from the sequence encoding the functional TCR β chain by a linker sequence that enables coordinate expression of two proteins or polypeptides in the same nucleic acid sequence. More details on this are provided below.

The nucleic acid sequences described herein may alternatively encode a small component of a T cell receptor e.g. a TCR Vα domain, or a TCR Vβ domain, only. The nucleic acid sequences may be considered as "building blocks" that provide essential components for peptide binding specificity. The nucleic acid sequences described herein may be incorporated into a distinct nucleic acid sequence (e.g. a vector) that encodes the other elements of a functional binding protein such as a TCR, such that when the nucleic acid sequence described herein is incorporated, a new nucleic acid sequence is generated that encodes e.g. a TCR α chain and/or a TCR β chain that specifically binds to an HA-1$^H$ antigen. The nucleic acid sequences described herein therefore have utility as essential components that confer binding specificity for an HA-1$^H$ antigen, and thus can be used to generate a larger nucleic acid sequence encoding a binding protein with the required antigen binding activity and specificity.

The nucleic acid sequences described herein may be codon optimised for expression in a host cell, for example they may be codon optimised for expression in a human cell, such as a cell of the immune system, a hematopoietic stem cell, a T cell, a primary T cell, a T cell line, a K cell, or a natural killer T cell (Scholten et al, Clin. Immunol. 119: 135, 2006). The T cell can be a CD4+ or a CD8+ T cell. Codon optimisation is a well known method in the art for maximizing expression of a nucleic acid sequence in a particular host cell. As described in the examples section below, one or more cysteine residues may also be introduced into the encoded TCR alpha and beta chain components (e.g. to reduce the risk of mispairing with endogenous TCR chains).

In one example, the nucleic acid sequences described herein are codon optimised for expression in a suitable host cell, and/or are modified to introduce codons encoding one or more cysteine amino acids (e.g. into the constant domain of the encoded TCR alpha chain and/or the encoded TCR beta chain) to reduce the risk of mispairing with endogenous TCR chains.

In certain examples, a TCR constant domain is modified to enhance pairing of desired TCR chains. For example, enhanced pairing between a heterologous TCR α chain and a heterologous TCR β chain due to a modification may result in the preferential assembly of a TCR comprising two heterologous chains over an undesired mispairing of a heterologous TCR chain with an endogenous TCR chain (see, e.g., Govers et al, Trends Mol. Med. 16(2):11 (2010)). Exemplary modifications to enhance pairing of heterologous TCR chains include the introduction of complementary cysteine residues in each of the heterologous TCR α chain and 13 chain. In some examples, a polynucleotide encoding a heterologous TCR α chain encodes a cysteine at amino acid position 48 (corresponding to the constant region of the full-length, mature human TCR α chain sequence) and a polynucleotide encoding a heterologous TCR chain encodes a cysteine at amino acid position 57 (corresponding to the constant region of the full-length mature human TCR β chain sequence).

A binding protein that is encoded by the nucleic acid compositions described herein is specific for an HA-1$^H$ antigen and comprises HA-1$^H$ antigen specific-TCR components. However, the encoded binding protein is not limited to being a TCR. Other appropriate binding proteins that comprise the specified HA-1$^H$ antigen specific-TCR components are also encompassed. For example, the encoded binding protein may comprise a TCR, an antigen binding fragment of a TCR, or a chimeric antigen receptor (CAR). TCRs, antigen binding fragments thereof and CARs are well defined in the art. A non-limiting example of an antigen binding fragment of a TCR is a single chain TCR (scTCR) or a chimeric dimer composed of the antigen binding fragments of the TCR α and TCR β chain linked to transmembrane and intracellular domains of a dimeric complex so that the complex is a chimeric dimer TCR (cdTCR).

In certain examples, an antigen-binding fragment of a TCR comprises a single chain TCR (scTCR), which comprises both the TCR Vα and TCR Vβ domains, but only a single TCR constant domain. In further examples, an antigen-binding fragment of a TCR or a chimeric antigen receptor is chimeric (e.g., comprises amino acid residues or motifs from more than one donor or species), humanized (e.g., comprises residues from a non-human organism that are altered or substituted so as to reduce the risk of immunogenicity in a human), or human.

"Chimeric antigen receptor" (CAR) refers to a fusion protein that is engineered to contain two or more naturally-occurring amino acid sequences linked together in a way that does not occur naturally or does not occur naturally in a host cell, which fusion protein can function as a receptor when present on a surface of a cell. CARs described herein include an extracellular portion comprising an antigen binding domain (i.e., obtained or derived from an immunoglobulin or immunoglobulin-like molecule, such as an scFv derived from an antibody or TCR specific for a cancer antigen, or an antigen binding domain derived or obtained from a killer immunoreceptor from an NK cell) linked to a transmembrane domain and one or more intracellular signalling domains (optionally containing co-stimulatory domain(s)) (see, e.g., Sadelain et al, Cancer Discov., 3(4):

388 (2013); see also Harris and Kranz, Trends Pharmacol. Sci., 37(3):220 (2016), and Stone et al, Cancer Immunol. Immunother., 63(11): 1163 (2014)).

Methods for producing engineered TCRs are described in, for example, Bowerman et al, Mol. Immunol, 5(15):3000 (2009). Methods for making CARs are well known in the art and are described, for example, in U.S. Pat. Nos. 6,410,319; 7,446,191; U.S. Patent Publication No. 2010/065818; U.S. Pat. No. 8,822,647; PCT Publication No. WO 2014/031687; U.S. Pat. No. 7,514,537; and Brentjens et al, 2007, Clin. Cancer Res. 73:5426.

The binding proteins described herein may also be expressed as part of a transgene construct that encodes additional accessory proteins, such as a safety switch protein, a tag, a selection marker, a CD8 co-receptor β-chain, a-chain or both, or any combination thereof.

A T cell receptor (TCR) is a molecule found on the surface of T cells (T lymphocytes) that is responsible for recognising a peptide that is bound to (presented by) a major histocompatibility complex (MHC) molecule on a target cell. The invention is directed to nucleic acid compositions that encode binding proteins comprising TCR components that interact with a particular peptide in the context of the appropriate serotype of MHC, i.e. an HA-1$^H$ antigen in the context of HLA-A*02:01 (in other words, the encoded binding protein is capable of specifically binding to a HA-1$^H$ antigen:HLA-A*0201 complex). HLA-A*02:01 is a globally common human leukocyte antigen serotype within the HLA-A serotype group. Peptides that are presented by HLA-A*02:01 to TCRs are described as being "HLA-A*02:01 restricted".

The HA-1$^H$ antigen that is specifically bound by the binding proteins described herein is an antigenic peptide derived from the amino acid sequence shown in SEQ ID NO:10. The antigen may be an antigenic fragment (i.e. a portion) of the sequence shown in SEQ ID NO:10, it may consist of the sequence of SEQ ID NO:10 or it may comprise (i.e. include within a longer sequence) the sequence of SEQ ID NO:10. The HA-1$^H$ antigen is capable of being presented by HLA-A*0201. The encoded binding protein may therefore be capable of specifically binding to a HA-1$^H$ antigen: HLA-A*0201 complex, wherein the HA-1$^H$ antigen is an antigenic fragment of the sequence shown in SEQ ID NO:10, or wherein the HA-1$^H$ antigen comprises or consists of the amino acid sequence shown in SEQ ID NO: 10.

The TCR is composed of two different polypeptide chains. In humans, 95% of TCRs consist of an alpha (α) chain and a beta (β) chain (encoded by TRA and TRB respectively). When the TCR engages with peptide in the context of HLA (e.g. in the context of HLA-A*02:01), the T cell is activated through signal transduction.

The alpha and beta chains of the TCR are highly variable in sequence. Each chain is composed of two extracellular domains, a variable domain (V) and a constant domain (C). The constant domain is proximal to the T cell membrane followed by a transmembrane region and a short cytoplasmic tail while the variable domain binds to the peptide/HLA-A complex.

The variable domain of each chain has three hypervariable regions (also called complementarity determining regions (CDRs)). Accordingly, the TCR alpha variable domain (referred to herein as a TCR Vα domain, TCR V alpha domain, Vα domain or V alpha domain, alpha variable domain etc) comprises a CDR1, a CDR2 and CDR3 region. Similarly, the TCR beta variable domain (referred to herein as a TCR Vβ domain, TCR V beta domain, Vβ domain or V beta domain, beta variable domain etc) also comprises a (different) CDR1, CDR2, and CDR3 region. In each of the alpha and beta variable domains it is CDR3 that is mainly responsible for recognizing the peptide being presented by HLA-A.

As will be clear to a person of skill in the art, the phrase "TCR α chain variable domain" refers to the variable (V) domain (extracellular domain) of a TCR alpha chain, and thus includes three hypervariable regions (CDR1, CDR2 and the specified CDR3), as well as the intervening sequences, but does not include the constant (C) domain of the alpha chain, which does not form part of the variable domain.

As will be clear to a person of skill in the art, the phrase "TCR β chain variable domain" refers to the variable (V) domain (extracellular domain) of a TCR beta chain, and thus includes three hypervariable regions (CDR1, CDR2 and the specified CDR3), as well as the intervening sequences, but does not include the constant (C) domain of the beta chain, which does not form part of the variable domain.

An isolated nucleic acid composition that encodes an HA-1$^H$ antigen-specific binding protein having a TCR α chain variable (Vα) domain and a TCR β chain variable (Vβ) domain is provided herein, the composition comprising:

(a) a nucleic acid sequence that encodes a TCR Vα domain comprising a CDR3 amino acid sequence having at least 85% sequence identity to any one of SEQ ID NOs: 1 to 3; and (b) a nucleic acid sequence that encodes a TCR Vβ domain having an amino acid sequence encoded by a TRBV7-9 gene, wherein the Vβ domain comprises a CDR3 amino acid sequence having at least 90% sequence identity to any one of SEQ ID NOs: 4 to 6 and a CDR1 amino acid sequence having at least 80% sequence identity to SEQ ID NO: 7.

Any of the permutations described below for (a) may be combined with the permutations described below for (b) (e.g. to form an appropriate nucleic acid composition that encodes an HA-1$^H$ antigen-specific binding protein having a TCR α chain variable (Vα) domain and a TCR β chain variable (Vβ) domain). More details on appropriate combinations are provided below.

Components of the TCR α Chain Variable (Vα) Domain

The isolated nucleic acid composition described herein encodes an HA-1$^H$ antigen-specific binding protein. The HA-1$^H$ antigen-specific binding protein comprises a TCR Vα domain comprising a CDR3 amino acid sequence having at least 80% sequence identity to any one of SEQ ID NOs: 1 to 3.

(i) Vα Domains Comprising a CDR3 Amino Acid Sequence of SEQ ID NO: 1 and Functional Variants Thereof.

An example of an appropriate TCR Vα domain CDR3 amino acid sequence that confers specific binding to an HA-1$^H$ antigen is shown in SEQ ID NO:1. As would be clear to a person of skill in the art, variants of the amino acid sequence shown in SEQ ID NO:1 may also be functional (i.e. retain their ability to confer specific binding to an HA-1$^H$ antigen (e.g. the peptide shown in SEQ ID NO:10) when the CDR3 is part of TCR Vα domain). Such functional variants are therefore encompassed herein.

For example, appropriate (functional) Vα domain CDR3 amino acid sequences may have at least 80% sequence identity to SEQ ID NO: 1, i.e. they may have at least 80%, at least 83%, at least 85%, at least 90%, at least 91%, at least 92%, at least 95%, at least 96%, at least 97%, at least 98%, at least 99%, or 100% sequence identity to SEQ ID NO: 1. Suitably, percent identity is calculated as the percentage of identity to the entire length of the reference sequence (e.g.

SEQ ID NO:1). In other words, appropriate (functional) Vα domain CDR3 amino acid sequences may vary from the sequence shown in SEQ ID NO:1 by one or several (e.g. two etc) amino acids.

As stated above, functional variants of SEQ ID NO:1 retain their ability to confer specific binding to an HA-1$^H$ antigen (e.g. the peptide shown in SEQ ID NO:10) when the CDR3 is part of TCR Vα domain.

Functional variants may be naturally occurring, synthetic, or synthetically improved functional variants of SEQ ID NO:1. The term "variant" also encompasses homologues. Functional variants will typically contain only conservative substitutions of one, two or more amino acids of SEQ ID NO:1, or substitution, deletion or insertion of non-critical amino acids in non-critical regions of the CDR3.

Non-functional variants are amino acid sequence variants of SEQ ID NO: 1 that do not specifically bind to an HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:1 or a substitution, insertion or deletion in critical amino acids or critical regions. Methods for identifying functional and non-functional variants are well known to a person of ordinary skill in the art.

In one example, the CDR3 of the Vα domain comprises or consists of the amino acid sequence of SEQ ID NO: 1. In examples where the TCR Vα domain CDR3 has the amino acid sequence of SEQ ID NO:1, the CDR3 may be encoded by the nucleic acid sequence of SEQ ID NO:11 or SEQ ID NO:12, or a genetically degenerate sequence thereof (i.e. other nucleic acid sequences that encode the same protein as a result of the degeneracy of the genetic code). It is noted that SEQ ID NO:12 is the codon optimised version of the nucleic acid sequence for CDR3 of clone M7 (the non-optimised sequence being SEQ ID NO:11).

The encoded TCR Vα domain may comprise, in addition to the specified CDR3, a CDR1 comprising an amino acid sequence of SEQ ID NO: 80, or a functional variant thereof (i.e. wherein the variant retains the ability to specifically bind to the N-terminus of the HA-1$^H$ antigen (e.g. the peptide shown in SEQ ID NO:10)). Such functional variants may be naturally occurring, synthetic, or synthetically improved functional variants of SEQ ID NO:80. The term "variant" also encompasses homologues. Functional variants will typically contain only conservative substitutions of one or more amino acids of SEQ ID NO:80, or substitution, deletion or insertion of non-critical amino acids in non-critical regions of the protein.

Non-functional variants are amino acid sequence variants of SEQ ID NO: 80 that do not specifically bind to the N-terminus of the HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:80 or a substitution, insertion or deletion in critical amino acids or critical regions. Methods for identifying functional and non-functional variants are well known to a person of ordinary skill in the art.

For example, appropriate functional Vα domain CDR1 amino acid sequences may have at least 80% sequence identity to SEQ ID NO: 80, i.e. it may have at least 80%, at least 90%, at least 91%, at least 92%, at least 93%, at least 94%, at least 95%, at least 96%, at least 97%, at least 98%, at least 99%, or 100% sequence identity to SEQ ID NO: 80. Suitably, percent identity is calculated as the percentage of identity to the entire length of the reference sequence (e.g. SEQ ID NO:80). In other words, appropriate functional Vα domain CDR1 amino acid sequences may vary from the sequence shown in SEQ ID NO: 80 by one or several amino acids. As stated previously, the variant may comprise an amino acid substitution such as a conservative amino acid substitution compared to the sequence shown in SEQ ID NO:80). As stated above, functional variants of SEQ ID NO: 80 retain the ability to specifically bind to the N-terminus of the HA-1$^H$ antigen (e.g. the peptide shown in SEQ ID NO:10) when the CDR1 is part of TCR Vα domain).

In one example, the CDR1 of the Vα domain comprises or consists of the amino acid sequence of SEQ ID NO:80. In examples where the TCR Vα domain CDR1 has the amino acid sequence of SEQ ID NO:80, the CDR1 may be encoded by the nucleic acid sequence of SEQ ID NO:81 or SEQ ID NO:82, or a genetically degenerate sequence thereof (i.e. other nucleic acid sequences that encode the same protein as a result of the degeneracy of the genetic code). It is noted that SEQ ID NO:82 is the codon optimised version of the nucleic acid sequence for CDR1 of clone M7 (the non-optimised sequence being SEQ ID NO:81).

Other appropriate CDR1 Vα domain amino acid sequences are described elsewhere herein e.g. a CDR1 sequence comprising the sequence shown in SEQ ID NO:8. It is clear to a person of skill in the art that reference to SEQ ID NO:80 above may therefore be replaced with reference to SEQ ID NO:8 (and the corresponding nucleotide sequences of SEQ ID NO: 9 and 27) when discussing permutations of Vα CDR1 amino acid and nucleotide sequences for combination with a CDR3 sequence of SEQ ID NO:1 (or corresponding nucleotide sequences of SEQ ID NO:11 or SEQ ID NO:12).

The encoded TCR Vα domain may also comprise, in addition to the specified CDR3 (and optionally the specified CDR1 above), a CDR2 comprising an amino acid sequence of SEQ ID NO:83, or a functional variant thereof (i.e. wherein the variant retains the ability to specifically bind to HLA-A*02:01). Such functional variants may be naturally occurring, synthetic, or synthetically improved functional variants of SEQ ID NO:83. The term "variant" also encompasses homologues. Functional variants will typically contain only conservative substitutions of one or more amino acids of SEQ ID NO:83, or substitution, deletion or insertion of non-critical amino acids in non-critical regions of the protein.

Non-functional variants are amino acid sequence variants of SEQ ID NO: 83 that do not specifically bind to HLA-A*02:01. Non-functional variants will typically contain a non-conservative substitution, a deletion, or insertion or premature truncation of the amino acid sequence of SEQ ID NO:83 or a substitution, insertion or deletion in critical amino acids or critical regions. Methods for identifying functional and non-functional variants are well known to a person of ordinary skill in the art.

For example, appropriate functional Vα domain CDR2 amino acid sequences may have at least 80% sequence identity to SEQ ID NO: 83, i.e. it may have at least 80%, at least 85%, at least 90%, at least 91%, at least 92%, at least 93%, at least 94%, at least 95%, at least 96%, at least 97%, at least 98%, at least 99%, or 100% sequence identity to SEQ ID NO: 83. Suitably, percent identity is calculated as the percentage of identity to the entire length of the reference sequence (e.g. SEQ ID NO:83). In other words, appropriate (functional) Vα domain CDR2 amino acid sequences may vary from the sequence shown in SEQ ID NO:83 by one or several amino acids. As stated previously, the variant may comprise an amino acid substitution such as a conservative amino acid substitution compared to the sequence shown in SEQ ID NO:83). As stated above, a functional variant of SEQ ID NO: 83 retains the ability to specifically bind to HLA-A*02:01).

In one example, the CDR2 of the Vα domain comprises or consists of the amino acid sequence of SEQ ID NO: 83. In examples where the TCR Vα domain CDR2 has the amino acid sequence of SEQ ID NO:83, the CDR2 may be encoded by the nucleic acid sequence of SEQ ID NO:84 or SEQ ID NO:85, or a genetically degenerate sequence thereof (i.e. other nucleic acid sequences that encode the same protein as a result of the degeneracy of the genetic code). It is noted that SEQ ID NO:85 is the codon optimised version of the nucleic acid sequence for CDR2 of clone M7 (the non-optimised sequence being SEQ ID NO:84).

Other appropriate CDR2 Vα domain amino acid sequences are described elsewhere herein e.g. a CDR2 sequence comprising the sequence shown in SEQ ID NO:28. It is clear to a person of skill in the art that reference to SEQ ID NO:83 above may therefore be replaced with reference to SEQ ID NO:28 (and the corresponding nucleotide sequences of SEQ ID NO: 39 and 40) when discussing permutations of Vα CDR2 amino acid and nucleotide sequences for combination with a CDR3 sequence of SEQ ID NO:1 (or corresponding nucleotide sequences of SEQ ID NO:11 or SEQ ID NO:12).

The encoded TCR Vα domain may therefore comprise the CDRs mentioned in detail above (by SEQ ID specifically i.e. SEQ ID NO:1, SEQ ID NO: 80 (or SEQ ID NO:8) and SEQ ID NO: 83 (or SEQ ID NO:28), or functional variants thereof), with appropriate intervening sequences between the CDRs.

The encoded TCR Vα domain may comprise an amino acid sequence of SEQ ID NO:17, or a functional variant thereof (i.e. wherein the variant TCR Vα domain retains the ability to specifically bind to an HA-1$^H$ antigen (e.g. the peptide shown in SEQ ID NO:10) when part of a binding protein described herein). Such functional variants may be naturally occurring, synthetic, or synthetically improved functional variants of SEQ ID NO:17. The term "variant" also encompasses homologues. Functional variants will typically contain only conservative substitutions of one or more amino acids of SEQ ID NO:17, or substitution, deletion or insertion of non-critical amino acids in non-critical regions of the protein.

Non-functional variants are amino acid sequence variants of SEQ ID NO: 17 that do not specifically bind to an HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:17 or a substitution, insertion or deletion in critical amino acids or critical regions. Methods for identifying functional and non-functional variants are well known to a person of ordinary skill in the art.

In one example, the encoded TCR Vα domain may have an amino acid sequence having at least 75%, at least 80%, at least 85% or at least 90% (or at least 91%, at least 92%, at least 93%, at least 94%, at least 95%, at least 96%, at least 97%, at least 98%, at least 99%, or 100%) sequence identity to the amino acid sequence of SEQ ID NO: 17, whilst retaining the ability to specifically bind to an HA-1$^H$ antigen (e.g. the peptide shown in SEQ ID NO:10). In other words, a functional TCR Vα domain with one or several amino acid substitutions compared to the sequence of SEQ ID NO:17 is also encompassed. As stated previously, the amino acid substitution may be a conservative amino acid substitution.

The variability in sequence compared to SEQ ID NO:17 may all be in regions of the TCR Vα domain that do not form CDRs (i.e. the variant may have the CDRs of SEQ ID NO: 1, SEQ ID NO: 80 and/or SEQ ID NO: 83, and still have 25% (or less) sequence variability compared to SEQ ID NO:17). In other words, the sequence of the CDRs of SEQ ID NO: 17 may be retained whilst the rest of the sequence is varied, as appropriate within the "at least 75% identity" parameters specified above. Suitably, percent identity can be calculated as the percentage of identity to the entire length of the reference sequence (e.g. SEQ ID NO: 17).

As an example, the encoded TCR Vα domain may comprise an amino acid sequence having at least 75% (e.g. at least 75%, at least 80%, at least 85%, at least 90%, at least 95% etc) sequence identity to the amino acid sequence of SEQ ID NO: 17, wherein the TCR Vα domain comprises a CDR3 having an amino acid sequence of SEQ ID NO: 1. In this example, the TCR Vα domain CDR1 may have an amino acid sequence of SEQ ID NO: 80 and the TCR Vα domain CDR2 may have an amino acid sequence of SEQ ID NO: 83.

As another example, the encoded TCR Vα domain may comprise an amino acid sequence having at the amino acid sequence of SEQ ID NO: 17, with 0 to 10 (or 0 to 5) amino acid substitutions, insertions or deletions), wherein the TCR Vα domain comprises a CDR3 having an amino acid sequence of SEQ ID NO: 1. In this example, the TCR Vα domain CDR1 may have an amino acid sequence of SEQ ID NO: 80 and the TCR Vα domain CDR2 may have an amino acid sequence of SEQ ID NO: 83.

In examples where the TCR Vα domain has the amino acid sequence of SEQ ID NO:17, the TCR Vα domain may be encoded by the nucleic acid sequence of SEQ ID NO:19 or SEQ ID NO:20, or a genetically degenerate sequence thereof (i.e. other nucleic acid sequences that encode the same protein as a result of the degeneracy of the genetic code). It is noted that SEQ ID NO:20 is the codon optimised version of the nucleic acid sequence for TCR Vα domain of clone M7 (the non-optimised sequence being SEQ ID NO:19).

For the avoidance of doubt, the nucleic acid sequence encoding the TCR Vα domain may also encode a TCR α chain constant domain. An example of a suitable constant domain is encoded in the MP71-TCR-flex retroviral vector. However, the invention is not limited to this specific constant domain, and encompasses any appropriate TCR α chain constant domain. The constant domain may be murine derived, human derived or humanised. Methods for identifying or generating appropriate constant domains are well known to a person of skill in the art and are well within their routine capabilities.

By way of example only, the constant domain may be encoded by or derived from a vector, such as a lentiviral, retroviral or plasmid vector but also adenovirus, adeno-associated virus, vaccinia virus, canary poxvirus or herpes virus vectors in which murine or human constant domains are pre-cloned. Recently, minicircles have also been described for TCR gene transfer (non-viral Sleeping Beauty transposition from minicircle vectors as published by R Monjezi, C Miskey, T Gogishvili, M Schleef, M Schmeer, H Einsele, Z Ivics and M Hudecek in Leukemia 2016). Moreover, naked (synthetic) DNA/RNA can also be used to introduce the TCR. As an example, a pMSGV retroviral vector with pre-cloned TCR-Ca and Cb genes as described in LV Coren et al., BioTechniques 2015 may be used to provide an appropriate constant domain. Alternatively, single stranded or double stranded DNA or RNA can be inserted by homologous directed repair into the TCR locus (see Roth et al 2018 Nature vol 559; page 405). As a further option, non-homologous end joining is possible.

Examples of specific TCR α chain amino acid sequences that include a TCR Vα domain described herein with an appropriate constant domain are shown in SEQ ID NO: 47 and SEQ ID NO: 48. It is noted that the constant domain shown in SEQ ID NO:48 is murine. Appropriate functional variants of SEQ ID NO:47 and SEQ ID NO:48 are also encompassed (e.g. variants having at least 75% (e.g. at least 75%, at least 80%, at least 85%, at least 90%, at least 95% etc) sequence identity to the amino acid sequence of SEQ ID NO: 47 or SEQ ID NO:48, wherein the variant TCR α chain amino acid sequence retains its ability to specifically bind to an HA-1$^H$ antigen (e.g. the peptide shown in SEQ ID NO:10) when part of a binding protein described herein). In other words, a functional TCR α chain with one or several amino acid substitutions compared to the sequence of SEQ ID NO:47 or SEQ ID NO:48 is also encompassed. As stated previously, the amino acid substitution may be a conservative amino acid substitution. The variability in sequence compared to SEQ ID NO:47 or SEQ ID NO:48 may all be in regions of the TCR α chain that do not form CDRs (i.e. the variant may have the CDRs of SEQ ID NO: 1, SEQ ID NO: 80 and/or SEQ ID NO: 83, and still have 25% (or less) sequence variability compared to SEQ ID NO:47 or SEQ ID NO:48). In other words, the sequence of the CDRs of SEQ ID NO: 47 or SEQ ID NO:48 may be retained whilst the rest of the sequence is varied, as appropriate within the "at least 75% identity" parameters specified above. Suitably, percent identity can be calculated as the percentage of identity to the entire length of the reference sequence (e.g. SEQ ID NO: 47 or SEQ ID NO:48 as appropriate).

As an example, the encoded TCR α chain may comprise an amino acid sequence having at least 75% (e.g. at least 75%, at least 80%, at least 85%, at least 90%, at least 95% etc) sequence identity to the amino acid sequence of SEQ ID NO: 47 or SEQ ID NO: 48, wherein the TCR α chain comprises a CDR3 having an amino acid sequence of SEQ ID NO: 1. In this example, the TCR α chain CDR1 may have an amino acid sequence of SEQ ID NO:80 and the TCR α chain CDR2 may have an amino acid sequence of SEQ ID NO: 83.

In examples where the TCR α chain has the amino acid sequence of SEQ ID NO:47, the TCR α chain may be encoded by the nucleic acid sequence of SEQ ID NO:49 or SEQ ID NO:50, or a genetically degenerate sequence thereof (i.e. other nucleic acid sequences that encode the same protein as a result of the degeneracy of the genetic code). It is noted that SEQ ID NO:50 is the codon optimised version of the nucleic acid sequence for TCR Vα domain of clone M7 (the non-optimised sequence being SEQ ID NO:49).

In examples where the TCR α chain has the amino acid sequence of SEQ ID NO:48, the TCR α chain may be encoded by the nucleic acid sequence of SEQ ID NO:51, or a genetically degenerate sequence thereof (i.e. other nucleic acid sequences that encode the same protein as a result of the degeneracy of the genetic code).

(ii) Vα Domains Comprising a CDR3 Amino Acid Sequence of SEQ ID NO: 2 and Functional Variants Thereof.

An example of an appropriate TCR Vα domain CDR3 amino acid sequence that confers specific binding to an HA-1$^H$ antigen is shown in SEQ ID NO:2. As would be clear to a person of skill in the art, variants of the amino acid sequence shown in SEQ ID NO:2 may also be functional (i.e. retain their ability to confer specific binding to an HA-1$^H$ antigen (e.g. the peptide shown in SEQ ID NO:10) when the CDR3 is part of TCR Vα domain). Such functional variants are therefore encompassed herein.

For example, appropriate (functional) Vα domain CDR3 amino acid sequences may have at least 80% sequence identity to SEQ ID NO: 2, i.e. they may have at least 80%, at least 83%, at least 85%, at least 90%, at least 91%, at least 92%, at least 93%, at least 95%, at least 96%, at least 97%, at least 98%, at least 99%, or 100% sequence identity to SEQ ID NO: 2. Suitably, percent identity is calculated as the percentage of identity to the entire length of the reference sequence (e.g. SEQ ID NO:2). In other words, appropriate (functional) Vα domain CDR3 amino acid sequences may vary from the sequence shown in SEQ ID NO:2 by one or sevral (e.g. two) amino acids. As stated above, functional variants of SEQ ID NO:2 retain their ability to confer specific binding to an HA-1$^H$ antigen (e.g. the peptide shown in SEQ ID NO:10) when the CDR3 is part of TCR Vα domain.

Functional variants may be naturally occurring, synthetic, or synthetically improved functional variants of SEQ ID NO:2. The term "variant" also encompasses homologues. Functional variants will typically contain only conservative substitutions of one, two or more amino acids of SEQ ID NO:2, or substitution, deletion or insertion of non-critical amino acids in non-critical regions of the CDR3.

Non-functional variants are amino acid sequence variants of SEQ ID NO: 2 that do not specifically bind to an HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:2 or a substitution, insertion or deletion in critical amino acids or critical regions. Methods for identifying functional and non-functional variants are well known to a person of ordinary skill in the art.

In one example, the CDR3 of the Vα domain comprises or consists of the amino acid sequence of SEQ ID NO: 2. In examples where the TCR Vα domain CDR3 has the amino acid sequence of SEQ ID NO:2, the CDR3 may be encoded by the nucleic acid sequence of SEQ ID NO:23 or SEQ ID NO:24, or a genetically degenerate sequence thereof (i.e. other nucleic acid sequences that encode the same protein as a result of the degeneracy of the genetic code). It is noted that SEQ ID NO:24 is the codon optimised version of the nucleic acid sequence for CDR3 of clone M2 (the non-optimised sequence being SEQ ID NO:23).

The encoded TCR Vα domain may comprise, in addition to the specified CDR3, a CDR1 comprising an amino acid sequence of SEQ ID NO: 8, or a functional variant thereof (i.e. wherein the variant retains the ability to specifically bind to the N-terminus of the HA-1$^H$ antigen (e.g. the peptide shown in SEQ ID NO:10)). Such functional variants may be naturally occurring, synthetic, or synthetically improved functional variants of SEQ ID NO:8. The term "variant" also encompasses homologues. Functional variants will typically contain only conservative substitutions of one or more amino acids of SEQ ID NO:8, or substitution, deletion or insertion of non-critical amino acids in non-critical regions of the protein.

Non-functional variants are amino acid sequence variants of SEQ ID NO: 8 that do not specifically bind to the N-terminus of the HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:8 or a substitution, insertion or deletion in critical amino acids or critical regions. Methods for identifying functional and non-functional variants are well known to a person of ordinary skill in the art.

For example, appropriate functional Vα domain CDR1 amino acid sequences may have at least 80% sequence identity to SEQ ID NO: 8, i.e. it may have at least 80%, at least 83%, at least 85%, at least 90%, at least 91%, at least 92%, at least 93%, at least 94%, at least 95%, at least 96%, at least 97%, at least 98%, at least 99%, or 100% sequence identity to SEQ ID NO: 8. Suitably, percent identity is calculated as the percentage of identity to the entire length of the reference sequence (e.g. SEQ ID NO:8). In other words, appropriate functional Vα domain CDR1 amino acid sequences may vary from the sequence shown in SEQ ID NO: 8 by one or several amino acids. As stated previously, the variant may comprise an amino acid substitution such as a conservative amino acid substitution compared to the sequence shown in SEQ ID NO:8). As stated above, functional variants of SEQ ID NO: 8 retain the ability to specifically bind to the N-terminus of the HA-1$^H$ antigen (e.g. the peptide shown in SEQ ID NO:10) when the CDR1 is part of TCR Vα domain).

In one example, the CDR1 of the Vα domain comprises or consists of the amino acid sequence of SEQ ID NO:8. In examples where the TCR Vα domain CDR1 has the amino acid sequence of SEQ ID NO:8, the CDR1 may be encoded by the nucleic acid sequence of SEQ ID NO:9 or SEQ ID NO:27, or a genetically degenerate sequence thereof (i.e. other nucleic acid sequences that encode the same protein as a result of the degeneracy of the genetic code). It is noted that SEQ ID NO:27 is the codon optimised version of the nucleic acid sequence for CDR1 of clone M2 (the non-optimised sequence being SEQ ID NO:9).

Other appropriate CDR1 Vα domain amino acid sequences are described elsewhere herein e.g. a CDR1 sequence comprising the sequence shown in SEQ ID NO:80. It is clear to a person of skill in the art that reference to SEQ ID NO:8 above may therefore be replaced with reference to SEQ ID NO:80 (and the corresponding nucleotide sequences of SEQ ID NO: 81 and 82) when discussing permutations of Vα CDR1 amino acid and nucleotide sequences for combination with a CDR3 sequence of SEQ ID NO:2 (or corresponding nucleotide sequences of SEQ ID NO:23 or SEQ ID NO:24).

The encoded TCR Vα domain may also comprise, in addition to the specified CDR3 (and optionally the specified CDR1 above), a CDR2 comprising an amino acid sequence of SEQ ID NO:28, or a functional variant thereof (i.e. wherein the variant retains the ability to specifically bind to HLA-A*02:01). Such functional variants may be naturally occurring, synthetic, or synthetically improved functional variants of SEQ ID NO:28. The term "variant" also encompasses homologues. Functional variants will typically contain only conservative substitutions of one or more amino acids of SEQ ID NO:28, or substitution, deletion or insertion of non-critical amino acids in non-critical regions of the protein.

Non-functional variants are amino acid sequence variants of SEQ ID NO: 28 that do not specifically bind to HLA-A*02:01. Non-functional variants will typically contain a non-conservative substitution, a deletion, or insertion or premature truncation of the amino acid sequence of SEQ ID NO:28 or a substitution, insertion or deletion in critical amino acids or critical regions. Methods for identifying functional and non-functional variants are well known to a person of ordinary skill in the art.

For example, appropriate functional Vα domain CDR2 amino acid sequences may have at least 80% sequence identity to SEQ ID NO: 28, i.e. it may have at least 80%, at least 85%, at least 90%, at least 91%, at least 92%, at least 93%, at least 94%, at least 95%, at least 96%, at least 97%, at least 98%, at least 99%, or 100% sequence identity to SEQ ID NO: 28. Suitably, percent identity is calculated as the percentage of identity to the entire length of the reference sequence (e.g. SEQ ID NO:28). In other words, appropriate (functional) Vα domain CDR2 amino acid sequences may vary from the sequence shown in SEQ ID NO:28 by one or several amino acids. As stated previously, the variant may comprise an amino acid substitution such as a conservative amino acid substitution compared to the sequence shown in SEQ ID NO:28). As stated above, a functional variant of SEQ ID NO: 28 retains the ability to specifically bind to HLA-A*02:01).

In one example, the CDR2 of the Vα domain comprises or consists of the amino acid sequence of SEQ ID NO: 28. In examples where the TCR Vα domain CDR2 has the amino acid sequence of SEQ ID NO:28, the CDR2 may be encoded by the nucleic acid sequence of SEQ ID NO:39 or SEQ ID NO:40, or a genetically degenerate sequence thereof (i.e. other nucleic acid sequences that encode the same protein as a result of the degeneracy of the genetic code). It is noted that SEQ ID NO:40 is the codon optimised version of the nucleic acid sequence for CDR2 of clone M2 (the non-optimised sequence being SEQ ID NO:39).

Other appropriate CDR2 Vα domain amino acid sequences are described elsewhere herein e.g. a CDR2 sequence comprising the sequence shown in SEQ ID NO:83. It is clear to a person of skill in the art that reference to SEQ ID NO:28 above may therefore be replaced with reference to SEQ ID NO:83 (and the corresponding nucleotide sequences of SEQ ID NO: 84 and 85) when discussing permutations of Vα CDR2 amino acid and nucleotide sequences for combination with a CDR3 sequence of SEQ ID NO:2 (or corresponding nucleotide sequences of SEQ ID NO:23 or SEQ ID NO:24).

The encoded TCR Vα domain may therefore comprise the CDRs mentioned in detail above (by SEQ ID specifically i.e. SEQ ID NO:2, SEQ ID NO: 8 (or SEQ ID NO:80) and SEQ ID NO: 28 (or SEQ ID NO:83), or functional variants thereof), with appropriate intervening sequences between the CDRs.

The encoded TCR Vα domain may comprise an amino acid sequence of SEQ ID NO:29, or a functional variant thereof (i.e. wherein the variant TCR Vα domain retains the ability to specifically bind to an HA-1$^H$ antigen (e.g. the peptide shown in SEQ ID NO:10) when part of a binding protein described herein). Such functional variants may be naturally occurring, synthetic, or synthetically improved functional variants of SEQ ID NO:29. The term "variant" also encompasses homologues. Functional variants will typically contain only conservative substitutions of one or more amino acids of SEQ ID NO:29, or substitution, deletion or insertion of non-critical amino acids in non-critical regions of the protein.

Non-functional variants are amino acid sequence variants of SEQ ID NO: 29 that do not specifically bind to an HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:29 or a substitution, insertion or deletion in critical amino acids or critical regions. Methods for identifying functional and non-functional variants are well known to a person of ordinary skill in the art.

In one example, the encoded TCR Vα domain may have an amino acid sequence having at least 75%, at least 80%, at least 85% or at least 90% (or at least 91%, at least 92%, at least 93%, at least 94%, at least 95%, at least 96%, at least 97%, at least 98%, at least 99%, or 100%) sequence identity to the amino acid sequence of SEQ ID NO: 29, whilst retaining the ability to specifically bind to an HA-1$^H$ antigen (e.g. the peptide shown in SEQ ID NO:10). In other words, a functional TCR Vα domain with one or several amino acid substitutions compared to the sequence of SEQ ID NO:29 is also encompassed. As stated previously, the amino acid substitution may be a conservative amino acid substitution. The variability in sequence compared to SEQ ID NO:29 may all be in regions of the TCR Vα domain that do not form CDRs (i.e. the variant may have the CDRs of SEQ ID NO: 2, SEQ ID NO: 8 and/or SEQ ID NO: 28, and still have 25% (or less) sequence variability compared to SEQ ID NO:29). In other words, the sequence of the CDRs of SEQ ID NO: 29 may be retained whilst the rest of the sequence is varied, as appropriate within the "at least 75% identity" parameters specified above. Suitably, percent identity can be calculated as the percentage of identity to the entire length of the reference sequence (e.g. SEQ ID NO: 29).

As an example, the encoded TCR Vα domain may comprise an amino acid sequence having at least 75% (e.g. at least 75%, at least 80%, at least 85%, at least 90%, at least 95% etc) sequence identity to the amino acid sequence of SEQ ID NO: 29, wherein the TCR Vα domain comprises a CDR3 having an amino acid sequence of SEQ ID NO: 2. In this example, the TCR Vα domain CDR1 may have an amino acid sequence of SEQ ID NO: 8 and the TCR Vα domain CDR2 may have an amino acid sequence of SEQ ID NO: 28.

As another example, the encoded TCR Vα domain may comprise an amino acid sequence having at the amino acid sequence of SEQ ID NO: 29, with 0 to 10 (or 0 to 5) amino acid substitutions, insertions or deletions), wherein the TCR Vα domain comprises a CDR3 having an amino acid sequence of SEQ ID NO: 2. In this example, the TCR Vα domain CDR1 may have an amino acid sequence of SEQ ID NO: 8 and the TCR Vα domain CDR2 may have an amino acid sequence of SEQ ID NO: 28.

In examples where the TCR Vα domain has the amino acid sequence of SEQ ID NO:29, the TCR Vα domain may be encoded by the nucleic acid sequence of SEQ ID NO:31 or SEQ ID NO:32, or a genetically degenerate sequence thereof (i.e. other nucleic acid sequences that encode the same protein as a result of the degeneracy of the genetic code). It is noted that SEQ ID NO:32 is the codon optimised version of the nucleic acid sequence for TCR Vα domain of clone M2 (the non-optimised sequence being SEQ ID NO:31).

For the avoidance of doubt, the nucleic acid sequence encoding the TCR Vα domain may also encode a TCR α chain constant domain. An example of a suitable constant domain is encoded in the MP71-TCR-flex retroviral vector. However, the invention is not limited to this specific constant domain, and encompasses any appropriate TCR α chain constant domain. The constant domain may be murine derived, human derived or humanised. Methods for identifying or generating appropriate constant domains are well known to a person of skill in the art and are well within their routine capabilities.

By way of example only, the constant domain may be encoded by or derived from a vector, such as a lentiviral, retroviral or plasmid vector but also adenovirus, adeno-associated virus, vaccinia virus, canary poxvirus or herpes virus vectors in which murine or human constant domains are pre-cloned. Recently, minicircles have also been described for TCR gene transfer (non-viral Sleeping Beauty transposition from minicircle vectors as published by R Monjezi, C Miskey, T Gogishvili, M Schleef, M Schmeer, H Einsele, Z Ivics and M Hudecek in Leukemia 2016). Moreover, naked (synthetic) DNA/RNA can also be used to introduce the TCR. As an example, a pMSGV retroviral vector with pre-cloned TCR-Ca and Cb genes as described in LV Coren et al., BioTechniques 2015 may be used to provide an appropriate constant domain. Alternatively, single stranded or double stranded DNA or RNA can be inserted by homologous directed repair into the TCR locus (see Roth et al 2018 Nature vol 559; page 405). As a further option, non-homologous end joining is possible.

Examples of specific TCR α chain amino acid sequences that include a TCR Vα domain described herein with an appropriate constant domain are shown in SEQ ID NO: 57 and SEQ ID NO: 58. It is noted that the constant domain shown in SEQ ID NO:58 is murine. Appropriate functional variants of SEQ ID NO:57 and SEQ ID NO:58 are also encompassed (e.g. variants having at least 75% (e.g. at least 75%, at least 80%, at least 85%, at least 90%, at least 95% etc) sequence identity to the amino acid sequence of SEQ ID NO: 57 or SEQ ID NO:58, wherein the variant TCR α chain amino acid sequence retains its ability to specifically bind to an HA-1$^H$ antigen (e.g. the peptide shown in SEQ ID NO:10) when part of a binding protein described herein). In other words, a functional TCR α chain with one or several amino acid substitutions compared to the sequence of SEQ ID NO:57 or SEQ ID NO:58 is also encompassed. As stated previously, the amino acid substitution may be a conservative amino acid substitution. The variability in sequence compared to SEQ ID NO:57 or SEQ ID NO:58 may all be in regions of the TCR α chain that do not form CDRs (i.e. the variant may have the CDRs of SEQ ID NO: 2, SEQ ID NO: 8 and/or SEQ ID NO: 28, and still have 25% (or less) sequence variability compared to SEQ ID NO:57 or SEQ ID NO:58). In other words, the sequence of the CDRs of SEQ ID NO: 57 or SEQ ID NO:58 may be retained whilst the rest of the sequence is varied, as appropriate within the "at least 75% identity" parameters specified above. Suitably, percent identity can be calculated as the percentage of identity to the entire length of the reference sequence (e.g. SEQ ID NO: 57 or SEQ ID NO:58 as appropriate).

As an example, the encoded TCR α chain may comprise an amino acid sequence having at least 75% (e.g. at least 75%, at least 80%, at least 85%, at least 90%, at least 95% etc) sequence identity to the amino acid sequence of SEQ ID NO: 57 or SEQ ID NO: 58, wherein the TCR α chain comprises a CDR3 having an amino acid sequence of SEQ ID NO: 2. In this example, the TCR α chain CDR1 may have an amino acid sequence of SEQ ID NO:8 and the TCR α chain CDR2 may have an amino acid sequence of SEQ ID NO: 28.

In examples where the TCR α chain has the amino acid sequence of SEQ ID NO:57, the TCR α chain may be encoded by the nucleic acid sequence of SEQ ID NO:59 or SEQ ID NO:60, or a genetically degenerate sequence thereof (i.e. other nucleic acid sequences that encode the same protein as a result of the degeneracy of the genetic code). It is noted that SEQ ID NO:60 is the codon optimised version of the nucleic acid sequence for TCR Vα domain of clone M2 (the non-optimised sequence being SEQ ID NO:59).

In examples where the TCR α chain has the amino acid sequence of SEQ ID NO:58, the TCR α chain may be encoded by the nucleic acid sequence of SEQ ID NO:61, or a genetically degenerate sequence thereof (i.e. other nucleic acid sequences that encode the same protein as a result of the degeneracy of the genetic code).

(iii) Vα Domains Comprising a CDR3 Amino Acid Sequence of SEQ ID NO: 3 and Functional Variants Thereof.

An example of an appropriate TCR Vα domain CDR3 amino acid sequence that confers specific binding to an HA-1$^H$ antigen is shown in SEQ ID NO:3. As would be clear to a person of skill in the art, variants of the amino acid sequence shown in SEQ ID NO:3 may also be functional (i.e. retain their ability to confer specific binding to an HA-1$^H$ antigen (e.g. the peptide shown in SEQ ID NO:10) when the CDR3 is part of TCR Vα domain). Such functional variants are therefore encompassed herein.

For example, appropriate (functional) Vα domain CDR3 amino acid sequences may have at least 80% sequence identity to SEQ ID NO: 3, i.e. they may have at least 80%, at least 83%, at least 85%, at least 90%, at least 91%, at least 92%, at least 93%, at least 95%, at least 96%, at least 97%, at least 98%, at least 99%, or 100% sequence identity to SEQ ID NO: 3. Suitably, percent identity is calculated as the percentage of identity to the entire length of the reference sequence (e.g. SEQ ID NO:3). In other words, appropriate (functional) Vα domain CDR3 amino acid sequences may vary from the sequence shown in SEQ ID NO:3 by one or several (e.g. two) amino acids. As stated above, functional variants of SEQ ID NO:3 retain their ability to confer specific binding to an HA-1$^H$ antigen (e.g. the peptide shown in SEQ ID NO:10) when the CDR3 is part of TCR Vα domain.

Functional variants may be naturally occurring, synthetic, or synthetically improved functional variants of SEQ ID NO:3. The term "variant" also encompasses homologues. Functional variants will typically contain only conservative substitutions of one, two or more amino acids of SEQ ID NO:3, or substitution, deletion or insertion of non-critical amino acids in non-critical regions of the CDR3.

Non-functional variants are amino acid sequence variants of SEQ ID NO: 3 that do not specifically bind to an HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:3 or a substitution, insertion or deletion in critical amino acids or critical regions. Methods for identifying functional and non-functional variants are well known to a person of ordinary skill in the art.

In one example, the CDR3 of the Vα domain comprises or consists of the amino acid sequence of SEQ ID NO: 3. In examples where the TCR Vα domain CDR3 has the amino acid sequence of SEQ ID NO:3, the CDR3 may be encoded by the nucleic acid sequence of SEQ ID NO:35 or SEQ ID NO:36, or a genetically degenerate sequence thereof (i.e. other nucleic acid sequences that encode the same protein as a result of the degeneracy of the genetic code). It is noted that SEQ ID NO:36 is the codon optimised version of the nucleic acid sequence for CDR3 of clone FK47.83 (the non-optimised sequence being SEQ ID NO:35).

The encoded TCR Vα domain may comprise, in addition to the specified CDR3, a CDR1 comprising an amino acid sequence of SEQ ID NO: 8, or a functional variant thereof (i.e. wherein the variant retains the ability to specifically bind to the N-terminus of the HA-1$^H$ antigen (e.g. the peptide shown in SEQ ID NO:10)). Such functional variants may be naturally occurring, synthetic, or synthetically improved functional variants of SEQ ID NO:8. The term "variant" also encompasses homologues. Functional variants will typically contain only conservative substitutions of one or more amino acids of SEQ ID NO:8, or substitution, deletion or insertion of non-critical amino acids in non-critical regions of the protein.

Non-functional variants are amino acid sequence variants of SEQ ID NO: 8 that do not specifically bind to the N-terminus of the HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:8 or a substitution, insertion or deletion in critical amino acids or critical regions. Methods for identifying functional and non-functional variants are well known to a person of ordinary skill in the art.

For example, appropriate functional Vα domain CDR1 amino acid sequences may have at least 80% sequence identity to SEQ ID NO: 8, i.e. it may have at least 80%, at least 83%, at least 85%, at least 90%, at least 91%, at least 92%, at least 93%, at least 94%, at least 95%, at least 96%, at least 97%, at least 98%, at least 99%, or 100% sequence identity to SEQ ID NO: 8. Suitably, percent identity is calculated as the percentage of identity to the entire length of the reference sequence (e.g. SEQ ID NO:8). In other words, appropriate functional Vα domain CDR1 amino acid sequences may vary from the sequence shown in SEQ ID NO: 8 by one or several amino acids. As stated previously, the variant may comprise an amino acid substitution such as a conservative amino acid substitution compared to the sequence shown in SEQ ID NO:8). As stated above, functional variants of SEQ ID NO: 8 retain the ability to specifically bind to the N-terminus of the HA-1$^H$ antigen (e.g. the peptide shown in SEQ ID NO:10) when the CDR1 is part of TCR Vα domain).

In one example, the CDR1 of the Vα domain comprises or consists of the amino acid sequence of SEQ ID NO:8. In examples where the TCR Vα domain CDR1 has the amino acid sequence of SEQ ID NO:8, the CDR1 may be encoded by the nucleic acid sequence of SEQ ID NO:9 or SEQ ID NO:27, or a genetically degenerate sequence thereof (i.e. other nucleic acid sequences that encode the same protein as a result of the degeneracy of the genetic code). It is noted that SEQ ID NO:27 is the codon optimised version of the nucleic acid sequence for CDR1 of clone FK47.83 (the non-optimised sequence being SEQ ID NO:9).

Other appropriate CDR1 Vα domain amino acid sequences are described elsewhere herein e.g. a CDR1 sequence comprising the sequence shown in SEQ ID NO:80. It is clear to a person of skill in the art that reference to SEQ ID NO:8 above may therefore be replaced with reference to SEQ ID NO:80 (and the corresponding nucleotide sequences of SEQ ID NO: 81 and 82) when discussing permutations of Vα CDR1 amino acid and nucleotide sequences for combination with a CDR3 sequence of SEQ ID NO:3 (or corresponding nucleotide sequences of SEQ ID NO:35 or SEQ ID NO:36).

The encoded TCR Vα domain may also comprise, in addition to the specified CDR3 (and optionally the specified CDR1 above), a CDR2 comprising an amino acid sequence of SEQ ID NO:28, or a functional variant thereof (i.e. wherein the variant retains the ability to specifically bind to HLA-A*02:01). Such functional variants may be naturally occurring, synthetic, or synthetically improved functional variants of SEQ ID NO:28. The term "variant" also encompasses homologues. Functional variants will typically contain only conservative substitutions of one or more amino acids of SEQ ID NO:28, or substitution, deletion or insertion of non-critical amino acids in non-critical regions of the protein.

Non-functional variants are amino acid sequence variants of SEQ ID NO: 28 that do not specifically bind to HLA-A*02:01. Non-conservative substitution, a deletion, or insertion or premature truncation of the amino acid sequence of SEQ ID NO:28 or a substitution, insertion or deletion in critical amino acids or critical regions. Methods for identifying functional and non-functional variants are well known to a person of ordinary skill in the art.

For example, appropriate functional Vα domain CDR2 amino acid sequences may have at least 80% sequence identity to SEQ ID NO: 28, i.e. it may have at least 80%, at least 85%, at least 90%, at least 91%, at least 92%, at least 93%, at least 94%, at least 95%, at least 96%, at least 97%, at least 98%, at least 99%, or 100% sequence identity to SEQ ID NO: 28. Suitably, percent identity is calculated as the percentage of identity to the entire length of the reference sequence (e.g. SEQ ID NO:28). In other words, appropriate (functional) Vα domain CDR2 amino acid sequences may vary from the sequence shown in SEQ ID NO:28 by one or several amino acids. As stated previously, the variant may comprise an amino acid substitution such as a conservative amino acid substitution compared to the sequence shown in SEQ ID NO:28). As stated above, a functional variant of SEQ ID NO: 28 retains the ability to specifically bind to HLA-A*02:01).

In one example, the CDR2 of the Vα domain comprises or consists of the amino acid sequence of SEQ ID NO: 28. In examples where the TCR Vα domain CDR2 has the amino acid sequence of SEQ ID NO:28, the CDR2 may be encoded by the nucleic acid sequence of SEQ ID NO:39 or SEQ ID NO:40, or a genetically degenerate sequence thereof (i.e. other nucleic acid sequences that encode the same protein as a result of the degeneracy of the genetic code). It is noted that SEQ ID NO:40 is the codon optimised version of the nucleic acid sequence for CDR2 of clone FK47.83 (the non-optimised sequence being SEQ ID NO:39).

Other appropriate CDR2 Vα domain amino acid sequences are described elsewhere herein e.g. a CDR2 sequence comprising the sequence shown in SEQ ID NO:83. It is clear to a person of skill in the art that reference to SEQ ID NO:28 above may therefore be replaced with reference to SEQ ID NO:83 (and the corresponding nucleotide sequences of SEQ ID NO: 84 and 85) when discussing permutations of Vα CDR2 amino acid and nucleotide sequences for combination with a CDR3 sequence of SEQ ID NO:3 (or corresponding nucleotide sequences of SEQ ID NO:35 or SEQ ID NO:36).

The encoded TCR Vα domain may therefore comprise the CDRs mentioned in detail above (by SEQ ID specifically i.e. SEQ ID NO:3, SEQ ID NO: 8 (or SEQ ID NO:80) and SEQ ID NO: 28 (or SEQ ID NO:83), or functional variants thereof), with appropriate intervening sequences between the CDRs.

The encoded TCR Vα domain may comprise an amino acid sequence of SEQ ID NO:41, or a functional variant thereof (i.e. wherein the variant TCR Vα domain retains the ability to specifically bind to an HA-1$^H$ antigen (e.g. the peptide shown in SEQ ID NO:10) when part of a binding protein described herein). Such functional variants may be naturally occurring, synthetic, or synthetically improved functional variants of SEQ ID NO:41. The term "variant" also encompasses homologues. Functional variants will typically contain only conservative substitutions of one or more amino acids of SEQ ID NO:41, or substitution, deletion or insertion of non-critical amino acids in non-critical regions of the protein.

Non-functional variants are amino acid sequence variants of SEQ ID NO: 41 that do not specifically bind to an HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:41 or a substitution, insertion or deletion in critical amino acids or critical regions. Methods for identifying functional and non-functional variants are well known to a person of ordinary skill in the art.

In one example, the encoded TCR Vα domain may have an amino acid sequence having at least 75%, at least 80%, at least 85% or at least 90% (or at least 91%, at least 92%, at least 93%, at least 94%, at least 95%, at least 96%, at least 97%, at least 98%, at least 99%, or 100%) sequence identity to the amino acid sequence of SEQ ID NO: 41, whilst retaining the ability to specifically bind to an HA-1$^H$ antigen (e.g. the peptide shown in SEQ ID NO:10). In other words, a functional TCR Vα domain with one or several amino acid substitutions compared to the sequence of SEQ ID NO:41 is also encompassed. As stated previously, the amino acid substitution may be a conservative amino acid substitution. The variability in sequence compared to SEQ ID NO:41 may all be in regions of the TCR Vα domain that do not form CDRs (i.e. the variant may have the CDRs of SEQ ID NO: 3, SEQ ID NO: 8 and/or SEQ ID NO: 28, and still have 25% (or less) sequence variability compared to SEQ ID NO:41). In other words, the sequence of the CDRs of SEQ ID NO: 41 may be retained whilst the rest of the sequence is varied, as appropriate within the "at least 75% identity" parameters specified above. Suitably, percent identity can be calculated as the percentage of identity to the entire length of the reference sequence (e.g. SEQ ID NO: 41).

As an example, the encoded TCR Vα domain may comprise an amino acid sequence having at least 75% (e.g. at least 75%, at least 80%, at least 85%, at least 90%, at least 95% etc) sequence identity to the amino acid sequence of SEQ ID NO: 41, wherein the TCR Vα domain comprises a CDR3 having an amino acid sequence of SEQ ID NO: 3. In this example, the TCR Vα domain CDR1 may have an amino acid sequence of SEQ ID NO: 8 and the TCR Vα domain CDR2 may have an amino acid sequence of SEQ ID NO: 28.

As another example, the encoded TCR Vα domain may comprise an amino acid sequence having at the amino acid sequence of SEQ ID NO: 41, with 0 to 10 (or 0 to 5) amino acid substitutions, insertions or deletions), wherein the TCR Vα domain comprises a CDR3 having an amino acid sequence of SEQ ID NO: 3. In this example, the TCR Vα domain CDR1 may have an amino acid sequence of SEQ ID NO: 8 and the TCR Vα domain CDR2 may have an amino acid sequence of SEQ ID NO: 28.

In examples where the TCR Vα domain has the amino acid sequence of SEQ ID NO:41, the TCR Vα domain may be encoded by the nucleic acid sequence of SEQ ID NO:43 or SEQ ID NO:44, or a genetically degenerate sequence thereof (i.e. other nucleic acid sequences that encode the same protein as a result of the degeneracy of the genetic code). It is noted that SEQ ID NO:44 is the codon optimised version of the nucleic acid sequence for TCR Vα domain of clone FK47.83 (the non-optimised sequence being SEQ ID NO:43).

For the avoidance of doubt, the nucleic acid sequence encoding the TCR Vα domain may also encode a TCR α chain constant domain. An example of a suitable constant domain is encoded in the MP71-TCR-flex retroviral vector. However, the invention is not limited to this specific constant domain, and encompasses any appropriate TCR α chain constant domain. The constant domain may be murine derived, human derived or humanised. Methods for identifying or generating appropriate constant domains are well known to a person of skill in the art and are well within their routine capabilities.

By way of example only, the constant domain may be encoded by or derived from a vector, such as a lentiviral, retroviral or plasmid vector but also adenovirus, adeno-associated virus, vaccinia virus, canary poxvirus or herpes virus vectors in which murine or human constant domains are pre-cloned. Recently, minicircles have also been described for TCR gene transfer (non-viral Sleeping Beauty transposition from minicircle vectors as published by R Monjezi, C Miskey, T Gogishvili, M Schleef, M Schmeer, H Einsele, Z Ivics and M Hudecek in Leukemia 2016). Moreover, naked (synthetic) DNA/RNA can also be used to introduce the TCR. As an example, a pMSGV retroviral vector with pre-cloned TCR-Ca and Cb genes as described in LV Coren et al., BioTechniques 2015 may be used to provide an appropriate constant domain. Alternatively, single stranded or double stranded DNA or RNA can be inserted by homologous directed repair into the TCR locus (see Roth et al 2018 Nature vol 559; page 405). As a further option, non-homologous end joining is possible.

Examples of specific TCR α chain amino acid sequences that include a TCR Vα domain described herein with an appropriate constant domain are shown in SEQ ID NO: 67 and SEQ ID NO: 68. It is noted that the constant domain shown in SEQ ID NO:68 is murine. Appropriate functional variants of SEQ ID NO:67 and SEQ ID NO:68 are also encompassed (e.g. variants having at least 75% (e.g. at least 75%, at least 80%, at least 85%, at least 90%, at least 95% etc) sequence identity to the amino acid sequence of SEQ ID NO: 67 or SEQ ID NO:68, wherein the variant TCR α chain amino acid sequence retains its ability to specifically bind to an HA-1$^H$ antigen (e.g. the peptide shown in SEQ ID NO:10) when part of a binding protein described herein). In other words, a functional TCR α chain with one or several amino acid substitutions compared to the sequence of SEQ ID NO:67 or SEQ ID NO:68 is also encompassed. As stated previously, the amino acid substitution may be a conservative amino acid substitution. The variability in sequence compared to SEQ ID NO:67 or SEQ ID NO:68 may all be in regions of the TCR α chain that do not form CDRs (i.e. the variant may have the CDRs of SEQ ID NO: 3, SEQ ID NO: 8 and/or SEQ ID NO: 28, and still have 25% (or less) sequence variability compared to SEQ ID NO:67 or SEQ ID NO:68). In other words, the sequence of the CDRs of SEQ ID NO: 67 or SEQ ID NO:68 may be retained whilst the rest of the sequence is varied, as appropriate within the "at least 75% identity" parameters specified above. Suitably, percent identity can be calculated as the percentage of identity to the entire length of the reference sequence (e.g. SEQ ID NO: 67 or SEQ ID NO:68 as appropriate).

As an example, the encoded TCR α chain may comprise an amino acid sequence having at least 75% (e.g. at least 75%, at least 80%, at least 85%, at least 90%, at least 95% etc) sequence identity to the amino acid sequence of SEQ ID NO: 67 or SEQ ID NO: 68, wherein the TCR α chain comprises a CDR3 having an amino acid sequence of SEQ ID NO: 3. In this example, the TCR α chain CDR1 may have an amino acid sequence of SEQ ID NO:8 and the TCR α chain CDR2 may have an amino acid sequence of SEQ ID NO: 28.

In examples where the TCR α chain has the amino acid sequence of SEQ ID NO:67, the TCR α chain may be encoded by the nucleic acid sequence of SEQ ID NO:69 or SEQ ID NO:70, or a genetically degenerate sequence thereof (i.e. other nucleic acid sequences that encode the same protein as a result of the degeneracy of the genetic code). It is noted that SEQ ID NO:70 is the codon optimised version of the nucleic acid sequence for TCR Vα domain of clone FK47.83 (the non-optimised sequence being SEQ ID NO:69).

In examples where the TCR α chain has the amino acid sequence of SEQ ID NO:68, the TCR α chain may be encoded by the nucleic acid sequence of SEQ ID NO:71, or a genetically degenerate sequence thereof (i.e. other nucleic acid sequences that encode the same protein as a result of the degeneracy of the genetic code).

Components of the TCR β Chain Variable (Vβ) Domain

The isolated nucleic acid composition described herein encodes an HA-1$^H$ antigen-specific binding protein. The encoded HA-1$^H$ antigen-specific binding protein comprises a TCR Vα domain comprising a CDR3 amino acid sequence having at least 80% sequence identity to any one of SEQ ID NOs: 1 to 3 as described above. The encoded HA-1$^H$ antigen-specific binding protein also comprises a TCR Vβ domain having an amino acid sequence encoded by a TRBV7-9 gene, wherein the Vβ domain comprises a CDR3 amino acid sequence having at least 80% sequence identity to any one of SEQ ID NOs: 4 to 6 and a CDR1 amino acid sequence having at least 80% sequence identity to SEQ ID NO: 7.

In humans, TCR Vβ chain amino acid sequences are generated in vivo by V(D)J recombination, which rearranges the available variable (V), joining (J) and in some cases, diversity (D) gene segments. This generates new repertoire of nucleic acid sequences encoding unique TCR Vβ chains, with distinct antigen recognition properties. An example of a human V gene segment is the TRBV7-9 gene (T cell Receptor Beta Variable 7-9 gene; UniprotKB unique identifier: P04435). TRBV7-9 has a number of known alleles (e.g. TRBV7-9*01, TRBV7-9*02, TRBV7-9*03, TRBV7-9*04, TRBV7-9*05, TRBV7-9*06 and TRBV7-9*07, with highly conserved nucleotide sequences (see Lefranc, M.-P. and Lefranc, G. The T cell receptor Facts Book Academic Press, London, UK (2001)).

The inventors have confirmed herein that HA-1$^H$ antigen-specific binding proteins harbour TCR β chains with similar Vβ domains. In each HA-1$^H$ antigen-specific binding protein described in the examples below, the Vβ domain comprised an amino acid sequence encoded by a TRBV7-9 gene. This sequence was shown to contribute to the peptide binding specificity of the binding proteins described herein.

Accordingly, the encoded HA-1$^H$ antigen-specific binding protein described herein comprise a TCR Vβ domain having an amino acid sequence encoded by a TRBV7-9 gene. The TRBV7-9 gene may be any TRBV7-9 allele for example, TRBV7-9*01, TRBV7-9*02, TRBV7-9*03, TRBV7-9*04, TRBV7-9*05, TRBV7-9*06 and TRBV7-9*07. In one particular example, the TRBV7-9 gene is TRBV7-9*01 or TRBV7-9*03.

As described above, the described binding proteins comprise a TCR Vβ. domain having an amino acid sequence encoded by a TRBV7-9 gene. In addition to this, the TCR Vβ domain of the binding proteins described herein comprises a CDR3 amino acid sequence having at least 80% sequence identity to any one of SEQ ID NOs: 4 to 6 (described directly below). For the avoidance of doubt, any of the TCR Vβ domain CDR3 sequences described below can be combined with any of the TCR Vβ domain CDR1 sequences described subsequently to generate a functional TCR Vβ domain.

(i) Vβ Domains Comprising a CDR3 Amino Acid Sequence of SEQ ID NO: 4 and Functional Variants Thereof.

An example of an appropriate TCR Vβ domain CDR3 amino acid sequence that confers specific binding to an HA-1$^H$ antigen is shown in SEQ ID NO:4. As would be clear to a person of skill in the art, variants of the amino acid sequence shown in SEQ ID NO:4 may also be functional (i.e. retain their ability to confer specific binding to an HA-1$^H$ antigen (e.g. the peptide shown in SEQ ID NO:10) when the CDR3 is part of TCR Vβ domain). Such functional variants are therefore encompassed herein.

For example, appropriate (functional) Vβ domain CDR3 amino acid sequences may have at least 80% sequence identity to SEQ ID NO: 4, i.e. they may have at least 80%, at least 84%, at least 90%, at least 91%, at least 92%, at least 93%, at least 94%, at least 95%, at least 96%, at least 97%, at least 98%, at least 99%, or 100% sequence identity to SEQ ID NO: 4. Suitably, percent identity is calculated as the percentage of identity to the entire length of the reference sequence (e.g. SEQ ID NO:4). In other words, appropriate (functional) Vβ domain CDR3 amino acid sequences may vary from the sequence shown in SEQ ID NO:4 by one or several (e.g. two) amino acids. As stated above, functional variants of SEQ ID NO:4 retain their ability to confer specific binding to an HA-1$^H$ antigen (e.g. the peptide shown in SEQ ID NO:10) when the CDR3 is part of TCR Vβ domain.

Functional variants may be naturally occurring, synthetic, or synthetically improved functional variants of SEQ ID NO:4. The term "variant" also encompasses homologues. Functional variants will typically contain only conservative substitutions of one or more amino acids of SEQ ID NO:4, or substitution, deletion or insertion of non-critical amino acids in non-critical regions of the CDR3.

Non-functional variants are amino acid sequence variants of SEQ ID NO:4 that do not specifically bind to an HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:4 or a substitution, insertion or deletion in critical amino acids or critical regions. Methods for identifying functional and non-functional variants are well known to a person of ordinary skill in the art.

In one example, the CDR3 of the Vβ domain comprises or consists of the amino acid sequence of SEQ ID NO: 4. In examples where the TCR Vβ domain CDR3 has the amino acid sequence of SEQ ID NO:4, the CDR3 may be encoded by the nucleic acid sequence of SEQ ID NO:13 or SEQ ID NO:14, or a genetically degenerate sequence thereof (i.e. other nucleic acid sequences that encode the same protein as a result of the degeneracy of the genetic code). It is noted that SEQ ID NO:14 is the codon optimised version of the nucleic acid sequence for CDR3 of clone M7 (the non-optimised sequence being SEQ ID NO:13).

The encoded TCR Vβ domain may comprise, in addition to the specified CDR3, a CDR1 comprising an amino acid sequence of SEQ ID NO: 7, or a functional variant thereof (i.e. wherein the variant retains the ability to specifically bind to the C-terminus of the HA-1$^H$ antigen (e.g. the peptide shown in SEQ ID NO:10)). Such functional variants may be naturally occurring, synthetic, or synthetically improved functional variants of SEQ ID NO: 7. The term "variant" also encompasses homologues. Functional variants will typically contain only conservative substitutions of one or more amino acids of SEQ ID NO: 7, or substitution, deletion or insertion of non-critical amino acids in non-critical regions of the protein.

Non-functional variants are amino acid sequence variants of SEQ ID NO: 7 that do not specifically bind to the C-terminus of the HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO: 7 or a substitution, insertion or deletion in critical amino acids or critical regions. Methods for identifying functional and non-functional variants are well known to a person of ordinary skill in the art.

For example, appropriate functional Vβ domain CDR1 amino acid sequences may have at least 80% sequence identity to SEQ ID NO: 7, i.e. it may have at least 80%, at least 83%, at least 85%, at least 90%, at least 91%, at least 92%, at least 93%, at least 94%, at least 95%, at least 96%, at least 97%, at least 98%, at least 99%, or 100% sequence identity to SEQ ID NO: 7. Suitably, percent identity is calculated as the percentage of identity to the entire length of the reference sequence (e.g. SEQ ID NO:7). In other words, appropriate (functional) Vβ domain CDR1 amino acid sequences may vary from the sequence shown in SEQ ID NO:7 by one or several amino acids. As stated previously, the variant may comprise an amino acid substitution such as a conservative amino acid substitution compared to the sequence shown in SEQ ID NO:7). As stated above, functional variants of SEQ ID NO: 7 retain the ability to specifically bind to the C-terminus of the HA-1$^H$ antigen (e.g. the peptide shown in SEQ ID NO:10) when the CDR1 is part of TCR Vii domain).

In one example, the CDR1 of the Vβ domain comprises or consists of the amino acid sequence of SEQ ID NO: 7. In examples where the TCR Vα domain CDR1 has the amino acid sequence of SEQ ID NO:7, the CDR1 may be encoded by the nucleic acid sequence of SEQ ID NO:15 or SEQ ID NO:16, or a genetically degenerate sequence thereof (i.e. other nucleic acid sequences that encode the same protein as a result of the degeneracy of the genetic code). It is noted that SEQ ID NO:16 is the codon optimised version of the nucleic acid sequence for CDR1 of clone M7 (the non-optimised sequence being SEQ ID NO:15).

The encoded TCR Vβ domain may also comprise, in addition to the specified CDR3 (and optionally the specified CDR1 above), a CDR2 having an amino acid sequence of SEQ ID NO: 86, or a functional variant thereof (i.e. wherein the variant retains the ability to specifically bind to HLA-A*02:01). Such functional variants may be naturally occurring, synthetic, or synthetically improved functional variants of SEQ ID NO:86. The term "variant" also encompasses homologues. Functional variants will typically contain only conservative substitutions of one or more amino acids of SEQ ID NO:86, or substitution, deletion or insertion of non-critical amino acids in non-critical regions of the protein.

Non-functional variants are amino acid sequence variants of SEQ ID NO:86 that do not specifically bind to HLA-A*02:01. Non-functional variants will typically contain a non-conservative substitution, a deletion, or insertion or premature truncation of the amino acid sequence of SEQ ID NO:86 or a substitution, insertion or deletion in critical amino acids or critical regions. Methods for identifying functional and non-functional variants are well known to a person of ordinary skill in the art.

For example, appropriate functional Vβ domain CDR2 amino acid sequences may have at least 80% sequence identity to SEQ ID NO: 86, i.e. it may have at least 80%, at least 83%, at least 90%, at least 91%, at least 92%, at least 93%, at least 94%, at least 95%, at least 96%, at least 97%, at least 98%, at least 99%, or 100% sequence identity to SEQ ID NO: 86. Suitably, percent identity is calculated as the percentage of identity to the entire length of the reference sequence (e.g. SEQ ID NO:86). In other words, appropriate (functional) Vβ domain CDR2 amino acid sequences may vary from the sequence shown in SEQ ID NO:86 by one or several amino acids. As stated previously, the variant may comprise an amino acid substitution such as a conservative amino acid substitution compared to the sequence shown in SEQ ID NO:86). As stated above, a functional variant of SEQ ID NO: 86 retains the ability to specifically bind to HLA-A*02:01).

In one example, the CDR2 of the Vβ domain comprises or consists of the amino acid sequence of SEQ ID NO: 86. In examples where the TCR Vβ domain CDR2 has the amino acid sequence of SEQ ID NO:86, the CDR2 may be encoded by the nucleic acid sequence of SEQ ID NO:87 or SEQ ID NO:88, or a genetically degenerate sequence thereof (i.e. other nucleic acid sequences that encode the same protein as a result of the degeneracy of the genetic code). It is noted that SEQ ID NO:88 is the codon optimised version of the nucleic acid sequence for CDR2 of clone M7 (the non-optimised sequence being SEQ ID NO:87).

The encoded TCR Vβ domain may therefore comprise the CDRs mentioned in detail above (by SEQ ID specifically i.e. SEQ ID NO:4, SEQ ID NO: 7 and SEQ ID NO: 86, or functional variants thereof), with appropriate intervening sequences between the CDRs.

The encoded TCR Vβ domain may have an amino acid sequence of SEQ ID NO:18, or a functional variant thereof (i.e. wherein the variant TCR Vβ domain retains the ability to specifically bind to an HA-1$^H$ antigen (e.g. the peptide shown in SEQ ID NO:10) when part of a binding protein described herein). Such functional variants may be naturally occurring, synthetic, or synthetically improved functional variants of SEQ ID NO:18. The term "variant" also encompasses homologues. Functional variants will typically contain only conservative substitutions of one or more amino acids of SEQ ID NO:18, or substitution, deletion or insertion of non-critical amino acids in non-critical regions of the protein.

Non-functional variants are amino acid sequence variants of SEQ ID NO: 18 that do not specifically bind to an HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:18 or a substitution, insertion or deletion in critical amino acids or critical regions. Methods for identifying functional and non-functional variants are well known to a person of ordinary skill in the art.

In one example, the encoded TCR Vβ domain may have an amino acid sequence having at least 75%, at least 80%, at least 85% or at least 90% (or at least 91%, at least 92%, at least 93%, at least 94%, at least 95%, at least 96%, at least 97%, at least 98%, at least 99%, or 100%) sequence identity to the amino acid sequence of SEQ ID NO: 18, whilst retaining the ability to specifically bind to an HA-1$^H$ antigen (e.g. the peptide shown in SEQ ID NO:10). In other words, a functional TCR Vβ domain with one or several amino acid substitutions compared to the sequence of SEQ ID NO:18 is also encompassed. As stated previously, the amino acid substitution may be a conservative amino acid substitution. The variability in sequence compared to SEQ ID NO:18 may all be in regions of the TCR Vβ domain that do not form CDRs (i.e. the variant may have the CDRs of SEQ ID NO: 4 and SEQ ID NO: 7 and optionally SEQ ID NO: 86, and still have 25% (or less) sequence variability compared to SEQ ID NO:18). In other words, the sequence of the CDRs of SEQ ID NO: 18 may be retained whilst the rest of the sequence is varied, as appropriate within the "at least 75% identity" parameters specified above. Suitably, percent identity can be calculated as the percentage of identity to the entire length of the reference sequence (e.g. SEQ ID NO: 18).

As an example, the encoded TCR Vβ domain may comprise an amino acid sequence having at least 75% (e.g. at least 75%, at least 80%, at least 85%, at least 90%, at least 95% etc) sequence identity to the amino acid sequence of SEQ ID NO: 18, wherein the TCR Vβ domain comprises a CDR3 having an amino acid sequence of SEQ ID NO: 4. In this example, the TCR Vβ domain CDR1 may have an amino acid sequence of SEQ ID NO:7 and the TCR Vβ domain CDR2 may have an amino acid sequence of SEQ ID NO: 86.

In examples where the TCR Vβ domain has the amino acid sequence of SEQ ID NO:18, the TCR Vβ domain may be encoded by the nucleic acid sequence of SEQ ID NO:21 or SEQ ID NO:22, or a genetically degenerate sequence thereof (i.e. other nucleic acid sequences that encode the same protein as a result of the degeneracy of the genetic code). It is noted that SEQ ID NO:22 is the codon optimised version of the nucleic acid sequence for TCR Vβ domain of clone M7 (the non-optimised sequence being SEQ ID NO:21).

For the avoidance of doubt, the nucleic acid sequence encoding the TCR Vβ domain may also encode a TCR β chain constant domain. An example of a suitable constant domain is encoded in the MP71-TCR-flex retroviral vector. However, the invention is not limited to this specific constant domain and encompasses any appropriate TCR β chain constant domain. The constant domain may be murine derived, human derived or humanised. Methods for identifying or generating appropriate constant domains are well known to a person of skill in the art and are well within their routine capabilities.

By way of example only, the constant domain may be encoded by or derived from a vector, such as a lentiviral, retroviral or plasmid vector but also adenovirus, adeno-associated virus, vaccinia virus, canary poxvirus or herpes virus vectors in which murine or human constant domains are pre-cloned. Recently, minicircles have also been described for TCR gene transfer (non-viral Sleeping Beauty transposition from minicircle vectors as published by R Monjezi, C Miskey, T Gogishvili, M Schleef, M Schmeer, H Einsele, Z Ivics and M Hudecek in Leukemia 2016). Moreover, naked (synthetic) DNA/RNA can also be used to introduce the TCR. As an example, a pMSGV retroviral vector with pre-cloned TCR-Ca and Cb genes as described in LV Coren et al., BioTechniques 2015 may be used to provide an appropriate constant domain.

Examples of specific TCR β chain amino acid sequences that include a TCR Vβ domain described herein and an appropriate constant domain are shown in SEQ ID NO: 52 and SEQ ID NO: 53. It is noted that the constant domain shown in SEQ ID NO:53 is murine. Appropriate functional variants of SEQ ID NO:52 and SEQ ID NO:53 are also encompassed (e.g. variants having at least 75% (e.g. at least 75%, at least 80%, at least 85%, at least 90%, at least 95% etc) sequence identity to the amino acid sequence of SEQ ID NO: 52 or SEQ ID NO:53, wherein the variant TCR β chain amino acid sequence retains its ability to specifically bind to an HA-1$^H$ antigen (e.g. the peptide shown in SEQ ID NO:10) when part of a binding protein described herein). In other words, a functional TCR β chain with one or several amino acid substitutions compared to the sequence of SEQ ID NO: 52 or SEQ ID NO:53 is also encompassed. As stated previously, the amino acid substitution may be a conservative amino acid substitution. The variability in sequence compared to SEQ ID NO:52 or SEQ ID NO:53 may all be in regions of the TCR β chain that do not form CDRs (i.e. the variant may have the CDRs of SEQ ID NO: 4 and SEQ ID NO: 7 and optionally SEQ ID NO: 86, and still have 25% (or less) sequence variability compared to SEQ ID NO:52 or SEQ ID NO:53. In other words, the sequence of the CDRs of SEQ ID NO: 52 or SEQ ID NO:53 may be retained whilst the rest of the sequence is varied, as appropriate within the "at least 75% identity" parameters specified above. Suitably, percent identity can be calculated as the percentage of identity to the entire length of the reference sequence (e.g. SEQ ID NO: 52 or SEQ ID NO:53 as appropriate).

As an example, the encoded TCR β chain may comprise an amino acid sequence having at least 75% (e.g. at least 75%, at least 80%, at least 85%, at least 90%, at least 95% etc) sequence identity to the amino acid sequence of SEQ ID NO: 52 or SEQ ID NO: 53, wherein the TCR β chain comprises a CDR3 having an amino acid sequence of SEQ ID NO: 4. In this example, the TCR β chain CDR1 may have an amino acid sequence of SEQ ID NO: 7 and the TCR β chain CDR2 may have an amino acid sequence of SEQ ID NO: 86.

In examples where the TCR β chain has the amino acid sequence of SEQ ID NO:52, the TCR β chain may be encoded by the nucleic acid sequence of SEQ ID NO:54 or SEQ ID NO:55, or a genetically degenerate sequence thereof (i.e. other nucleic acid sequences that encode the same protein as a result of the degeneracy of the genetic code). It is noted that SEQ ID NO:55 is the codon optimised version of the nucleic acid sequence for TCR Vβ domain of clone M7 (the non-optimised sequence being SEQ ID NO:54).

In examples where the TCR β chain has the amino acid sequence of SEQ ID NO:53, the TCR β chain may be encoded by the nucleic acid sequence of SEQ ID NO:56, or a genetically degenerate sequence thereof (i.e. other nucleic acid sequences that encode the same protein as a result of the degeneracy of the genetic code).

In a particular example, a nucleic acid composition described herein encodes an HA-1$^H$ antigen-specific binding protein having a TCR Vα domain with a CDR3 amino acid sequence comprising or consisting of the amino acid sequence of SEQ ID NO: 1; and a TCR Vβ domain having an amino acid sequence encoded by a TRBV7-9 gene, with a CDR3 comprising or consisting of the amino acid sequence of SEQ ID NO:4, and a CDR1 comprising or consisting of the amino acid sequence of SEQ ID NO: 7. The TRBV7-9 gene may be TRBV7-9*03. In addition, the HA-1$^H$ antigen may comprise or consist of the sequence shown in SEQ ID NO:10. Furthermore, the TCR Vα domain may be part of a TCR α chain having a constant domain and the TCR Vβ domain may be part of a TCR β chain having a constant domain.

In this particular example, the CDR3 of the Vα domain may be encoded by a nucleic acid sequence comprising the sequence of SEQ ID NO: 11 or SEQ ID NO:12; the CDR3 of the Vβ domain may be encoded by a nucleic acid sequence comprising the sequence of SEQ ID NO: 13 or SEQ ID NO:14; and the CDR1 of the Vβ domain may be encoded by a nucleic acid sequence comprising the sequence of SEQ ID NO: 15 or SEQ ID NO:16.

In this particular example, the Vα domain may comprise an amino acid sequence having at least 90% sequence identity to, comprising, or consisting of, SEQ ID NO: 17; and the Vβ domain comprises an amino acid sequence having at least 90% sequence identity to, comprising, or consisting of, SEQ ID NO: 18. In one example, the Vα domain comprises the amino acid sequence of SEQ ID NO: 17 and the Vβ domain comprises the amino acid sequence of SEQ ID NO: 18. In such cases, the Vα domain may be encoded by a nucleic acid sequence comprising the sequence of SEQ ID NO: 19 or SEQ ID NO: 20; and the Vβ domain may be encoded by a nucleic acid sequence comprising the sequence of SEQ ID NO: 21 or SEQ ID NO:22.

In this particular example, the TCR Vα domain may include a CDR1 amino acid sequence comprising or consisting of the amino acid sequence of SEQ ID NO:80 and a CDR2 amino acid sequence comprising or consisting of the amino acid sequence of SEQ ID NO:83. Furthermore, the TCR Vβ domain may include a CDR2 amino acid sequence comprising or consisting of the amino acid sequence of SEQ ID NO: 86.

For the avoidance of doubt, this particular example encompasses components of TCR clone M7 exemplified herein. The different components of TCR clone M7 and their respective SEQ ID Nos are summarised in Table 1 below.

TABLE 1 component parts of clone M7 with their respective SEQ ID Nos.

| SEQ ID NO | TCR COMPONENT | AA or NT |
|---|---|---|
| 80 | α CDR1 | AA |
| 81 | α CDR1 | NT |
| 82 | α CDR1 | NT co* |
| 83 | α CDR2 | AA |
| 84 | α CDR2 | NT |
| 85 | α CDR2 | NT co* |
| 1 | α CDR3 | AA |
| 11 | α CDR3 | NT |
| 12 | α CDR3 | NT co* |
| 7 | β CDR1 | AA |
| 15 | β CDR1 | NT |
| 16 | β CDR1 | NT co* |
| 86 | β CDR2 | AA |
| 87 | β CDR2 | NT |
| 88 | β CDR2 | NT co* |
| 4 | β CDR3 | AA |
| 13 | β CDR3 | NT |
| 14 | β CDR3 | NT co |
| 17 | α VJ | AA |
| 19 | α VJ | NT |
| 20 | α VJ | NT co |
| 18 | β VDJ | AA |
| 21 | β VDJ | NT |
| 22 | β VDJ | NT co |
| 47 | α VJ and constant | AA |
| 48 | α VJ and constant (murine) | AA |
| 49 | α VJ and constant | NT |
| 50 | α VJ and constant | NT co |
| 51 | α VJ and constant (murine) | NT co |
| 52 | β VDJ and constant | AA |
| 53 | β VDJ and constant (murine) | AA |
| 54 | β VDJ and constant | NT |
| 55 | β VDJ and constant | NT co |
| 56 | β VDJ and constant (murine) | NT co |

(ii) Vβ Domains Comprising a CDR3 Amino Acid Sequence of SEQ ID NO: 5 and Functional Variants Thereof.

An example of an appropriate TCR Vβ domain CDR3 amino acid sequence that confers specific binding to an HA-1$^H$ antigen is shown in SEQ ID NO:5. As would be clear to a person of skill in the art, variants of the amino acid sequence shown in SEQ ID NO:5 may also be functional (i.e. retain their ability to confer specific binding to an HA-1$^H$ antigen (e.g. the peptide shown in SEQ ID NO:10) when the CDR3 is part of TCR Vβ domain). Such functional variants are therefore encompassed herein.

For example, appropriate (functional) Vβ domain CDR3 amino acid sequences may have at least 80% sequence identity to SEQ ID NO: 5, i.e. they may have at least 80%, at least 84%, at least 90%, at least 91%, at least 92%, at least 93%, at least 94%, at least 95%, at least 96%, at least 97%, at least 98%, at least 99%, or 100% sequence identity to SEQ ID NO: 5. Suitably, percent identity is calculated as the percentage of identity to the entire length of the reference sequence (e.g. SEQ ID NO:5). In other words, appropriate (functional) Vβ domain CDR3 amino acid sequences may vary from the sequence shown in SEQ ID NO:5 by one or several (e.g. two) amino acids. As stated above, functional variants of SEQ ID NO:5 retain their ability to confer specific binding to an HA-1$^H$ antigen (e.g. the peptide shown in SEQ ID NO:10) when the CDR3 is part of TCR Vβ domain.

Functional variants may be naturally occurring, synthetic, or synthetically improved functional variants of SEQ ID NO:5. The term "variant" also encompasses homologues. Functional variants will typically contain only conservative substitutions of one or more amino acids of SEQ ID NO:5, or substitution, deletion or insertion of non-critical amino acids in non-critical regions of the CDR3.

Non-functional variants are amino acid sequence variants of SEQ ID NO:5 that do not specifically bind to an HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:5 or a substitution, insertion or deletion in critical amino acids or critical regions. Methods for identifying functional and non-functional variants are well known to a person of ordinary skill in the art.

In one example, the CDR3 of the Vβ domain comprises or consists of the amino acid sequence of SEQ ID NO: 5. In examples where the TCR Vβ domain CDR3 has the amino acid sequence of SEQ ID NO:5, the CDR3 may be encoded by the nucleic acid sequence of SEQ ID NO:25 or SEQ ID NO:26, or a genetically degenerate sequence thereof (i.e. other nucleic acid sequences that encode the same protein as a result of the degeneracy of the genetic code). It is noted that SEQ ID NO:26 is the codon optimised version of the nucleic acid sequence for CDR3 of clone M2 (the non-optimised sequence being SEQ ID NO:25).

The encoded TCR Vβ domain may comprise, in addition to the specified CDR3, a CDR1 comprising an amino acid sequence of SEQ ID NO: 7, or a functional variant thereof (i.e. wherein the variant retains the ability to specifically bind to the C-terminus of the HA-1$^H$ antigen (e.g. the peptide shown in SEQ ID NO:10)). Such functional variants may be naturally occurring, synthetic, or synthetically improved functional variants of SEQ ID NO: 7. The term "variant" also encompasses homologues. Functional variants will typically contain only conservative substitutions of one or more amino acids of SEQ ID NO: 7, or substitution, deletion or insertion of non-critical amino acids in non-critical regions of the protein.

Non-functional variants are amino acid sequence variants of SEQ ID NO: 7 that do not specifically bind to the C-terminus of the HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO: 7 or a substitution, insertion or deletion in critical amino acids or critical regions. Methods for identifying functional and non-functional variants are well known to a person of ordinary skill in the art.

For example, appropriate functional Vβ domain CDR1 amino acid sequences may have at least 80% sequence identity to SEQ ID NO: 7, i.e. it may have at least 80%, at least 83%, at least 85%, at least 90%, at least 91%, at least 92%, at least 93%, at least 94%, at least 95%, at least 96%, at least 97%, at least 98%, at least 99%, or 100% sequence identity to SEQ ID NO: 7. Suitably, percent identity is calculated as the percentage of identity to the entire length of the reference sequence (e.g. SEQ ID NO:7). In other words, appropriate (functional) Vβ domain CDR1 amino acid sequences may vary from the sequence shown in SEQ ID NO:7 by one or several amino acids. As stated previously, the variant may comprise an amino acid substitution such as a conservative amino acid substitution compared to the sequence shown in SEQ ID NO:7). As stated above, functional variants of SEQ ID NO: 7 retain the ability to specifically bind to the C-terminus of the HA-1$^H$ antigen (e.g. the peptide shown in SEQ ID NO:10) when the CDR1 is part of TCR Vβ domain).

In one example, the CDR1 of the Vβ domain comprises or consists of the amino acid sequence of SEQ ID NO: 7. In examples where the TCR Vα domain CDR1 has the amino acid sequence of SEQ ID NO:7, the CDR1 may be encoded by the nucleic acid sequence of SEQ ID NO:15 or SEQ ID NO:16, or a genetically degenerate sequence thereof (i.e. other nucleic acid sequences that encode the same protein as a result of the degeneracy of the genetic code). It is noted that SEQ ID NO:16 is the codon optimised version of the nucleic acid sequence for CDR1 of clone M2 (the non-optimised sequence being SEQ ID NO:15).

The encoded TCR Vβ domain may also comprise, in addition to the specified CDR3 (and optionally the specified CDR1 above), a CDR2 having an amino acid sequence of SEQ ID NO: 86, or a functional variant thereof (i.e. wherein the variant retains the ability to specifically bind to HLA-A*02:01). Such functional variants may be naturally occurring, synthetic, or synthetically improved functional variants of SEQ ID NO:86. The term "variant" also encompasses homologues. Functional variants will typically contain only conservative substitutions of one or more amino acids of SEQ ID NO:86, or substitution, deletion or insertion of non-critical amino acids in non-critical regions of the protein.

Non-functional variants are amino acid sequence variants of SEQ ID NO:86 that do not specifically bind to HLA-A*02:01. Non-functional variants will typically contain a non-conservative substitution, a deletion, or insertion or premature truncation of the amino acid sequence of SEQ ID NO:86 or a substitution, insertion or deletion in critical amino acids or critical regions. Methods for identifying functional and non-functional variants are well known to a person of ordinary skill in the art.

For example, appropriate functional Vβ domain CDR2 amino acid sequences may have at least 80% sequence identity to SEQ ID NO: 86, i.e. it may have at least 80%, at least 83%, at least 85%, at least 90%, at least 91%, at least 92%, at least 93%, at least 94%, at least 95%, at least 96%, at least 97%, at least 98%, at least 99%, or 100% sequence identity to SEQ ID NO: 86. Suitably, percent identity is calculated as the percentage of identity to the entire length of the reference sequence (e.g. SEQ ID NO:86). In other words, appropriate (functional) Vβ domain CDR2 amino acid sequences may vary from the sequence shown in SEQ ID NO:86 by one or several amino acids. As stated previously, the variant may comprise an amino acid substitution such as a conservative amino acid substitution compared to the sequence shown in SEQ ID NO:86). As stated above, a functional variant of SEQ ID NO: 86 retains the ability to specifically bind to HLA-A*02:01).

In one example, the CDR2 of the Vβ domain comprises or consists of the amino acid sequence of SEQ ID NO: 86. In examples where the TCR Vβ domain CDR2 has the amino acid sequence of SEQ ID NO:86, the CDR2 may be encoded by the nucleic acid sequence of SEQ ID NO:87 or SEQ ID NO:88, or a genetically degenerate sequence thereof (i.e. other nucleic acid sequences that encode the same protein as a result of the degeneracy of the genetic code). It is noted that SEQ ID NO:88 is the codon optimised version of the nucleic acid sequence for CDR2 of clone M2 (the non-optimised sequence being SEQ ID NO:87).

The encoded TCR Vβ domain may therefore comprise the CDRs mentioned in detail above (by SEQ ID specifically i.e. SEQ ID NO:5, SEQ ID NO: 7 and SEQ ID NO: 86, or functional variants thereof), with appropriate intervening sequences between the CDRs.

The encoded TCR Vβ domain may have an amino acid sequence of SEQ ID NO:30, or a functional variant thereof (i.e. wherein the variant TCR Vβ domain retains the ability to specifically bind to an HA-1$^H$ antigen (e.g. the peptide shown in SEQ ID NO:10) when part of a binding protein described herein). Such functional variants may be naturally occurring, synthetic, or synthetically improved functional variants of SEQ ID NO:30. The term "variant" also encompasses homologues. Functional variants will typically contain only conservative substitutions of one or more amino acids of SEQ ID NO:30, or substitution, deletion or insertion of non-critical amino acids in non-critical regions of the protein.

Non-functional variants are amino acid sequence variants of SEQ ID NO: 30 that do not specifically bind to an HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:30 or a substitution, insertion or deletion in critical amino acids or critical regions. Methods for identifying functional and non-functional variants are well known to a person of ordinary skill in the art.

In one example, the encoded TCR Vβ domain may have an amino acid sequence having at least 75%, at least 80%, at least 85% or at least 90% (or at least 91%, at least 92%, at least 93%, at least 94%, at least 95%, at least 96%, at least 97%, at least 98%, at least 99%, or 100%) sequence identity to the amino acid sequence of SEQ ID NO: 30, whilst retaining the ability to specifically bind to an HA-1$^H$ antigen (e.g. the peptide shown in SEQ ID NO:10). In other words, a functional TCR Vβ domain with one or several amino acid substitutions compared to the sequence of SEQ ID NO:30 is also encompassed. As stated previously, the amino acid substitution may be a conservative amino acid substitution. The variability in sequence compared to SEQ ID NO:30 may all be in regions of the TCR Vβ domain that do not form CDRs (i.e. the variant may have the CDRs of SEQ ID NO: 5 and SEQ ID NO: 7 and optionally SEQ ID NO: 86, and still have 25% (or less) sequence variability compared to SEQ ID NO:30). In other words, the sequence of the CDRs of SEQ ID NO: 30 may be retained whilst the rest of the sequence is varied, as appropriate within the "at least 75% identity" parameters specified above. Suitably, percent identity can be calculated as the percentage of identity to the entire length of the reference sequence (e.g. SEQ ID NO: 30).

As an example, the encoded TCR Vβ domain may comprise an amino acid sequence having at least 75% (e.g. at least 75%, at least 80%, at least 85%, at least 90%, at least 95% etc) sequence identity to the amino acid sequence of SEQ ID NO: 30, wherein the TCR Vβ domain comprises a CDR3 having an amino acid sequence of SEQ ID NO: 5. In this example, the TCR Vβ domain CDR1 may have an amino acid sequence of SEQ ID NO:7 and the TCR Vβ domain CDR2 may have an amino acid sequence of SEQ ID NO: 86.

In examples where the TCR Vβ domain has the amino acid sequence of SEQ ID NO:30, the TCR Vβ domain may be encoded by the nucleic acid sequence of SEQ ID NO:33 or SEQ ID NO:34, or a genetically degenerate sequence thereof (i.e. other nucleic acid sequences that encode the same protein as a result of the degeneracy of the genetic code). It is noted that SEQ ID NO:34 is the codon optimised version of the nucleic acid sequence for TCR Vβ domain of clone M2 (the non-optimised sequence being SEQ ID NO:33).

For the avoidance of doubt, the nucleic acid sequence encoding the TCR Vβ domain may also encode a TCR β chain constant domain. An example of a suitable constant domain is encoded in the MP71-TCR-flex retroviral vector. However, the invention is not limited to this specific constant domain and encompasses any appropriate TCR β chain constant domain. The constant domain may be murine derived, human derived or humanised. Methods for identifying or generating appropriate constant domains are well known to a person of skill in the art and are well within their routine capabilities.

By way of example only, the constant domain may be encoded by or derived from a vector, such as a lentiviral, retroviral or plasmid vector but also adenovirus, adeno-associated virus, vaccinia virus, canary poxvirus or herpes virus vectors in which murine or human constant domains are pre-cloned. Recently, minicircles have also been described for TCR gene transfer (non-viral Sleeping Beauty transposition from minicircle vectors as published by R Monjezi, C Miskey, T Gogishvili, M Schleef, M Schmeer, H Einsele, Z Ivics and M Hudecek in Leukemia 2016). Moreover, naked (synthetic) DNA/RNA can also be used to introduce the TCR. As an example, a pMSGV retroviral vector with pre-cloned TCR-Ca and Cb genes as described in LV Coren et al., BioTechniques 2015 may be used to provide an appropriate constant domain.

Examples of specific TCR β chain amino acid sequences that include a TCR Vβ domain described herein and an appropriate constant domain are shown in SEQ ID NO: 62 and SEQ ID NO: 63. It is noted that the constant domain shown in SEQ ID NO:63 is murine. Appropriate functional variants of SEQ ID NO:62 and SEQ ID NO:63 are also encompassed (e.g. variants having at least 75% (e.g. at least 75%, at least 80%, at least 85%, at least 90%, at least 95% etc) sequence identity to the amino acid sequence of SEQ ID NO: 62 or SEQ ID NO:63, wherein the variant TCR β chain amino acid sequence retains its ability to specifically bind to an HA-1$^H$ antigen (e.g. the peptide shown in SEQ ID NO:10) when part of a binding protein described herein). In other words, a functional TCR β chain with one or several amino acid substitutions compared to the sequence of SEQ ID NO: 62 or SEQ ID NO:63 is also encompassed. As stated previously, the amino acid substitution may be a conservative amino acid substitution. The variability in sequence compared to SEQ ID NO:62 or SEQ ID NO:63 may all be in regions of the TCR β chain that do not form CDRs (i.e. the variant may have the CDRs of SEQ ID NO: 5 and SEQ ID NO: 7 and optionally SEQ ID NO: 86, and still have 25% (or less) sequence variability compared to SEQ ID NO:62 or SEQ ID NO:63. In other words, the sequence of the CDRs of SEQ ID NO: 62 or SEQ ID NO:63 may be retained whilst the rest of the sequence is varied, as appropriate within the "at least 75% identity" parameters specified above. Suitably, percent identity can be calculated as the percentage of identity to the entire length of the reference sequence (e.g. SEQ ID NO: 62 or SEQ ID NO:63 as appropriate).

As an example, the encoded TCR β chain may comprise an amino acid sequence having at least 75% (e.g. at least 75%, at least 80%, at least 85%, at least 90%, at least 95% etc) sequence identity to the amino acid sequence of SEQ ID NO: 62 or SEQ ID NO: 63, wherein the TCR β chain comprises a CDR3 having an amino acid sequence of SEQ ID NO: 5. In this example, the TCR β chain CDR1 may have an amino acid sequence of SEQ ID NO: 7 and the TCR β chain CDR2 may have an amino acid sequence of SEQ ID NO: 86.

In examples where the TCR β chain has the amino acid sequence of SEQ ID NO:62, the TCR β chain may be encoded by the nucleic acid sequence of SEQ ID NO:64 or SEQ ID NO:65, or a genetically degenerate sequence thereof (i.e. other nucleic acid sequences that encode the same protein as a result of the degeneracy of the genetic code). It is noted that SEQ ID NO:65 is the codon optimised version of the nucleic acid sequence for TCR Vβ domain of clone M7 (the non-optimised sequence being SEQ ID NO:64).

In examples where the TCR β chain has the amino acid sequence of SEQ ID NO:63, the TCR β chain may be encoded by the nucleic acid sequence of SEQ ID NO:66, or a genetically degenerate sequence thereof (i.e. other nucleic acid sequences that encode the same protein as a result of the degeneracy of the genetic code).

In a particular example, a nucleic acid composition described herein encodes an HA-1$^H$ antigen-specific binding protein having a TCR Vα domain with a CDR3 amino acid sequence comprising or consisting of the amino acid sequence of SEQ ID NO: 2; and a TCR Vβ domain having an amino acid sequence encoded by a TRBV7-9 gene, with a CDR3 comprising or consisting of the amino acid sequence of SEQ ID NO:5, and a CDR1 comprising or consisting of the amino acid sequence of SEQ ID NO: 7. The TRBV7-9 gene may be TRBV7-9*01. In addition, the HA-1$^H$ antigen may comprise or consist of the sequence shown in SEQ ID NO:10. Furthermore, the TCR Vα domain may be part of a TCR α chain having a constant domain and the TCR Vβ domain may be part of a TCR β chain having a constant domain.

In this particular example, the CDR3 of the Vα domain may be encoded by a nucleic acid sequence comprising the sequence of SEQ ID NO: 23 or SEQ ID NO:24; the CDR3 of the Vβ domain may be encoded by a nucleic acid sequence comprising the sequence of SEQ ID NO: 25 or SEQ ID NO:26; and the CDR1 of the Vβ domain may be encoded by a nucleic acid sequence comprising the sequence of SEQ ID NO: 15 or SEQ ID NO:16.

In this particular example, the Vα domain may comprise an amino acid sequence having at least 90% sequence identity to, comprising, or consisting of, SEQ ID NO: 29; and the Vβ domain comprises an amino acid sequence having at least 90% sequence identity to, comprising, or consisting of, SEQ ID NO: 30. In one example, the Vα domain comprises the amino acid sequence of SEQ ID NO: 29 and the Vβ domain comprises the amino acid sequence of SEQ ID NO: 30. In such cases, the Vα domain may be encoded by a nucleic acid sequence comprising the sequence of SEQ ID NO: 31 or SEQ ID NO: 32; and the Vβ domain may be encoded by a nucleic acid sequence comprising the sequence of SEQ ID NO: 33 or SEQ ID NO:34.

In this particular example, the TCR Vα domain may include a CDR1 amino acid sequence comprising or consisting of the amino acid sequence of SEQ ID NO:8 and a CDR2 amino acid sequence comprising or consisting of the amino acid sequence of SEQ ID NO:28.

Furthermore, the TCR Vβ domain may include a CDR2 amino acid sequence comprising or consisting of the amino acid sequence of SEQ ID NO: 86.

For the avoidance of doubt, this particular example encompasses components of TCR clone M2 exemplified herein. The different components of TCR clone M2 and their respective SEQ ID Nos are summarised in Table 2 below.

TABLE 2 component parts of clone M2 with their respective SEQ ID Nos.

| SEQ ID NO | TCR COMPONENT | AA or NT |
|---|---|---|
| 8 | α CDR1 | AA |
| 9 | α CDR1 | NT |
| 27 | α CDR1 | NT co* |
| 28 | α CDR2 | AA |
| 39 | α CDR2 | NT |
| 40 | α CDR2 | NT co* |
| 2 | α CDR3 | AA |
| 23 | α CDR3 | NT |
| 24 | α CDR3 | NT co* |
| 7 | β CDR1 | AA |
| 15 | β CDR1 | NT |
| 16 | β CDR1 | NT co* |
| 86 | β CDR2 | AA |
| 87 | β CDR2 | NT |
| 88 | β CDR2 | NT co* |
| 5 | β CDR3 | AA |
| 25 | β CDR3 | NT |
| 26 | β CDR3 | NT co |
| 29 | α VJ | AA |
| 31 | α VJ | NT |
| 32 | α VJ | NT co |
| 30 | β VDJ | AA |
| 33 | β VDJ | NT |
| 34 | β VDJ | NT co |
| 57 | α VJ and constant | AA |
| 58 | α VJ and constant (murine) | AA |
| 59 | α VJ and constant | NT |
| 60 | α VJ and constant | NT co |
| 61 | α VJ and constant (murine) | NT co |
| 62 | β VDJ and constant | AA |
| 63 | β VDJ and constant (murine) | AA |
| 64 | β VDJ and constant | NT |
| 65 | β VDJ and constant | NT co |
| 66 | β VDJ and constant (murine) | NT co |

(iii) Vβ Domains Comprising a CDR3 Amino Acid Sequence of SEQ ID NO: 6 and Functional Variants Thereof.

An example of an appropriate TCR Vβ domain CDR3 amino acid sequence that confers specific binding to an HA-1$^H$ antigen is shown in SEQ ID NO:6. As would be clear to a person of skill in the art, variants of the amino acid sequence shown in SEQ ID NO:6 may also be functional (i.e. retain their ability to confer specific binding to an HA-1$^H$ antigen (e.g. the peptide shown in SEQ ID NO:10)

when the CDR3 is part of TCR Vβ domain). Such functional variants are therefore encompassed herein.

For example, appropriate (functional) Vβ domain CDR3 amino acid sequences may have at least 80% sequence identity to SEQ ID NO: 6, i.e. they may have at least 80%, at least 84%, at least 90%, at least 91%, at least 92%, at least 93%, at least 94%, at least 95%, at least 96%, at least 97%, at least 98%, at least 99%, or 100% sequence identity to SEQ ID NO: 6. Suitably, percent identity is calculated as the percentage of identity to the entire length of the reference sequence (e.g. SEQ ID NO:6). In other words, appropriate (functional) Vβ domain CDR3 amino acid sequences may vary from the sequence shown in SEQ ID NO:6 by one or several (e.g. two) amino acids. As stated above, functional variants of SEQ ID NO:6 retain their ability to confer specific binding to an HA-1$^H$ antigen (e.g. the peptide shown in SEQ ID NO:10) when the CDR3 is part of TCR Vβ domain.

Functional variants may be naturally occurring, synthetic, or synthetically improved functional variants of SEQ ID NO:6. The term "variant" also encompasses homologues. Functional variants will typically contain only conservative substitutions of one or more amino acids of SEQ ID NO:6, or substitution, deletion or insertion of non-critical amino acids in non-critical regions of the CDR3.

Non-functional variants are amino acid sequence variants of SEQ ID NO:6 that do not specifically bind to an HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:6 or a substitution, insertion or deletion in critical amino acids or critical regions. Methods for identifying functional and non-functional variants are well known to a person of ordinary skill in the art.

In one example, the CDR3 of the Vβ domain comprises or consists of the amino acid sequence of SEQ ID NO: 6. In examples where the TCR Vβ domain CDR3 has the amino acid sequence of SEQ ID NO:6, the CDR3 may be encoded by the nucleic acid sequence of SEQ ID NO:37 or SEQ ID NO:38, or a genetically degenerate sequence thereof (i.e. other nucleic acid sequences that encode the same protein as a result of the degeneracy of the genetic code). It is noted that SEQ ID NO:38 is the codon optimised version of the nucleic acid sequence for CDR3 of clone FK47.83 (the non-optimised sequence being SEQ ID NO:37).

The encoded TCR Vβ domain may comprise, in addition to the specified CDR3, a CDR1 comprising an amino acid sequence of SEQ ID NO: 7, or a functional variant thereof (i.e. wherein the variant retains the ability to specifically bind to the C-terminus of the HA-1$^H$ antigen (e.g. the peptide shown in SEQ ID NO:10)). Such functional variants may be naturally occurring, synthetic, or synthetically improved functional variants of SEQ ID NO: 7. The term "variant" also encompasses homologues. Functional variants will typically contain only conservative substitutions of one or more amino acids of SEQ ID NO: 7, or substitution, deletion or insertion of non-critical amino acids in non-critical regions of the protein.

Non-functional variants are amino acid sequence variants of SEQ ID NO: 7 that do not specifically bind to the C-terminus of the HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO: 7 or a substitution, insertion or deletion in critical amino acids or critical regions. Methods for identifying functional and non-functional variants are well known to a person of ordinary skill in the art.

For example, appropriate functional Vβ domain CDR1 amino acid sequences may have at least 80% sequence identity to SEQ ID NO: 7, i.e. it may have at least 80%, at least 83%, at least 85%, at least 90%, at least 91%, at least 92%, at least 93%, at least 94%, at least 95%, at least 96%, at least 97%, at least 98%, at least 99%, or 100% sequence identity to SEQ ID NO: 7. Suitably, percent identity is calculated as the percentage of identity to the entire length of the reference sequence (e.g. SEQ ID NO:7). In other words, appropriate (functional) Vβ domain CDR1 amino acid sequences may vary from the sequence shown in SEQ ID NO:7 by one or several amino acids. As stated previously, the variant may comprise an amino acid substitution such as a conservative amino acid substitution compared to the sequence shown in SEQ ID NO:7). As stated above, functional variants of SEQ ID NO: 7 retain the ability to specifically bind to the C-terminus of the HA-1$^H$ antigen (e.g. the peptide shown in SEQ ID NO:10) when the CDR1 is part of TCR Vβ domain).

In one example, the CDR1 of the Vβ domain comprises or consists of the amino acid sequence of SEQ ID NO: 7. In examples where the TCR Vα domain CDR1 has the amino acid sequence of SEQ ID NO:7, the CDR1 may be encoded by the nucleic acid sequence of SEQ ID NO:15 or SEQ ID NO:16, or a genetically degenerate sequence thereof (i.e. other nucleic acid sequences that encode the same protein as a result of the degeneracy of the genetic code). It is noted that SEQ ID NO:16 is the codon optimised version of the nucleic acid sequence for CDR1 of clone FK47.83 (the non-optimised sequence being SEQ ID NO:15).

The encoded TCR Vβ domain may also comprise, in addition to the specified CDR3 (and optionally the specified CDR1 above), a CDR2 having an amino acid sequence of SEQ ID NO: 86, or a functional variant thereof (i.e. wherein the variant retains the ability to specifically bind to HLA-A*02:01). Such functional variants may be naturally occurring, synthetic, or synthetically improved functional variants of SEQ ID NO:86. The term "variant" also encompasses homologues. Functional variants will typically contain only conservative substitutions of one or more amino acids of SEQ ID NO:86, or substitution, deletion or insertion of non-critical amino acids in non-critical regions of the protein.

Non-functional variants are amino acid sequence variants of SEQ ID NO:86 that do not specifically bind to HLA-A*02:01. Non-functional variants will typically contain a non-conservative substitution, a deletion, or insertion or premature truncation of the amino acid sequence of SEQ ID NO:86 or a substitution, insertion or deletion in critical amino acids or critical regions. Methods for identifying functional and non-functional variants are well known to a person of ordinary skill in the art.

For example, appropriate functional Vβ domain CDR2 amino acid sequences may have at least 80% sequence identity to SEQ ID NO: 86, i.e. it may have at least 80%, at least 83%, at least 85%, at least 90%, at least 91%, at least 92%, at least 93%, at least 94%, at least 95%, at least 96%, at least 97%, at least 98%, at least 99%, or 100% sequence identity to SEQ ID NO: 86. Suitably, percent identity is calculated as the percentage of identity to the entire length of the reference sequence (e.g. SEQ ID NO:86). In other words, appropriate (functional) Vβ domain CDR2 amino acid sequences may vary from the sequence shown in SEQ ID NO:86 by one or several amino acids. As stated previously, the variant may comprise an amino acid substitution such as a conservative amino acid substitution compared to the sequence shown in SEQ ID NO:86). As stated above, a functional variant of SEQ ID NO: 86 retains the ability to specifically bind to HLA-A*02:01).

In one example, the CDR2 of the Vβ domain comprises or consists of the amino acid sequence of SEQ ID NO: 86. In examples where the TCR Vβ domain CDR2 has the amino acid sequence of SEQ ID NO:86, the CDR2 may be encoded by the nucleic acid sequence of SEQ ID NO:87 or SEQ ID NO:88, or a genetically degenerate sequence thereof (i.e. other nucleic acid sequences that encode the same protein as a result of the degeneracy of the genetic code). It is noted that SEQ ID NO:88 is the codon optimised version of the nucleic acid sequence for CDR2 of clone FK47.83 (the non-optimised sequence being SEQ ID NO:87).

The encoded TCR Vβ domain may therefore comprise the CDRs mentioned in detail above (by SEQ ID specifically i.e. SEQ ID NO:6, SEQ ID NO: 7 and SEQ ID NO: 86, or functional variants thereof), with appropriate intervening sequences between the CDRs.

The encoded TCR Vβ domain may have an amino acid sequence of SEQ ID NO:42, or a functional variant thereof (i.e. wherein the variant TCR Vβ domain retains the ability to specifically bind to an HA-1$^H$ antigen (e.g. the peptide shown in SEQ ID NO:10) when part of a binding protein described herein). Such functional variants may be naturally occurring, synthetic, or synthetically improved functional variants of SEQ ID NO:42. The term "variant" also encompasses homologues. Functional variants will typically contain only conservative substitutions of one or more amino acids of SEQ ID NO:42, or substitution, deletion or insertion of non-critical amino acids in non-critical regions of the protein.

Non-functional variants are amino acid sequence variants of SEQ ID NO: 42 that do not specifically bind to an HA-1$^H$ antigen (e.g. the peptide shown in SEQ ID NO:10). Non-functional variants will typically contain a non-conservative substitution, a deletion, or insertion or premature truncation of the amino acid sequence of SEQ ID NO:42 or a substitution, insertion or deletion in critical amino acids or critical regions. Methods for identifying functional and non-functional variants are well known to a person of ordinary skill in the art.

In one example, the encoded TCR Vβ domain may have an amino acid sequence having at least 75%, at least 80%, at least 85% or at least 90% (or at least 91%, at least 92%, at least 93%, at least 94%, at least 95%, at least 96%, at least 97%, at least 98%, at least 99%, or 100%) sequence identity to the amino acid sequence of SEQ ID NO: 42, whilst retaining the ability to specifically bind to an HA-1$^H$ antigen (e.g. the peptide shown in SEQ ID NO:10). In other words, a functional TCR Vβ domain with one or several amino acid substitutions compared to the sequence of SEQ ID NO:42 is also encompassed. As stated previously, the amino acid substitution may be a conservative amino acid substitution. The variability in sequence compared to SEQ ID NO:42 may all be in regions of the TCR Vβ domain that do not form CDRs (i.e. the variant may have the CDRs of SEQ ID NO: 6 and SEQ ID NO: 7 and optionally SEQ ID NO: 86, and still have 25% (or less) sequence variability compared to SEQ ID NO:42). In other words, the sequence of the CDRs of SEQ ID NO: 42 may be retained whilst the rest of the sequence is varied, as appropriate within the "at least 75% identity" parameters specified above. Suitably, percent identity can be calculated as the percentage of identity to the entire length of the reference sequence (e.g. SEQ ID NO: 42).

As an example, the encoded TCR Vβ domain may comprise an amino acid sequence having at least 75% (e.g. at least 75%, at least 80%, at least 85%, at least 90%, at least 95% etc) sequence identity to the amino acid sequence of SEQ ID NO: 42, wherein the TCR Vβ domain comprises a CDR3 having an amino acid sequence of SEQ ID NO: 6. In this example, the TCR Vβ domain CDR1 may have an amino acid sequence of SEQ ID NO:7 and the TCR Vβ domain CDR2 may have an amino acid sequence of SEQ ID NO: 86.

In examples where the TCR Vβ domain has the amino acid sequence of SEQ ID NO:42, the TCR Vβ domain may be encoded by the nucleic acid sequence of SEQ ID NO:45 or SEQ ID NO:46, or a genetically degenerate sequence thereof (i.e. other nucleic acid sequences that encode the same protein as a result of the degeneracy of the genetic code). It is noted that SEQ ID NO:46 is the codon optimised version of the nucleic acid sequence for TCR Vβ domain of clone FK47.83 (the non-optimised sequence being SEQ ID NO:45).

For the avoidance of doubt, the nucleic acid sequence encoding the TCR Vβ domain may also encode a TCR β chain constant domain. An example of a suitable constant domain is encoded in the MP71-TCR-flex retroviral vector. However, the invention is not limited to this specific constant domain and encompasses any appropriate TCR β chain constant domain. The constant domain may be murine derived, human derived or humanised. Methods for identifying or generating appropriate constant domains are well known to a person of skill in the art and are well within their routine capabilities.

By way of example only, the constant domain may be encoded by or derived from a vector, such as a lentiviral, retroviral or plasmid vector but also adenovirus, adeno-associated virus, vaccinia virus, canary poxvirus or herpes virus vectors in which murine or human constant domains are pre-cloned. Recently, minicircles have also been described for TCR gene transfer (non-viral Sleeping Beauty transposition from minicircle vectors as published by R Monjezi, C Miskey, T Gogishvili, M Schleef, M Schmeer, H Einsele, Z Ivics and M Hudecek in Leukemia 2016). Moreover, naked (synthetic) DNA/RNA can also be used to introduce the TCR. As an example, a pMSGV retroviral vector with pre-cloned TCR-Ca and Cb genes as described in LV Coren et al., BioTechniques 2015 may be used to provide an appropriate constant domain.

Examples of specific TCR β chain amino acid sequences that include a TCR Vβ domain described herein and an appropriate constant domain are shown in SEQ ID NO: 72 and SEQ ID NO: 73. It is noted that the constant domain shown in SEQ ID NO:73 is murine. Appropriate functional variants of SEQ ID NO:72 and SEQ ID NO:73 are also encompassed (e.g. variants having at least 75% (e.g. at least 75%, at least 80%, at least 85%, at least 90%, at least 95% etc) sequence identity to the amino acid sequence of SEQ ID NO: 72 or SEQ ID NO:73, wherein the variant TCR β chain amino acid sequence retains its ability to specifically bind to an HA-1$^H$ antigen (e.g. the peptide shown in SEQ ID NO:10) when part of a binding protein described herein). In other words, a functional TCR β chain with one or several amino acid substitutions compared to the sequence of SEQ ID NO: 72 or SEQ ID NO:73 is also encompassed. As stated previously, the amino acid substitution may be a conservative amino acid substitution. The variability in sequence compared to SEQ ID NO:72 or SEQ ID NO:73 may all be in regions of the TCR β chain that do not form CDRs (i.e. the variant may have the CDRs of SEQ ID NO: 6 and SEQ ID NO: 7 and optionally SEQ ID NO: 86, and still have 25% (or less) sequence variability compared to SEQ ID NO:72 or SEQ ID NO:73. In other words, the sequence of the CDRs of SEQ ID NO: 72 or SEQ ID NO:73 may be retained whilst the rest of the sequence is varied, as appropriate within the "at least 75% identity" parameters specified above. Suitably, percent identity can be calculated as the percentage of identity to the entire length of the reference sequence (e.g. SEQ ID NO: 72 or SEQ ID NO:73 as appropriate).

As an example, the encoded TCR β chain may comprise an amino acid sequence having at least 75% (e.g. at least 75%, at least 80%, at least 85%, at least 90%, at least 95% etc) sequence identity to the amino acid sequence of SEQ ID NO: 72 or SEQ ID NO: 73, wherein the TCR β chain comprises a CDR3 having an amino acid sequence of SEQ ID NO: 6. In this example, the TCR β chain CDR1 may have an amino acid sequence of SEQ ID NO: 7 and the TCR β chain CDR2 may have an amino acid sequence of SEQ ID NO: 86.

In examples where the TCR β chain has the amino acid sequence of SEQ ID NO:72, the TCR β chain may be encoded by the nucleic acid sequence of SEQ ID NO:74 or SEQ ID NO:75, or a genetically degenerate sequence thereof (i.e. other nucleic acid sequences that encode the same protein as a result of the degeneracy of the genetic code). It is noted that SEQ ID NO:75 is the codon optimised version of the nucleic acid sequence for TCR Vβ domain of clone M7 (the non-optimised sequence being SEQ ID NO:74).

In examples where the TCR β chain has the amino acid sequence of SEQ ID NO:73, the TCR β chain may be encoded by the nucleic acid sequence of SEQ ID NO:76, or a genetically degenerate sequence thereof (i.e. other nucleic acid sequences that encode the same protein as a result of the degeneracy of the genetic code).

In a particular example, a nucleic acid composition described herein encodes an HA-1$^H$ antigen-specific binding protein having a TCR Vα domain with a CDR3 amino acid sequence comprising or consisting of the amino acid sequence of SEQ ID NO: 3; and a TCR Vβ domain having an amino acid sequence encoded by a TRBV7-9 gene, with a CDR3 comprising or consisting of the amino acid sequence of SEQ ID NO:6, and a CDR1 comprising or consisting of the amino acid sequence of SEQ ID NO: 7. The TRBV7-9 gene may be TRBV7-9*01. In addition, the HA-1$^H$ antigen may comprise or consist of the sequence shown in SEQ ID NO:10. Furthermore, the TCR Vα domain may be part of a TCR α chain having a constant domain and the TCR Vβ domain may be part of a TCR β chain having a constant domain.

In this particular example, the CDR3 of the Vα domain may be encoded by a nucleic acid sequence comprising the sequence of SEQ ID NO: 35 or SEQ ID NO:36; the CDR3 of the Vβ domain may be encoded by a nucleic acid sequence comprising the sequence of SEQ ID NO: 37 or SEQ ID NO:38; and the CDR1 of the Vβ. domain may be encoded by a nucleic acid sequence comprising the sequence of SEQ ID NO: 15 or SEQ ID NO:16.

In this particular example, the Vα domain may comprise an amino acid sequence having at least 90% sequence identity to, comprising, or consisting of, SEQ ID NO: 41; and the Vβ domain comprises an amino acid sequence having at least 90% sequence identity to, comprising, or consisting of, SEQ ID NO: 42. In one example, the Vα domain comprises the amino acid sequence of SEQ ID NO: 41 and the Vβ domain comprises the amino acid sequence of SEQ ID NO: 42. In such cases, the Vα domain may be encoded by a nucleic acid sequence comprising the sequence of SEQ ID NO: 43 or SEQ ID NO: 44; and the Vβ domain may be encoded by a nucleic acid sequence comprising the sequence of SEQ ID NO: 45 or SEQ ID NO:46.

In this particular example, the TCR Vα domain may include a CDR1 amino acid sequence comprising or consisting of the amino acid sequence of SEQ ID NO:8 and a CDR2 amino acid sequence comprising or consisting of the amino acid sequence of SEQ ID NO:28. Furthermore, the TCR Vβ domain may include a CDR2 amino acid sequence comprising or consisting of the amino acid sequence of SEQ ID NO: 86.

For the avoidance of doubt, this particular example encompasses components of TCR clone FK47.83 exemplified herein. The different components of TCR clone FK47.83 and their respective SEQ ID Nos are summarised in Table 3 below.

TABLE 3 component parts of clone FK47.83 with their respective SEQ ID Nos.

| SEQ ID NO | TCR COMPONENT | AA or NT |
|---|---|---|
| 8 | α CDR1 | AA |
| 9 | α CDR1 | NT |
| 27 | α CDR1 | NT co* |
| 28 | α CDR2 | AA |
| 39 | α CDR2 | NT |
| 40 | α CDR2 | NT co* |
| 3 | α CDR3 | AA |
| 35 | α CDR3 | NT |
| 36 | α CDR3 | NT co* |
| 7 | β CDR1 | AA |
| 15 | β CDR1 | NT |
| 16 | β CDR1 | NT co* |
| 86 | β CDR2 | AA |
| 87 | β CDR2 | NT |
| 88 | β CDR2 | NT co* |
| 6 | β CDR3 | AA |
| 37 | β CDR3 | NT |
| 38 | β CDR3 | NT co |
| 41 | α VJ | AA |
| 43 | α VJ | NT |
| 44 | α VJ | NT co |
| 42 | β VDJ | AA |
| 45 | β VDJ | NT |
| 46 | β VDJ | NT co |
| 67 | α VJ and constant | AA |
| 68 | α VJ and constant (murine) | AA |
| 69 | α VJ and constant | NT |
| 70 | α VJ and constant | NT co |
| 71 | α VJ and constant (murine) | NT co |
| 72 | β VJ and constant | AA |
| 73 | β VJ and constant (murine) | AA |
| 74 | β VJ and constant | NT |
| 75 | β VJ and constant | NT co |
| 76 | β VJ and constant (murine) | NT co |

Any of the TCR Vα domains (or TCR α chains) described herein can be combined with any of the TCR Vα domains (or TCR α chains).

a) Components of TCR Clone M2 Vα Domain with Components of TCR Clone M7 (or FK47.83) Vβ Domain.

For example, a nucleic acid composition described herein encodes an HA-1$^H$ antigen-specific binding protein having a TCR Vα domain with a CDR3 amino acid sequence comprising or consisting of the amino acid sequence of SEQ ID NO: 2; and a TCR Vβ domain having an amino acid sequence encoded by a TRBV7-9 gene, with a CDR3 comprising or consisting of the amino acid sequence of SEQ ID NO:4 (or SEQ ID NO:6), and a CDR1 comprising or consisting of the amino acid sequence of SEQ ID NO: 7. The TRBV7-9 gene may be TRBV7-9*03 (or TRBV7-9*01). In addition, the HA-1^H antigen may comprise or consist of the sequence shown in SEQ ID NO:10. Furthermore, the TCR Vα domain may be part of a TCR α chain having a constant domain and the TCR Vβ domain may be part of a TCR β chain having a constant domain.

In this particular example, the CDR3 of the Vα domain may be encoded by a nucleic acid sequence comprising the sequence of SEQ ID NO: 23 or SEQ ID NO:24, the CDR3 of the Vβ domain may be encoded by a nucleic acid sequence comprising the sequence of SEQ ID NO: 13 or SEQ ID NO:14 (or SEQ ID NO: 37 or SEQ ID NO:38); and the CDR1 of the Vβ domain may be encoded by a nucleic acid sequence comprising the sequence of SEQ ID NO: 15 or SEQ ID NO:16.

In this particular example, the Vα domain may comprise an amino acid sequence having at least 90% sequence identity to, comprising, or consisting of, SEQ ID NO: 29; and the Vβ domain comprises an amino acid sequence having at least 90% sequence identity to, comprising, or consisting of, SEQ ID NO: 18 (or SEQ ID NO:42). In one example, the Vα domain comprises the amino acid sequence of SEQ ID NO: 29 and the Vβ domain comprises the amino acid sequence of SEQ ID NO: 18 (or SEQ ID NO:42). In such cases, the Vα domain may be encoded by a nucleic acid sequence comprising the sequence of SEQ ID NO: 31 or SEQ ID NO: 32; and the Vβ domain may be encoded by a nucleic acid sequence comprising the sequence of SEQ ID NO: 21 or SEQ ID NO:22 (or SEQ ID NO:45 or SEQ ID NO: 46).

In this particular example, the TCR Vα domain may include a CDR1 amino acid sequence comprising or consisting of the amino acid sequence of SEQ ID NO:8 and a CDR2 amino acid sequence comprising or consisting of the amino acid sequence of SEQ ID NO:28. Furthermore, the TCR Vβ domain may include a CDR2 amino acid sequence comprising or consisting of the amino acid sequence of SEQ ID NO: 86.

b) Components of TCR Clone M7 Vα Domain with Components of TCR Clone M2 (or FK47.83) Vβ Domain.

For example, a nucleic acid composition described herein encodes an HA-1^H antigen-specific binding protein having a TCR Vα domain with a CDR3 amino acid sequence comprising or consisting of the amino acid sequence of SEQ ID NO: 1; and a TCR Vβ domain having an amino acid sequence encoded by a TRBV7-9 gene, with a CDR3 comprising or consisting of the amino acid sequence of SEQ ID NO:5 (or SEQ ID NO:6), and a CDR1 comprising or consisting of the amino acid sequence of SEQ ID NO: 7. The TRBV7-9 gene may be TRBV7-9*01. In addition, the HA-1^H antigen may comprise or consist of the sequence shown in SEQ ID NO:10. Furthermore, the TCR Vα domain may be part of a TCR α chain having a constant domain and the TCR Vβ domain may be part of a TCR β chain having a constant domain.

In this particular example, the CDR3 of the Vα domain may be encoded by a nucleic acid sequence comprising the sequence of SEQ ID NO: 11 or SEQ ID NO:12, the CDR3 of the Vβ domain may be encoded by a nucleic acid sequence comprising the sequence of SEQ ID NO: 25 or SEQ ID NO:26 (or SEQ ID NO: 37 or SEQ ID NO:38); and the CDR1 of the Vβ domain may be encoded by a nucleic acid sequence comprising the sequence of SEQ ID NO: 15 or SEQ ID NO:16.

In this particular example, the Vα domain may comprise an amino acid sequence having at least 90% sequence identity to, comprising, or consisting of, SEQ ID NO: 17; and the Vβ domain comprises an amino acid sequence having at least 90% sequence identity to, comprising, or consisting of, SEQ ID NO: 30 (or SEQ ID NO:42). In one example, the Vα domain comprises the amino acid sequence of SEQ ID NO: 17 and the Vβ domain comprises the amino acid sequence of SEQ ID NO: 30 (or SEQ ID NO:42). In such cases, the Vα domain may be encoded by a nucleic acid sequence comprising the sequence of SEQ ID NO: 19 or SEQ ID NO: 20; and the Vβ domain may be encoded by a nucleic acid sequence comprising the sequence of SEQ ID NO: 33 or SEQ ID NO:34 (or SEQ ID NO:45 or SEQ ID NO: 46).

In this particular example, the TCR Vα domain may include a CDR1 amino acid sequence comprising or consisting of the amino acid sequence of SEQ ID NO:80 and a CDR2 amino acid sequence comprising or consisting of the amino acid sequence of SEQ ID NO:83. Furthermore, the TCR Vβ domain may include a CDR2 amino acid sequence comprising or consisting of the amino acid sequence of SEQ ID NO: 86.

c) Components of TCR Clone FK47.8 Vα Domain with Components of TCR Clone M2 (or M7) Vβ Domain.

For example, a nucleic acid composition described herein encodes an HA-1^H antigen-specific binding protein having a TCR Vα domain with a CDR3 amino acid sequence comprising or consisting of the amino acid sequence of SEQ ID NO: 3; and a TCR Vβ domain having an amino acid sequence encoded by a TRBV7-9 gene, with a CDR3 comprising or consisting of the amino acid sequence of SEQ ID NO:5 (or SEQ ID NO:4), and a CDR1 comprising or consisting of the amino acid sequence of SEQ ID NO: 7. The TRBV7-9 gene may be TRBV7-9*01 (or TRBV7-9*03). In addition, the HA-1^H antigen may comprise or consist of the sequence shown in SEQ ID NO:10. Furthermore, the TCR Vα domain may be part of a TCR α chain having a constant domain and the TCR Vβ domain may be part of a TCR β chain having a constant domain.

In this particular example, the CDR3 of the Vα domain may be encoded by a nucleic acid sequence comprising the sequence of SEQ ID NO: 35 or SEQ ID NO:36, the CDR3 of the Vβ domain may be encoded by a nucleic acid sequence comprising the sequence of SEQ ID NO: 25 or SEQ ID NO:26 (or SEQ ID NO: 13 or SEQ ID NO:14); and the CDR1 of the Vβ domain may be encoded by a nucleic acid sequence comprising the sequence of SEQ ID NO: 15 or SEQ ID NO:16.

In this particular example, the Vα domain may comprise an amino acid sequence having at least 90% sequence identity to, comprising, or consisting of, SEQ ID NO: 41; and the Vβ domain comprises an amino acid sequence having at least 90% sequence identity to, comprising, or consisting of, SEQ ID NO: 30 (or SEQ ID NO:18). In one example, the Vα domain comprises the amino acid sequence of SEQ ID NO: 41 and the Vβ domain comprises the amino acid sequence of SEQ ID NO: 30 (or SEQ ID NO:18). In such cases, the Vα domain may be encoded by a nucleic acid sequence comprising the sequence of SEQ ID NO: 43 or SEQ ID NO: 44; and the Vβ domain may be encoded by a nucleic acid sequence comprising the sequence of SEQ ID NO: 33 or SEQ ID NO:34 (or SEQ ID NO:21 or SEQ ID NO: 22).

In this particular example, the TCR Vα domain may include a CDR1 amino acid sequence comprising or consisting of the amino acid sequence of SEQ ID NO:8 and a CDR2 amino acid sequence comprising or consisting of the amino acid sequence of SEQ ID NO:28. Furthermore, the TCR Vβ domain may include a CDR2 amino acid sequence comprising or consisting of the amino acid sequence of SEQ ID NO: 86.

As stated in more detail elsewhere herein, the nucleic acid composition described herein encodes both a TCR Vα domain and a TCR Vβ domain, which form the binding protein that is capable of specifically binding to the HA-1$^H$ antigen. In examples where the TCR Vα domain and the TCR Vβ domain are encoded by the same nucleic acid sequence, the TCR Vα domain and TCR Vβ domain may be joined together via a linker, e.g. a linker that enables expression of two proteins or polypeptides from the same vector. By way of example, a linker comprising a porcine teschovirus-1 2A (P2A) sequence may be used, such as 2A sequences from foot-and-mouth disease virus (F2A), equine rhinitis A virus (E2A) or *Thosea asigna* virus (T2A) as published by A. L. Szymczak et al., Nature Biotechnology 22, 589-594 (2004) or 2A-like sequences. 2A and 2A-like sequences are linkers that are cleavable once the nucleic acid molecule has been transcribed and translated. Another example of a linker is an internal ribosomal entry sites (IRES) which enables translation of two proteins or polypeptides from the same transcript. Any other appropriate linker may also be used. As a further example, the nucleic acid sequence encoding the TCR Vα domain and nucleic acid sequence encoding the TCR Vβ domain may be cloned into a vector with dual internal promoters (see e.g. S Jones et al., Human Gene Ther 2009). The identification of appropriate linkers and vectors that enable expression of both the TCR Vα domain and the TCR Vβ domain is well within the routine capabilities of a person of skill in the art.

Additional appropriate polypeptide domains may also be encoded by the nucleic acid sequences that encode the TCR Vα domain and/or the TCR Vβ domain. By way of example only, the nucleic acid sequence may comprise a membrane targeting sequence that provides for transport of the encoded polypeptide to the cell surface membrane of the modified cell. Other appropriate additional domains are well known and are described, for example, in WO2016/071758.

In one example, the nucleic acid composition described herein may encode a soluble TCR. For example, the nucleic acid composition may encode the variable domain of the TCR alpha and beta chains respectively together with an immune-modulator molecule such as a CD3 agonist (e.g. an anti-CD3 scFv). The CD3 antigen is present on mature human T cells, thymocytes and a subset of natural killer cells. It is associated with the TCR and is involved in signal transduction of the TCR. Antibodies specific for the human CD3 antigen are well known. One such antibody is the murine monoclonal antibody OKT3, which is the first monoclonal antibody approved by the FDA. Other antibodies specific for CD3 have also been reported (see e.g. WO2004/106380; U.S. Patent Application Publication No. 2004/0202657; U.S. Pat. No. 6,750,325). Immune mobilising mTCR Against Cancer (ImmTAC; Immunocore Limited, Milton Partk, Abington, Oxon, United Kingdom) are bifunctional proteins that combine affinity monoclonal T-cell receptor (mTCR) targeting with a therapeutic mechanism of action (i.e., an anti-CD3 scFv). In another example, a soluble TCR of the invention may be combined with a radioisotope or a toxic drug. Appropriate radioisotopes and/or toxic drugs are well known in the art and are readily identifiable by a person of ordinary skill in the art.

In one example, the nucleic acid composition may encode a chimeric single chain TCR wherein the TCR alpha chain variable domain is linked to the TCR beta chain variable domain and a constant domain which is e.g. fused to the CD3 zeta signalling domain. In this example, the linker is non-cleavable. In an alternative embodiment, the nucleic acid composition may encode a chimeric two chain TCR in which the TCR alpha chain variable domain and the TCR beta chain variable domain are each linked to a CD3 zeta signalling domain or other transmembrane and intracellular domains. Methods for preparing such single chain TCRs and two chain TCRs are well known in the art; see for example RA Willemsen et al, Gene Therapy 2000.

Vector Systems

A vector system is also provided which includes a nucleic acid composition described herein. The vector system may have one more vectors. As discussed previously, the binding protein components that are encoded by the nucleic acid composition may be encoded by one or more nucleic acid sequences in the nucleic acid composition. In examples where all of the binding protein components are encoded by a single nucleic acid sequence, the nucleic acid sequence may be present within a single vector (and thus the vector system described herein may comprise of one vector only). In examples where the binding protein components are encoded by two or more nucleic acid sequences (wherein the plurality of nucleic acid sequences, together, encode all of the components of the binding protein) these two or more nucleic acid sequences may be present within one vector (e.g. in different open reading frames of the vector), or may be distributed over two or more vectors. In this example, the vector system will comprise a plurality of distinct vectors (i.e. vectors with different nucleotide sequences).

Any appropriate vector can be used. By way of example only, the vector may be a plasmid, a cosmid, or a viral vector, such as a retroviral vector or a lentiviral vector. Adenovirus, adeno-associated virus, vaccinia virus, canary poxvirus, herpes virus, minicircle vectors and naked (synthetic) DNA/RNA may also be used (for details on minicircle vectors, see for example non-viral Sleeping Beauty transposition from minicircle vectors as published by R Monjezi, C Miskey, T Gogishvili, M Schleef, M Schmeer, H Einsele, Z Ivics and M Hudecek in Leukemia 2016). Alternatively, single stranded or double stranded DNA or RNA can be used to transfect lymphocytes with a TCR of interest (see Roth et al 2018 Nature vol 559; page 405).

As used herein, the term "vector" refers to a nucleic acid sequence capable of transporting another nucleic acid sequence to which it has been operably linked. The vector can be capable of autonomous replication or it can integrate into a host DNA. The vector may include restriction enzyme sites for insertion of recombinant DNA and may include one or more selectable markers or suicide genes. The vector can be a nucleic acid sequence in the form of a plasmid, a bacteriophage or a cosmid. Preferably the vector is suitable for expression in a cell (i.e. the vector is an "expression vector"). Preferably, the vector is suitable for expression in a human T cell such as a CD8$^+$ T cell or CD4$^+$ T cell. In certain aspects, the vector is a viral vector, such as a retroviral vector, a lentiviral vector or an adeno-associated vector. Optionally, the vector is selected from the group consisting of an adenovirus, vaccinia virus, canary poxvirus, herpes virus, minicircle vector and synthetic DNA or synthetic RNA.

Preferably the (expression) vector is capable of propagation in a host cell and is stably transmitted to future generations.

The vector may comprise regulatory sequences. "Regulatory sequences" as used herein, refers to, DNA or RNA elements that are capable of controlling gene expression. Examples of expression control sequences include promoters, enhancers, silencers, TATA-boxes, internal ribosomal entry sites (IRES), attachment sites for transcription factors, transcriptional terminators, polyadenylation sites etc. Optionally, the vector includes one or more regulatory sequences operatively linked to the nucleic acid sequence to be expressed. Regulatory sequences include those which direct constitutive expression, as well as tissue-specific regulatory and/or inducible sequences.

Optionally, the vector comprises the nucleic acid sequence of interest operably linked to a promoter. "Promoter", as used herein, refers to the nucleotide sequences in DNA to which RNA polymerase binds to start transcription. The promoter may be inducible or constitutively expressed. Alternatively, the promoter is under the control of a repressor or stimulatory protein. The promoter may be one that is not naturally found in the host cell (e.g. it may be an exogenous promoter). The skilled person in the art is well aware of appropriate promoters for use in the expression of target proteins, wherein the selected promoter will depend on the host cell.

"Operably linked" refers to a single or a combination of the below-described control elements together with a coding sequence in a functional relationship with one another, for example, in a linked relationship so as to direct expression of the coding sequence.

The vector may comprise a transcriptional terminator. "Transcriptional terminator" as used herein, refers to a DNA element, which terminates the function of RNA polymerases responsible for transcribing DNA into RNA. Preferred transcriptional terminators are characterized by a run of T residues preceded by a GC rich dyad symmetrical region.

The vector may comprise a translational control element. "Translational control element", as used herein, refers to DNA or RNA elements that control the translation of mRNA. Preferred translational control elements are ribosome binding sites. Preferably, the translational control element is from a homologous system as the promoter, for example a promoter and its associated ribozyme binding site. Preferred ribosome binding sites are known, and will depend on the chosen host cell.

The vector may comprise restriction enzyme recognition sites. "Restriction enzyme recognition site" as used herein, refers to a motif on the DNA recognized by a restriction enzyme.

The vector may comprise a selectable marker. "Selectable marker" as used herein, refers to proteins that, when expressed in a host cell, confer a phenotype onto the cell which allows a selection of the cell expressing said selectable marker gene. Generally this may be a protein that confers a new beneficial property onto the host cell (e.g. antibiotic resistance) or a protein that is expressed on the cell surface and thus accessible for antibody binding. Appropriate selectable markers are well known in the art.

Optionally, the vector may also comprise a suicide gene. "Suicide gene" as used herein, refers to proteins that induce death of the modified cell upon treatment with specific drugs. By way of example, suicide can be induced of cells modified by the herpes simplex virus thymidine kinase gene upon treatment with specific nucleoside analogs including ganciclovir, cells modified by human CD20 upon treatment with anti-CD20 monoclonal antibody and cells modified with inducible Caspase9 (iCasp9) upon treatment with AP1903 (reviewed by BS Jones, LS Lamb, F Goldman, A Di Stasi; Improving the safety of cell therapy products by suicide gene transfer. Front Pharmacol. (2014) 5:254. Appropriate suicide genes are well known in the art.

Preferably the vector comprises those genetic elements which are necessary for expression of the binding proteins described herein by a host cell. The elements required for transcription and translation in the host cell include a promoter, a coding region for the protein(s) of interest, and a transcriptional terminator.

A person of skill in the art will be well aware of the molecular techniques available for the preparation of (expression) vectors and how the (expression) vectors may be transduced or transfected into an appropriate host cell (thereby generating a modified cell described further below). The (expression) vector system described herein can be introduced into cells by conventional techniques such as transformation, transfection or transduction. "Transformation", "transfection" and "transduction" refer generally to techniques for introducing foreign (exogenous) nucleic acid sequences into a host cell, and therefore encompass methods such as electroporation, microinjection, gene gun delivery, transduction with retroviral, lentiviral or adeno-associated vectors, lipofection, superfection etc. The specific method used typically depends on both the type of vector and the cell. Appropriate methods for introducing nucleic acid sequences and vectors into host cells such as human cells are well known in the art; see for example Sambrook et al (1989) Molecular Cloning, A Laboratory Manual, Cold Spring Harbor Laboratory, Cold Spring Harbor, N.Y; Ausubel et al (1987) Current Protocols in Molecular Biology, John Wiley and Sons, Inc., NY; Cohen et al (1972) Proc. Natl. Acad. Sci. USA 69, 2110; Luchansky et al (1988) Mol. Microbiol. 2, 637-646. Further conventional methods that are suitable for preparing expression vectors and introducing them into appropriate host cells are described in detail in WO2016/071758 for example.

It is understood that it some examples, the host cell is contacted with the vector system (e.g. viral vector) in vitro, ex vivo, and in some examples, the host cell is contacted with the vector system (e.g. viral vector) in vivo.

The term "host cell" includes any cell into which the nucleic acid composition or vector system described herein may be introduced (e.g. transduced). Once a nucleic acid molecule or vector system has been introduced into the cell, it may be referred to as a "modified cell" herein. Once the nucleic acid molecule or vector is introduced into the host cell, the resultant modified cell should be capable of expressing the encoded binding protein (and e.g. correctly localising the encoded binding protein for its intended function e.g. transporting the encoded binding protein to the cell surface).

The term "modified cell" refers to a genetically altered (e.g. transformed or transfected) cell. The term refers to the particular subject cell and also to the progeny or potential progeny of such a cell. Because certain modifications may occur in succeeding generations due to either mutation or environmental influences, such progeny may not, in fact, be identical to the parent cell, but are still included within the scope of the term as used herein.

The host cell (and thus the modified cell) is typically a eukaryotic cell, and particularly a human cell (e.g. a T cell such as a $CD8^+$ T cell or a $CD4^+$ T cell, or a mixture thereof). The host cell (and thus the modified cell) may be an allogeneic cell (e.g. an allogeneic T cell such as a $CD8^+$ T cell or a $CD4^+$ T cell, or a mixture thereof), which refers to a cell derived from the different individual to the individual to which it is later administered. In other words, the host cell (and thus the modified cell) may be an isolated T cell from a distinct individual compared to the subject to be treated.

The host cell (and thus the modified cell) may be any cell that is able to confer anti-tumour immunity after TCR gene transfer. Non limiting examples of appropriate cells include autologous or allogeneic a CD8 T cell, a CD4 T cell, Natural Killer (NK) cells, NKT cells, gamma-delta T cells, hematopoietic stem cells or other progenitor cells and any other autologous or allogeneic cell or cell line (NK-92 for example or T cell lines) that is able to confer anti-tumor immunity after TCR gene transfer.

In the context of the methods of treatment described herein, the host cell (and thus the modified cell) is typically for administration to a HLA-A*0201 positive human subject. In view of this, the host cell (and thus the modified cell) is typically HLA-A*0201 negative and/or HA-$1^H$ negative (I.e. it does not express both HLA-A*0201 and HA-$1^H$).

Advantageously, the modified cell is capable of expressing the binding protein encoded by the nucleic acid composition or vector system described herein (i.e. the TCR component parts) such that the modified cell provides an immunotherapy that specifically targets haematological malignancies, and thus can be used to treat or prevent a relapse of a haematological malignancy after allogeneic stem cell transplantation (allo-SCT) in a HLA-A*0201 positive human subject. More details on this use are given below.

Pharmaceutical Compositions

A nucleic acid composition, vector system or modified cell described herein may be provided as part of a pharmaceutical composition. Advantageously, such compositions may be administered to a human subject having a haematological malignancy after allogeneic stem cell transplantation (allo-SCT) to treat or prevent a relapse (e.g. by inducing or enhancing an HA-$1^H$ antigen target specific immune response).

A pharmaceutical composition may comprise a nucleic acid composition, vector system or modified cell described herein along with a pharmaceutically acceptable excipient, adjuvant, diluent and/or carrier.

Compositions may routinely contain pharmaceutically acceptable concentrations of salt, buffering agents, preservatives, compatible carriers, supplementary immune potentiating agents such as adjuvants and cytokines and optionally other therapeutic agents or compounds.

As used herein, "pharmaceutically acceptable" refers to a material that is not biologically or otherwise undesirable, i.e., the material may be administered to an individual along with the selected nucleic acid composition, vector system or modified cell without causing any undesirable biological effects or interacting in a deleterious manner with any of the other components of the pharmaceutical composition in which it is contained.

Excipients are natural or synthetic substances formulated alongside an active ingredient (e.g. a nucleic acid sequence, vector, modified cell or isolated peptide as provided herein), included for the purpose of bulking-up the formulation or to confer a therapeutic enhancement on the active ingredient in the final dosage form, such as facilitating drug absorption or solubility. Excipients can also be useful in the manufacturing process, to aid in the handling of the active substance concerned such as by facilitating powder flowability or non-stick properties, in addition to aiding in vitro stability such as prevention of denaturation over the expected shelf life. Pharmaceutically acceptable excipients are well known in the art. A suitable excipient is therefore easily identifiable by one of ordinary skill in the art. By way of example, suitable pharmaceutically acceptable excipients include water, saline, aqueous dextrose, glycerol, ethanol, and the like.

Adjuvants are pharmacological and/or immunological agents that modify the effect of other agents in a formulation. Pharmaceutically acceptable adjuvants are well known in the art. A suitable adjuvant is therefore easily identifiable by one of ordinary skill in the art.

Diluents are diluting agents. Pharmaceutically acceptable diluents are well known in the art. A suitable diluent is therefore easily identifiable by one of ordinary skill in the art.

Carriers are non-toxic to recipients at the dosages and concentrations employed and are compatible with other ingredients of the formulation. The term "carrier" denotes an organic or inorganic ingredient, natural or synthetic, with which the active ingredient is combined to facilitate the application. Pharmaceutically acceptable carriers are well known in the art. A suitable carrier is therefore easily identifiable by one of ordinary skill in the art.

Treatment of a Subject

Pharmaceutical compositions described herein may advantageously be used to treat or prevent a relapse of a haematological malignancy after allogeneic stem cell transplantation (allo-SCT) in a HLA-A*0201 positive human subject.

In one example, the method of treatment or prevention of a relapse of a haematological malignancy described herein results in an induced or enhanced immune response (e.g. a cell mediated response) in the subject (e.g. a targeted immune response to malignant cells that present the HA-$1^H$-HLA-A*0201 restricted peptide).

The phrase "induced or enhanced immune response" refers to an increase in the immune response (e.g. a cell mediated immune response such as a T cell mediated immune response) of the subject during or after treatment compared to their immune response prior to treatment. An "induced or enhanced" immune response therefore encompasses any measurable increase in the immune response that is directly or indirectly targeted to the haematological malignancy being treated (or prevented).

A person of skill in the art will be fully aware of haematological malignancies that may be may be treated in accordance with the invention. By way of example, appropriate haematological malignancies include leukemia, lymphoma, myelodysplastic disorder, or myeloma.

For example, when the haematological malignancy comprises a leukemia, the leukemia may be acute myeloid leukemia (AML), acute lymphocytic leukemia (ALL), mixed phenotype acute leukemia (MPAL), chronic myeloid leukemia (CML), B cell prolymphocytic leukemia, hairy cell leukemia, or chronic lymphocytic leukemia (CLL).

As another example, when the haematological malignancy comprises a lymphoma, the lymphoma may be Hodgkin's lymphoma (HL), non-Hodgkin's lymphoma (NHL), a central nervous system lymphoma, small lymphocytic lymphoma (SLL), CD37+ dendritic cell lymphoma, lymphoplasmacytic lymphoma, splenic marginal zone lymphoma, extra-nodal marginal zone B-cell lymphoma of mucosa-associated (MALT) lymphoid tissue, nodal marginal zone B-cell lymphoma, follicular lymphoma, mantle cell lymphoma, diffuse large B-cell lymphoma, mediastinal (thymic) large B-cell lymphoma, precursor B-lymphoblastic lymphoma, immunoblastic large cell lymphoma, intravascular large B-cell lymphoma, primary effusion lymphoma, or Burkitt's lymphoma.

As a further example, when the hematological malignancy comprises a myelodysplastic disorder, the myelodysplastic disorder may be refractory cytopenia with unilineage dysplasia (refractory anemia, refractory neutropenia, and refractory thrombocytopenia), refractory anemia with ring sideroblasts (RARS), refractory anemia with ring sideroblasts-thrombocytosis (RARS-t), refractory cytopenia with multinieage dysplasia (RCMD), refractory cytopenia with multilineage dysplasia and ring sideroblasts (RCMD-RS), refractory anemia with excess blasts (RAEB), myelodysplasia unclassifiable, or refractory cytopenia of childhood.

In certain instances, the subject has previously received lymphodepleting chemotherapy, for example an lymphodepleting chemotherapy comprising cyclophosphamide, fludarabine, anti-thymocyte globulin, or a combination thereof.

Typically, the modified cells that are administered to the subject are allogeneic.

As used herein, the terms "treat", "treating" and "treatment" are taken to include an intervention performed with the intention of preventing the development or altering the pathology of a condition, disorder or symptom (i.e. in this case a haematological malignancy). Accordingly, "treatment" refers to both therapeutic treatment and prophylactic or preventative measures, wherein the object is to prevent or slow down (lessen) the targeted condition, disorder or symptom. "Treatment" therefore encompasses a reduction, slowing or inhibition of the amount or concentration of malignant cells, for example as measured in a sample obtained from the subject, of at least 5%, 10%, 20%, 30%, 40%, 50%, 60%, 70%, 80%, 90% or 100% when compared to the amount or concentration of malignant cells before treatment. Methods of measuring the amount or concentration of malignant cells include, for example, qRT-PCR, and quantification of haematological malignancy specific biomarkers in a sample obtained from the subject.

As used herein the term "subject" refers to an individual, e.g., a human, having or at risk of having a specified condition, disorder or symptom. The subject may be a patient i.e. a subject in need of treatment in accordance with the invention. The subject may have received treatment for the condition, disorder or symptom. Alternatively, the subject has not been treated prior to treatment in accordance with the present invention.

The compositions described herein can be administered to the subject by any conventional route, including injection or by gradual infusion over time. The administration may, for example, be by infusion or by intramuscular, intravascular, intracavity, intracerebral, intralesional, rectal, subcutaneous, intradermal, epidural, intrathecal, percutaneous administration.

The compositions described herein may be in any form suitable for the above modes of administration. For example, compositions comprising modified cells may in any form suitable for infusion. As further examples, suitable forms for parenteral injection (including, subcutaneous, intramuscular, intravascular or infusion) include a sterile solution, suspension or emulsion. Alternatively, the route of administration may be by direct injection into the target area, or by regional delivery or by local delivery. The identification of suitable dosages of the compositions of the invention is well within the routine capabilities of a person of skill in the art.

Advantageously, the compositions described herein may be formulated for use in T cell receptor (TCR) gene transfer, an approach that is rapid, reliable and capable of generating large quantities of T cells with specificity for the HA-1$^H$ antigenic peptide (e.g. the peptide shown in SEQ ID NO:10), regardless of the patient's pre-existing immune repertoire. Using TCR gene transfer, modified allogeneic cells suitable for infusion may be generated within a few days.

The compositions described herein are for administration in an effective amount. An "effective amount" is an amount that alone, or together with further doses, produces the desired (therapeutic or non-therapeutic) response. The effective amount to be used will depend, for example, upon the therapeutic (or non-therapeutic) objectives, the route of administration, and the condition of the patient/subject. For example, the suitable dosage of the composition of the invention for a given patient/subject will be determined by the attending physician (or person administering the composition), taking into consideration various factors known to modify the action of the composition of the invention for example severity and type of haematological malignancy, body weight, sex, diet, time and route of administration, other medications and other relevant clinical factors. The dosages and schedules may be varied according to the particular condition, disorder or symptom the overall condition of the patient/subject. Effective dosages may be determined by either in vitro or in vivo methods.

The pharmaceutical compositions described herein are advantageously presented in unit dosage form.

Methods of Generating TCRs

A method of generating a binding protein that is capable of specifically binding to a peptide containing an HA-1$^H$ antigen and does not bind to a peptide that does not contain an HA-1$^H$ antigen is also provided, comprising contacting a nucleic acid composition (or vector system) described herein with a cell under conditions in which the nucleic acid composition is incorporated and expressed by the cell.

The method may be carried out on the host cell ex vivo or in vitro. Alternatively, the method may be performed in vivo, wherein the nucleic acid composition (or vector system) is administered to the subject and is contacted with the host cell in vivo, under conditions in which the nucleic acid sequence is incorporated and expressed by the host cell to generate the binding protein. In one example, the method is not a method of treatment of the human or animal body.

Appropriate in vivo, in vitro and ex vivo methods for contacting a nucleic acid sequence (or vector systems) with a host cell under conditions in which the nucleic acid sequence (or vector) is incorporated and expressed by the cell are well known, as described elsewhere herein.

General Definitions

As used herein "nucleic acid sequence", "polynucleotide", "nucleic acid" and "nucleic acid molecule" are used interchangeably to refer to an oligonucleotide sequence or polynucleotide sequence. The nucleotide sequence may be of genomic, synthetic or recombinant origin, and may be double-stranded or single-stranded (representing the sense or antisense strand). The term "nucleotide sequence" includes genomic DNA, cDNA, synthetic DNA, and RNA (e.g. mRNA) and analogs of the DNA or RNA generated, e.g., by the use of nucleotide analogs.

As used herein, "isolated nucleic acid sequence" or "isolated nucleic acid composition" refers to a nucleic acid sequence that is not in its natural environment when it is linked to its naturally associated sequence(s) that is/are also in its/their natural environment. In other words, an isolated nucleic acid sequence/composition is not a native nucleotide sequence/composition, wherein "native nucleotide sequence/composition" means an entire nucleotide sequence that is in its native environment and when operatively linked to an entire promoter with which it is naturally associated, which promoter is also in its native environment. Such a nucleic acid could be part of a vector and/or such nucleic acid or polypeptide could be part of a composition {e.g., a cell lysate), and still be isolated in that such vector or composition is not part of the natural environment for the nucleic acid or polypeptide. The term "gene" means the segment of DNA involved in producing a polypeptide chain; it includes regions preceding and following the coding region ("leader and trailer") as well as intervening sequences (introns) between individual coding segments (exons).

As used herein "specifically binds" or "specific for" refers to an association or union of a binding protein (e.g., TCR receptor) or a binding domain (or fusion protein thereof) to a target molecule with an affinity or $K_a$ (i.e., an equilibrium association constant of a particular binding interaction with units of 1/M) equal to or greater than $10^5 M^{-1}$ (which equals the ratio of the on-rate [$k_{on}$] to the off-rate [$k_{off}$] for this association reaction), while not significantly associating or uniting with any other molecules or components in a sample. Binding proteins or binding domains (or fusion proteins thereof) may be classified as "high affinity" binding proteins or binding domains (or fusion proteins thereof) or as "low affinity" binding proteins or binding domains (or fusion proteins thereof). "High affinity" binding proteins or binding domains refer to those binding proteins or binding domains having a $K_a$ of at least $10^7 M^{-1}$, at least $10^8 M^{-1}$, at least $10^9 M^{-1}$, at least $10^{10} M^{-1}$, at least $10^{11} M^{-1}$, at least $10^{12} M^{-1}$, or at least $10^{13}$ M. Low affinity" binding proteins or binding domains refer to those binding proteins or binding domains having a $K_a$ of up to $10^7 M^{-1}$, up to $10^6 M^{-1}$, up to $10^5 M^{-1}$. Alternatively, affinity can be defined as an equilibrium dissociation constant ($K_d$) of a particular binding interaction with units of M (e.g., $10^{-5}$ M to $10^{-13}$ M).

In certain embodiments, a receptor or binding domain may have "enhanced affinity," which refers to selected or engineered receptors or binding domains with stronger binding to a target antigen than a wild type (or parent) binding domain. For example, enhanced affinity may be due to a $K_a$ (equilibrium association constant) for the target antigen that is higher than the wild type binding domain, due to a $K_d$ (dissociation constant) for the target antigen that is less than that of the wild type binding domain, due to an off-rate ($k_{off}$) for the target antigen that is less than that of the wild type binding domain, or a combination thereof. In certain embodiments, enhanced affinity TCRs can be codon optimized to enhance expression in a particular host cell, such as a cell of the immune system, a hematopoietic stem cell, a T cell, a primary T cell, a T cell line, a K cell, or a natural killer T cell (Scholten et al, Clin. Immunol. 119: 135, 2006). The T cell can be a CD4+ or a CD8+ T cell.

As used herein, the term "HA-1$^H$ antigen" or "HA-1$^H$ peptide antigen" or "HA-1$^H$-containing peptide antigen" (or "minor HA-1<H>antigen" or "minor HA-1$^H$ peptide antigen" or "minor HA-1$^H$-containing peptide antigen" or "minor Histocompatibility HA-1$^H$ antigen peptide") refers to a naturally or synthetically produced peptide portion of a HMHA1 protein ranging in length from about 7 amino acids, about 8 amino acids, about 9 amino acids, about 10 amino acids, up to about 20 amino acids, and comprising the R139H substitution polymorphism), which can form a complex with a MHC (e.g., HLA) molecule, and a binding protein of this disclosure specific for a HA-1$^H$ peptide:MHC (e.g., HLA) complex can specifically bind to such as complex. An exemplary HA-1$^H$ HA-1 peptide antigen comprises a peptide having the amino acid VLHDDLLEA (SEQ ID NO: 10), wherein the bolded histidine in the sequence represents the R139H polymorphism.

The term "HA-1$^H$-specific binding protein," as used herein, refers to a protein or polypeptide, such as a TCR or CAR, that specifically binds to an HA-1$^H$ peptide antigen (or to an HA-1$^H$ peptide antigen:HLA complex, e.g., on a cell surface), and does not bind an HMHA peptide that does not contain the HA-1$^H$ polymorphism (e.g., a peptide comprising the amino acid sequence shown in SEQ ID NO:79) and does not bind to an HLA complex containing such an HMHA peptide.

In certain embodiments, a HA-1$^H$-specific binding protein specifically binds to an HA-1-containing peptide (or an HA-1$^H$ peptide:HLA complex) with a Kd of less than about $10^{-8}$ M, less than about $10^{-9}$ M, less than about $10^{-10}$ M, less than about $10^{-11}$ M, less than about $10^{-12}$ M, or less than about $10^{-13}$ M, or with an affinity that is about the same as, at least about the same as, or is greater than at or about the affinity exhibited by an exemplary HA-1-specific binding protein provided herein, such as any of the HA-1$^H$-specific TCRs provided herein, for example, as measured by the same assay. In certain embodiments, a HA-1-specific binding protein comprises a HA-1-specific immunoglobulin superfamily binding protein or binding portion thereof.

The selective binding may be in the context of HA-1$^H$ antigen presentation by HLA-A*02:01. In other words, in certain embodiments, a binding protein that "specifically binds to an HA-1$^H$ antigen" may only do so when it is being presented (i.e. it is bound by) HLA-A*02:01, or is in an equivalent structural formation as when it is being presented by HLA-A*02:01.

A "non-essential" (or "non-critical") amino acid residue is a residue that can be altered from the wild-type sequence of (e.g., the sequence identified by SEQ ID NO herein) without abolishing or, more preferably, without substantially altering a biological activity, whereas an "essential" (or "critical") amino acid residue results in such a change. For example, amino acid residues that are conserved are predicted to be particularly non-amenable to alteration, except that amino acid residues within the hydrophobic core of domains can generally be replaced by other residues having approximately equivalent hydrophobicity without significantly altering activity.

A "conservative amino acid substitution" is one in which the amino acid residue is replaced with an amino acid residue having a similar side chain. Families of amino acid residues having similar side chains have been defined in the art. These families include amino acids with basic side chains (e.g., lysine, arginine, histidine), acidic side chains (e.g., aspartic acid, glutamic acid), uncharged polar side chains (e.g., glycine, asparagine, glutamine, serine, threonine, tyrosine, cysteine), non-polar side chains (e.g., alanine, valine, leucine, isoleucine, proline, phenylalanine, methionine, tryptophan), beta-branched side chains (e.g., threonine, valine, isoleucine) and aromatic side chains (e.g., tyrosine, phenylalanine, tryptophan, histidine). Thus, a nonessential (or non-critical) amino acid residue in a protein is preferably replaced with another amino acid residue from the same side chain family. Alternatively, in another embodiment, mutations can be introduced randomly, and the resultant mutants can be screened for activity to identify mutants that retain activity.

Calculations of sequence homology or identity (the terms are used interchangeably herein) between sequences are performed as follows.

To determine the percent identity of two amino acid sequences, or of two nucleic acid sequences, the sequences are aligned for optimal comparison purposes (e.g., gaps can be introduced in one or both of a first and a second amino acid or nucleic acid sequence for optimal alignment and non-homologous sequences can be disregarded for comparison purposes). In a preferred embodiment, the length of a reference sequence aligned for comparison purposes is at least 30%, preferably at least 40%, more preferably at least 50%, even more preferably at least 60%, and even more preferably at least 70%, 75%, 80%, 82%, 84%, 85%, 86%, 87%, 88%, 89%, 90%, 91%, 92%, 93%, 94%, 95%, 96%, 97%, 98%, 99%, or 100% of the length of the reference sequence. The amino acid residues or nucleotides at corresponding amino acid positions or nucleotide positions are then compared. When a position in the first sequence is occupied by the same amino acid residue or nucleotide as the corresponding position in the second sequence, then the molecules are identical at that position (as used herein amino acid or nucleic acid "identity" is equivalent to amino acid or nucleic acid "homology"). The percent identity between the two sequences is a function of the number of identical positions shared by the sequences, taking into account the number of gaps, and the length of each gap, which need to be introduced for optimal alignment of the two sequences.

The comparison of sequences and determination of percent identity between two sequences can be accomplished using a mathematical algorithm. In a preferred embodiment, the percent identity between two amino acid sequences is determined using the Needleman et al. (1970) *J. Mol. Biol.* 48:444-453) algorithm which has been incorporated into the GAP program in the GCG software package (available at http://www.gcg.com), using either a BLOSUM 62 matrix or a PAM250 matrix, and a gap weight of 16, 14, 12, 10, 8, 6, or 4 and a length weight of 1, 2, 3, 4, 5, or 6. In yet another preferred embodiment, the percent identity between two nucleotide sequences is determined using the GAP program in the GCG software package (available at http://www.gcg.com), using a NWSgapdna.CMP matrix and a gap weight of 40, 50, 60, 70, or 80 and a length weight of 1, 2, 3, 4, 5, or 6. A particularly preferred set of parameters (and the one that should be used if the practitioner is uncertain about what parameters should be applied to determine if a molecule is within a sequence identity or homology limitation of the invention) are a BLOSUM 62 scoring matrix with a gap penalty of 12, a gap extend penalty of 4, and a frameshift gap penalty of 5.

Alternatively, the percent identity between two amino acid or nucleotide sequences can be determined using the algorithm of Meyers et al. (1989) *CAB/OS* 4:11-17) which has been incorporated into the ALIGN program (version 2.0), using a PAM120 weight residue table, a gap length penalty of 12 and a gap penalty of 4.

The nucleic acid and protein sequences described herein can be used as a "query sequence" to perform a search against public databases to, for example, identify other family members or related sequences. Such searches can be performed using the NBLAST and XBLAST programs (version 2.0) of Altschul, et al. (1990) *J. Mol. Biol.* 215: 403-410). BLAST nucleotide searches can be performed with the NBLAST program, score=100, wordlength=12 to obtain nucleotide sequences homologous to nucleic acid molecules of the invention. BLAST protein searches can be performed with the XBLAST program, score=50, wordlength=3 to obtain amino acid sequences homologous to protein molecules of the invention. To obtain gapped alignments for comparison purposes, gapped BLAST can be utilized as described in Altschul et al. (1997, *Nucl. Acids Res.* 25:3389-3402). When using BLAST and gapped BLAST programs, the default parameters of the respective programs (e.g., XBLAST and NBLAST) can be used. See National Library of Medicine: National Center for Biotechnology Information.

The polypeptides and nucleic acid molecules described herein can have amino acid sequences or nucleic acid sequences sufficiently or substantially identical to the sequences identified by SEQ ID NO. The terms "sufficiently identical" or "substantially identical" are used herein to refer to a first amino acid or nucleotide sequence that contains a sufficient or minimum number of identical or equivalent (e.g. with a similar side chain) amino acid residues or nucleotides to a second amino acid or nucleotide sequence such that the first and second amino acid or nucleotide sequences have a common structural domain or common functional activity. In other words, amino acid sequences or nucleic acid sequences having one or several (e.g. two, three, four etc) amino acid or nucleic acid substitutions compared to the corresponding sequences identified by SEQ ID NO may be sufficiently or substantially identical to the sequences identified by SEQ ID NO (provided that they retain the requisite functionality). In such examples, the one or several (e.g. two, three, four etc) amino acid or nucleic acid substitutions may be conservative substitutions. For example, amino acid or nucleotide sequences that contain a common structural domain having at least about 60%, or 65% identity, likely 75% identity, more likely 85%, 90%, 91%, 92%, 93%, 94%, 95%, 96%, 97%, 98% or 99% identity are defined herein as sufficiently or substantially identical.

TCR sequences are defined according to IMGT. See the LeFranc references herein for further details i.e. [1] Lefranc M.-P. "Unique database numbering system for immunogenetic analysis" Immunology Today, 18: 509 (1997). [2] Lefranc M.-P. "The IMGT unique numbering for immunoglobulins, T cell Receptors and Ig-like domains" The immunologist, 7, 132-136 (1999). [3] Lefranc M.-P. et al. "IMGT unique numbering for immunoglobulin and Tcell receptor variable domains and Ig superfamily V-like domains" Dev. Comp. Immunol., 27, 55-77 (2003). [4] Lefranc M.-P. et al. "IMGT unique numbering for immunoglobulin and T cell receptor constant domains and Ig superfamily C-like domains" Dev. Comp. Immunol., 2005, 29, 185-203 PMID: 15572068.

Aspects of the invention are demonstrated by the following non-limiting examples.

EXAMPLES

TCR gene transfer is an attractive strategy to modify T-cells with well-defined specificities in a short time period. Recently, the effectiveness of TCR transfer was demonstrated in patients with melanoma or synovial cell sarcoma that were treated with TCR-modified autologous T-cells. To engineer T-cells that exert selective GvL without GvHD, we prefer to transfer the HA-1-TCR. To broaden the applicability of adoptive T-cell therapy in hematological malignancies, we started a clinical study using HA-1-TCR transferred virus-specific T-cells. We sequenced the TCR chains of 3 HA-1 specific T cell clones M2, M7, and FK47.83 (Table 4).

TABLE 4

Sequence of HA-1-TCRs of clones M2, M7 and FK47.83.

| clone | | CDR3 (aa C-F) | CDR3 (nt C-F) | V (IMGT) | J (IMGT) | C |
|---|---|---|---|---|---|---|
| M2 | α | SEQ ID NO: 2 | SEQ ID NO: 23 | TRAV13-1*02 | TRAJ28*01 | |
| | β | SEQ ID NO: 5 | SEQ ID NO: 25 | TRBV7-9*01 | TRBJ1-1*01 | TRBC1 |
| M7 | α | SEQ ID NO: 1 | SEQ ID NO: 11 | TRAV25*01 | TRAJ9*01 | |
| | β | SEQ ID NO: 4 | SEQ ID NO: 13 | TRBV7-9*03 | TRBJ1-5*01 | TRBC1 |
| FK47.83 | α | SEQ ID NO: 3 | SEQ ID NO: 35 | TRAV13-1*02 | TRAJ47*01 | |
| | β | SEQ ID NO: 6 | SEQ ID NO: 37 | TRBV7-9*01 | TRBJ2-1*01 | TRBC2 |

As was already previously described we observed again that all the 3 HA-1 specific T cell clones expressed a beta chain with a similar V region (TRBV7-9) (4). LZRS retroviral constructs were generated encoding the TCR alpha and beta chains of M2 and M7. The HA-1-TCRβ chain of M7 was also cloned into the retroviral vector MP71. The TCRα chains were linked via IRES with the marker eGFP, and the TCRβ chains were linked via IRES with the marker truncated nerve growth factor receptor (NGF-R). Both HA-1-TCR chains were also linked with a T2A sequence and expressed in either the pLZRS vector combined with NGF-R or in the MP71 vector without marker genes. MP71 constructs encoding for codon optimized and cysteine modified HA-1-TCRs were also generated.

Figure 1:
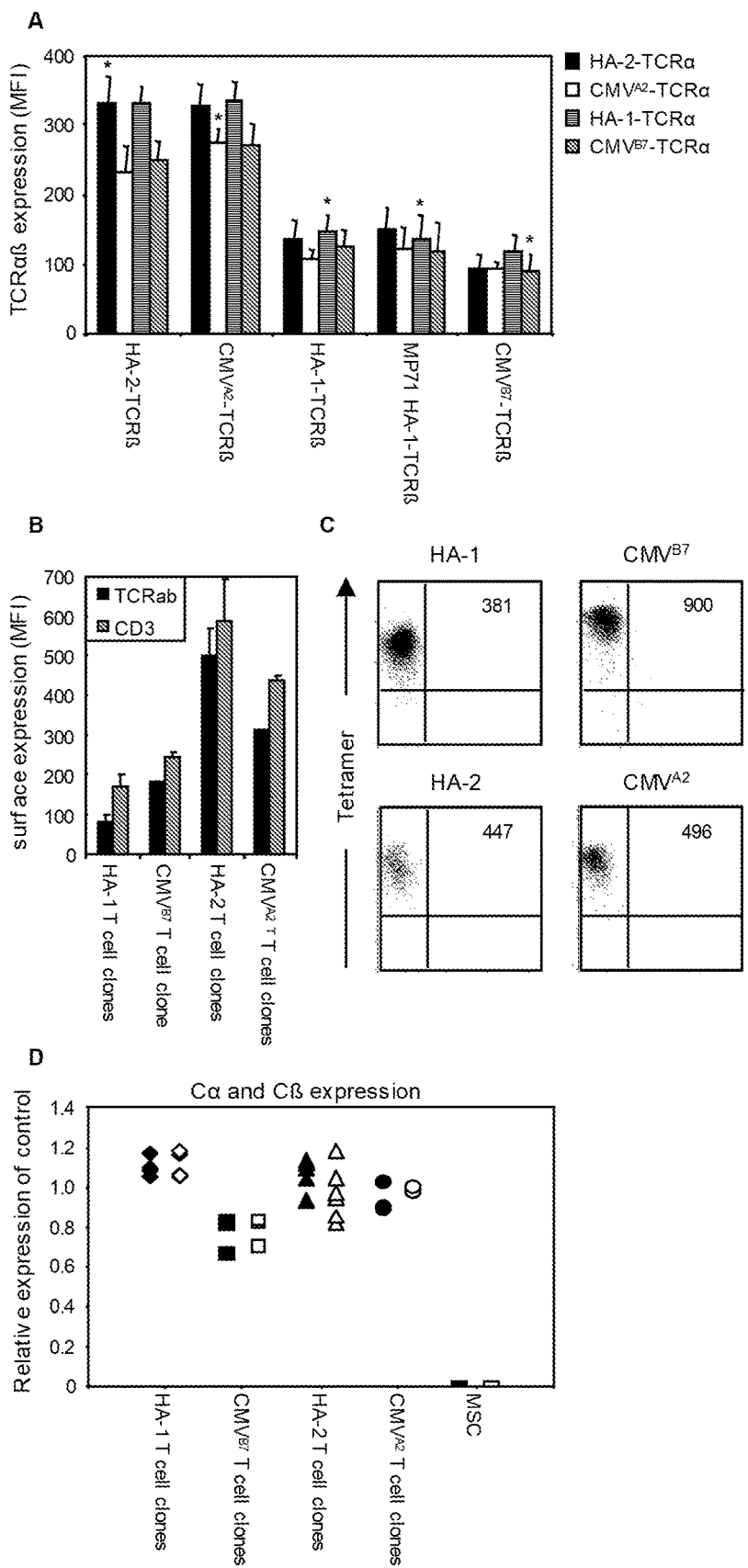
FIG. 1 shows low HA-1-TCR cell surface expression due to intrinsic properties of the HA-1-TCRß chain. (A) The pairing properties of HA-1-TCRα and ß chains were analyzed by transducing the J76 cells with combinations of the HA-1-TCRα or TCRβ chains with 14 other antigen-specific TCRα and TCRß chains. TCR cell surface expression of these different combinations was measured by staining with anti-TCRαß mAbs and analyzing eGFP/NGF-R double positive J76 cells using flow cytometry 5 days after transduction. Here depicted are the mean fluorescence intensity (MFI) of the TCRαß expression of all the TCRα chains of the HA-2-, HA-1-, CMV$^{B7}$, and CMV$^{A2}$-specific TCRs combined with all the TCRß chains of these TCRs. All TCR chains are encoded by pLZRS retroviral vectors with the exception of the HA-1-TCRß chain that is in addition also encoded, as indicated, by the MP71 retroviral vector. Non td J76 cells showed little background staining with anti-TCRαß mAbs (MFI=16). Parental TCR combinations are indicated with an asterisk. (B) Several T-cell clones including 5 different HA-1-specific T-cell clones, 6 different HA-2-specific T-cell clones, and 2 different CMV-A2-specific T-cell clones were stained with anti-TCRαß and anti-CD3 mAbs and analyzed using flow cytometry. MFIs shown are means of the different T-cell clones. (C) The different T-cell clones were stained with their respective tetramers and MFI is depicted in the dot plots. (D) mRNA levels of TCRα (closed symbols) and TCRβ chains (open symbols) were analyzed for the different T-cell clones using q-RT-PCR. As a negative control, cDNA of MSCs was included. Staining was performed in duplicate, and data shown are representative for 2 independent experiments.

Based on the low cell surface expression of HA-1-TCRs after gene transfer as described by us (3), we investigated whether this low expression was due to the inability of the TCR chains to pair efficiently with each other or due to intrinsic properties of the TCR chains. TCRαβ-deficient J76 cells were transduced (td) with individual HA-1-TCRα and HA-1-TCRβ chains in combination with 17 different TCRα and TCRβ chains and TCR cell surface expression was measured using anti-TCRαβ mAbs. In FIG. 1A, TCR cell surface expression is shown for HA-1-TCRαβ, CMV$^{B7}$-TCRαβ, HA-2-TCRαβ, CMV$^{A2}$-TCRαβ and mixed TCRα and β chain combinations. HA-2-TCRαβ td J76 cells (MFI 330) and CMV$^{A2}$-TCRαβ td J76 cells (MFI 274) demonstrated high TCR expression. TCR expression of HA-1-TCRαβ td J76 cells (MFI 129) was low compared to HA-2-TCRαβ td J76 cells. Moreover, no restored TCR cell surface expression was observed when J76 cells were transduced with combinations of the HA-1-TCRβ with either the HA-2- or CMV$^{A2}$-TCRα (FIG. 1A). In addition, no restored TCR expression could be observed in any of the transductions of the HA-1-TCRβ chain with one of the 14 other TCRα chains (data not shown). In contrast, the HA-1-TCRα chain in combination with HA-2- or CMV$^{A2}$-TCRβ chains resulted in comparable TCR cell surface expression as parental HA-2- and CMV$^{A2}$-TCR complexes, indicating that reduced HA-1-TCR cell surface expression was not due to the HA-1-TCRα chain but due to the HA-1-TCRβ chain.

Since the TCR cell surface expression of the HA-1-TCRβ with all 14 other TCRα chains tested remained low we concluded that low HA-1-TCR cell surface expression was not due to inefficient pairing of specifically the HA-1-TCRα with the HA-1-TCR1β chain. To exclude that the LZRS vector used to introduce the TCR chains caused selectively low expression of the HA-1-TCR, the HA-1-TCRβ gene was inserted into the MP71 vector which was described to mediate high transgene expression. As can be seen in FIG. 1A, HA-1-TCR cell surface expression was not improved using the MP71 vector encoding the HA-1-TCRβ chain, indicating that the low HA-1-TCR cell surface expression of td J76 cells was not due to vector specific properties. To investigate whether transfer of the HA-1-TCRβ chain resulted in low cell surface expression due to sequence specific properties of the always identical variable region of the HA-1-TRBV7-9 chain, cell surface expression of the CMV$^{B7}$-TCRβ with an identical variable TRBV7-9 as the HA-1-TCRβ chain but a completely different CDR3 region was analyzed. As shown in FIG. 1A, the parental CMV$^{B7}$-TCR complex demonstrated comparably low cell surface expression as the parental HA-1-TCR complex. This low TCR expression was also not restored when the CMV$^{B7}$-TCRβ chain was combined with either the HA-2- or CMV$^{A2}$-TCRα chain, whereas CMV$^{B7}$-TCRα chains in combination with HA-2- or CMV$^{A2}$-TCRβ chains resulted in high TCR cell surface expression that was comparable to the expression of the parental HA-2- or CMV$^{A2}$-TCRs. These results imply that low HA-1- and CMV$^{B7}$-TCRβ chain expression was due to sequence specific properties of the variable region. These data together indicate that low HA-1-TCR cell surface expression is due to intrinsic properties of the HA-1-TCRβ chain.

To confirm that the sub-optimal cell surface expression of the HA-1-TCR after gene transfer was due to intrinsic properties of the TCRβ chain, the HA-1-TCR cell surface expression and HA-1-TCRα and β chain mRNA levels of different parental HA-1-specific T-cell clones was determined. As demonstrated in FIG. 1B, FACS analyses with antibodies directed against the TCRαβ and CD3 complex demonstrated that the HA-1-specific T-cell clones as well as the CMVB7-specific T-cell clones expressed lower levels of TCR-CD3 complexes at the cell surface compared to HA-2- and CMVA2-specific T-cell clones. The HA-1-specific T-cell clones, however, stained with similar intensity with their respective tetramer compared to other T-cell clones (FIG. 1C), and were on basis of cytokine production and cytotoxicity fully functional T-cells (data not shown). To exclude that the low TCRαβ expression was due to lower transcriptional activity, TCRα and β mRNA levels of the HA-1-specific T-cell clones were determined and compared to TCRα and β mRNA levels of other T-cell clones. As demonstrated in FIG. 1D, no significant differences in HA-1-TCRα or β mRNA expression levels compared to other T-cell clones could be detected. In conclusion, the parental HA-1-specific T-cell clones demonstrate lower TCR cell surface expression despite normal TCRαβ mRNA levels. These results indicate that the low HA-1-TCR expression observed in HA-1-TCR transferred T-cells is an intrinsic feature of the HA-1-TCR, since already TCR expression of the parental HA-1-specific T-cell clones is low.

Figure 2:
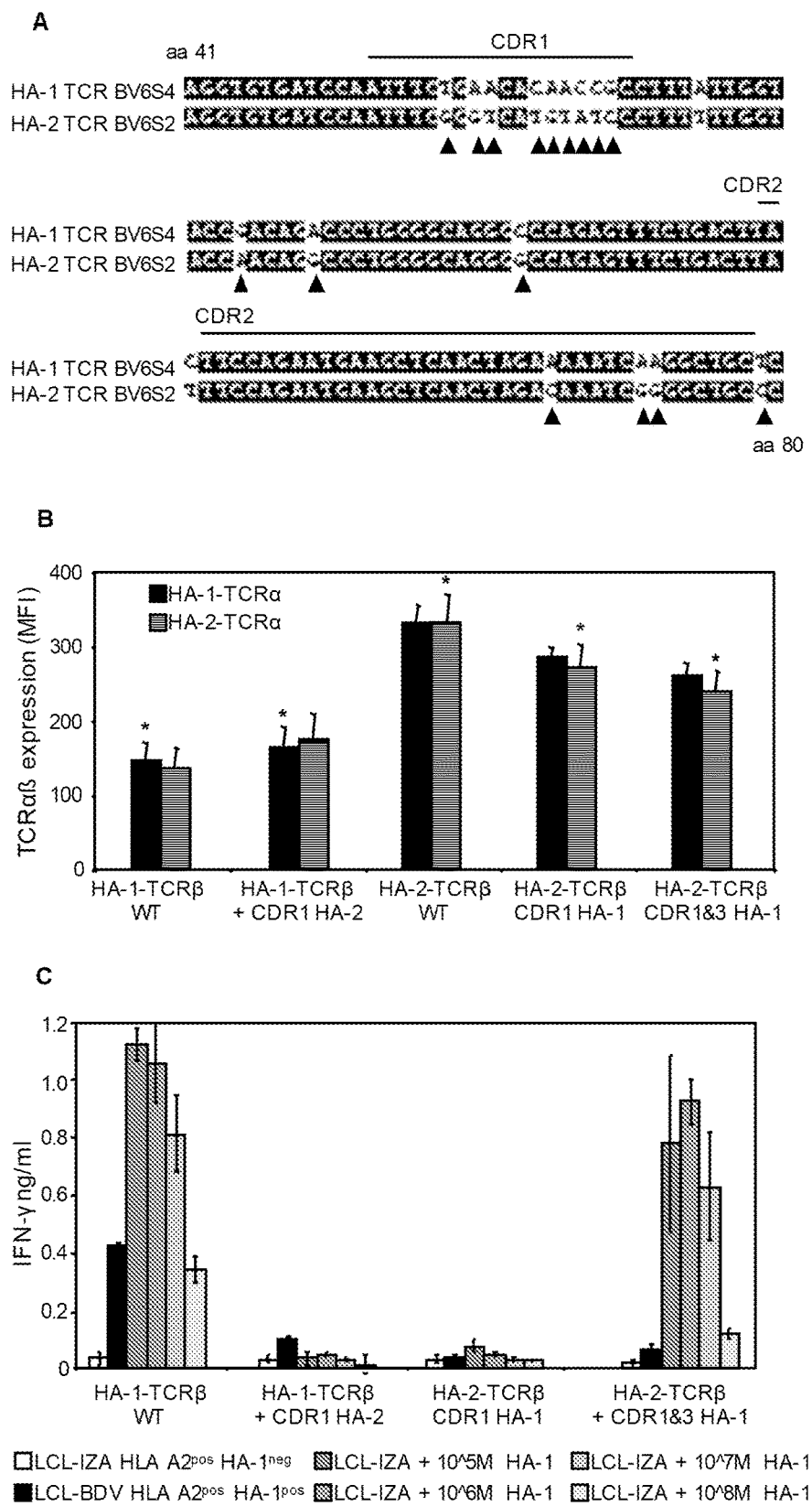
FIG. 2 shows that the CDR1 region is not responsible for low HA-1-TCR expression, but indispensable for HA-1-specificity. (A) Different TRBV7 chains that demonstrate high or low TCR expression after TCR gene transfer were aligned and differences in nucleotide sequences were analyzed. 30 shared nucleotide differences were observed in the 309 aa long variable region between the highly expressed HA-2-TRBV7-8, JBBun-TRBV7-6, 10G5-TRBV7-1, and low expressed HA-1-TRBV7-9. Sequences shown are from amino acid 41 to 80 of the TRBV7 chains (total aa 309) containing the CDR1- and CDR2-region of the HA-1 and HA-2 TCRß chains (SEQ ID NO: 77 and 78). The shared differences between all other TRBV7 chains and the HA-1 TRBV7-9 chain are indicated with arrows. (B) To test the role of the HA-1-TCRβ CDR1 region in low HA-1-TCR expression, J76 cells were transduced with combinations of the HA-1-TCRα or HA-2-TCRα with several constructs encoding for either the HA-1-TORR chain unmodified or exchanged with the HA-2-TCRß CDR1 region, or the HA-2-TCRß chain unmodified or exchanged with the HA-1-TCRß CDR1 region only or exchanged with the HA-1-TCRß CDR1 and CDR3 region. Using flow cytometry TCR cell surface expression was analyzed for the eGFP/NGF-R double positive J76 cells. Non td J76 cells showed little background staining with anti-TCRαß mAbs (MFI=16). Parental TCR combinations are indicated with an asterisk. (C) To test the role of the HA-1-TCRβ CDR1 region in HA-1-specificity, virus-specific T-cells were transduced with the different constructs. eGFP and NGF-R double positive cells were stimulated with HLA-A2$^{pos}$ and HA-1$^{neg}$ LCL-IZA, HLA-A2$^{pos}$ and HA-1$^{pos}$ LCL-BDV and LCL-IZA pulsed with different HA-1-peptide concentrations, and IFN-γ production was measured by standard ELISA after o/n incubation.

To be able to improve HA-1-TCR expression after gene transfer, we investigated whether we could determine the specific region of the HA-1-TCRß responsible for this low TCR cell surface expression and improve HA-1-TCR expression by modification of this region (6). For this purpose, the sequences of several TCRß chains belonging to the TRBV7 variable domain family and known to exhibit high cell surface expression after gene transfer, namely the HA-2-TRBV7-8, the JBBun-TRBV7-6, and the 10G5-TRBV7-1, were aligned with the sequences of the HA-1 and CMV$^{B7}$-TRBV7-9. In total, 30 shared differences were scattered throughout the 309 amino acids (aa) long variable region, of which 9 nucleotide differences clustered in the 18 nucleotide-long CDR1 region, as depicted in FIG. 2A. Based on these results, we hypothesized that primarily the CDR1 region of HA-1-TCR TRBV7-9 may be influencing cell surface expression of the HA-1-TCRβ chain. To study this, different constructs were made in which the HA-1-TCRβ CDR1 region was exchanged with the HA-2-TCRβ CDR1 region and vice versa. J76 cells transduced with modified HA-1- and HA-2-TCRs were analyzed for TCR cell surface expression using an anti-TCRαβ-specific mAb. As demonstrated in FIG. 2B, exchange of the HA-1-TCRβ CDR1 region with the CDR1 region of the HA-2-TCRβ did not result in marked improvement of TCR cell surface expression on J76 cells. Likewise, the exchange of the HA-2-TCRβ CDR1 region with the HA-1-TCRβ CDR1 region did not result in significantly decreased TCR cell surface expression on J76 cells. These results indicate that the CDR1 region is not solely responsible for the low TCR cell surface expression. In addition, we demonstrate by the transduction of virus-specific T-cells with the different modified TCR chains that exchange of the CDR1 region of the HA-1-TCRß with the CDR1 region of the HA-2-TCRß resulted in a complete abolishment of HA-1-specific IFN-γ production (FIG. 2C), illustrating that the HA-1-TCRß CDR1 region is crucial for HA-1-specificity. However, exchange of the HA-2-TCRß CDR1 region with the HA-1-TCRß CDR1 region demonstrated that exchange of only this region was not enough to transfer HA-1-specificity. Exchange of both the HA-2-TCRß CDR1 and CDR3 region with the regions of the HA-1-TCRß resulted in HA-1-specificity (FIG. 2C). However, these td T-cells were still less efficient compared to the parental HA-1-TCR td T-cells, since only very low recognition of endogenously processed HA-1 (LCL-BDV) was observed (FIG. 2C). In conclusion, the HA-1-TCRβ CDR1 region is crucial for HA-1-specificity, but is not sufficient for HA-1 specificity. In addition, the CDR3 region and of the HA-1-TCRβ chain is also crucial for HA-1 specificity.

Based on a similar TRBV7-9 chain usage of all HA-1 specific T cell clone (4) we investigated whether chimeric TCR combinations of the M2 and M7 TCRs could also be HA-1 specific. Peripheral T cells were transduced with the chimeric TCR combinations of 2 HA-1 TCRs and 1 CMV-B7 TCR (all TRB7-9 chains) and the functionality of the transferred chimeric TCR was compared with the original HA-1 TCR combinations. As shown in Table 5, the results indicate that the M7 beta chain can form a function HA-1 TCR complex with both the M7 TRAV25*01 as well as the M2 TRAV13-1*02, however not with the CMV TRAV17*01. In addition, the M2 TRAV13-1*02 and M7 TRAV25*01 do not form a functional HA-1 TCR complex in combination with the TRBV7-9 of the CMV-B7 TCR. These results demonstrate (as also mentioned above) that it is the combination of TCR alpha and TCR beta that determines the HA-1 specificity.

TABLE 5

Chimeric HA-1 TCRs. Mean Fluorescence intensity (MFI) of HA-1 pMHC tetramer is indicated.

| TCR | | M2 TRAV13-1*02 | M7 TRAV25*01 | CMV TRAV17*01 |
|---|---|---|---|---|
| M2 | TRBV7-9 | 24.2 | 32.6 | 1.8 |
| M7 | TRBV7-9 | 2.6 | 33.8 | 2 |
| CMV | TRBV7-9 | 3.1 | 2.3 | 2.3 |

Figure 3:
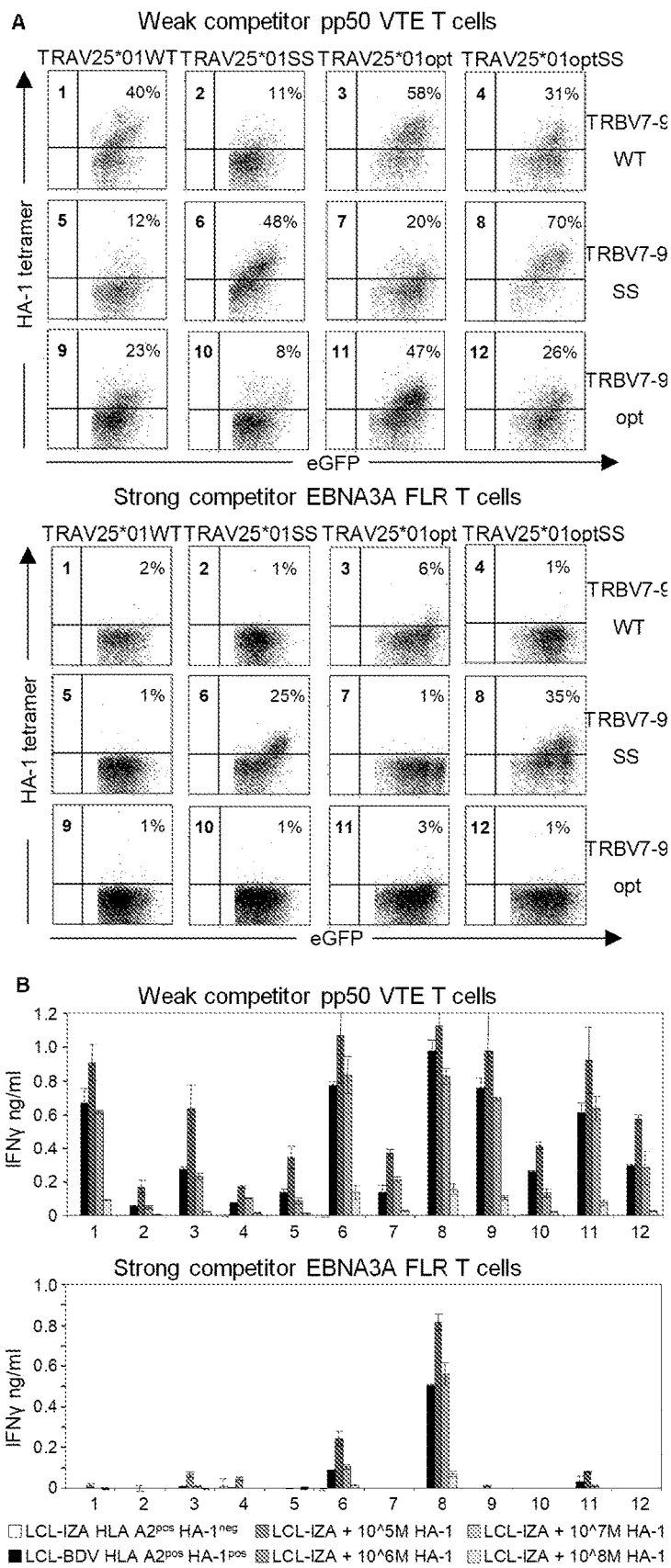
FIG. 3 shows that a combination of codon optimization and cysteine modification resulted in optimal HA-1-TCR expression and HA-1-functionality. The different modification strategies were tested for their potential to optimize HA-1-TCR expression and functionality. (A) Weak (pp50 VTE T-cells) and strong competitor phenotype (EBNA3A FLR T-cells) virus-specific T-cells were transduced with either unmodified (TRAV25*01;), cysteine modified (TRAV25*01 SS), codon optimized (TRAV25*01 opt) or codon optimized and cysteine modified (TRAV25*01 opt SS) HA-1-TCRα chains in combination with either unmodified (TRBV7-9), cysteine modified (TRBV7-9 SS), or codon optimized (TRBV7-9 opt) HA-1-TCRß chains. Dot plots are depicted of eGFP and NGF-R double positive virus-specific T-cells. (B) All these modified HA-1-TCR td weak competitor and strong competitor virus-specific T-cells were tested in a standard IFN-γ ELISA. Numbers in the figures correspond with the numbers indicated in the dot plots of A. Targets used were HLA-A2$^{pos}$ HA-1$^{neg}$ LCL-IZA, HLA-A2$^{pos}$ HA-1$^{pos}$ LCL-MRJ and LCL-IZA pulsed with different concentrations of HA-1-peptide. Data shown are representative for 3 independent experiments using virus-specific T-cells of 2 different healthy donors.

Since HA-1-TCR expression could not be improved by modification of specific sequences of the HA-1-TCRß chain, other strategies described to improve TCR cell surface expression of gene transferred TCRs were explored. We studied whether TCR codon optimization or inclusion of cysteine residues (7) in the constant domains of both the HA-1-TCRα and ß chain resulted in potent HA-1-specific T-cells after gene transfer. We analyzed the HA-1-TCR cell surface expression after transfer of the different constructs into virus-specific T-cells known to possess endogenous TCRs which weakly compete for cell surface expression (weak competitor; pp50 VTE specific T-cells, FIG. 3) and virus-specific T-cells known to possess endogenous TCRs which strongly compete for cell surface expression (strong competitor; EBNA3A FLR specific T-cells, FIG. 3) (5). As demonstrated in FIG. 3A, transfer of the unmodified HA-1-TCR complex into weak competitor T-cells resulted in 40% of HA-1 tetramer positive T-cells, whereas after transfer of the unmodified HA-1-TCR complex into strong competitor T-cells no clear HA-1-TCR expression could be measured using tetramers after transfer of the unmodified HA-1-TCR complex. The inclusion of cysteine residues in both HA-I-TCR chains improved HA-1-TCR expression especially in the strong competitor virus-specific T-cells. As expected, inclusion of cysteine residues in only one of the two HA-1-TCR chains significantly diminished HA-1-TCR expression. Codon optimization, in addition, improved HA-1-TCR expression both in weak and strong competitor virus-specific T-cells. The increased HA-1-TCR expression, however, appeared not to be due to improved HA-1-TCRβ chain expression, but due to improved HA-1-TCRα chain expression, since T-cells transferred with the codon optimized HA-1-TCRα chain in combination with the wild type HA-1-TCRβ chain showed a similar improvement in percentage of HA-1-tetramer positive T-cells compared to T-cells transferred with both codon optimized HA-1-TCRα and ß chain. In both the weak and strong competitor virus-specific T-cells a combination of codon optimized and cysteine modified HA-1-TCRα chain with cysteine modified HA-1-TCRß chain improved HA-1-TCR expression most prominent (FIG. 3A).

To test whether the improved HA-1-TCR expression resulted in improved HA-1-specific functionality, HA-1-TCR td weak and strong competitor virus-specific T-cells were tested against HA-1 peptide loaded target cells as well as target cells endogenously expressing the HA-1 antigen (FIG. 3B). In weak competitor virus-specific T-cells, the combination of codon optimized and cysteine modified HA-1-TCRα chain with the cysteine modified HA-1-TCRβ chain (combination #8) demonstrated highest IFN-γ production against peptide loaded target cells as well as against target cells presenting endogenously processed HA-1 antigen. Most evidently, in strong competitor T-cells, this TCR combination was the only one able to exert significant HA-1-specific reactivity. In conclusion, the combination of cysteine modification of the HA-1-TCR chains with codon optimization of the HA-1-TCRα chain resulted in efficient HA-1-TCR expression after gene transfer, even in strong competitor T-cells, and resulted in robust HA-1-specific functionality.

Figure 4:
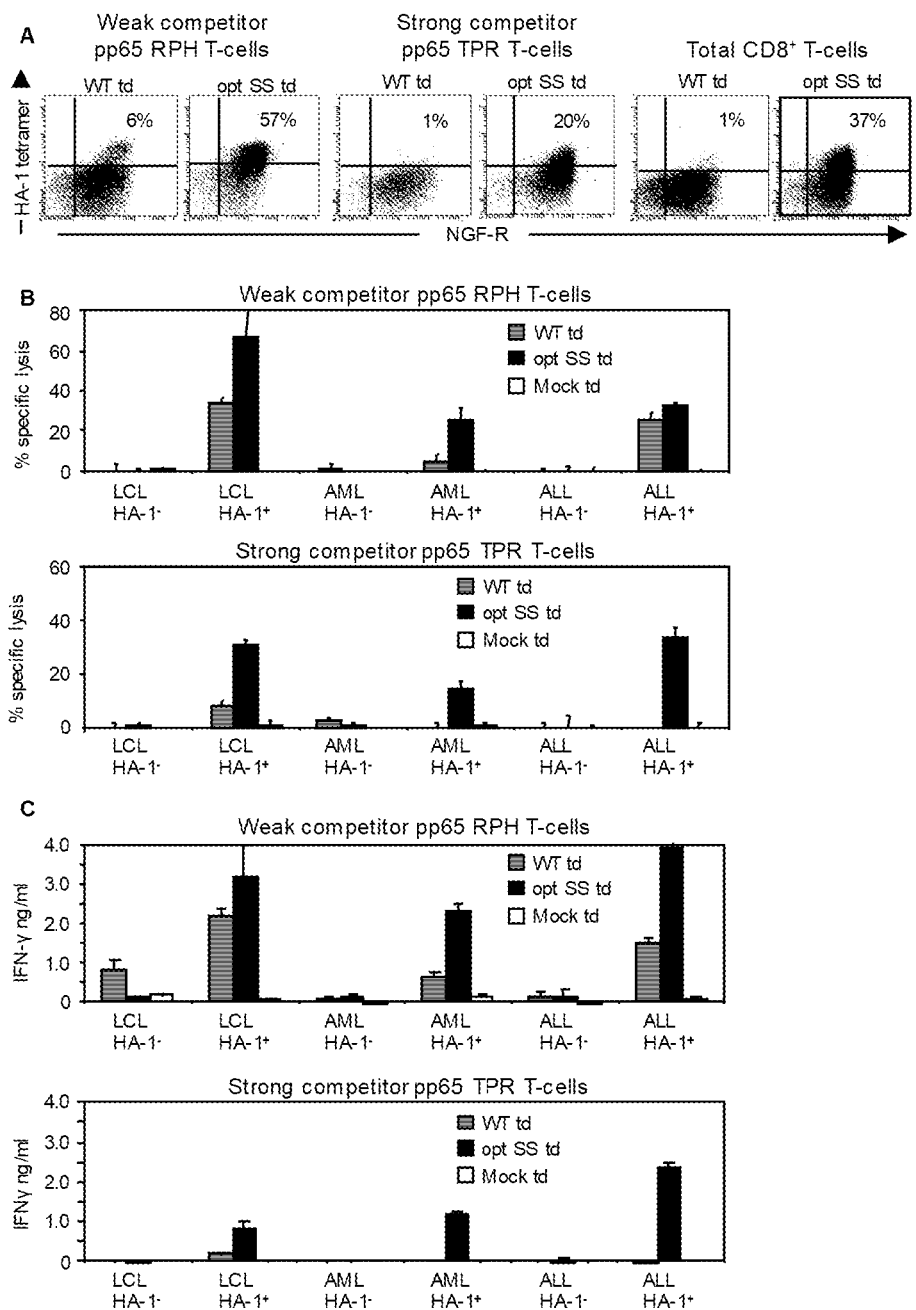
FIG. 4 shows that introduction of codon optimized and cysteine modified HA-1-TCR generally results in efficient HA-1-TCR expression and robust HA-1-specific functionality. (A) Weak competitor phenotype (pp65 RPH) T-cells, strong competitor phenotype (pp65 TPR) T-cells and polyclonal peripheral CD8$^{+}$ T-cells were transduced with either a single construct encoding the unmodified (WT td) or the codon optimized and cysteine modified HA-1-TCR chains (opt SS td) and HA-1 tetramer staining was analyzed. Dot plots depict HA-1 tetramer staining of NGF-R positive virus-specific T-cells and percentages of HA-1 tetramer positive T-cells are indicated. Dot plots depicted are representative for 2 independent experiments using T-cells of 3 different healthy individuals. (B/C) pp65 RPH and pp65 TPR T-cells transduced with a single construct encoding either HA-1-TCR WT or HA-1-TCR opt SS, or empty vectors were tested against different targets for HA-1-specific (B) cytotoxic reactivity in a chromium release assay and (C) IFN-γ production. Targets used were HLA-A2$^{pos}$ LCLs, AML and ALL primary cells that were either positive or negative for HA-1. Data presented is representative for 2 independent experiments using T-cells of 3 different healthy individuals.

To confirm the generality of these data, polyclonal peripheral $CD8^+$ T-cells, as well as other weak and strong competitor T-cells were transduced with single retroviral vectors encoding both the unmodified or codon optimized and cysteine modified HA-1-TCRα and ß chain linked with a picorna virus derived self-cleaving 2A sequence and tested for HA-1-TCR cell surface expression (FIG. 4A). Also the HA-1-TCRß chain was codon optimized, although we did not observe improved cell surface expression of codon optimized HA-1-TCRß chains, to warrant that mRNA stability of the TCRß chain was not negatively influencing TCRα chain expression. Correspondingly, transduction with the modified HA-1-TCR resulted in most efficient cell-surface expression in both weak and strong competitor T-cells. The polyclonal $CD8^+$ T-cells demonstrated similar to strong competitor T-cells significant HA-1-TCR cell-surface expression after transfer of the modified HA-1-TCR (FIG. 4A).

To study whether this improved HA-1-TCR cell-surface expression was coincided with clinically relevant HA-1-specific functionality, weak and strong competitor phenotype T-cells transduced with either the unmodified or codon optimized and cysteine modified HA-1-TCR were analyzed for HA-1-specific cytotoxic activity (FIG. 4B) and IFN-γ production (FIG. 4C). Whereas weak competitor T-cells transduced with the unmodified HA-1-TCR exerted HA-1 specific cytotoxic reactivity and IFN-γ production against AML and ALL, introduction of the modified TCR enhanced HA-1-specific reactivity (FIGS. 4B and C, respectively). In addition, strong competitor T-cells transduced with the modified HA-1-TCR were able to demonstrate significant cytotoxic activity and IFN-γ production directed against $HA-1^+$ malignant cells (FIGS. 4B and 4C, respectively). In conclusion, these results confirm the generality of improved HA-1-TCR expression of introduced modified HA-1-TCRs into both weak as well as strong competitor phenotype T-cells, and in polyclonal CD8+ T cells, thus demonstrating that we can generate potent redirected HA-1-specific T-cells.

Figure 5:
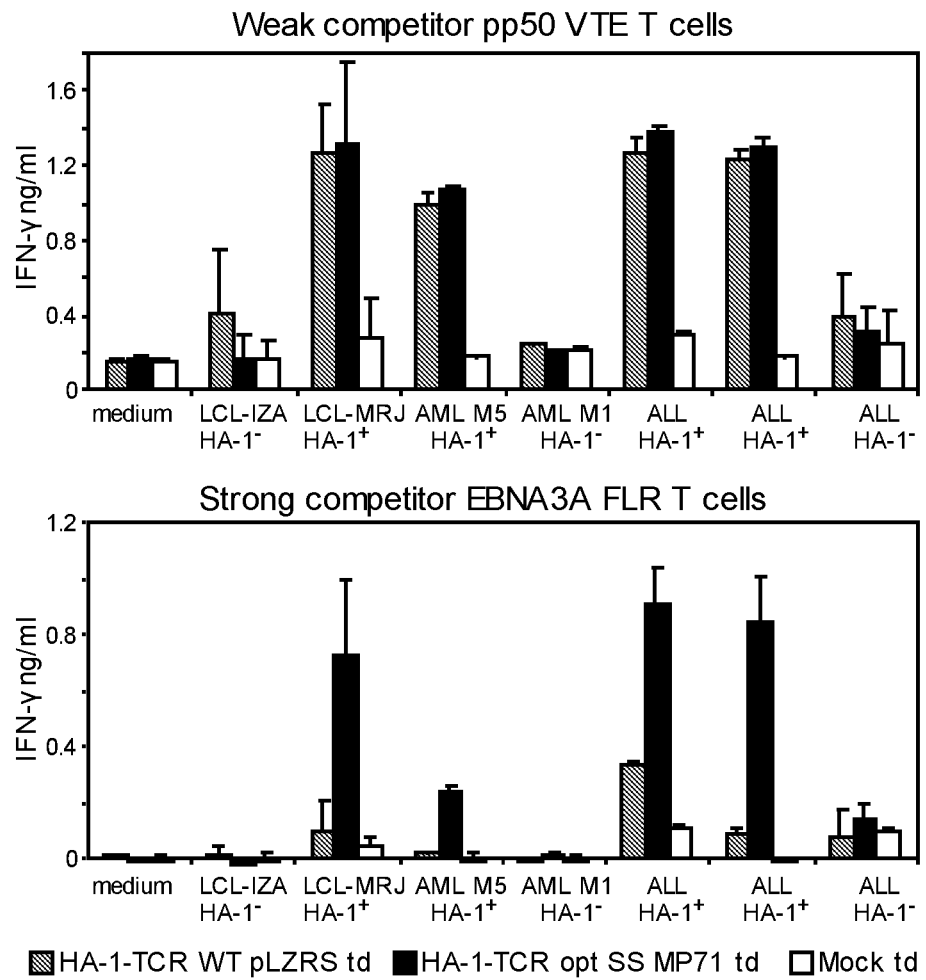
FIG. 5 shows strong competitor phenotype virus-specific T-cells transduced with MP71 HA-1-TCR opt SS demonstrate more robust HA-1-specific IFNγ production against AML and ALL malignant cells compared to HA-1-TCR WT transduced T-cells.

For use in clinical therapy the introduced TCR has to be encoded by a retroviral construct without potentially immunogenic marker genes. Therefore, we constructed a MP71 vector without marker gene encoding the modified HA-1-TCRα and R chain, and analyzed whether weak (FIG. 5) and strong competitor T-cells (FIG. 5) transduced with this clinically useful vector demonstrated similarly improved anti-leukemic reactivity (8). One week after transduction weak and strong competitor T-cells were analyzed for HA-1-specific reactivity against malignant target cells using IFN-γ ELISA (FIG. 5). Transduction efficiency of the pLZRS and MP71 vector were based on NGF-R or HA-1-tetramer staining, and was demonstrated to be 15 and 2%, respectively. Whereas malignant cells were equally well recognized by weak competitor T-cells transduced with either the unmodified or the modified HA-1-TCR (FIG. 5), strong competitor T-cells transduced with the modified HA-1-TCR demonstrated markedly improved IFNγ production against AML en ALL target cells as compared to unmodified HA-1-TCR transduced T-cells. In conclusion, TCR transfer with a codon optimized and cysteine modified HA-1-TCR resulted in efficient expression of introduced HA-1-TCRs and robust HA-1-specific functionality against clinically relevant target cells, both in weak as well as in strong competitor T-cells.

Based on the previous results, we studied whether we could scale up this procedure for clinical purposes resulting in a rapid procedure to engineer therapeutically relevant numbers of pure virus-specific T-cells transduced with the HA-1-TCR. To obtain therapeutic cell numbers after the total procedure, donor leukocytes were incubated with one or two Streptamers consisting of the relevant CMV and EBV peptide-HLA complexes for which profound T-cell populations are present in the donor. For this purpose, we performed 4 test procedures using $1 \times 10^9$ PBMCs derived from leukapheresis products of 4 healthy individuals, donor JBC, UPB, UHO and UBQ (FIG. 6). Leukocytes were incubated with the relevant Streptamers, and purified using CliniMACS (FIG. 6A-D). Directly after isolation, T-cells were incubated with D-biotin, and analyzed for purity using flowcytometry. As depicted in FIG. 6A-D, all positive fractions contained 60% virus-specific T-cells even when starting material had low frequencies of virus-specific T-cells (FIG. 6D). For all 4 test procedures the positive fraction had a recovery rate of virus-specific T-cells present in the starting material of nearly 60%. After CliniMACS-isolation the positive fractions were cultured in T-cell medium containing irradiated autologous feeders (1:5 ratio) and cytokines. Part of the Streptamer-enriched cell lines was not transduced, whereas the largest fraction of the cell lines was transduced with GMP-grade retroviral supernatant, produced by Eufets (Germany), encoding the HA-1-TCR 2-3 days after isolation. After an additional culture period of 8-12 days, transduced T-cells were analyzed for transduction efficiency and purity using HA-1 and virus-tetramers. All 4 Streptamer-enriched cell lines that were not transduced were A7% pure as measured with virus-tetramers (FIG. 6E-H). Transduction efficiencies of the 4 HA-1-TCR transduced Streptamer-enriched cell lines ranged between 22.5% and 54.2% (FIG. 6E-H). T-cells within the HA-1-TCR transduced virus-specific T-cells that stained positive with the HA-1 tetramer dominantly expressed the HA-1-TCR and expressed reduced levels of the virus-TCR due to competition for cell surface expression. At the end of the culture period (day 14 after isolation) all T-cell products were harvested and viable cells were counted. Test procedures JBC, UPB and UHO resulted in $\geq 15 \times 10^6$ highly pure antigen-specific T-cells. Test procedure UBQ with the low frequencies of virus-specific T-cells in the starting material resulted in $2 \times 10^6$ antigen-specific T-cells at the end of the culture period. In conclusion, these results demonstrate that using GMP-grade isolation methods, virus-specific T-cells can be enriched with a high recovery rate from thawed PBMC-material, and efficiently transduced.

HA-1-specific functionality was tested in a peptide titration assay for 3 of the HA-1-TCR transduced virus-specific T-cells (JBC, UHO, UBQ), and IFN-γ production was measured. All 3 transduced virus-specific T-cell lines demonstrated equal HA-1-specific dose-dependent IFN-γ production, comparable to the HA-1-specific control T-cell clone. In addition, no HA-1-specific IFN-γ production of non-td T-cells was observed. To study whether HA-1-TCR transduced virus-specific T-cells were able to recognize malignant primary leukemic cells presenting endogenously processed $HA1^H$ antigen, HA-1-TCR transduced virus-specific T-cells were tested against $HLA-A2^{pos}$ primary ALL cells either $HA1^{H\,pos}$ or $HA1^{H\,neg}$. As can be observed in FIG. 7B, all HA-1-TCR transduced virus-specific T-cell lines but not non transduced virus-specific T-cells were able to produce IFN-γ after stimulation with HA-1$^{pos}$ primary ALL cells, whereas no IFN-γ was produced after stimulation with HA-1$^{neg}$ primary ALL cells. Both the HA-1-TCR transduced virus-specific T-cell lines and non-transduced virus-specific T-cells produced IFN-γ after stimulation with T2 cells pulsed with viral peptides. In addition, all 4 HA-1-TCR transduced virus-specific T-cells were tested for HA-1-specific cytotoxic reactivity against virus or HA-1 peptide pulsed T2 cells, or against HLA-A2$^{pos}$ primary ALL and AML cells either HA1$^{H\,pos}$ or HA1$^{H\,neg}$ (FIG. 7C). Results demonstrate that HA-1-TCR transduced virus-specific T-cells efficiently lysed HLA-A2$^{pos}$ HA1$^H$ 1$^{pos}$ primary ALL and AML samples. In addition, they showed comparable cytotoxic reactivity against virus peptide pulsed T2 cells as non transduced virus-specific T-cells. These results demonstrate that it is feasible to reproducibly produce HA-1-TCR modified T-cells with potent anti-leukemic reactivity using a GMP-grade production process.

Recently, it has been demonstrated that patients treated with CD19CAR modified T cells derived from the patient after allogeneic SCT do not induce GvHD. Therefore, we tested whether polyclonal CD8+ T cells can be transduced and efficiently express the HA1-TCR at the cell-surface. For this purpose we isolated CD8+ T cells by MACS from a healthy individual, and transduced the T cells 2 days after a-specific stimulation with PHA in IL-2 supplemented medium with GMP grade retroviral supernatant encoding the HA1-TCR (codon optimized and cysteine modified). The transduction of the polyclonal CD8+ T cells resulted in 50% HA1-TCR positive T cells and the modified T cells recognized the HA1$^H$ positive target cells very efficiently as was demonstrated by the high IFN-γ production after stimulation with various different HLA-A*0201+ target cells expressing HA1$^H$ (EBV-MRJ, U266, AML3), whereas HLA-A2*0201+ target cells not expressing the immunogenic HA1$^H$ were not recognized (EBV-IZA, EBV-JY, AML2) (FIG. 8).

In addition, these HA-1 TCR engineered CD8+ T cells mediated an effectively anti-leukemic response in a multiple myeloma xenograft model (FIG. 9), demonstrating that these HA-1 TCR engineered T cells are highly anti-tumour reactive in vitro and in vivo. These data therefore indicate that patients suffering from a relapse or refractory hematological malignancy can be effectively treated with these potent HA1-TCR modified T cells.

Assay Setup for FIGS. 10 and 11:

CD8+ T cells of two healthy HLA-A*02:01+ donors, who are homozygous for HA-1R variant, were lentivirally transduced with two different HA1-H-specific TCRs (TCR LUMC, TCR FHCRC of WO2018058002A1). The TRBV-CDR3-TRBJ and TRAV-CDR3-TRBJ of FHCRC and LUMC were cloned with a murine alpha and beta C region into the pES.12-6 vector (see SEQ ID NO: 89 and SEQ ID NO:90 below).

The transduced cells were subsequently sorted for murine-Cβ+ and CD8+ cells and expanded (rapid expansion protocol).

For the analysis of functional avidity, T2 cells were loaded with graded concentrations of HA-1H peptide (VLHDDLLEA (SEQ ID NO: 10), $10^{-12}$ M-$10^{-5}$ M), incubated for 1-2 hours at 37° C., washed with PBS and resuspended in culture medium. Transduced T cells were co-cultivated with peptide-loaded T2 cells at an effector to target ratio of 2:1 (20.000 effectors/96-well). IFN-g in the supernatant was measured by ELISA after 20 h of co-cultivation.

To analyze unspecific recognition of the HA-1R peptide, the same effector cell preparation as described above were co-cultivated with graded concentrations of the HA-1R peptide (VLRDDLLEA (SEQ ID NO: 79), $10^{-8}$ M-$10^{-5}$ M). Peptide-loading, co-cultivation and read-out was performed as described above.

```
Nucleic acid and amino acid sequences of interest:
(amino acid sequence for CDR3 of Vα domain of HA-1^H TCR M7):
                                                                          SEQ ID NO: 1
CAGNTGGFKTIF (amino acid sequence for CDR3 of Vα domain of HA-1^H TCR M2):
                                                                          SEQ ID NO: 2
CAARNSGAGSYQLTF (amino acid sequence for CDR3 of Vα domain of HA-1^H TCR FK47.83):
                                                                          SEQ ID NO: 3
CAASNLVF (amino acid sequence for CDR3 of Vβ domain of HA-1^H TCR M7):
                                                                          SEQ ID NO: 4
CASSLLGNQPQHF (amino acid sequence for CDR3 of Vβ domain of HA-1^H TCR M2):
                                                                          SEQ ID NO: 5
CASLTVQNTEAFF (amino acid sequence for CDR3 of Vβ domain of HA-1^H TCR FK47.83):
                                                                          SEQ ID NO: 6
CASSLVVVDEQFF (amino acid sequence for CDR1 of Vβ domain of HA-1^H TCR M7,
HA-1^H TCR M2, or HA-1^H TCR FK47.83):
                                                                          SEQ ID NO: 7
SEHNRL (amino acid sequence for CDR1 of Vα domain of HA-1^H TCR M2 or HA-1^H
TCR FK47.83):
                                                                          SEQ ID NO: 8
DSASNY
```

-continued (nucleic acid sequence for CDR1 of Vα domain of HA-1$^H$ TCR M2 or HA-1$^H$ TCR FK47.83):

SEQ ID NO: 9

GACAGTGCCTCAAACTAC (amino acid sequence for HA-1$^H$ antigen):

SEQ ID NO: 10

VLHDDLLEA (nucleic acid sequence for CDR3 of Vα domain of HA-1$^H$ TCR M7):

SEQ ID NO: 11

TGTGCAGGCAATACTGGAGGCTTCAAAACTATCTTT (codon optimised nucleic acid sequence for CDR3 of Vα domain of HA-1$^H$ TCR M7):

SEQ ID NO: 12

TGTGCCGGCAATACCGGCGGCTTCAAGACCATCTTC (nucleic acid sequence for CDR3 of Vβ domain of HA-1$^H$ TCR M7):

SEQ ID NO: 13

TGTGCCAGCAGCTTATTGGGTAATCAGCCCCAGCATTTT (codon optimised nucleic acid sequence for CDR3 of Vβ domain of HA-1$^H$ TCR M7):

SEQ ID NO: 14

TGCGCCAGCTCCCTGCTGGGCAACCAGCCCCAGCACTTC (nucleic acid sequence for CDR1 of Vβ domain of HA-1$^H$ TCR M7, HA-1$^H$ TCR M2, or HA-1$^H$ TCR FK47.83):

SEQ ID NO: 15

TCTGAACACAACCGCCTT (codon optimised nucleic acid sequence for CDR1 of Vβ domain of HA-1$^H$ TCR M7; HA-1$^H$ TCR M2, or HA-1$^H$ TCR FK47.83):

SEQ ID NO: 16

AGCGAGCACAACCGGCTG (amino acid sequence for Vα (VJ) domain of HA-1$^H$ TCR M7):

SEQ ID NO: 17

MLLITSMLVLWMQLSQVNGQQVMQIPQYQHVQEGEDFTTYCNSSTTLSNIQWYKQRPGG

HPVFLIQLVKSGEVKKQKRLTFQFGEAKKNSSLHITATQTTDVGTYFCAGNTGGFKTIFGAG

TRLFVKA (amino acid sequence for Vβ (VDJ) domain of HA-1$^H$ TCR M7):

SEQ ID NO: 18

MGTSLLCWMALCLLGADHADTGVSQDPRHKITKRGQNVTFRCDPISEHNRLYWYRQTLGQ

GPEFLTYFQNEAQLEKSRLLSDRFSAERPKGSFSTLEIQRTEQGDSAMYLCASSLLGNQPQ

HFGDGTRLSIL (nucleic acid sequence for Vα (VJ) domain of HA-1$^H$ TCR M7):

SEQ ID NO: 19

ATGCTACTCATCACATCAATGTTGGTCTTATGGATGCAATTGTCACAGGTGAATGGACA

ACAGGTAATGCAAATTCCTCAGTACCAGCATGTACAAGAAGGAGAAGACTTCACCACGT

ACTGCAATTCCTCAACTACTTTAAGCAATATACAGTGGTATAAGCAAAGGCCTGGTGGA

CATCCCGTTTTTTTGATACAGTTAGTGAAGAGTGGAGAAGTGAAGAAGCAGAAAAGACT

GACATTTCAGTTTGGAGAAGCAAAAAAGAACAGCTCCCTGCACATCACAGCCACCCAGA

CTACAGATGTAGGAACCTACTTCTGTGCAGGCAATACTGGAGGCTTCAAAACTATCTTT

GGAGCAGGAACAAGACTATTTGTTAAAGCA (codon optimised nucleic acid sequence for Vα (VJ) domain of HA-1$^H$ TCR M7):

SEQ ID NO: 20

ATGCTGCTGATCACCTCCATGCTGGTGCTGTGGATGCAGCTGTCCCAGGTGAACGGCC

AGCAGGTGATGCAGATCCCCCAGTACCAGCACGTGCAGGAGGGCGAGGATTTCACCA

CCTACTGTAACAGCAGCACCACCCTGAGCAACATCCAGTGGTACAAGCAGAGACCTGG

CGGCCACCCCGTGTTCCTGATCCAGCTGGTGAAGAGCGGCGAGGTGAAGAAGCAGAA

GCGGCTGACCTTCCAGTTCGGCGAGGCCAAGAAGAATAGCAGCCTGCACATCACCGC

-continued

```
CACCCAGACCACCGATGTGGGCACCTACTTCTGTGCCGGCAATACCGGCGGCTTCAAG

ACCATCTTCGGAGCCGGCACCAGACTGTTCGTGAAGGCC
```

(nucleic acid sequence for Vβ (VDJ) domain of HA-1$^H$ TCR M7):

SEQ ID NO: 21

```
ATGGGCACCAGCCTCCTCTGCTGGATGGCCCTGTGTCTCCTGGGGGCAGATCACGCA

GATACTGGAGTCTCCCAGGACCCCAGACACAAGATCACAAAGAGGGGACAGAATGTAA

CTTTCAGGTGTGATCCAATTTCTGAACACAACCGCCTTTATTGGTACCGACAGACCCTG

GGGCAGGGCCCAGAGTTTCTGACTTACTTCCAGAATGAAGCTCAACTAGAAAAATCAAG

GCTGCTCAGTGATCGGTTCTCTGCAGAGAGGCCTAAGGGATCTTTCTCCACCTTGGAG

ATCCAGCGCACAGAGCAGGGGACTCGGCCATGTATCTCTGTGCCAGCAGCTTATTGG

GTAATCAGCCCCAGCATTTTGGTGATGGGACTCGACTCTCCATCCTA
```

(codon optimised nucleic acid sequence for Vβ (VDJ) domain of HA-1$^H$ TCR M7):

SEQ ID NO: 22

```
ATGGGCACCAGCCTGCTGTGCTGGATGGCCCTGTGCCTGCTGGGCGCTGACCATGCT

GATACCGGCGTGAGCCAGGACCCCCGGCACAAGATCACCAAGCGGGGCCAGAACGTG

ACCTTCAGATGCGACCCCATCAGCGAGCACAACCGGCTGTACTGGTACAGACAGACCC

TGGGCCAGGGCCCCGAGTTCCTGACCTACTTCCAGAACGAGGCCCAGCTGGAAAAGA

GCCGGCTGCTGTCCGACCGGTTCAGCGCCGAGCGGCCCAAGGGCAGCTTCAGCACCC

TGGAAATCCAGCGGACCGAGCAGGGCGACAGCGCCATGTACCTGTGCGCCAGCTCCC

TGCTGGGCAACCAGCCCCAGCACTTCGGCGACGGCACCAGACTGAGCATCCTG
```

(nucleic acid sequence for CDR3 of Vα domain of HA-1$^H$ TCR M2):

SEQ ID NO: 23

```
TGTGCAGCAAGGAACTCTGGGGCTGGGAGTTACCAACTCACTTTC
```

(codon optimised nucleic acid sequence for CDR3 of Vα domain of HA-1$^H$ TCR M2):

SEQ ID NO: 24

```
TGCGCCGCCCGGAACAGCGGCGCCGGCAGCTACCAGCTGACCTTC
```

(nucleic acid sequence for CDR3 of Vβ domain of HA-1$^H$ TCR M2):

SEQ ID NO: 25

```
TGTGCCAGCTTGACGGTACAGAACACTGAAGCTTTCTTT
```

(codon optimised nucleic acid sequence for CDR3 of Vβ domain of HA-1$^H$ TCR M2):

SEQ ID NO: 26

```
TGCGCCAGCCTGACCGTGCAGAACACCGAGGCCTTCTTC
```

(codon optimised nucleic acid sequence for CDR1 of Vα domain of HA-1$^H$ TCR M2 or HA-1$^H$ TCR FK47.83):

SEQ ID NO: 27

```
GACAGCGCCAGCAACTAC
```

(amino acid sequence for CDR2 of Vα domain of HA-1$^H$ TCR M2 or HA-1$^H$ TCR FK47.83):

SEQ ID NO: 28

```
IRSNVGE
```

(amino acid sequence for Vα (VJ) domain of HA-1$^H$ TCR M2):

SEQ ID NO: 29

```
MTSIRAVFIFLWLQLDLVNGENVEQHPSTLSVQEGDSAVIKCTYSDSASNYFPWYKQELGK

RPQLIIDIRSNVGEKKDQRIAVTLNKTAKHFSLHITETQPEDSAVYFCAARNSGAGSYQLTFG

KGTKLSVIP
```

(amino acid sequence for Vβ (VDJ) domain of HA-1$^H$ TCR M2):

SEQ ID NO: 30

```
MGTSLLCWMALCLLGADHADTGVSQNPRHKITKRGQNVTFRCDPISEHNRLYWYRQTLGQ

GPEFLTYFQNEAQLEKSRLLSDRFSAERPKGSFSTLEIQRTEQGDSAMYLCASLTVQNTEA

FFGQGTRLTVV
```

-continued (nucleic acid sequence for Vα (VJ) domain of HA-1^H TCR M2):

SEQ ID NO: 31

ATGACATCCATTCGAGCTGTATTTATATTCCTGTGGCTGCAGCTGGACTTGGTGAATGG

AGAGAATGTGGAGCAGCATCCTTCAACCCTGAGTGTCCAGGAGGGAGACAGCGCTGTT

ATCAAGTGTACTTATTCAGACAGTGCCTCAAACTACTTCCCTTGGTATAAGCAAGAACTT

GGAAAAAGACCTCAGCTTATTATAGACATTCGTTCAAATGTGGGCGAAAAGAAAGACCA

ACGAATTGCTGTTACATTGAACAAGACAGCCAAACATTTCTCCCTGCACATCACAGAGA

CCCAACCTGAAGACTCGGCTGTCTACTTCTGTGCAGCAAGGAACTCTGGGGCTGGGAG

TTACCAACTCACTTTCGGGAAGGGGACCAAACTCTCGGTCATACCA (codon optimised nucleic acid sequence for Vα (VJ) domain of HA-1^H TCR M2):

SEQ ID NO: 32

ATGACCAGCATCCGGGCCGTGTTCATCTTCCTGTGGCTGCAGCTGGACCTGGTGAACG

GCGAGAACGTGGAGCAGCACCCCAGCACCCTGAGCGTGCAGGAGGGCGACAGCGCC

GTGATCAAGTGCACCTACAGCGACAGCGCCAGCAACTACTTCCCCTGGTACAAGCAGG

AGCTGGGCAAGCGGCCCCAGCTGATCATCGACATCCGGAGCAACGTGGGCGAGAAGA

AGGACCAGCGGATCGCCGTGACCCTGAACAAGACCGCCAAGCACTTCAGCCTGCACAT

CACCGAGACCCAGCCCGAGGACAGCGCCGTGTACTTCTGCGCCGCCCGGAACAGCGG

CGCCGGCAGCTACCAGCTGACCTTCGGCAAGGGCACCAAGCTGAGCGTGATCCCC (nucleic acid sequence for Vβ (VDJ) domain of HA-1^H TCR M2):

SEQ ID NO: 33

ATGGGCACCAGCCTCCTCTGCTGGATGGCCCTGTGTCTCCTGGGGGCAGATCACGCA

GATACTGGAGTCTCCCAGAACCCCAGACACAAGATCACAAAGAGGGGACAGAATGTAA

CTTTCAGGTGTGATCCAATTTCTGAACACAACCGCCTTTATTGGTACCGACAGACCCTG

GGGCAGGGCCCAGAGTTTCTGACTTACTTCCAGAATGAAGCTCAACTAGAAAAATCAAG

GCTGCTCAGTGATCGGTTCTCTGCAGAGAGGCCTAAGGGATCTTTCTCCACCTTGGAG

ATCCAGCGCACAGAGCAGGGGGACTCGGCCATGTATCTCTGTGCCAGCTTGACGGTAC

AGAACACTGAAGCTTTCTTTGGACAAGGCACCAGACTCACAGTTGTA (codon optimised nucleic acid sequence for Vβ (VDJ) domain of HA-1^H TCR M2):

SEQ ID NO: 34

ATGGGCACCAGCCTGCTGTGCTGGATGGCCCTGTGCCTGCTGGGCGCCGACCACGCC

GACACCGGCGTGAGCCAGAACCCCCGGCACAAGATCACCAAGCGGGGCCAGAACGTG

ACCTTCCGGTGCGACCCCATCAGCGAGCACAACCGGCTGTACTGGTACCGGCAGACC

CTGGGCCAGGGCCCCGAGTTCCTGACCTACTTCCAGAACGAGGCCCAGCTGGAGAAG

AGCCGGCTGCTGAGCGACCGGTTCAGCGCCGAGCGGCCCAAGGGCAGCTTCAGCAC

CCTGGAGATCCAGCGGACCGAGCAGGGCGACAGCGCCATGTACCTGTGCGCCAGCCT

GACCGTGCAGAACACCGAGGCCTTCTTCGGCCAGGGCACCCGGCTGACCGTGGTG (nucleic acid sequence for CDR3 of Vα domain of HA-1^H TCR FK47.83):

SEQ ID NO: 35

TGTGCAGCAAGTAATCTGGTCTTT (codon optimised nucleic acid sequence for CDR3 of Vα domain of HA-1^H TCR FK47.83):

SEQ ID NO: 36

TGCGCCGCCAGCAACCTGGTGTTC (nucleic acid sequence for CDR3 of Vβ domain of HA-1^H TCR FK47.83):

SEQ ID NO: 37

TGTGCCAGCAGCTTAGTCGTTGTGGATGAGCAGTTCTTC (codon optimised nucleic acid sequence for CDR3 of Vβ domain of HA-1$^H$ TCR FK47.83):

SEQ ID NO: 38

TGCGCCAGCAGCCTGGTGGTGGTGGACGAGCAGTTCTTC (nucleic acid sequence for CDR2 of Vα domain of HA-1$^H$ TCR M2 or HA-1$^H$ TCR FK47.83):

SEQ ID NO: 39

ATTCGTTCAAATGTGGGCGAA (codon optimised nucleic acid sequence for CDR2 of Vα domain of HA-1$^H$ TCR M2 or HA-1$^H$ TCR FK47.83):

SEQ ID NO: 40

ATCCGGAGCAACGTGGGCGAG (amino acid sequence for Vα (VJ) domain of HA-1$^H$ TCR FK47.83):

SEQ ID NO: 41

MTSIRAVFIFLWLQLDLVNGENVEQHPSTLSVQEGDSAVIKCTYSDSASNYFPWYKQELGK

RPQLIIDIRSNVGEKKDQRIAVTLNKTAKHFSLHITETQPEDSAVYFCAASNLVFGAGTILRVK

S (amino acid sequence for Vβ (VDJ) domain of HA-1$^H$ TCR FK47.83):

SEQ ID NO: 42

MGTSLLCWMALCLLGADHADTGVSQNPRHKITKRGQNVTFRCDPISEHNRLYWYRQTLGQ

GPEFLTYFQNEAQLEKSRLLSDRFSAERPKGSFSTLEIQRTEQGDSAMYLCASSLVVVDEQ

FFGPGTRLTVL (nucleic acid sequence for Vα (VJ) domain of HA-1$^H$ TCR FK47.83):

SEQ ID NO: 43

ATGACATCCATTCGAGCTGTATTTATATTCCTGTGGCTGCAGCTGGACTTGGTGAATGG

AGAGAATGTGGAGCAGCATCCTTCAACCCTGAGTGTCCAGGAGGGAGACAGCGCTGTT

ATCAAGTGTACTTATTCAGACAGTGCCTCAAACTACTTCCCTTGGTATAAGCAAGAACTT

GGAAAAAGACCTCAGCTTATTATAGACATTCGTTCAAATGTGGGCGAAAAGAAAGACCA

ACGAATTGCTGTTACATTGAACAAGACAGCCAAACATTTCTCCCTGCACATCACAGAGA

CCCAACCTGAAGACTCGGCTGTCTACTTCTGTGCAGCAAGTAATCTGGTCTTTGGCGCA

GGAACCATTCTGAGAGTCAAGTCC (codon optimised nucleic acid sequence for Vα (VJ) domain of HA-1$^H$ TCR FK47.83):

SEQ ID NO: 44

ATGACCAGCATCCGGGCCGTGTTCATCTTCCTGTGGCTGCAGCTGGACCTGGTGAACG

GCGAGAACGTGGAGCAGCACCCCAGCACCCTGAGCGTGCAGGAGGGCGACAGCGCC

GTGATCAAGTGCACCTACAGCGACAGCGCCAGCAACTACTTCCCCTGGTACAAGCAGG

AGCTGGGCAAGCGGCCCCAGCTGATCATCGACATCCGGAGCAACGTGGGCGAGAAGA

AGGACCAGCGGATCGCCGTGACCCTGAACAAGACCGCCAAGCACTTCAGCCTGCACAT

CACCGAGACCCAGCCCGAGGACAGCGCCGTGTACTTCTGCGCCGCCAGCAACCTGGT

GTTCGGCGCCGGCACCATCCTGCGGGTGAAGAGC (nucleic acid sequence for Vβ (VDJ) domain of HA-1$^H$ TCR FK47.83):

SEQ ID NO: 45

ATGGGCACCAGCCTCCTCTGCTGGATGGCCCTGTGTCTCCTGGGGGCAGATCACGCA

GATACTGGAGTCTCCCAGAACCCCAGACACAAGATCACAAAGAGGGGACAGAATGTAA

CTTTCAGGTGTGATCCAATTTCTGAACACAACCGCCTTTATTGGTACCGACAGACCCTG

GGGCAGGGCCCAGAGTTTCTGACTTACTTCCAGAATGAAGCTCAACTAGAAAAATCAAG

GCTGCTCAGTGATCGGTTCTCTGCAGAGAGGCCTAAGGGATCTTTCTCCACCTTGGAG

ATCCAGCGCACAGAGCAGGGGGACTCGGCCATGTATCTCTGTGCCAGCAGCTTAGTCG

TTGTGGATGAGCAGTTCTTCGGGCCAGGGACACGGCTCACCGTGCTA (codon optimised nucleic acid sequence for Vβ (VDJ) domain of HA-1$^H$ TCR FK47.83):

SEQ ID NO: 46

ATGGGCACCAGCCTGCTGTGCTGGATGGCCCTGTGCCTGCTGGGCGCCGACCACGCC

GACACCGGCGTGAGCCAGAACCCCCGGCACAAGATCACCAAGCGGGGCCAGAACGTG

ACCTTCCGGTGCGACCCCATCAGCGAGCACAACCGGCTGTACTGGTACCGGCAGACC

CTGGGCCAGGGCCCCGAGTTCCTGACCTACTTCCAGAACGAGGCCCAGCTGGAGAAG

AGCCGGCTGCTGAGCGACCGGTTCAGCGCCGAGCGGCCCAAGGGCAGCTTCAGCAC

CCTGGAGATCCAGCGGACCGAGCAGGGCGACAGCGCCATGTACCTGTGCGCCAGCAG

CCTGGTGGTGGTGGACGAGCAGTTCTTCGGCCCCGGCACCCGGCTGACCGTGCTG (amino acid sequence for Vα (VJ) domain and constant domain of HA-1$^H$ TCR M7):

SEQ ID NO: 47

MLLITSMLVLWMQLSQVNGQQVMQIPQYQHVQEGEDFTTYCNSSTTLSNIQWYKQRPGG

HPVFLIQLVKSGEVKKQKRLTFQFGEAKKNSSLHITATQTTDVGTYFCAGNTGGFKTIFGAG

TRLFVKANIQNPDPAVYQLRDSKSSDKSVCLFTDFDSQTNVSQSKDSDVYITDKTVLDMRS

MDFKSNSAVAWSNKSDFACANAFNNSIIPEDTFFPSPESSCDVKLVEKSFETDTNLNFQNL

SVIGFRILLLKVAGFNLLMTLRLWSS*

(amino acid sequence for Vα (VJ) domain of HA-1$^H$ TCR M7 and constant domain (murine)):

SEQ ID NO: 48

MKSLRVLLVILWLQLSWVWSQGQQVMQIPQYQHVQEGEDFTTYCNSSTTLSNIQWYKQRP

GGHPVFLIQLVKSGEVKKQKRLTFQFGEAKKNSSLHITATQTTDVGTYFCAGNTGGFKTIFG

AGTRLFVKADIQNPEPAVYQLKDPRSQDSTLCLFTDFDSQINVPKTMESGTFITDKCVLDMK

AMDSKSNGAIAWSNQTSFTCQDIFKETNATYPSSDVPCDATLTEKSFETDMNLNFQNLSVM

GLRILLLKVAGFNLLMTLRLWSS*

(nucleic acid sequence for Vα (VJ) domain and constant domain of HA-1$^H$ TCR M7):

SEQ ID NO: 49

ATGCTACTCATCACATCAATGTTGGTCTTATGGATGCAATTGTCACAGGTGAATGGACA

ACAGGTAATGCAAATTCCTCAGTACCAGCATGTACAAGAAGGAGAAGACTTCACCACGT

ACTGCAATTCCTCAACTACTTTAAGCAATATACAGTGGTATAAGCAAAGGCCTGGTGGA

CATCCCGTTTTTTTGATACAGTTAGTGAAGAGTGGAGAAGTGAAGAAGCAGAAAAGACT

GACATTTCAGTTTGGAGAAGCAAAAAAGAACAGCTCCCTGCACATCACAGCCACCCAGA

CTACAGATGTAGGAACCTACTTCTGTGCAGGCAATACTGGAGGCTTCAAAACTATCTTT

GGAGCAGGAACAAGACTATTTGTTAAAGCAAATATCCAGAACCCTGACCCTGCCGTGTA

CCAGCTGAGAGACTCTAAATCCAGTGACAAGTCTGTCTGCCTATTCACCGATTTTGATT

CTCAAACAAATGTGTCACAAAGTAAGGATTCTGATGTGTATATCACAGACAAAACTGTGC

TAGACATGAGGTCTATGGACTTCAAGAGCAACAGTGCTGTGGCCTGGAGCAACAAATC

TGACTTTGCATGTGCAAACGCCTTCAACAACAGCATTATTCCAGAAGACACCTTCTTCC

CCAGCCCAGAAAGTTCCTGTGATGTCAAGCTGGTCGAGAAAAGCTTTGAAACAGATAC

GAACCTAAACTTTCAAAACCTGTCAGTGATTGGGTTCCGAATCCTCCTCCTGAAAGTGG

CCGGGTTTAATCTGCTCATGACGCTGCGGCTGTGGTCCAGCTGA (codon optimised nucleic acid sequence for Vα (VJ) domain and constant domain of HA-1$^H$ TCR M7):

SEQ ID NO: 50

ATGCTGCTGATCACCTCCATGCTGGTGCTGTGGATGCAGCTGTCCCAGGTGAACGGCC

AGCAGGTGATGCAGATCCCCCAGTACCAGCACGTGCAGGAGGGCGAGGATTTCACCA

```
CCTACTGTAACAGCAGCACCACCCTGAGCAACATCCAGTGGTACAAGCAGAGACCTGG

CGGCCACCCCGTGTTCCTGATCCAGCTGGTGAAGAGCGGCGAGGTGAAGAAGCAGAA

GCGGCTGACCTTCCAGTTCGGCGAGGCCAAGAAGAATAGCAGCCTGCACATCACCGC

CACCCAGACCACCGATGTGGGCACCTACTTCTGTGCCGGCAATACCGGCGGCTTCAAG

ACCATCTTCGGAGCCGGCACCAGACTGTTCGTGAAGGCCAACATCCAGAACCCTGACC

CTGCCGTGTACCAGCTGAGGGACAGCAAGAGCAGCGACAAGAGCGTGTGTCTGTTCA

CCGACTTCGACAGCCAGACCAACGTGTCCCAGAGCAAGGACAGCGACGTGTACATCAC

CGACAAGTGCGTGCTGGACATGCGGAGCATGGACTTCAAGAGCAACAGCGCCGTGGC

CTGGAGCAACAAGAGCGACTTCGCCTGTGCCAACGCCTTCAACAACAGCATCATCCCC

GAGGACACCTTTTTCCCCAGCCCTGAGAGCAGCTGTGACGTGAAACTGGTGGAGAAGA

GCTTCGAGACCGACACCAACCTGAACTTCCAGAACCTGAGCGTGATCGGCTTCAGGAT

CCTGCTGCTGAAGGTGGCCGGCTTCAACCTGCTGATGACCCTGAGACTGTGGTCCAGC

TGA
```

(codon optimised nucleic acid sequence for Vα (VJ) domain of HA-1ᴴ TCR M7 and constant domain (murine)):

SEQ ID NO: 51

```
ATGAAGAGCCTGCGCGTGCTGCTGGTCATCCTGTGGCTGCAATTGTCGTGGGTCTGGA

GCCAAATGCTGCTGATCACCTCCATGCTGGTGCTGTGGATGCAGCTGTCCCAGGTGAA

CGGCCAGCAGGTGATGCAGATCCCCCAGTACCAGCACGTGCAGGAGGGCGAGGATTT

CACCACCTACTGTAACAGCAGCACCACCCTGAGCAACATCCAGTGGTACAAGCAGAGA

CCTGGCGGCCACCCCGTGTTCCTGATCCAGCTGGTGAAGAGCGGCGAGGTGAAGAAG

CAGAAGCGGCTGACCTTCCAGTTCGGCGAGGCCAAGAAGAATAGCAGCCTGCACATCA

CCGCCACCCAGACCACCGATGTGGGCACCTACTTCTGTGCCGGCAATACCGGCGGCT

TCAAGACCATCTTCGGAGCCGGCACCAGACTGTTCGTGAAGGCCGACATTCAGAACCC

GGAACCGGCTGTATACCAGCTGAAGGACCCCCGATCTCAGGATAGTACTCTGTGCCTG

TTCACCGACTTTGATAGTCAGATCAATGTGCCTAAAACCATGGAATCCGGAACTTTTATT

ACCGACAAGTGCGTGCTGGATATGAAAGCCATGGACAGTAAGTCAAACGGCGCCATCG

CTTGGAGCAATCAGACATCCTTCACTTGCCAGGATATCTTCAAGGAGACCAACGCAACA

TACCCATCCTCTGACGTGCCCTGTGATGCCACCCTGACAGAGAAGTCTTTCGAAACAGA

CATGAACCTGAATTTTCAGAATCTGAGCGTGATGGGCCTGAGAATCCTGCTGCTGAAG

GTCGCTGGGTTTAATCTGCTGATGACACTGCGGCTGTGGTCCTCATGA
```

(amino acid sequence for Vβ (VDJ) domain and constant domain of HA-1ᴴ TCR M7):

SEQ ID NO: 52

MGTSLLCWMALCLLGADHADTGVSQDPRHKITKRGQNVTFRCDPISEHNRLYWYRQTLGQ

GPEFLTYFQNEAQLEKSRLLSDRFSAERPKGSFSTLEIQRTEQGDSAMYLCASSLLGNQPQ

HFGDGTRLSILEDLNKVFPPEVAVFEPSEAEISHTQKATLVCLATGFFPDHVELSWWVNGK

EVHSGVSTDPQPLKEQPALNDSRYCLSSRLRVSATFWQNPRNHFRCQVQFYGLSENDEW

TQDRAKPVTQIVSAEAWGRADCGFTSVSYQQGVLSATILYEILLGKATLYAVLVSALVLMAM

VKRKDF*

(amino acid sequence for Vβ (VDJ) domain of HA-1ᴴ TCR M7 and constant domain (murine)):

SEQ ID NO: 53

MGTSLLCWMALCLLGADHADTGVSQDPRHKITKRGQNVTFRCDPISEHNRLYWYRQTLGQ

GPEFLTYFQNEAQLEKSRLLSDRFSAERPKGSFSTLEIQRTEQGDSAMYLCASSLLGNQPQ

HFGDGTRLSILEDLRNVTPPKVSLFEPSKAEIANKQKATLVCLARGFFPDHVELSWWVNGK

EVHSGVCTDPQAYKESNYSYCLSSRLRVSATFWHNPRNHFRCQVQFHGLSEEDKWPEGS

PKPVTQNISAEAWGRADCGITSASYHQGVLSATILYEILLGKATLYAVLVSGLVLMAMVKKK

NS*

(nucleic acid sequence for Vβ (VDJ) domain and constant domain of HA-1$^H$ TCR M7):

SEQ ID NO: 54

ATGGGCACCAGCCTCCTCTGCTGGATGGCCCTGTGTCTCCTGGGGGCAGATCACGCA

GATACTGGAGTCTCCCAGGACCCCAGACACAAGATCACAAAGAGGGGACAGAATGTAA

CTTTCAGGTGTGATCCAATTTCTGAACACAACCGCCTTTATTGGTACCGACAGACCCTG

GGGCAGGGCCCAGAGTTTCTGACTTACTTCCAGAATGAAGCTCAACTAGAAAAATCAAG

GCTGCTCAGTGATCGGTTCTCTGCAGAGAGGCCTAAGGGATCTTTCTCCACCTTGGAG

ATCCAGCGCACAGAGCAGGGGGACTCGGCCATGTATCTCTGTGCCAGCAGCTTATTGG

GTAATCAGCCCCAGCATTTTGGTGATGGGACTCGACTCTCCATCCTAGAGGACCTGAA

CAAGGTGTTCCCACCCGAGGTCGCTGTGTTTGAGCCATCAGAAGCAGAGATCTCCCAC

ACCCAAAAGGCCACACTGGTGTGCCTGGCCACAGGCTTCTTCCCCGACCACGTGGAG

CTGAGCTGGTGGGTGAATGGGAAGGAGGTGCACAGTGGGGTCAGCACAGACCCGCAG

CCCCTCAAGGAGCAGCCCGCCCTCAATGACTCCAGATACTGCCTGAGCAGCCGCCTGA

GGGTCTCGGCCACCTTCTGGCAGAACCCCCGCAACCACTTCCGCTGTCAAGTCCAGTT

CTACGGGCTCTCGGAGAATGACGAGTGGACCCAGGATAGGGCCAAACCCGTCACCCA

GATCGTCAGCGCCGAGGCCTGGGGTAGAGCAGACTGTGGCTTTACCTCGGTGTCCTA

CCAGCAAGGGGTCCTGTCTGCCACCATCCTCTATGAGATCCTGCTAGGGAAGGCCACC

CTGTATGCTGTGCTGGTCAGCGCCCTTGTGTTGATGGCCATGGTCAAGAGAAAGGATT

TCTGA (codon optimised nucleic acid sequence for Vβ (VDJ) domain and constant domain of HA-1$^H$ TCR M7):

SEQ ID NO: 55

ATGGGCACCAGCCTGCTGTGCTGGATGGCCCTGTGCCTGCTGGGCGCTGACCATGCT

GATACCGGCGTGAGCCAGGACCCCCGGCACAAGATCACCAAGCGGGGCCAGAACGTG

ACCTTCAGATGCGACCCCATCAGCGAGCACAACCGGCTGTACTGGTACAGACAGACCC

TGGGCCAGGGCCCCGAGTTCCTGACCTACTTCCAGAACGAGGCCCAGCTGGAAAAGA

GCCGGCTGCTGTCCGACCGGTTCAGCGCCGAGCGGCCCAAGGGCAGCTTCAGCACCC

TGGAAATCCAGCGGACCGAGCAGGGCGACAGCGCCATGTACCTGTGCGCCAGCTCCC

TGCTGGGCAACCAGCCCCAGCACTTCGGCGACGGCACCAGACTGAGCATCCTGGAAG

ATCTGAACAAGGTGTTCCCCCCCGAGGTGGCCGTGTTCGAGCCCAGCGAGGCCGAGA

TCAGCCACACCCAGAAAGCCACCCTGGTGTGCCTGGCCACCGGCTTTTTCCCCGACCA

CGTGGAGCTGTCTTGGTGGGTGAACGGCAAAGAGGTGCACAGCGGCGTCAGCACCGA

CCCCCAGCCCCTGAAAGAGCAGCCCGCCCTGAACGACAGCCGGTACTGCCTGTCTAG

CCGGCTGCGGGTGTCCGCCACCTTCTGGCAGAACCCCCGGAACCACTTCCGGTGCCA

GGTGCAGTTCTACGGCCTGAGCGAGAACGACGAGTGGACCCAGGACAGAGCCAAGCC

CGTGACCCAGATCGTGTCCGCCGAGGCCTGGGGCAGAGCCGACTGCGGCTTCACCAG

CGTGTCCTACCAGCAGGGCGTGCTGTCTGCCACCATCCTGTACGAGATCCTGCTGGGG

AAGGCCACCCTGTACGCCGTGCTGGTGTCCGCCCTGGTGCTGATGGCCATGGTGAAG

CGGAAGGACTTCTGA (codon optimised nucleic acid sequence for Vβ (VDJ) of HA-1$^H$ TCR M7 domain and constant domain (murine)):

SEQ ID NO: 56

ATGGGCACCAGCCTGCTGTGCTGGATGGCCCTGTGCCTGCTGGGCGCTGACCATGCT

GATACCGGCGTGAGCCAGGACCCCCGGCACAAGATCACCAAGCGGGGCCAGAACGTG

ACCTTCAGATGCGACCCCATCAGCGAGCACAACCGGCTGTACTGGTACAGACAGACCC

TGGGCCAGGGCCCCGAGTTCCTGACCTACTTCCAGAACGAGGCCCAGCTGGAAAAGA

GCCGGCTGCTGTCCGACCGGTTCAGCGCCGAGCGGCCCAAGGGCAGCTTCAGCACCC

TGGAAATCCAGCGGACCGAGCAGGGCGACAGCGCCATGTACCTGTGCGCCAGCTCCC

TGCTGGGCAACCAGCCCCAGCACTTCGGCGACGGCACCAGACTGAGCATCCTGGAAG

ATCTACGTAACGTGACACCACCCAAAGTCTCACTGTTTGAGCCTAGCAAGGCAGAAATT

GCCAACAAGCAGAAGGCCACCCTGGTGTGCCTGGCAAGAGGGTTCTTTCCAGATCACG

TGGAGCTGTCCTGGTGGGTCAACGGCAAAGAAGTGCATTCTGGGGTCTGCACCGACC

CCCAGGCTTACAAGGAGAGTAATTACTCATATTGTCTGTCAAGCCGGCTGAGAGTGTCC

GCCACATTCTGGCACAACCCTAGGAATCATTTCCGCTGCCAGGTCCAGTTTCACGGCC

TGAGTGAGGAAGATAAATGGCCAGAGGGGTCACCTAAGCCAGTGACACAGAACATCAG

CGCAGAAGCCTGGGGACGAGCAGACTGTGGCATTACTAGCGCCTCCTATCATCAGGG

CGTGCTGAGCGCCACTATCCTGTACGAGATTCTGCTGGGAAAGGCCACCCTGTATGCT

GTGCTGGTCTCCGGCCTGGTGCTGATGGCCATGGTCAAGAAAAAGAACTCTTGA (amino acid sequence for Vα (VJ) domain and constant domain of HA-1$^H$ TCR M2):

SEQ ID NO: 57

MTSIRAVFIFLWLQLDLVNGENVEQHPSTLSVQEGDSAVIKCTYSDSASNYFPWYKQELGK

RPQLIIDIRSNVGEKKDQRIAVTLNKTAKHFSLHITETQPEDSAVYFCAARNSGAGSYQLTFG

KGTKLSVIPNIQNPDPAVYQLRDSKSSDKSVCLFTDFDSQTNVSQSKDSDVYITDKTVLDMR

SMDFKSNSAVAWSNKSDFACANAFNNSIIPEDTFFPSPESSCDVKLVEKSFETDTNLNFQN

LSVIGFRILLLKVAGFNLLMTLRLWSS*

(amino acid sequence for Vα (VJ) domain of HA-1$^H$ TCR M2 and constant domain (murine)):

SEQ ID NO: 58

MKSLRVLLVILWLQLSWVWSQGENVEQHPSTLSVQEGDSAVIKCTYSDSASNYFPWYKQE

LGKRPQLIIDIRSNVGEKKDQRIAVTLNKTAKHFSLHITETQPEDSAVYFCAARNSGAGSYQL

TFGKGTKLSVIPDIQNPEPAVYQLKDPRSQDSTLCLFTDFDSQINVPKTMESGTFITDKCVLD

MKAMDSKSNGAIAWSNQTSFTCQDIFKETNATYPSSDVPCDATLTEKSFETDMNLNFQNLS

VMGLRILLLKVAGFNLLMTLRLWSS*

(nucleic acid sequence for Vα (VJ) domain and constant domain of HA-1$^H$ TCR M2):

SEQ ID NO: 59

ATGACATCCATTCGAGCTGTATTTATATTCCTGTGGCTGCAGCTGGACTTGGTGAATGG

AGAGAATGTGGAGCAGCATCCTTCAACCCTGAGTGTCCAGGAGGGAGACAGCGCTGTT

ATCAAGTGTACTTATTCAGACAGTGCCTCAAACTACTTCCCTTGGTATAAGCAAGAACTT

GGAAAAAGACCTCAGCTTATTATAGACATTCGTTCAAATGTGGGCGAAAAGAAAGACCA

ACGAATTGCTGTTACATTGAACAAGACAGCCAAACATTTCTCCCTGCACATCACAGAGA

-continued

CCCAACCTGAAGACTCGGCTGTCTACTTCTGTGCAGCAAGGAACTCTGGGGCTGGGAG

TTACCAACTCACTTTCGGGAAGGGGACCAAACTCTCGGTCATACCAAATATCCAGAACC

CTGACCCTGCCGTGTACCAGCTGAGAGACTCTAAATCCAGTGACAAGTCTGTCTGCCTA

TTCACCGATTTTGATTCTCAAACAAATGTGTCACAAAGTAAGGATTCTGATGTGTATATC

ACAGACAAAACTGTGCTAGACATGAGGTCTATGGACTTCAAGAGCAACAGTGCTGTGG

CCTGGAGCAACAAATCTGACTTTGCATGTGCAAACGCCTTCAACAACAGCATTATTCCA

GAAGACACCTTCTTCCCCAGCCCAGAAAGTTCCTGTGATGTCAAGCTGGTCGAGAAAA

GCTTTGAAACAGATACGAACCTAAACTTTCAAAACCTGTCAGTGATTGGGTTCCGAATC

CTCCTCCTGAAAGTGGCCGGGTTTAATCTGCTCATGACGCTGCGGTTGTGGTCCAGCT

GA (codon optimised nucleic acid sequence for Vα (VJ) domain and constant domain of HA-1$^H$ TCR M2):     SEQ ID NO: 60

ATGACCAGCATCCGGGCCGTGTTCATCTTCCTGTGGCTGCAGCTGGACCTGGTGAACG

GCGAGAACGTGGAGCAGCACCCCAGCACCCTGAGCGTGCAGGAGGGCGACAGCGCC

GTGATCAAGTGCACCTACAGCGACAGCGCCAGCAACTACTTCCCCTGGTACAAGCAGG

AGCTGGGCAAGCGGCCCCAGCTGATCATCGACATCCGGAGCAACGTGGGCGAGAAGA

AGGACCAGCGGATCGCCGTGACCCTGAACAAGACCGCCAAGCACTTCAGCCTGCACAT

CACCGAGACCCAGCCCGAGGACAGCGCCGTGTACTTCTGCGCCGCCCGGAACAGCGG

CGCCGGCAGCTACCAGCTGACCTTCGGCAAGGGCACCAAGCTGAGCGTGATCCCCAA

CATCCAGAACCCCGACCCCGCCGTGTACCAGCTGCGGGACAGCAAGAGCAGCGACAA

GAGCGTGTGCCTGTTCACCGACTTCGACAGCCAGACCAACGTGAGCCAGAGCAAGGA

CAGCGACGTGTACATCACCGACAAGTGCGTGCTGGACATGCGGAGCATGGACTTCAAG

AGCAACAGCGCCGTGGCCTGGAGCAACAAGAGCGACTTCGCCTGCGCCAACGCCTTC

AACAACAGCATCATCCCCGAGGACACCTTCTTCCCCAGCCCCGAGAGCAGCTGCGACG

TGAAGCTGGTGGAGAAGAGCTTCGAGACCGACACCAACCTGAACTTCCAGAACCTGAG

CGTGATCGGCTTCCGGATCCTGCTGCTGAAGGTGGCCGGCTTCAACCTGCTGATGACC

CTGCGGCTGTGGAGCAGCTGA (codon optimised nucleic acid sequence for Vα (VJ) domain of HA-1$^H$ TCR M2 and constant domain (murine)):     SEQ ID NO: 61

ATGAAGAGCCTGCGCGTGCTGCTGGTCATCCTGTGGCTGCAATTGTCGTGGGTCTGGA

GCCAAGGCGAGAACGTGGAGCAGCACCCCAGCACCCTGAGCGTGCAGGAGGGCGAC

AGCGCCGTGATCAAGTGCACCTACAGCGACAGCGCCAGCAACTACTTCCCCTGGTACA

AGCAGGAGCTGGGCAAGCGGCCCCAGCTGATCATCGACATCCGGAGCAACGTGGGCG

AGAAGAAGGACCAGCGGATCGCCGTGACCCTGAACAAGACCGCCAAGCACTTCAGCC

TGCACATCACCGAGACCCAGCCCGAGGACAGCGCCGTGTACTTCTGCGCCGCCCGGA

ACAGCGGCGCCGGCAGCTACCAGCTGACCTTCGGCAAGGGCACCAAGCTGAGCGTGA

TCCCCGACATTCAGAACCCGGAACCGGCTGTATACCAGCTGAAGGACCCCCGATCTCA

GGATAGTACTCTGTGCCTGTTCACCGACTTTGATAGTCAGATCAATGTGCCTAAAACCA

TGGAATCCGGAACTTTTATTACCGACAAGTGCGTGCTGGATATGAAAGCCATGGACAGT

AAGTCAAACGGCGCCATCGCTTGGAGCAATCAGACATCCTTCACTTGCCAGGATATCTT

CAAGGAGACCAACGCAACATACCCATCCTCTGACGTGCCCTGTGATGCCACCCTGACA

GAGAAGTCTTTCGAAACAGACATGAACCTGAATTTTCAGAATCTGAGCGTGATGGGCCT

-continued

GAGAATCCTGCTGCTGAAGGTCGCTGGGTTTAATCTGCTGATGACACTGCGGCTGTGG

TCCTCATGA (amino acid sequence for Vβ (VDJ) domain and constant domain of HA-1$^H$ TCR M2):

SEQ ID NO: 62

MGTSLLCWMALCLLGADHADTGVSQNPRHKITKRGQNVTFRCDPISEHNRLYWYRQTLGQ

GPEFLTYFQNEAQLEKSRLLSDRFSAERPKGSFSTLEIQRTEQGDSAMYLCASLTVQNTEA

FFGQGTRLTVVEDLNKVFPPEVAVFEPSEAEISHTQKATLVCLATGFFPDHVELSWWVNGK

EVHSGVSTDPQPLKEQPALNDSRYCLSSRLRVSATFWQNPRNHFRCQVQFYGLSENDEW

TQDRAKPVTQIVSAEAWGRADCGFTSVSYQQGVLSATILYEILLGKATLYAVLVSALVLMAM

VKRKDF*

(amino acid sequence for Vβ (VDJ) domain of HA-1$^H$ TCR M2 and constant domain (murine)):

SEQ ID NO: 63

MGTSLLCWMALCLLGADHADTGVSQNPRHKITKRGQNVTFRCDPISEHNRLYWYRQTLGQ

GPEFLTYFQNEAQLEKSRLLSDRFSAERPKGSFSTLEIQRTEQGDSAMYLCASLTVQNTEA

FFGQGTRLTVVEDLRNVTPPKVSLFEPSKAEIANKQKATLVCLARGFFPDHVELSWWVNGK

EVHSGVCTDPQAYKESNYSYCLSSRLRVSATFWHNPRNHFRCQVQFHGLSEEDKWPEGS

PKPVTQNISAEAWGRADCGITSASYHQGVLSATILYEILLGKATLYAVLVSGLVLMAMVKKK

NS*

(nucleic acid sequence for Vβ (VDJ) domain and constant domain of HA-1$^H$ TCR M2):

SEQ ID NO: 64

ATGGGCACCAGCCTCCTCTGCTGGATGGCCCTGTGTCTCCTGGGGGCAGATCACGCA

GATACTGGAGTCTCCCAGAACCCCAGACACAAGATCACAAAGAGGGGACAGAATGTAA

CTTTCAGGTGTGATCCAATTTCTGAACACAACCGCCTTTATTGGTACCGACAGACCCTG

GGGCAGGGCCCAGAGTTTCTGACTTACTTCCAGAATGAAGCTCAACTAGAAAAATCAAG

GCTGCTCAGTGATCGGTTCTCTGCAGAGAGGCCTAAGGGATCTTTCTCCACCTTGGAG

ATCCAGCGCACAGAGCAGGGGACTCGGCCATGTATCTCTGTGCCAGCTTGACGGTAC

AGAACACTGAAGCTTTCTTTGGACAAGGCACCAGACTCACAGTTGTAGAGGACCTGAAC

AAGGTGTTCCCACCCGAGGTCGCTGTGTTTGAGCCATCAGAAGCAGAGATCTCCCACA

CCCAAAAGGCCACACTGGTGTGCCTGGCCACAGGCTTCTTCCCTGACCACGTGGAGCT

GAGCTGGTGGGTGAATGGGAAGGAGGTGCACAGTGGGGTCAGCACGGACCCCGCAGC

CCCTCAAGGAGCAGCCCGCCCTCAATGACTCCAGATACTGCCTGAGCAGCCGCCTGA

GGGTCTCGGCCACCTTCTGGCAGAACCCCCGCAACCACTTCCGCTGTCAAGTCCAGTT

CTACGGGCTCTCGGAGAATGACGAGTGGACCCAGGATAGGGCCAAACCCGTCACCCA

GATCGTCAGCGCCGAGGCCTGGGGTAGAGCAGACTGTGGCTTTACCTCGGTGTCCTA

CCAGCAAGGGGTCCTGTCTGCCACCATCCTCTATGAGATCCTGCTAGGGAAGGCCACC

CTGTATGCTGTGCTGGTCAGCGCCCTTGTGTTGATGGCCATGGTCAAGAGAAAGGATT

TCTGA (codon optimised nucleic acid sequence for Vβ (VDJ) domain and constant domain of HA-1$^H$ TCR M2):

SEQ ID NO: 65

ATGGGCACCAGCCTGCTGTGCTGGATGGCCCTGTGCCTGCTGGGCGCCGACCACGCC

GACACCGGCGTGAGCCAGAACCCCCGGCACAAGATCACCAAGCGGGGCCAGAACGTG

ACCTTCCGGTGCGACCCCATCAGCGAGCACAACCGGCTGTACTGGTACCGGCAGACC

-continued

CTGGGCCAGGGCCCCGAGTTCCTGACCTACTTCCAGAACGAGGCCCAGCTGGAGAAG

AGCCGGCTGCTGAGCGACCGGTTCAGCGCCGAGCGGCCCAAGGGCAGCTTCAGCAC

CCTGGAGATCCAGCGGACCGAGCAGGGCGACAGCGCCATGTACCTGTGCGCCAGCCT

GACCGTGCAGAACACCGAGGCCTTCTTCGGCCAGGGCACCCGGCTGACCGTGGTGGA

GGACCTGAACAAGGTGTTCCCCCCCGAGGTGGCCGTGTTCGAGCCCAGCGAGGCCGA

GATCAGCCACACCCAGAAGGCCACCCTGGTGTGCCTGGCCACCGGCTTCTTCCCCGA

CCACGTGGAGCTGAGCTGGTGGGTGAACGGCAAGGAGGTGCACAGCGGCGTGAGCT

GCGACCCCCAGCCCCTGAAGGAGCAGCCCGCCCTGAACGACAGCCGGTACTGCCTGA

GCAGCCGGCTGCGGGTGAGCGCCACCTTCTGGCAGAACCCCCGGAACCACTTCCGGT

GCCAGGTGCAGTTCTACGGCCTGAGCGAGAACGACGAGTGGACCCAGGACCGGGCCA

AGCCCGTGACCCAGATCGTGAGCGCCGAGGCCTGGGGCCGGGCCGACTGCGGCTTC

ACCAGCGTGAGCTACCAGCAGGGCGTGCTGAGCGCCACCATCCTGTACGAGATCCTG

CTGGGCAAGGCCACCCTGTACGCCGTGCTGGTGAGCGCCCTGGTGCTGATGGCCATG

GTGAAGCGGAAGGACTTCTGA (codon optimised nucleic acid sequence for Vβ (VDJ) domain of HA-1$^H$ TCR
M2 and constant domain (murine)):

SEQ ID NO: 66

ATGGGCACCAGCCTGCTGTGCTGGATGGCCCTGTGCCTGCTGGGCGCCGACCACGCC

GACACCGGCGTGAGCCAGAACCCCCGGCACAAGATCACCAAGCGGGGCCAGAACGTG

ACCTTCCGGTGCGACCCCATCAGCGAGCACAACCGGCTGTACTGGTACCGGCAGACC

CTGGGCCAGGGCCCCGAGTTCCTGACCTACTTCCAGAACGAGGCCCAGCTGGAGAAG

AGCCGGCTGCTGAGCGACCGGTTCAGCGCCGAGCGGCCCAAGGGCAGCTTCAGCAC

CCTGGAGATCCAGCGGACCGAGCAGGGCGACAGCGCCATGTACCTGTGCGCCAGCCT

GACCGTGCAGAACACCGAGGCCTTCTTCGGCCAGGGCACCCGGCTGACCGTGGTGGA

AGATCTACGTAACGTGACACCACCCAAAGTCTCACTGTTTGAGCCTAGCAAGGCAGAAA

TTGCCAACAAGCAGAAGGCCACCCTGGTGTGCCTGGCAAGAGGGTTCTTTCCAGATCA

CGTGGAGCTGTCCTGGTGGGTCAACGGCAAAGAAGTGCATTCTGGGGTCTGCACCGA

CCCCCAGGCTTACAAGGAGAGTAATTACTCATATTGTCTGTCAAGCCGGCTGAGAGTGT

CCGCCACATTCTGGCACAACCCTAGGAATCATTTCCGCTGCCAGGTCCAGTTTCACGG

CCTGAGTGAGGAAGATAAATGGCCAGAGGGGTCACCTAAGCCAGTGACACAGAACATC

AGCGCAGAAGCCTGGGGACGAGCAGACTGTGGCATTACTAGCGCCTCCTATCATCAGG

GCGTGCTGAGCGCCACTATCCTGTACGAGATTCTGCTGGGAAAGGCCACCCTGTATGC

TGTGCTGGTCTCCGGCCTGGTGCTGATGGCCATGGTCAAGAAAAAGAACTCTTGA (amino acid sequence for Vα (VJ) domain and constant domain of HA-1$^H$
TCR FK47.83):

SEQ ID NO: 67

MTSIRAVFIFLWLQLDLVNGENVEQHPSTLSVQEGDSAVIKCTYSDSASNYFPWYKQELGK

RPQLIIDIRSNVGEKKDQRIAVTLNKTAKHFSLHITETQPEDSAVYFCAASNLVFGAGTILRVK

SYIQNPDPAVYQLRDSKSSDKSVCLFTDFDSQTNVSQSKDSDVYITDKTVLDMRSMDFKSN

SAVAWSNKSDFACANAFNNSIIPEDTFFPSPESSCDVKLVEKSFETDTNLNFQNLSVIGFRIL

LLKVAGFNLLMTLRLWSS*

(amino acid sequence for Vα (VJ) domain of HA-1$^H$ TCR FK47.83 and constant domain (murine)):

SEQ ID NO: 68

MKSLRVLLVILWLQLSWVWSQGENVEQHPSTLSVQEGDSAVIKCTYSDSASNYFPWYKQE

LGKRPQLIIDIRSNVGEKKDQRIAVTLNKTAKHFSLHITETQPEDSAVYFCAASNLVFGAGTIL

RVKSDIQNPEPAVYQLKDPRSQDSTLCLFTDFDSQINVPKTMESGTFITDKCVLDMKAMDS

KSNGAIAWSNQTSFTCQDIFKETNATYPSSDVPCDATLTEKSFETDMNLNFQNLSVMGLRIL

LLKVAGFNLLMTLRLWSS*

(nucleic acid sequence for Vα (VJ) domain and constant domain of HA-1$^H$ TCR FK47.83):

SEQ ID NO: 69

ATGACATCCATTCGAGCTGTATTTATATTCCTGTGGCTGCAGCTGGACTTGGTGAATGG

AGAGAATGTGGAGCAGCATCCTTCAACCCTGAGTGTCCAGGAGGGAGACAGCGCTGTT

ATCAAGTGTACTTATTCAGACAGTGCCTCAAACTACTTCCCTTGGTATAAGCAAGAACTT

GGAAAAAGACCTCAGCTTATTATAGACATTCGTTCAAATGTGGGCGAAAAGAAAGACCA

ACGAATTGCTGTTACATTGAACAAGACAGCCAAACATTTCTCCCTGCACATCACAGAGA

CCCAACCTGAAGACTCGGCTGTCTACTTCTGTGCAGCAAGTAATCTGGTOTTTGGCGCA

GGAACCATTCTGAGAGTCAAGTCCTATATCCAGAACCCTGACCCTGCCGTGTACCAGCT

GAGAGACTCTAAATCCAGTGACAAGTCTGTCTGCCTATTCACCGATTTTGATTCTCAAAC

AAATGTGTCACAAAGTAAGGATTCTGATGTGTATATCACAGACAAAACTGTGCTAGACAT

GAGGTCTATGGACTTCAAGAGCAACAGTGCTGTGGCCTGGAGCAACAAATCTGACTTT

GCATGTGCAAACGCCTTCAACAACAGCATTATTCCAGAAGACACCTTCTTCCCCAGCCC

AGAAAGTTCCTGTGATGTCAAGCTGGTCGAGAAAAGCTTTGAAACAGATACGAACCTAA

ACTTTCAAAACCTGTCAGTGATTGGGTTCCGAATCCTCCTCCTGAAAGTGGCCGGGTTT

AATCTGCTCATGACGCTGCGGTTGTGGTCCAGCTGA (codon optimised nucleic acid sequence for Vα (VJ) domain and constant domain of HA-1$^H$ TCR FK47.83):

SEQ ID NO: 70

ATGACCAGCATCCGGGCCGTGTTCATCTTCCTGTGGCTGCAGCTGGACCTGGTGAACG

GCGAGAACGTGGAGCAGCACCCCAGCACCCTGAGCGTGCAGGAGGGCGACAGCGCC

GTGATCAAGTGCACCTACAGCGACAGCGCCAGCAACTACTTCCCCTGGTACAAGCAGG

AGCTGGGCAAGCGGCCCCAGCTGATCATCGACATCCGGAGCAACGTGGGCGAGAAGA

AGGACCAGCGGATCGCCGTGACCCTGAACAAGACCGCCAAGCACTTCAGCCTGCACAT

CACCGAGACCCAGCCCGAGGACAGCGCCGTGTACTTCTGCGCCGCCAGCAACCTGGT

GTTCGGCGCCGGCACCATCCTGCGGGTGAAGAGCTACATCCAGAACCCCGACCCCGC

CGTGTACCAGCTGCGGGACAGCAAGAGCAGCGACAAGAGCGTGTGCCTGTTCACCGA

CTTCGACAGCCAGACCAACGTGAGCCAGAGCAAGGACAGCGACGTGTACATCACCGA

CAAGTGCGTGCTGGACATGCGGAGCATGGACTTCAAGAGCAACAGCGCCGTGGCCTG

GAGCAACAAGAGCGACTTCGCCTGCGCCAACGCCTTCAACAACAGCATCATCCCCGAG

GACACCTTCTTCCCCAGCCCCGAGAGCAGCTGCGACGTGAAGCTGGTGGAGAAGAGC

TTCGAGACCGACACCAACCTGAACTTCCAGAACCTGAGCGTGATCGGCTTCCGGATCC

TGCTGCTGAAGGTGGCCGGCTTCAACCTGCTGATGACCCTGCGGCTGTGGAGCAGCT

GA (codon optimised nucleic acid sequence for Vα (VJ) domain of HA-1$^H$ TCR
FK47.83 and constant domain (murine)):

SEQ ID NO: 71

ATGAAGAGCCTGCGCGTGCTGCTGGTCATCCTGTGGCTGCAATTGTCGTGGGTCTGGA

GCCAAGGCGAGAACGTGGAGCAGCACCCCAGCACCCTGAGCGTGCAGGAGGGCGAC

AGCGCCGTGATCAAGTGCACCTACAGCGACAGCGCCAGCAACTACTTCCCCTGGTACA

AGCAGGAGCTGGGCAAGCGGCCCCAGCTGATCATCGACATCCGGAGCAACGTGGGCG

AGAAGAAGGACCAGCGGATCGCCGTGACCCTGAACAAGACCGCCAAGCACTTCAGCC

TGCACATCACCGAGACCCAGCCCGAGGACAGCGCCGTGTACTTCTGCGCCGCCAGCA

ACCTGGTGTTCGGCGCCGGCACCATCCTGCGGGTGAAGAGCGACATTCAGAACCCGG

AACCGGCTGTATACCAGCTGAAGGACCCCCGATCTCAGGATAGTACTCTGTGCCTGTT

CACCGACTTTGATAGTCAGATCAATGTGCCTAAAACCATGGAATCCGGAACTTTTATTAC

CGACAAGTGCGTGCTGGATATGAAAGCCATGGACAGTAAGTCAAACGGCGCCATCGCT

TGGAGCAATCAGACATCCTTCACTTGCCAGGATATCTTCAAGGAGACCAACGCAACATA

CCCATCCTCTGACGTGCCCTGTGATGCCACCCTGACAGAGAAGTCTTTCGAAACAGAC

ATGAACCTGAATTTTCAGAATCTGAGCGTGATGGGCCTGAGAATCCTGCTGCTGAAGGT

CGCTGGGTTTAATCTGCTGATGACACTGCGGCTGTGGTCCTCATGA (amino acid sequence for Vβ (VDJ) domain and constant domain of HA-1$^H$
TCR FK47.83):

SEQ ID NO: 72

MGTSLLCWMALCLLGADHADTGVSQNPRHKITKRGQNVTFRCDPISEHNRLYWYRQTLGQ

GPEFLTYFQNEAQLEKSRLLSDRFSAERPKGSFSTLEIQRTEQGDSAMYLCASSLVVVDEQ

FFGPGTRLTVLEDLKNVFPPEVAVFEPSEAEISHTQKATLVCLATGFYPDHVELSWWVNGK

EVHSGVSTDPQPLKEQPALNDSRYCLSSRLRVSATFWQNPRNHFRCQVQFYGLSENDEW

TQDRAKPVTQIVSAEAWGRADCGFTSESYQQGVLSATILYEILLGKATLYAVLVSALVLMAM

VKRKDSRG*

(amino acid sequence for Vβ (VDJ) domain and constant domain (murine) of
HA-1$^H$ TCR FK47.83):

SEQ ID NO: 73

MGTSLLCWMALCLLGADHADTGVSQNPRHKITKRGQNVTFRCDPISEHNRLYWYRQTLGQ

GPEFLTYFQNEAQLEKSRLLSDRFSAERPKGSFSTLEIQRTEQGDSAMYLCASSLVVVDEQ

FFGPGTRLTVLEDLRNVTPPKVSLFEPSKAEIANKQKATLVCLARGFFPDHVELSWWVNGK

EVHSGVCTDPQAYKESNYSYCLSSRLRVSATFWHNPRNHFRCQVQFHGLSEEDKWPEGS

PKPVTQNISAEAWGRADCGITSASYHQGVLSATILYEILLGKATLYAVLVSGLVLMAMVKKK

NS*

(nucleic acid sequence for Vβ (VDJ) domain and constant domain of HA-1$^H$
TCR FK47.83):

SEQ ID NO: 74

ATGGGCACCAGCCTCCTCTGCTGGATGGCCCTGTGTCTCCTGGGGGCAGATCACGCA

GATACTGGAGTCTCCCAGAACCCCAGACACAAGATCACAAAGAGGGGACAGAATGTAA

CTTTCAGGTGTGATCCAATTTCTGAACACAACCGCCTTTATTGGTACCGACAGACCCTG

GGGCAGGGCCCAGAGTTTCTGACTTACTTCCAGAATGAAGCTCAACTAGAAAAATCAAG

GCTGCTCAGTGATCGGTTCTCTGCAGAGAGGCCTAAGGGATCTTTCTCCACCTTGGAG

ATCCAGCGCACAGAGCAGGGGACTCGGCCATGTATCTCTGTGCCAGCAGCTTAGTCG

TTGTGGATGAGCAGTTCTTCGGGCCAGGGACACGGCTCACCGTGCTAGAGGACCTGAA

AAACGTGTTCCCACCCGAGGTCGCTGTGTTTGAGCCATCAGAAGCAGAGATCTCCCAC

-continued

ACCCAAAAGGCCACACTGGTATGCCTGGCCACAGGCTTCTACCCCGACCACGTGGAGC

TGAGCTGGTGGGTGAATGGGAAGGAGGTGCACAGTGGGGTCAGCACAGACCCGCAGC

CCCTCAAGGAGCAGCCCGCCCTCAATGACTCCAGATACTGCCTGAGCAGCCGCCTGA

GGGTCTCGGCCACCTTCTGGCAGAACCCCCGCAACCACTTCCGCTGTCAAGTCCAGTT

CTACGGGCTCTCGGAGAATGACGAGTGGACCCAGGATAGGGCCAAACCTGTCACCCA

GATCGTCAGCGCCGAGGCCTGGGGTAGAGCAGACTGTGGCTTCACCTCCGAGTCTTA

CCAGCAAGGGGTCCTGTCTGCCACCATCCTCTATGAGATCTTGCTAGGGAAGGCCACC

TTGTATGCCGTGCTGGTCAGTGCCCTCGTGCTGATGGCCATGGTCAAGAGAAAGGATT

CCAGAGGCTAG (codon optimised nucleic acid sequence for Vβ (VDJ) domain and constant
domain of HA-1$^H$ TCR FK47.83):
SEQ ID NO: 75

ATGGGCACCAGCCTGCTGTGCTGGATGGCCCTGTGCCTGCTGGGCGCCGACCACGCC

GACACCGGCGTGAGCCAGAACCCCCGGCACAAGATCACCAAGCGGGGCCAGAACGTG

ACCTTCCGGTGCGACCCCATCAGCGAGCACAACCGGCTGTACTGGTACCGGCAGACC

CTGGGCCAGGGCCCCGAGTTCCTGACCTACTTCCAGAACGAGGCCCAGCTGGAGAAG

AGCCGGCTGCTGAGCGACCGGTTCAGCGCCGAGCGGCCCAAGGGCAGCTTCAGCAC

CCTGGAGATCCAGCGGACCGAGCAGGGCGACAGCGCCATGTACCTGTGCGCCAGCAG

CCTGGTGGTGGTGGACGAGCAGTTCTTCGGCCCCGGCACCCGGCTGACCGTGCTGGA

GGACCTGAAGAACGTGTTCCCCCCCGAGGTGGCCGTGTTCGAGCCCAGCGAGGCCGA

GATCAGCCACACCCAGAAGGCCACCCTGGTGTGCCTGGCCACCGGCTTCTACCCCGA

CCACGTGGAGCTGAGCTGGTGGGTGAACGGCAAGGAGGTGCACAGCGGCGTGTGCA

CCGACCCCCAGCCCCTGAAGGAGCAGCCCGCCCTGAACGACAGCCGGTACTGCCTGA

GCAGCCGGCTGCGGGTGAGCGCCACCTTCTGGCAGAACCCCCGGAACCACTTCCGGT

GCCAGGTGCAGTTCTACGGCCTGAGCGAGAACGACGAGTGGACCCAGGACCGGGCCA

AGCCCGTGACCCAGATCGTGAGCGCCGAGGCCTGGGGCCGGGCCGACTGCGGCTTC

ACCAGCGAGAGCTACCAGCAGGGCGTGCTGAGCGCCACCATCCTGTACGAGATCCTG

CTGGGCAAGGCCACCCTGTACGCCGTGCTGGTGAGCGCCCTGGTGCTGATGGCCATG

GTGAAGCGGAAGGACAGCCGGGGCTGA (codon optimised nucleic acid sequence for Vβ (VDJ) domain of HA-1$^H$ TCR
FK47.83 and constant domain (murine)):
SEQ ID NO: 76

ATGGGCACCAGCCTGCTGTGCTGGATGGCCCTGTGCCTGCTGGGCGCCGACCACGCC

GACACCGGCGTGAGCCAGAACCCCCGGCACAAGATCACCAAGCGGGGCCAGAACGTG

ACCTTCCGGTGCGACCCCATCAGCGAGCACAACCGGCTGTACTGGTACCGGCAGACC

CTGGGCCAGGGCCCCGAGTTCCTGACCTACTTCCAGAACGAGGCCCAGCTGGAGAAG

AGCCGGCTGCTGAGCGACCGGTTCAGCGCCGAGCGGCCCAAGGGCAGCTTCAGCAC

CCTGGAGATCCAGCGGACCGAGCAGGGCGACAGCGCCATGTACCTGTGCGCCAGCAG

CCTGGTGGTGGTGGACGAGCAGTTCTTCGGCCCCGGCACCCGGCTGACCGTGCTGGA

AGATCTACGTAACGTGACACCACCCAAAGTCTCACTGTTTGAGCCTAGCAAGGCAGAAA

TTGCCAACAAGCAGAAGGCCACCCTGGTGTGCCTGGCAAGAGGGTTCTTTCCAGATCA

CGTGGAGCTGTCCTGGTGGGTCAACGGCAAAGAAGTGCATTCTGGGGTCTGCACCGA

CCCCCAGGCTTACAAGGAGAGTAATTACTCATATTGTCTGTCAAGCCGGCTGAGAGTGT

CCGCCACATTCTGGCACAACCCTAGGAATCATTTCCGCTGCCAGGTCCAGTTTCACGG

CCTGAGTGAGGAAGATAAATGGCCAGAGGGGTCACCTAAGCCAGTGACACAGAACATC

AGCGCAGAAGCCTGGGGACGAGCAGACTGTGGCATTACTAGCGCCTCCTATCATCAGG

GCGTGCTGAGCGCCACTATCCTGTACGAGATTCTGCTGGGAAAGGCCACCCTGTATGC

TGTGCTGGTCTCCGGCCTGGTGCTGATGGCCATGGTCAAGAAAAAGAACTCTTGA (nucleotide sequence encoding amino acids 1 to 80 of HA-1 TCR BV7-9 (FIG. 2A)): SEQ ID NO: 77

AGGTGTGATCCAATTTCTGAACACAACCGCCTTTATTGGTACCGACAGACCCTGGGGCA

GGGCCCAGAGTTTCTGACTTACTTCCAGAATGAAGCTCAACTAGAAAAATCAAGGCTGC

TC (nucleotide sequence encoding amino acids 1 to 80 of HA-2 TCR BV7-8 (FIG. 2A)): SEQ ID NO: 78

AGGTGTGATCCAATTTCGGGTCATGTATCCCTTTTTTGGTACCAACAGGCCCTGGGGCA

GGGGCCAGAGTTTCTGACTTATTTCCAGAATGAAGCTCAACTAGACAAATCGGGGCTG

CCC (amino acid sequence of HA-1R): SEQ ID NO: 79

VLRDDLLEA (amino acid sequence for CDR1 of Vα domain of HA-1$^H$ TCR M7): SEQ ID NO: 80

TTLSN (nucleic acid sequence for CDR1 of Vα domain of HA-1$^H$ TCR M7): SEQ ID NO: 81

ACTACTTTAAGCAAT (codon optimised nucleic acid sequence for CDR1 of Vα domain of HA-1$^H$ TCR M7): SEQ ID NO: 82

ACCACCCTGAGCAAC (amino acid sequence for CDR2 of Vα domain of HA-1$^H$ TCR M7): SEQ ID NO: 83

LVKSGEV (nucleic acid sequence for CDR2 of Vα domain of HA-1$^H$ TCR M7): SEQ ID NO: 84

TTAGTGAAGAGTGGAGAAGTG (codon optimised nucleic acid sequence for CDR2 of Vα domain of HA-1$^H$ TCR M7): SEQ ID NO: 85

CTGGTGAAGAGCGGCGAGGTG (amino acid sequence for CDR2 of Vβ domain of HA-1$^H$ TCR M7, HA-1$^H$ TCR M2, or HA-1$^H$ TCR FK47.83): SEQ ID NO: 86

FQNEAQ (nucleic acid sequence for CDR2 of Vβ domain of HA-1$^H$ TCR M7, HA-1$^H$ TCR M2, or HA-1$^H$ TCR FK47.83): SEQ ID NO: 87

TTCCAGAATGAAGCTCAA (codon optimised nucleic acid sequence for CDR2 of V13 domain of HA-1$^H$ TCR M7, HA-1$^H$ TCR M2, or HA-1$^H$ TCR FK47.83): SEQ ID NO: 88

TTCCAGAACGAGGCCCAG (murine C - beta region) SEQ ID NO: 89 gagcaaggccgagatcgccaacaagcagaaagccaccctcgtgtgcctggccagaggcttcttccccgaccatgtggaactgt cttggtgggtcaacggcaaagaggtgcacagcggagtgtccaccgaccctcaggcctacaaagagagcaactacagctactg cctgagcagcagactgcgggtgtccgccaccttctgcacaaccccggaaccacttcagatgccaggtgcagtttcacggcct gagcgaagaggacaagtggcccgaaggctcccccaagcccgtgacccagaatatctctgccgaggcctggggcagagccg

```
actgtggaattaccagcgccagctaccaccagggcgtgctgtctgccaccatcctgtacgagatcctgctgggcaaggccaccc tgtacgccgtgctggtgtctggcctggt
```

(murine C - alpha region)

SEQ ID NO: 90

```
caggacagcaccctgtgcctgttcaccgacttcgacagccagatcaacgtgcccaagaccatggaaagcggcaccttcatcac cgacaagacagtgctggacatgaaggccatggacagcaagtccaacggcgcaatcgcctggtccaaccagaccagcttcac atgccaggacatcttcaaagagacaaacgccacatacccccagcagcgacgtgccctgtgatgccaccctgacagagaagtcc ttcgagacagacatgaacctgaacttccagaatctgtccgtgatgggcctgagaatcctgctgctgaaggtggccggcttcaatct gctgatgaccctgcggctgtggtccagctga
```

(Seattle TCR2, Vβ domain from WO2018/058002)

SEQ ID NO: 91

```
MGTSLLCWMALCLLGADHADTGVSQDPRHKITKRGQNVTFRCDPISEHNRLYWYRQTLGQ

GPEFLTYFQNEAQLEKSRLLSDRFSAERPKGSFSTLEIQRTEQGDSAMYLCASSLVKGEKL

FFGSGTQLSVL
```

(Seattle TCR2, Vα domain from WO2018/058002)

SEQ ID NO: 92

```
METLLGLLILWLQLQWVSSKQEVTQIPAALSVPEGENLVLNCSFTDSAIYNLQWFRQDPGK

GLTSLLLIQSSQREQTSGRLNASLDKSSGRSTLYIAASQPGDSATYLCAVIGLGGTYKYIFGT

GTRLKVLAN
```

REFERENCES

1. Marijt W A, Heemskerk M H, Kloosterboer F M, Goulmy E, Kester M G, van der Hoorn M A, et al. Hematopoiesis-restricted minor histocompatibility antigens HA-1- or HA-2-specific T cells can induce complete remissions of relapsed leukemia. Proc Natl Acad Sci USA 2003; 100: 2742-7.
2. den Haan J M, Sherman N E, Blokland E, Huczko E, Koning F, Drijfhout J W, et al. Identification of a graft versus host disease-associated human minor histocompatibility antigen. Science 1995; 268:1476-80.
3. Mommaas B, van Halteren A G, Pool J, van der Veken L, Wieles B, Heemskerk M H, et al. Adult and cord blood T cells can acquire HA-1 specificity through HA-1 T-cell receptor gene transfer. Haematologica 2005; 90:1415-21.
4. Verdijk R M, Mutis T, Wilke M, Pool J, Schrama E, Brand A, et al. Exclusive TCRVbeta chain usage of ex vivo generated minor Histocompatibility antigen HA-1 specific cytotoxic T cells: implications for monitoring of immunotherapy of leukemia by TCRBV spectratyping. Hematol J 2002; 3:271-5.
5. Heemskerk M H, Hagedoorn R S, van der Hoorn M A, van der Veken L T, Hoogeboom M, Kester M G, et al. Efficiency of T cell receptor expression in dual specific T cells is controlled by the intrinsic qualities of the TCR chains within the TCR-CD3 complex. Blood 2006.
6. van Loenen, M. M., de Boer, R., Hagedoorn, R. S., van Egmond, E. H., Falkenburg, J. H. & Heemskerk, M. H. (2011) Optimization of the HA-1-specific T-cell receptor for gene therapy of hematologic malignancies, Haematologica. 96, 477-481
7. van Loenen M M, de Boer R, Amir A L, Hagedoorn R S, Volbeda G L, Willemze R, et al. Mixed T cell receptor dimers harbor potentially harmful neoreactivity. Proc Natl Acad Sci USA 2010; 107:10972-7.
8. van Loenen, M. M., de Boer, R., van Liempt, E., Meij, P., Jedema, I., Falkenburg, J. H. & Heemskerk, M. H. (2014) A Good Manufacturing Practice procedure to engineer donor virus-specific T cells into potent anti-leukemic effector cells, Haematologica. 99, 759-768.
9. Meij P, Jedema I, van der Hoorn M A, Bongaerts R, Cox L, Wafelman A R, et al. Generation and administration of HA-1-specific T-cell lines for the treatment of patients with relapsed leukemia after allogeneic stem cell transplantation: a pilot study. Haematologica. 2012; 97(8): 1205-8.

Lefranc M.-P. "Unique database numbering system for immunogenetic analysis" Immunology Today, 18: 509 (1997).

Lefranc M.-P. "The IMGT unique numbering for immunoglobulins, T cell Receptors and Ig-like domains" The immunologist, 7, 132-136 (1999).

Lefranc M.-P. et al. "IMGT unique numbering for immunoglobulin and Tcell receptor variable domains and Ig superfamily V-like domains" Dev. Comp. Immunol., 27, 55-77 (2003).

Lefranc M.-P. et al. "IMGT unique numbering for immunoglobulin and T cell receptor constant domains and Ig superfamily C-like domains" Dev. Comp. Immunol., 2005, 29, 185-203.

The invention claimed is:

1. An isolated nucleic acid composition that encodes an HA-1$^H$ antigen-specific binding protein having a TCR α chain variable (Vα) domain and a TCR β chain variable (Vβ) domain, the composition comprising:

(i)
(a) a nucleic acid sequence that encodes a TCR Vα domain comprising a CDR3 amino acid sequence, a CDR1 amino acid sequence, and a CDR2 amino acid sequence, wherein the CDR3 amino acid sequence comprises the sequence of SEQ ID NO: 1, wherein the CDR1 amino acid sequence comprises the sequence of SEQ ID NO: 80, and wherein the CDR2 amino acid sequence comprises the sequence of SEQ ID NO: 83; and (b) a nucleic acid sequence that encodes a TCR Vβ domain having an amino acid sequence encoded by a TRBV7-9 gene, wherein the Vβ domain comprises a CDR3 amino acid sequence, a CDR1 amino acid sequence, and a CDR2 amino acid sequence, wherein the CDR3 amino acid sequence comprises the sequence of SEQ ID NO: 4, wherein the CDR1 amino acid sequence comprises the sequence of SEQ ID NO: 7 and wherein the CDR2 amino acid sequence comprises the sequence of SEQ ID NO: 86; or (ii)
(a) a nucleic acid sequence that encodes a TCR Vα domain comprising a CDR3 amino acid sequence, a CDR1 amino acid sequence, and a CDR2 amino acid sequence, wherein the CDR3 amino acid sequence comprises the sequence of SEQ ID NO: 2, wherein the CDR1 amino acid sequence comprises the sequence of SEQ ID NO: 8, and wherein the CDR2 amino acid sequence comprises the sequence of SEQ ID NO: 28; and (b) a nucleic acid sequence that encodes a TCR Vβ domain having an amino acid sequence encoded by a TRBV7-9 gene, wherein the Vβ domain comprises a CDR3 amino acid sequence, a CDR1 amino acid sequence, and a CDR2 amino acid sequence, wherein the CDR3 amino acid sequence comprises the sequence of SEQ ID NO: 5, wherein the CDR1 amino acid sequence comprises the sequence of SEQ ID NO: 7 and wherein the CDR2 amino acid sequence comprises the sequence of SEQ ID NO: 86; or (iii)
(a) a nucleic acid sequence that encodes a TCR Vα domain comprising a CDR3 amino acid sequence, a CDR1 amino acid sequence, and a CDR2 amino acid sequence, wherein the CDR3 amino acid sequence comprises the sequence of SEQ ID NO: 3, wherein the CDR1 amino acid sequence comprises the sequence of SEQ ID NO: 8, and wherein the CDR2 amino acid sequence comprises the sequence of SEQ ID NO: 28; and (b) a nucleic acid sequence that encodes a TCR Vβ domain having an amino acid sequence encoded by a TRBV7-9 gene, wherein the Vβ domain comprises a CDR3 amino acid sequence, a CDR1 amino acid sequence, and a CDR2 amino acid sequence, wherein the CDR3 amino acid sequence comprises the sequence of SEQ ID NO: 6, wherein the CDR1 amino acid sequence comprises the sequence of SEQ ID NO: 7, and wherein the CDR2 amino acid sequence comprises the sequence of SEQ ID NO: 86; or (iv)
(a) a nucleic acid sequence that encodes a TCR Vα domain comprising a CDR3 amino acid sequence, a CDR1 amino acid sequence, and a CDR2 amino acid sequence, wherein the CDR3 amino acid sequence comprises the sequence of SEQ ID NO: 2, wherein the CDR1 amino acid sequence comprises the sequence of SEQ ID NO: 8, and wherein the CDR2 amino acid sequence comprises the sequence of SEQ ID NO: 28; and (b) a nucleic acid sequence that encodes a TCR Vβ domain having an amino acid sequence encoded by a TRBV7-9 gene, wherein the Vβ domain comprises a CDR3 amino acid sequence, a CDR1 amino acid sequence, and a CDR2 amino acid sequence, wherein the CDR3 amino acid sequence comprises the sequence of SEQ ID NO: 4, wherein the CDR1 amino acid sequence comprises the sequence of SEQ ID NO: 7, and wherein the CDR2 amino acid sequence comprises the sequence of SEQ ID NO: 86.

2. The isolated nucleic acid composition of claim 1, wherein the TRBV7-9 gene in (i), (ii), (iii) or (iv) is TRBV7-9*01 or TRBV7-9*03.

3. The isolated nucleic acid composition of claim 1, wherein the HA-1$^H$ antigen comprises the amino acid sequence of SEQ ID NO: 10.

4. The isolated nucleic acid composition of claim 1, wherein the encoded binding protein is capable of specifically binding to a HA-1$^H$ antigen: HLA-A*0201 complex.

5. The isolated nucleic acid composition of claim 1, wherein the composition comprises (i), and wherein:

(a) the Vα domain comprises an amino acid sequence having at least 90% sequence identity to, comprising, or consisting of, SEQ ID NO: 17; and/or (b) the Vβ domain comprises an amino acid sequence having at least 90% sequence identity to, comprising, or consisting of, SEQ ID NO: 18.

6. The isolated nucleic acid composition of claim 5, wherein:

(a) the Vα domain is encoded by a nucleic acid sequence comprising the sequence of SEQ ID NO: 19 or SEQ ID NO: 20; and/or (b) the Vβ domain is encoded by a nucleic acid sequence comprising the sequence of SEQ ID NO: 21 or SEQ ID NO:22.

7. The isolated nucleic acid composition of claim 1, wherein the composition comprises (ii), and wherein:

(a) the Vα domain comprises an amino acid sequence having at least 90% sequence identity to, comprising, or consisting of, SEQ ID NO: 29; and/or (b) the Vβ domain comprises an amino acid sequence having at least 90% sequence identity to, comprising, or consisting of, SEQ ID NO: 30.

8. The isolated nucleic acid composition of claim 7, wherein:

(a) the Vα domain is encoded by a nucleic acid sequence comprising the sequence of SEQ ID NO: 31 or SEQ ID NO:32; and/or (b) the Vβ domain is encoded by a nucleic acid sequence comprising the sequence of SEQ ID NO: 33 or SEQ ID NO:34.

9. The isolated nucleic acid composition of claim 1, wherein the composition comprises (iii), and wherein:

(a) the Vα domain comprises an amino acid sequence having at least 90% sequence identity to, comprising, or consisting of, SEQ ID NO: 41; and/or (b) the Vβ domain comprises an amino acid sequence having at least 90% sequence identity to, comprising, or consisting of, SEQ ID NO: 42.

10. The isolated nucleic acid composition of claim 9, wherein:

(a) the Vα domain is encoded by a nucleic acid sequence comprising the sequence of SEQ ID NO: 43 or SEQ ID NO:44; and/or (b) the Vβ domain is encoded by a nucleic acid sequence comprising the sequence of SEQ ID NO: 45 or SEQ ID NO:46.

11. The isolated nucleic acid composition of claim 1, wherein the composition comprises (iv), and wherein:

(a) the Vα domain comprises an amino acid sequence having at least 90% sequence identity to, comprising, or consisting of, SEQ ID NO: 29; and/or (b) the Vβ domain comprises an amino acid sequence having at least 90% sequence identity to, comprising, or consisting of, SEQ ID NO: 18.

12. The isolated nucleic acid composition of claim 11, wherein:

(a) the Vα domain is encoded by a nucleic acid sequence comprising the sequence of SEQ ID NO: 31 or SEQ ID NO: 32; and/or (b) the Vβ domain is encoded by a nucleic acid sequence comprising the sequence of SEQ ID NO: 21 or SEQ ID NO:22.

13. The isolated nucleic acid composition of claim 1 further comprising a TCR α chain constant domain and/or a TCR β chain constant domain.

14. The isolated nucleic acid composition of claim 1, wherein the encoded binding protein comprises a TCR, an antigen binding fragment of a TCR, or a chimeric antigen receptor (CAR).

15. The isolated nucleic acid composition of claim 14, wherein the antigen binding fragment of a TCR is a single chain TCR (scTCR).

16. A vector system comprising a nucleic acid composition of claim 1.

17. A modified cell transfected or transduced with a nucleic acid composition according to claim 1, or a vector system according to claim 16, wherein the modified cell is HLA-A *0201 negative and/or HA-1$^H$ negative.

18. A pharmaceutical composition comprising a nucleic acid composition according to claim 1, a vector system according to claim 16, or a modified cell according to claim 17, and a pharmaceutically acceptable excipient, adjuvant, diluent and/or carrier.

19. A method for treating or preventing a relapse of a hematological malignancy after allogeneic stem cell transplantation (allo-SCT) in a HLA-A*0201 positive human subject, the method comprising administering to the subject a therapeutically effective amount of a modified cell according to claim 17, wherein the modified cell is a T cell.

20. A method of generating a binding protein that is capable of specifically binding to a peptide containing an HA-1$^H$ antigen and does not bind to a peptide that does not contain an HA-1$^H$ antigen, comprising contacting a nucleic acid composition according to claim 1 with a cell under conditions in which the nucleic acid composition is incorporated and expressed by the cell.

* * * * *

UNITED STATES PATENT AND TRADEMARK OFFICE
CERTIFICATE OF CORRECTION

PATENT NO. : 12,448,427 B2
APPLICATION NO. : 17/283786
DATED : October 21, 2025
INVENTOR(S) : Heemskerk et al.

Page 1 of 1

It is certified that error appears in the above-identified patent and that said Letters Patent is hereby corrected as shown below:

In the Claims

In Claim 18, Column 173, Line 14, delete "pharmaceutical".

Signed and Sealed this
Thirteenth Day of January, 2026

John A. Squires
*Director of the United States Patent and Trademark Office*